United States Patent [19]

Masunaga et al.

[11] Patent Number: 4,523,827

[45] Date of Patent: Jun. 18, 1985

[54] CAMERA

[75] Inventors: Makoto Masunaga; Hideo Taka, both of Tokyo, Japan

[73] Assignee: Canon Kabushiki Kaisha, Tokyo, Japan

[21] Appl. No.: 298,532

[22] Filed: Sep. 1, 1981

[30] Foreign Application Priority Data

Sep. 8, 1980 [JP] Japan .................... 55-125111

[51] Int. Cl.³ .............................................. G03B 3/00
[52] U.S. Cl. .................................... 354/400; 354/402; 354/420; 354/267.1
[58] Field of Search ............... 354/400, 401, 402, 403, 354/404, 405, 406, 407, 408, 409, 412, 420, 267.1

[56] References Cited

U.S. PATENT DOCUMENTS 4,238,154 12/1980 Biber et al. ...................... 354/401
4,346,975 8/1982 Isono .................................. 354/412
4,348,089 9/1982 Shenk ................................ 354/400

Primary Examiner—Russell E. Adams
Attorney, Agent, or Firm—Fitzpatrick, Cella, Harper & Scinto

[57] ABSTRACT

A camera of the type having a distance detecting system for repeatedly detecting the object distance, a photographic lens control system for stopping the displacement of the photographic lens from a predetermined set position by an actuator when the photographic lens reaches a position indicated by distance data obtained with the distance detecting system, to thereby focus the photographic lens on an object to be photographed, a control system provided to prohibit the initiation of the displacement of the photographic lens by the actuator until effective distance data is obtained by the distance detecting system, or until the number of distance detecting operations reaches a predetermined value.

19 Claims, 170 Drawing Figures

| FIG. 21-1 | FIG. 21-2 | FIG. 21-3 | FIG. 21-4 | FIG. 21-5 | FIG. 21-6 |
|---|---|---|---|---|---|
| FIG. 21-7 | FIG. 21-8 | FIG. 21-9 | FIG. 21-10 | FIG. 21-11 | FIG. 21-12 |
| FIG. 21-13 | FIG. 21-14 | FIG. 21-15 | FIG. 21-16 | FIG. 21-17 | FIG. 21-18 |
| FIG. 21-19 | FIG. 21-20 | FIG. 21-21 | FIG. 21-22 | FIG. 21-23 | FIG. 21-24 |
| FIG. 21-25 | FIG. 21-26 | FIG. 21-27 | FIG. 21-28 | FIG. 21-29 | FIG. 21-30 |
| FIG. 21-31 | FIG. 21-32 | FIG. 21-33 | FIG. 21-34 | FIG. 21-35 | FIG. 21-36 |

FIG. 21

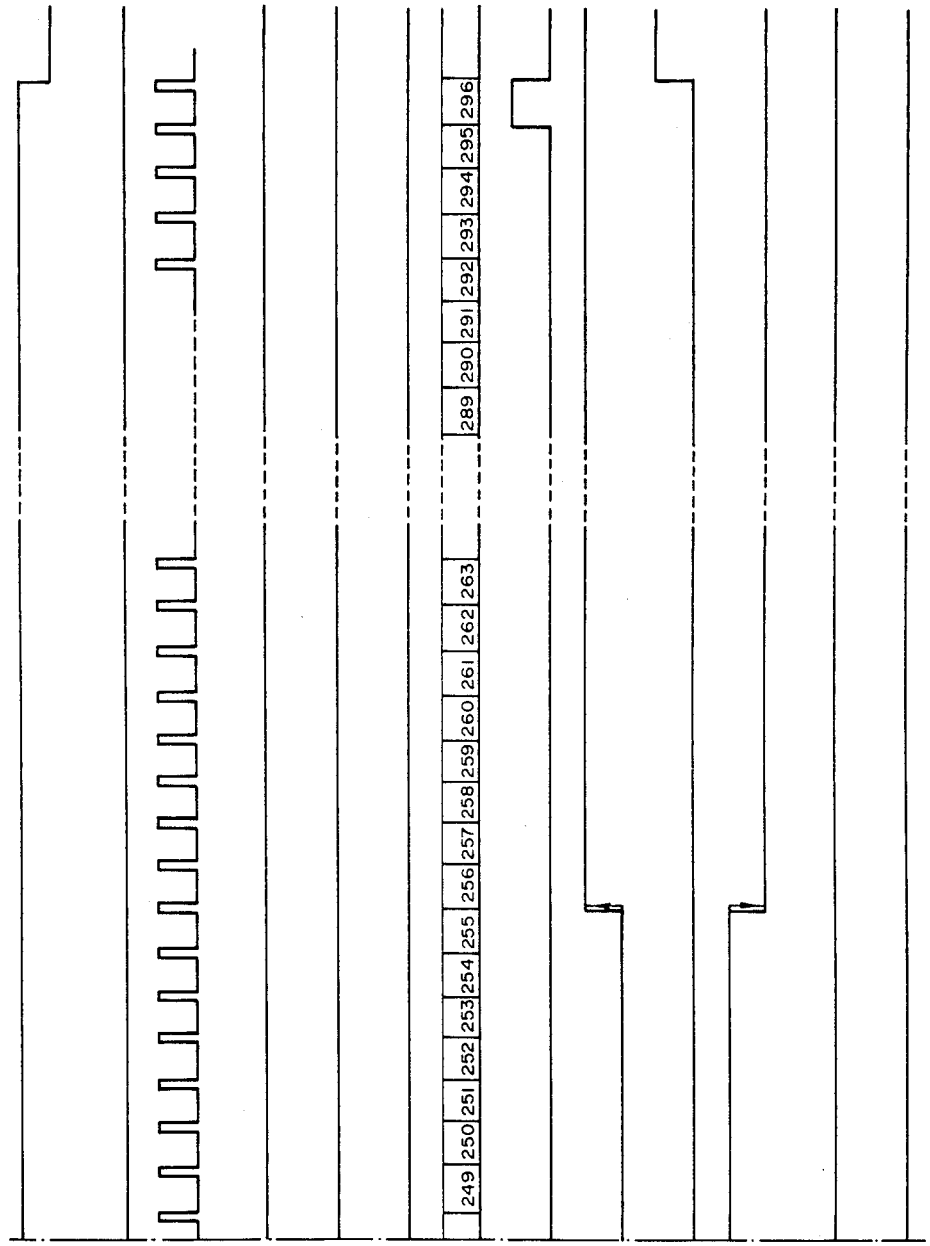

CC6 ACTION $\begin{cases} CC6 \cdot (\overline{SELF} + SE\ F/F\ SET) \cdot (RE\ F/F\ SET + CNT) \rightarrow CC8 \\ CC6 \cdot \overline{SELF} \cdot SE\ F/F\ RESET \rightarrow CC7 \\ CC6 \cdot (SELF + SE\ F/F\ SET) \cdot (RE\ F/F\ RESET \cdot \overline{CNT}) \rightarrow CC3 \end{cases}$

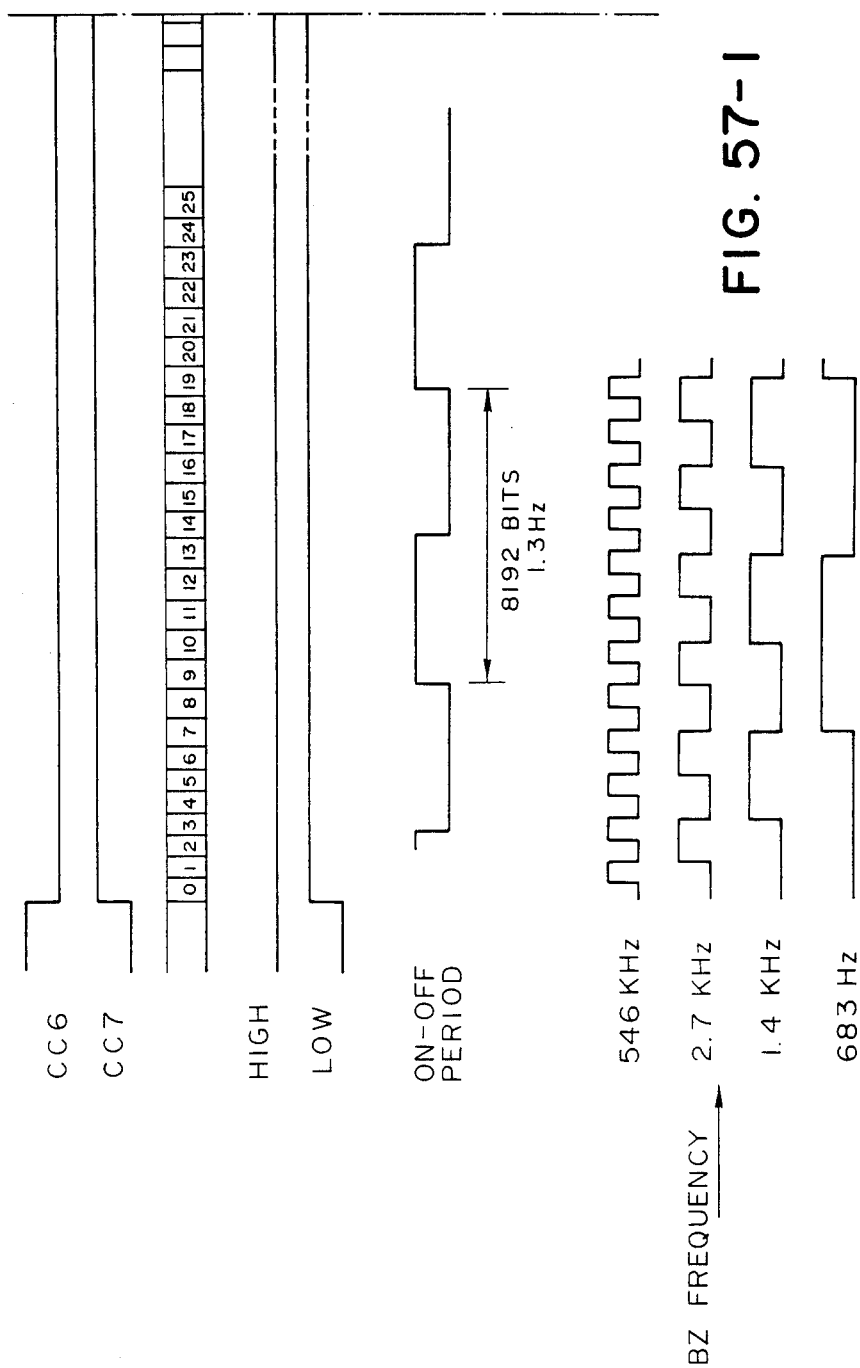

TO PROVIDE PULSE SIGNAL AT BZ
TERMINAL UPON CAMERA-SHAKE WARNING

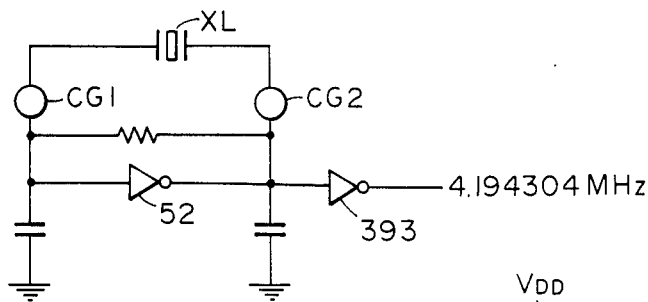
FIG. 68
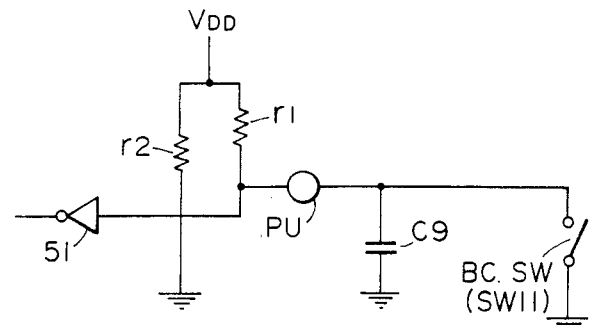
FIG. 69
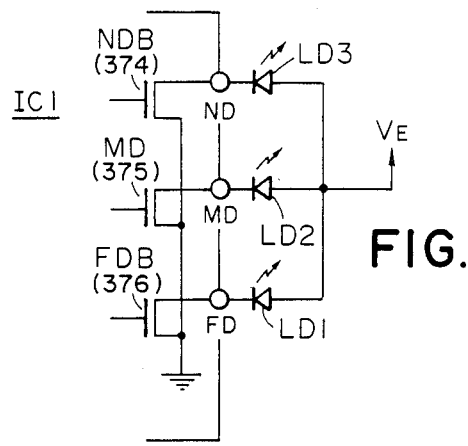
FIG. 70
| n<br>TERMINALS | STROBE INPOP | | | STROBE POP | | |
|---|---|---|---|---|---|---|
| | 0–3 | 4–15 | 16– | 0–3 | 4–15 | 16– |
| ND | H | H | L | H | H | L |
| MD | H | L | H | L | L | H |
| FD | L | H | H | H | H | H |
FIG. 71
H : HIGH
L : LOW
DISTANCE = $\frac{25.5}{n}$ (m)

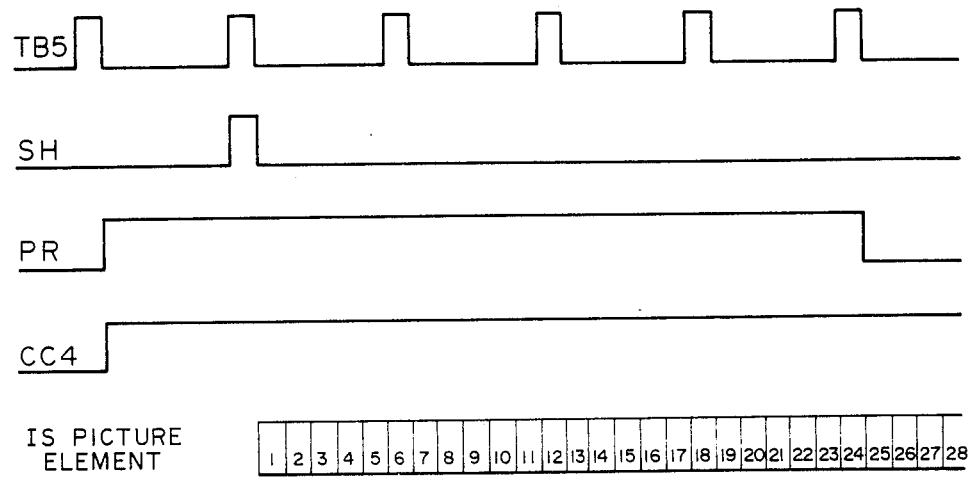
FIG. 77
STD FIELD RANGE
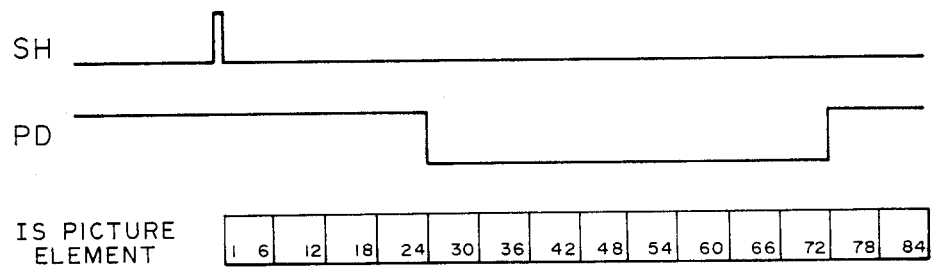
FIG. 78

(1) BATTERY CHECK
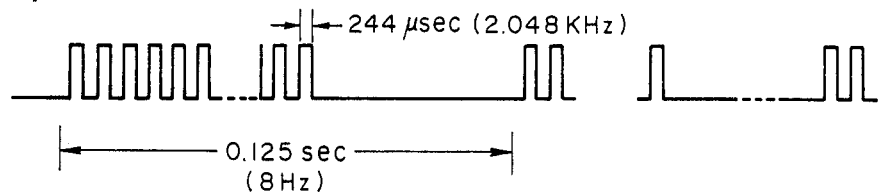
(2) CAMERA-SHAKE WARNING
(3) SELF TIMER
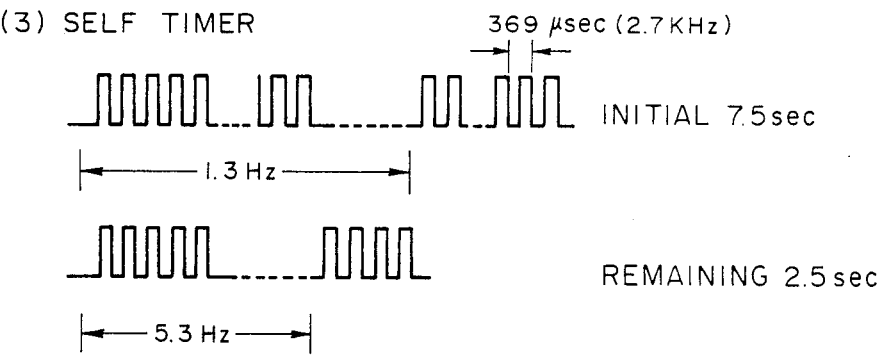
(4) WIND-UP TROUBLE WARNING
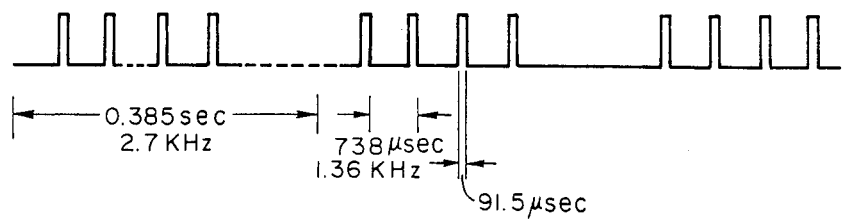
FIG. 82

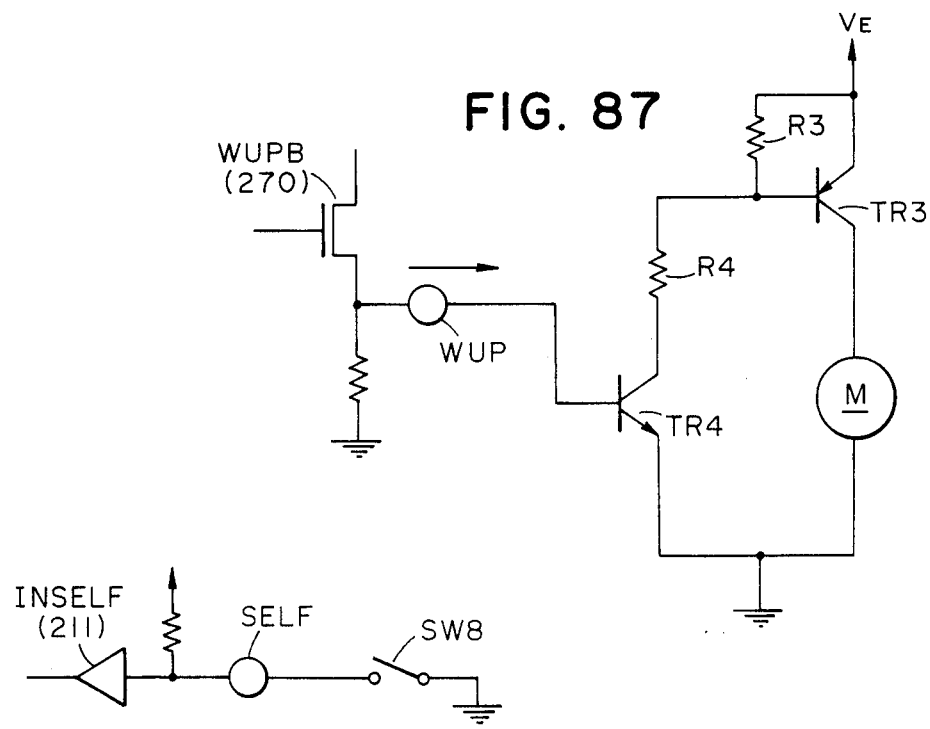
FIG. 87
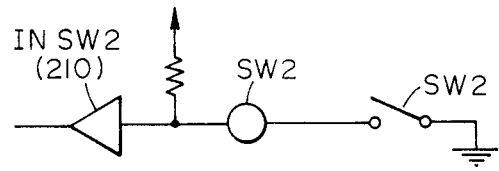
FIG. 88
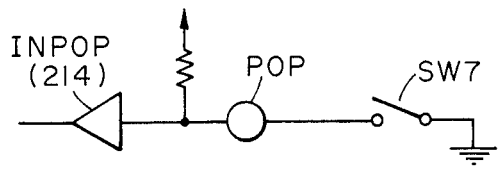
FIG. 89
FIG. 90
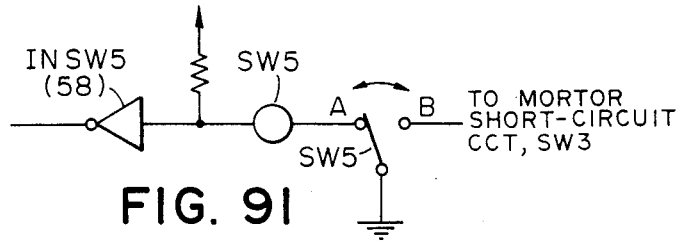
FIG. 91

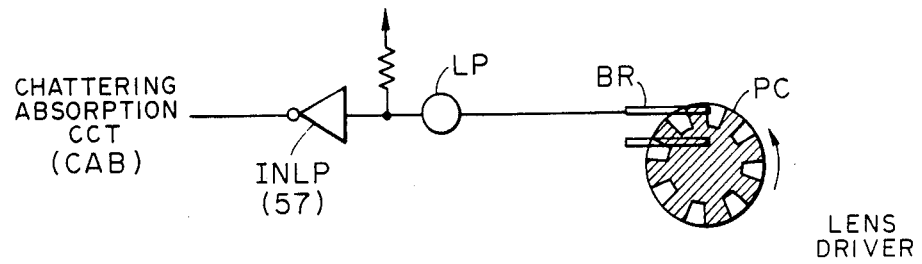
FIG. 92
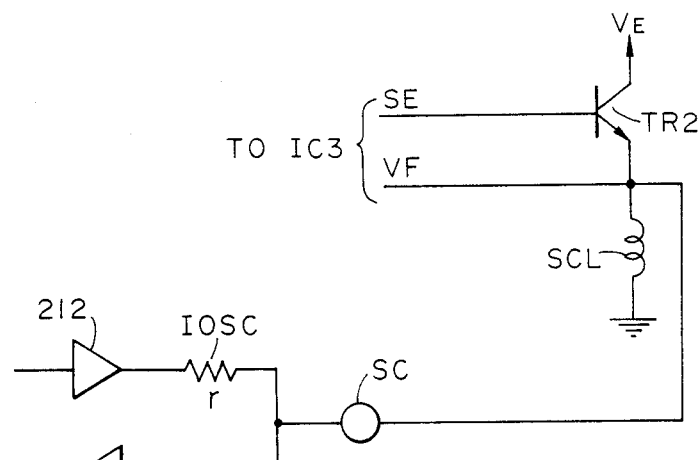
FIG. 93
| | | SST | |
|---|---|---|---|
| | | H | L |
| LBC | H | EXPOSURE DETERMINATION CP3 OUTPUT (EXPOSURE SET TERMINATION) | CAMERA-SHAKE DISCRIMINATION COMPARATOR CP4 OUTPUT |
| | L | BATTERY VOL. DISCRIMINATION COMPARATOR CP5 OUTPUT | |
FIG. 94

CAMERA

BACKGROUND OF THE INVENTION

1. Field of the Invention

The present invention relates to a camera and, more particularly, to a camera which is capable of effectively performing sequence control of an automatic focusing device, an electric winding device, an electronic self-timer, an electronic flash device and so on which are built into or attached to the camera.

2. Description of the Prior Art

According to the conventional method of controlling a camera, individual parts of different functions are sequantially connected to constitute a sequence control system. However, when new factors are involved such as automatic focusing, electronic self-timing, and electric winding, effective sequence control may not be achieved with simple sequence control.

Considering the parts, e.g., involved in a distance measuring operation and a shutter releasing operation of a conventional automatic focusing device, prior art devices are so arranged that when the shutter releasing operation is performed before the distance measuring operation is completed or the distance measuring operation is performed after the operation of a self-timer, determination of priority of control in a system, especially in a system specifically designed for photography with a camera, must depends on the sequence of the respective mechanisms. This has resulted in ineffective system configuration.

SUMMARY OF THE INVENTION

It is, therefore, an object of the present invention to provide a novel, efficient and improved camera which eliminates the drawbacks of the prior art technique and which is capable of proper sequence control by constituting an effective photography system including, e.g., an automatic focusing device, an electronic self-timer and an electric winder.

More specifically, it is an object of the present invention to provide an improved digital system for a camera which is capable of performing discrimination of various conditions such as the battery voltage, the presence or absence of defects in the respective electromagnetic conversion mechanisms, and the complete or incomplete condition of the distance measurement, while at the same time effecting the operations in the appropriate sequence for lessening photographic errors.

Still more specifically, it is the first object of the present invention to provide a camera having a distance detecting system for repeatedly detecting object distance, and a photographic lens control system for stopping the displacement of the photographic lens from a predetermined set position by actator means when the photographic lens has reached a position indicated by distance data obtained with the distance detecting system, to thereby focus the photographic lens on an object to be photographed, wherein more efficient and effective sequence control can be performed along the line of the ultimate end of the camera, i.e., photography, with automatic focus control of the photographic lens after the detection of the distance to the object to be photographed by the distance detecting system, even in consideration of the fact that effective distance data is hard to obtain, depending upon the condition of the object to be photographed. The first characteristic feature of the present invention for the purpose of achieving this object resides in that a control means is provided for prohibiting the initiation of the displacement of the photographic lens by the actuator means until the effective distance data is obtained with the distance measuring system or until the number of distance detection operations reaches a predetermined value.

In association with this characteristic feature, various improved constructions of the camera are proposed in the embodiments to be described hereinafter. For example, the control means may be constructed so as to include in the distance detecting system, as a means for photoelectrically detecting an image of the object to be photographed, a signal integrating and storing image sensor with which control of the signal integrating time is variable, so that the limit number to be set for the distance detecting operations of the distance detecting system may be varied according to the signal integrating time which is set for the image sensor. There is also proposed a construction according to which a two-step shutter release button is incorporated. When the button is depressed to the first position, the distance detecting system is operated. The control system is so constructed that, after the button is depressed to the second position, the initiation of the displacement of the photographic lens by the actuator means is prohibited until the effective distance data is obtained with the distance detecting system or until the number of the distance detecting operations reaches the predetermined value. Alternatively, another construction is proposed according to which control of the photographic lens is effected based on prefixed distance-data which is provided in advance, when the effective distance-data cannot be obtained before the number of the distance detecting operations with the distance detecting system reaches the predetermined value.

It is the second object of the present invention to provide a camera having an automatic focusing device which accomplishes focusing on the object to be photographed by detecting whether or not the photographic lens has focused on the object to be photographed during its displacement from a predetermined set position by actuator means, and by stopping the displacement of the photographic lens when it has reached the in-focus position, wherein more effective sequence control can be performed along the line of the ultimate end of the camera, i.e., photography, in case of occurrence of any imperfect operation of the mechanisms or electronic means involved in the control of the photographic lens, which in prior art would result in that the film exposure to follow is not performed immediately, which may be considered as a defect or which may result in camera shake. The second characteristic feature of the present invention for the purpose of achieving this object of the present invention resides in that a sequence control means for controlling the operation of the camera is provided so that the counting of the predetermined period of time may be initiated at the same time as the initiation of the displacement of the photographic lens by the actuator means, and the subsequent operation sequence for photography may be effected after the predetermined period of time has elapsed.

It is the third object of the present invention to provide a camera having an automatic focusing device which accomplishes focusing on the object to be photographed by detecting whether or not the photographic lens has focused on the object to be photographed during its displacement from a predetermined set position by actuator means, and by stopping the displacement of the photographic lens when it has reached the in-focus position, wherein an effective solution is provided to the problem of delayed control of the photographic lens and thus unnecessary consumption of power when the mechanisms and or electronic means involved in the control of the photographic lens have been imperfectly operated. The third characteristic feature of the present invention for the purpose of achieving this object resides in that a sequence control means is provided which detects whether or not the displacement of the photograhic lens is initiated after the instruction for initiating the displacement of the photographic lens is supplied to the actuator means, so that the subsequent operation sequence for photography may be effected when the displacement is detected to have been initiated and the subsequent operation sequence for photography may be immediately interrupted when the displacement is detected not to have been initiated.

In association with this characteristic feature of the present invention, various improved constructions of the camera are proposed in the embodiments to be described hereinafter. For example, the automatic focusing device comprises a distance detecting system which detects the distance to an object to be photographed and which produces digital data on this distance, and a photographic lens control system which stops the displacement of the photographic lens when the count of clock pulses obtained in association with the displacement of the photographic lens from a predetermined set position coincides with the digital data indicating the distance to the object to be photographed. The sequence control means is so constructed that the detection of whether or not the displacement of the photographic lens is initiated is performed through the detection of an initial pulse obtained in association with the displacement of the photographic lens. Another construction is proposed according to which the actuator means comprises electromagnetic means which starts the displacement of the photographic lens upon being energized in response to the instruction for initiating the lens displacement, so that detection of defects in the electromagnetic means for displacing the photographic lens can be accomplished through detection by the sequence control means of whether or not the displacement of the photographic lens has begun after reception of the command for initiating this displacement. According to still another construction, an electromagnetic automatic focusing means is provided which blocks a stopper means for stopping the photographic lens, when energized in synchronism with the operation of the actuator means, and which releases the stopper means for stopping the photographic lens at the in-focus position, in response to de-energization when the photographic lens has reached the in-focus position. According to this construction, the stopper means is so arranged that when the photographic lens is set at the predetermined set position, the stopper means prevents the substantial movement of the lens. Further detection of whether or not the electromagnetic automatic focusing means is defective is achieved through the detection by the sequence control means of whether or not the photographic lens has been displaced after the command for initiating the displacement of the photographic lens is supplied.

It is the fourth object of the present invention to provide an improved camera of the type as disclosed in the U.S. patent application Ser. No. 865,924 (German Patent Application No. P28 00 451.5: G78 00 294.5), U.S. patent application Ser. No. 867,339 (German Patent Application No. P28 00 450.4: G78 00 293.4), U.S. patent application Ser. No. 867,343 (German Patent Application No. P28 00 448.0: G78 00 290.1), U.S. patent application Ser. No. 944,972 (German Patent Application No. P28 42 348.5: G78 28 970.0), and U.S. patent application No. 121,690 (German Patent Application No. P30 07 390.6: G80 05 277.3), all of the present assignee, wherein the camera has for the purpose of automatic focusing of the photographic lens, a distance detecting system using a digital counter means for detecting the distance to an object to be photographed, and further includes an improved arrangement for a self-timer function as an additional feature. The fourth characteristic feature of the present invention for the purpose of achieving this object resides in that, in a camera having a distance detecting system using a digital counter means for detecting the distance to the object to be photographed, at least part of the digital counter means can be selectively used as a self-timer means.

In association with this characteristic feature of the present invention, various improved constructions of the camera are proposed. For example, the sequence control means is incorporated to stop the distance detecting operation of the distance detecting system during the time counting of the self-timer period by the digital counter means, and to resume the distance detecting operation of the distance detecting system after the preset self-timer period has elasped, when the digital counter means is used as a self-timer means. According to another construction, a two-step shutter release button is incorporated such that the distance detecting system is repeatedly operated when the release button is depressed to the first position. When the digital counter means is used as a self-timer means, the counting of the self-timer period in units of seconds is performed upon depression of the shutter release cutton to the second position. When the digital counter means is used as a self-timer means, the sequence control means controls the distance detecting operation of the distance detecting system to be interrupted until the self-timer period elapses after the depression of the shutter release button to the second position; the distance detecting operation of the distance detecting system is resumed after the self-timer period has elapsed. The sequence control means may alternatively be constructed so as to prohibit the focusing of the photographic lens on the object to be photographed until the effective distance data is available from the distance detecting system or until the number of distance detecting operations reaches a predetermined value, after the shutter release button is depressed to the second position in the case where the digital counter means is not used as the self-timer means or after the elapse of the self-timer period in units of seconds in the case where the digital counter means is used as the self-timer means.

It is the fifth object of the present invention to provide a camera with an automatic winding device, which assures correct photographic operations without wind-up troubles. The fifth characteristic feature of the present invention for the purpose of achieving this object resides in that a sequence control means for control of camera is incorporated in a camera with an automatic winding device so that detection of whether or not winding is completed is performed before exposure and the predetermined operation sequence for photography can be performed after operating the automatic winding device if the film is not already wound.

In association with this characteristic feature, a construction of the camera is proposed in the embodiments to be described hereinafter according to which continuous photographic operation may be normally performed as long as the shutter release button is operated, while only a single exposure is possible in a case where the photographing starts with the film incompletely wound, which means that in the first place the film must be wound completely. According to to this construction, the power is normally maintained upon operation of the shutter release button, but is not maintained and the operation sequence will not proceeed if the photographing operation is attempted after incomplete winding operation.

It is the sixth object of the present invention to provide a camera of the type incorporating a continuous photographing device for performing continuous photographing operation as long as the shutter release button is being operated, and further incorporating or capable of supporting an electronic flash device, which is capable of performing suitable photographing operation according to whether or not the electronic flash device is in use, particularly in consideration of the fact that the electronic flash device generally requires a very long time to be charged. The sixth feature of the present invention for the purpose of achieving this object resides in that a control means for controlling the operation of the camera is provided to detect the in-use or not-in-use condition of the electronic flashing device, so that only one exposure is made when the electronic flash device is used.

It is the seventh object of the present invention to provide a camera which has a routine for low-luminance detection or alarm as one measure for determining exposure, and which incorporates or is capable of supporting an electronic flash device, wherein more efficient sequence control can be performed when the electronic flash device is used, by skipping the unnecessary functions included in the preprogrammed operation sequence in view of the photographing conditions in a case where the electronic flash device is to be used. The seventh characteristic feature of the present invention for the purpose of achieving this object resides in that a sequence control means for controlling the operation of the camera is incorporated in the camera of this type so that the predetermined operation sequence can be performed without performing the low luminance detection by the low luminance detecting means when the electronic flash device is detected to be used.

It is the eighth object of the present invention to provide an improved camera having an electromagnetically driven shutter, wherein the battery voltage can be correctly checked by applying an actual load without performing any photographing operation. The eighth characteristic feature of the present invention for the purpose of achieving this object resides in that a battery check means is incorporated in the camera as described above for energizing the electromagnetic means in response to a battery check command for a period of time short enough to keep the shutter closed, so that the battery voltage at this instant can be checked.

In association with this characteristic feature, a construction is proposed in a preferred embodiment of the present invention to be described hereinafter, according to which the electromagnetic means is intermittently repeatedly energized for short periods of time so as to perform the checking of the battery voltage in a correct and reliable manner.

It is the ninth object of the present invention to provide a camera of the type which detects whether or not a photographic lens has reached the in-focus position during displacement in a predetermined direction from a predetermined position and stops the photographic lens at this in-focus position, wherein the part for controlling the starting and stopping of the photographic lens and the procedure for this are simplified so that erratic operations may occur less frequently. The ninth characteristic feature of the present invention for the purpose of achieving this object resides in that a lens control part of an automatic focusing camera is so constructed that the start and stop of the displacement of the photographic lens is controlled by respective electromagnets. A common control signal is supplied to both these electromagnets so that when the control signal changes from a first condition to a second condition, the electromagnet for starting displacement is commanded to start displacing the photographic lens; and when the control signal changes from the second to the first condition, the electromagnet for stopping displacement is commanded to stop the displacement of the photographic lens.

It is the tenth object of the present invention to provide, in a camera capable of performing automatic focus control of a photographic lens by comparing distance data obtained by distance measurement with lens position data indicating the displaced position of the photographic lens, an effective solution for the problem in a case where the distance data and the lens position data do not share the same reference system. For example, in a distance measuring system disclosed in the applications described hereinabove, the distance data is obtained according to a fixed trigonometric method taking a focal point corresponding to an infinite object distance as a reference. On the other hand, it is sometimes advantageous to construct a camera such that the photographic lens is displaced from the closest side toward the infinite side. In this case, the lens position data takes the closest side as a reference so that it is fundamentally different from the distance data. According to the tenth characteristic feature of the present invention, an automatic focusing system is proposed capable of being used in combination with any type of a lens control system according to which distance data obtained taking an infinite object distance as a reference is converted to coincide with the nature of lens position data such that the obtained distance may be suitable for lens control, that is, unnecessary parts of the distance data, for example, are omitted if not all of the distance data is required.

It is the eleventh object of the present invention to provide an improved automatic focusing system for a camera for flash photography. The eleventh characteristic feature of the present invention for the purpose of achieving this object resides in that, when the automatic distance measuring device correctly measures a distance to an object in the flash photography mode, the distance data obtained as a result of this measurement is limited to the farthest point within the range for allowing synchronous operation of the electronic flash device, and when the automatic distance measuring device cannot correctly measure the distance to the object, predetermined data within the range for allowing the synchronous operation of the electronic flash device is generated.

It is the twelfth object of the present invention to provide, in a camera having an automatic winding device, effective measures for meeting various wind-up troubles encountered in winding operation. According to the twelfth characteristic feature of the present invention for the purpose of achieving this object, an improved camera is proposed which is of the construction wherein a wind-up trouble during the winding operation or an overload due to the film end or the like is detected to de-energize the winding device after a predetermined period of time, and a device is incorporated to generate an alarm (for example, by an alarm sound) which may be sensed by the operator.

Cameras of various other improved constructions are also proposed according to the present invention.

For example, a construction is proposed for a camera capable of flash photography which uses an electromagnetic shutter which gradually opens the aperture upon energization and gradually closes the aperture upon de-energization, according to which the proposed construction the triggering of the electronic flash device can be performed in synchronism with the de-energization of the shutter.

A method is also proposed for correctly and easily checking for disconnections in the coil of an electromagnetic means such as an electromagnetic shutter means, by checking the impedance of the coil under an applied voltage.

A camera control device is also proposed wherein a two-step shutter release button is incorporated such that, upon the first step corresponding to the preparatory period for photography, the distance measurement by the distance measuring device and the low luminance detection by the low luminance alarm device are alternately performed and the low luminance detection is repeatedly performed after completing the distance measurement; and, upon the second step for starting the photographing operation, the distance measurement alone is performed without performing the low luminance detection.

An improved camera is proposed in which whether the displacement of the photographic lens has been appropriately performed can be checked during the sequence mode subsequent to the focusing mode, by i.e., associating a winding completion detection switch in an automatic winding device with the photographic lens to be automatically focused.

An improved camera is also proposed which has a control device which discriminates the photographing condition upon the first step of the shutter release button and thereafter performs the normal sequence.

The other objects and features of the present invention will become apparent from the following description of the preferred embodiments when taken in conjunction with the accompanying drawings.

BRIEF DESCRIPTION OF THE DRAWINGS

The preferred embodiments of the present invention will now be described with reference to the accompanying drawings in which:

FIGS. 9-1 and 9-2 are partial block circuit diagrams showing all of the electronic circuitry of the camera shown in FIG. 1;

Figure 1:
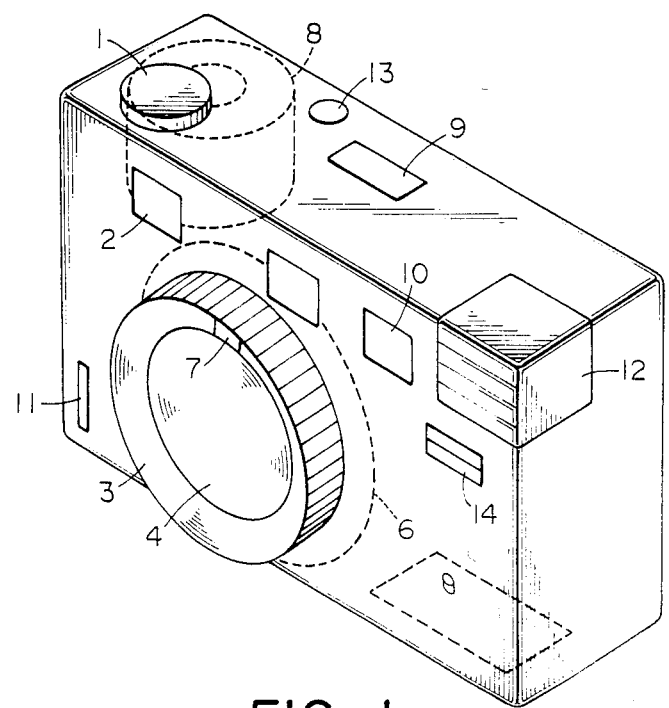
FIG. 1 is a model view schematically showing an embodiment of a camera according to the present invention, especially the functions of this camera.
Figure 2:
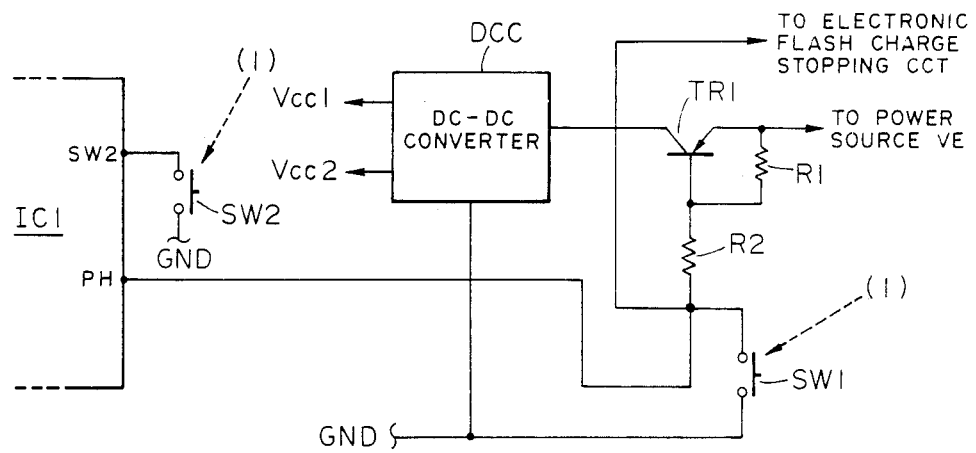
FIG. 2 is a partial circuit diagram showing the configuration of the main electronic circuitry associated with a shutter release button of the camera shown in FIG. 1.
Figure 4:
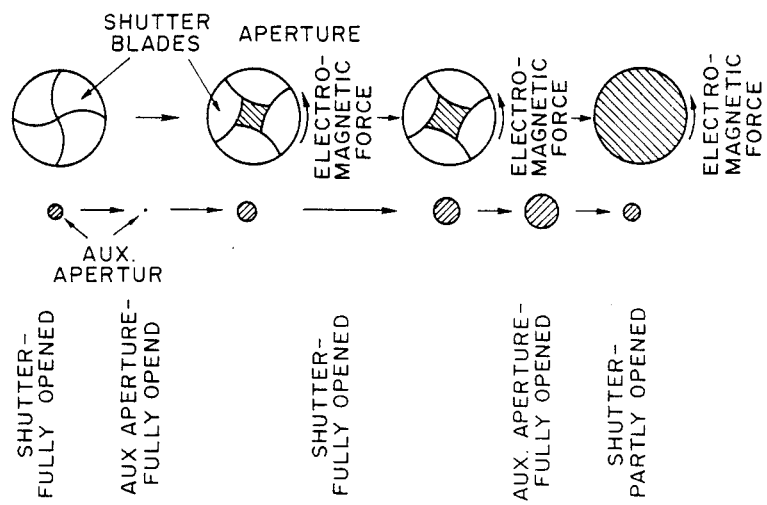
FIGS. 4 and 5 are model views showing the mode of operation and mode of control of an electromagnetically driven shutter mounted on the camera shown in FIG. 1.
Figure 9:
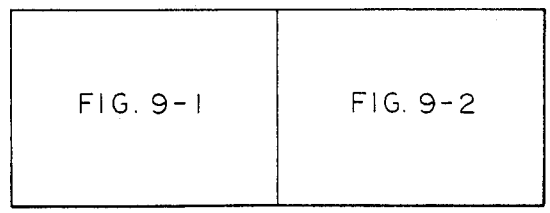
Figures 1, 9:
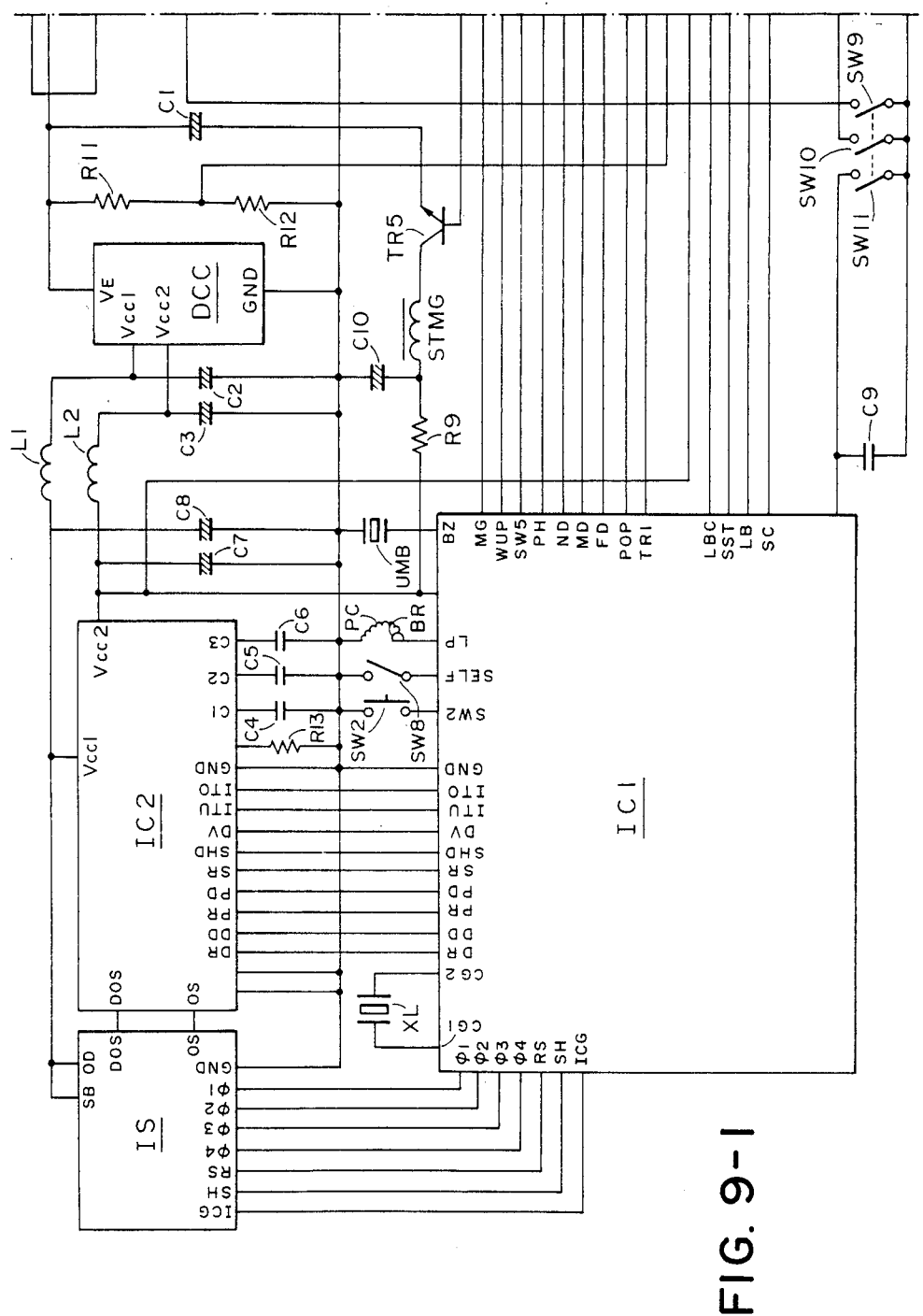
Figures 2, 9:
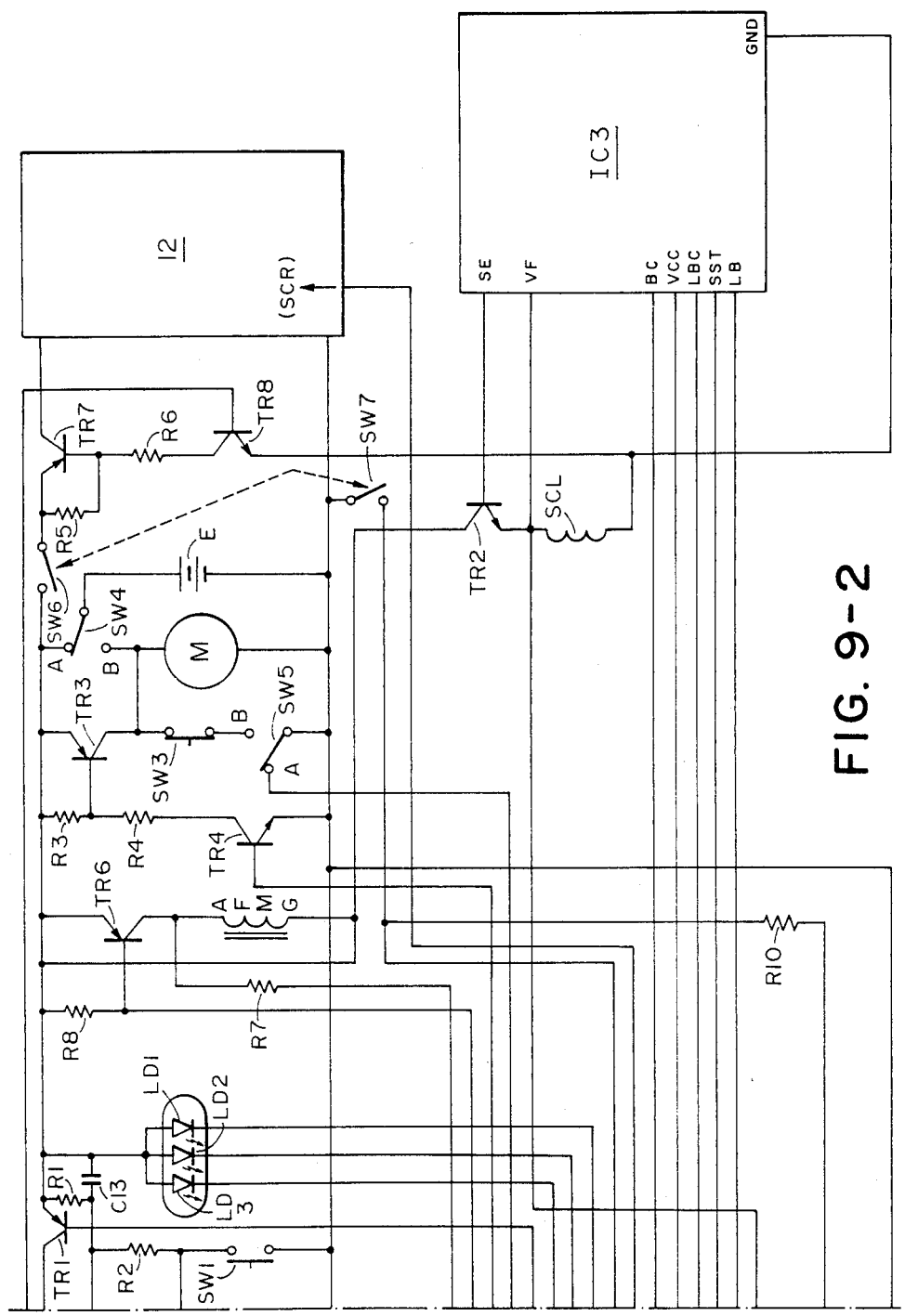
Figure 10:
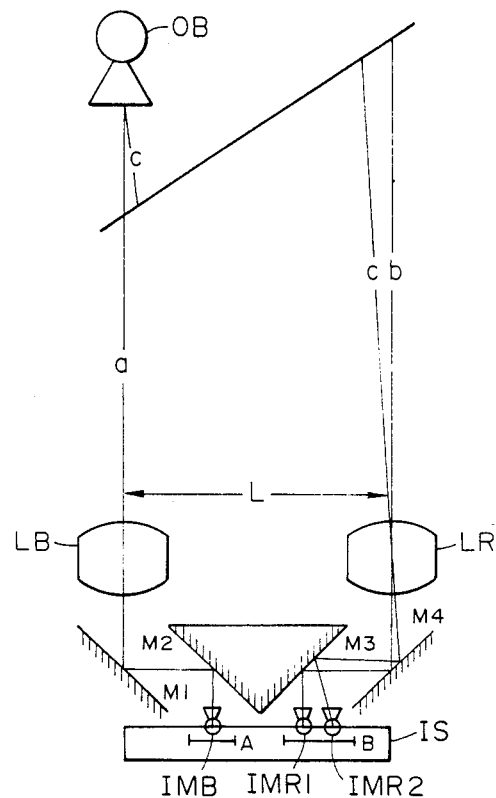
Figure 11:
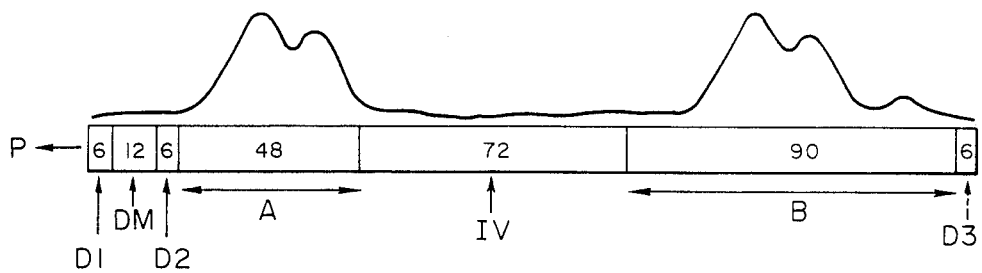
Figure 12:
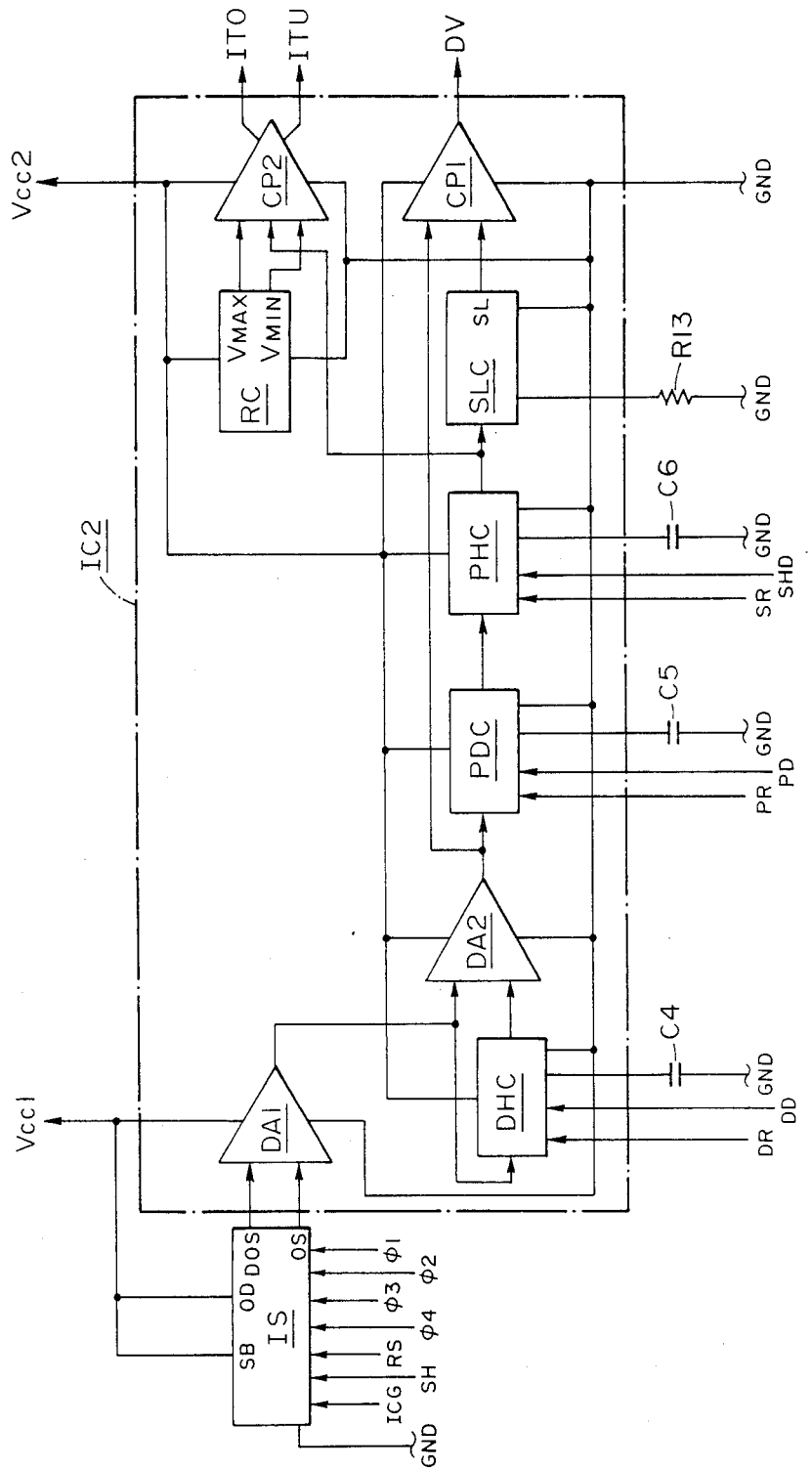
Figure 13:
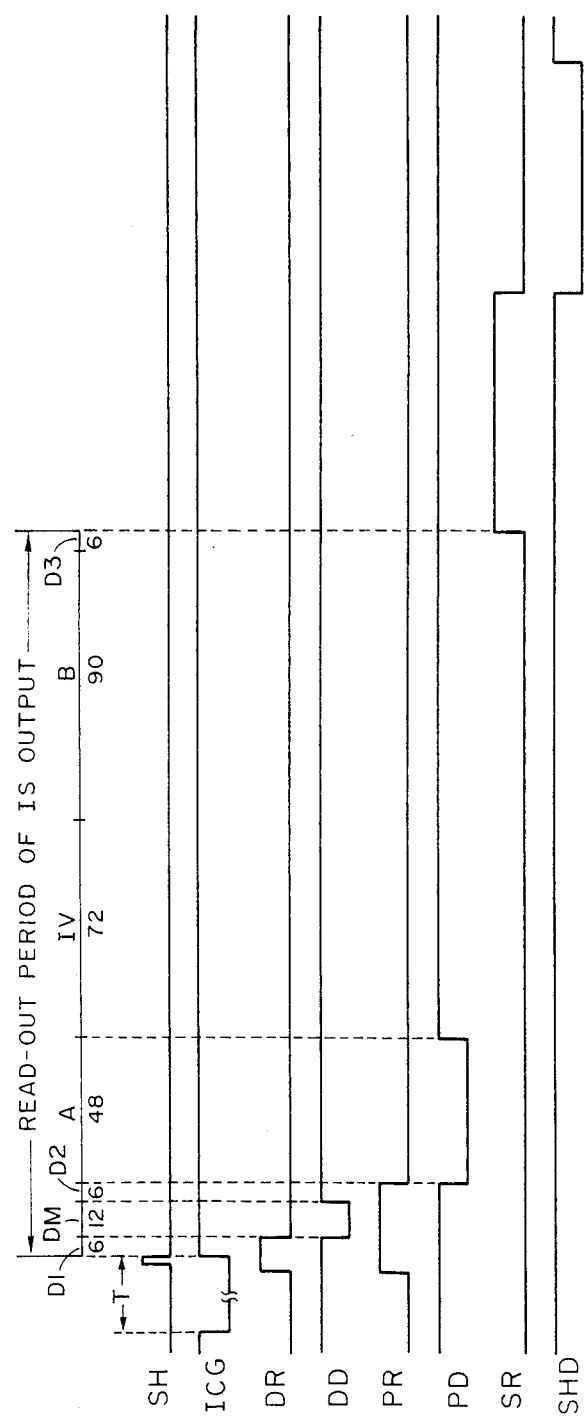
Figure 14:
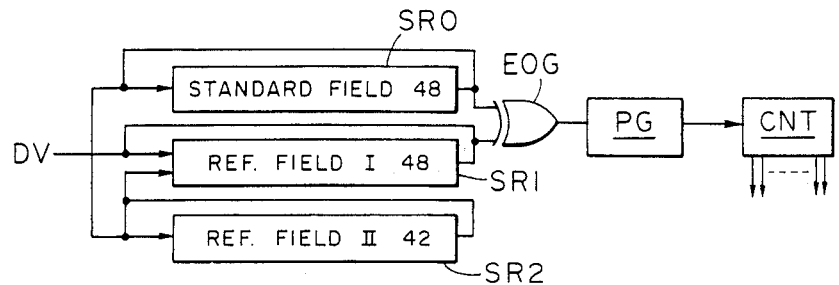
Figure 15:
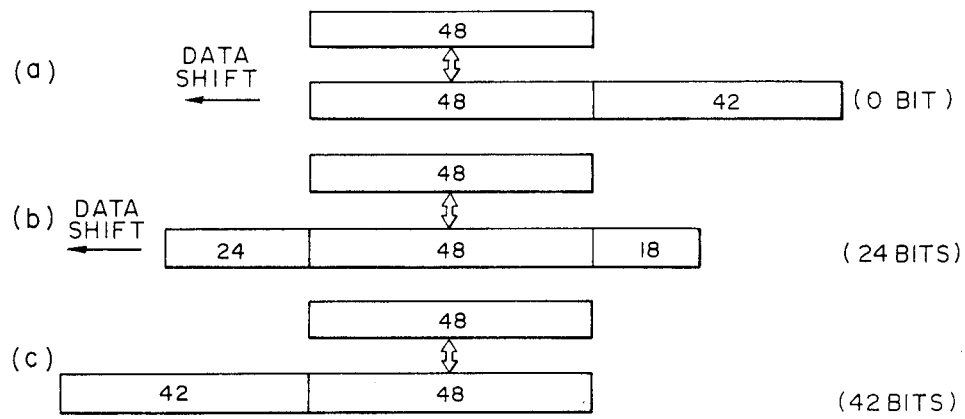
Figure 16:
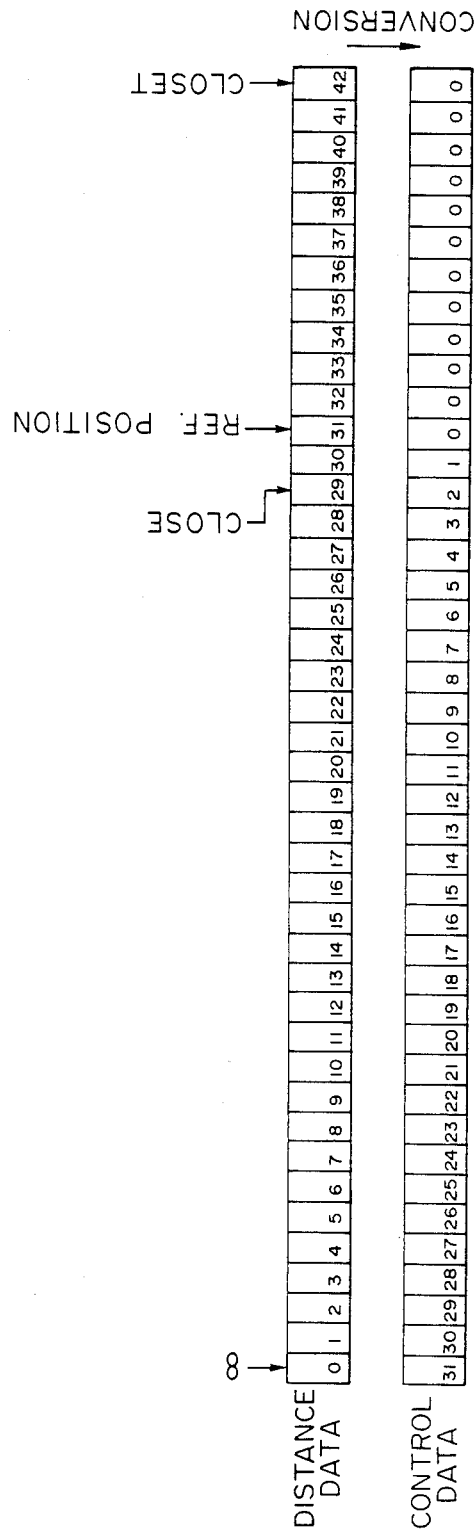
Figure 17:
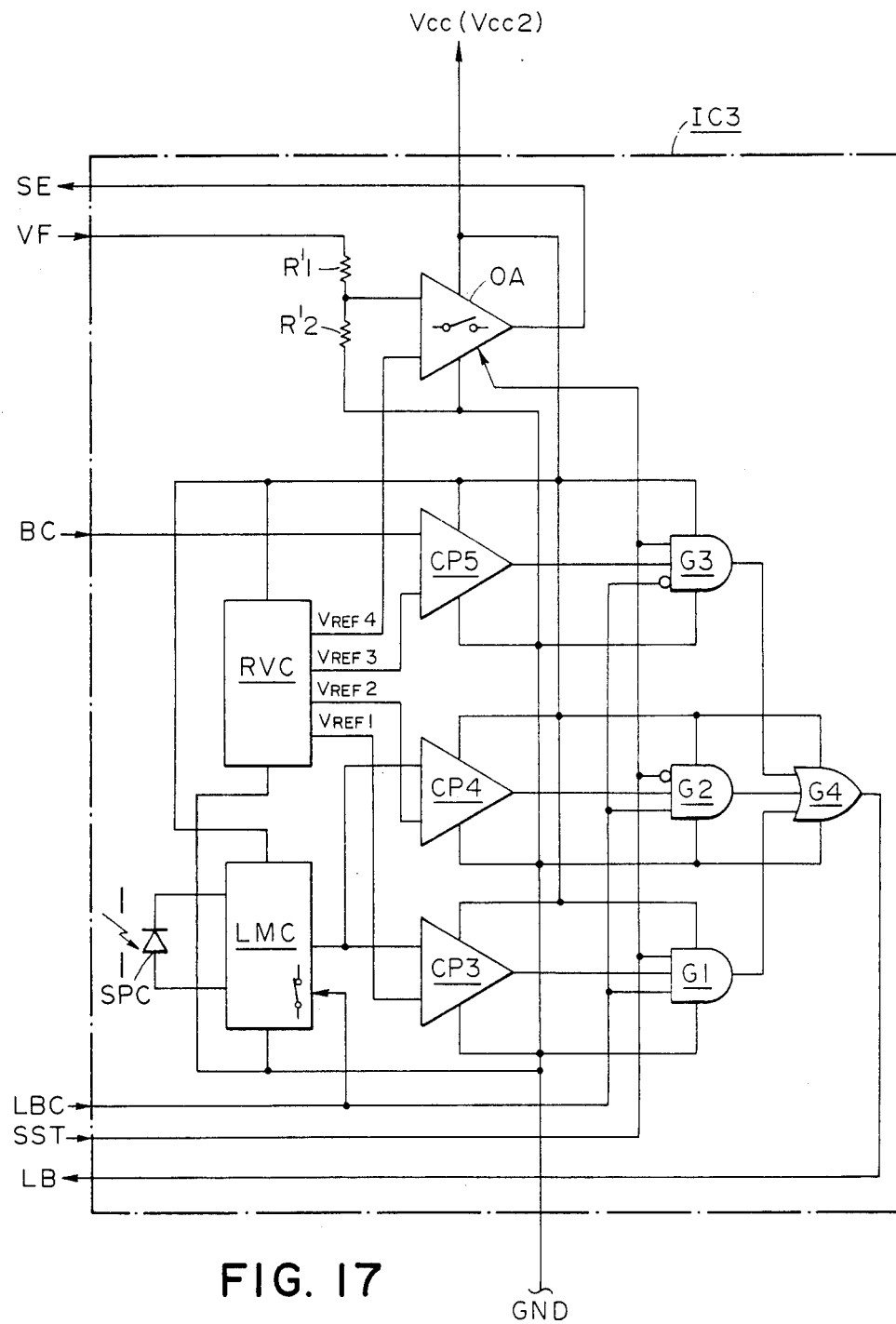
Figure 18:
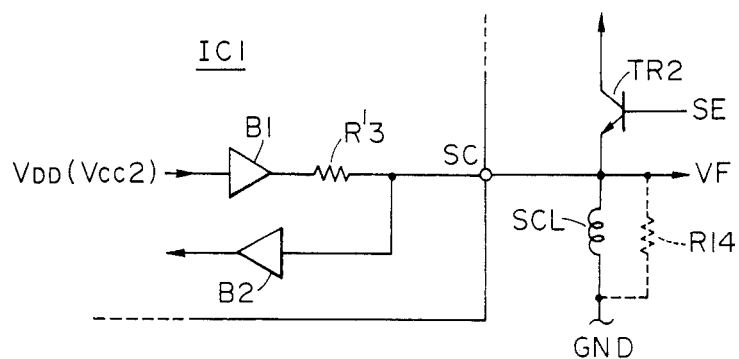
Figure 19:
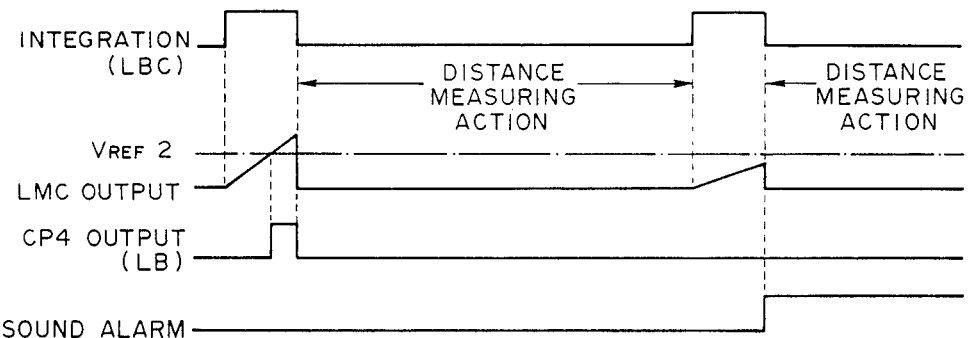
Figure 20:
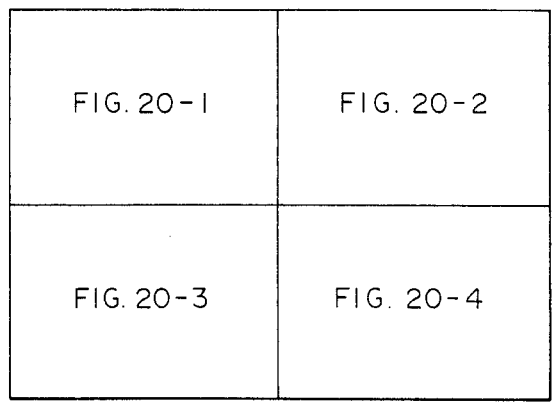
Figures 1, 20:
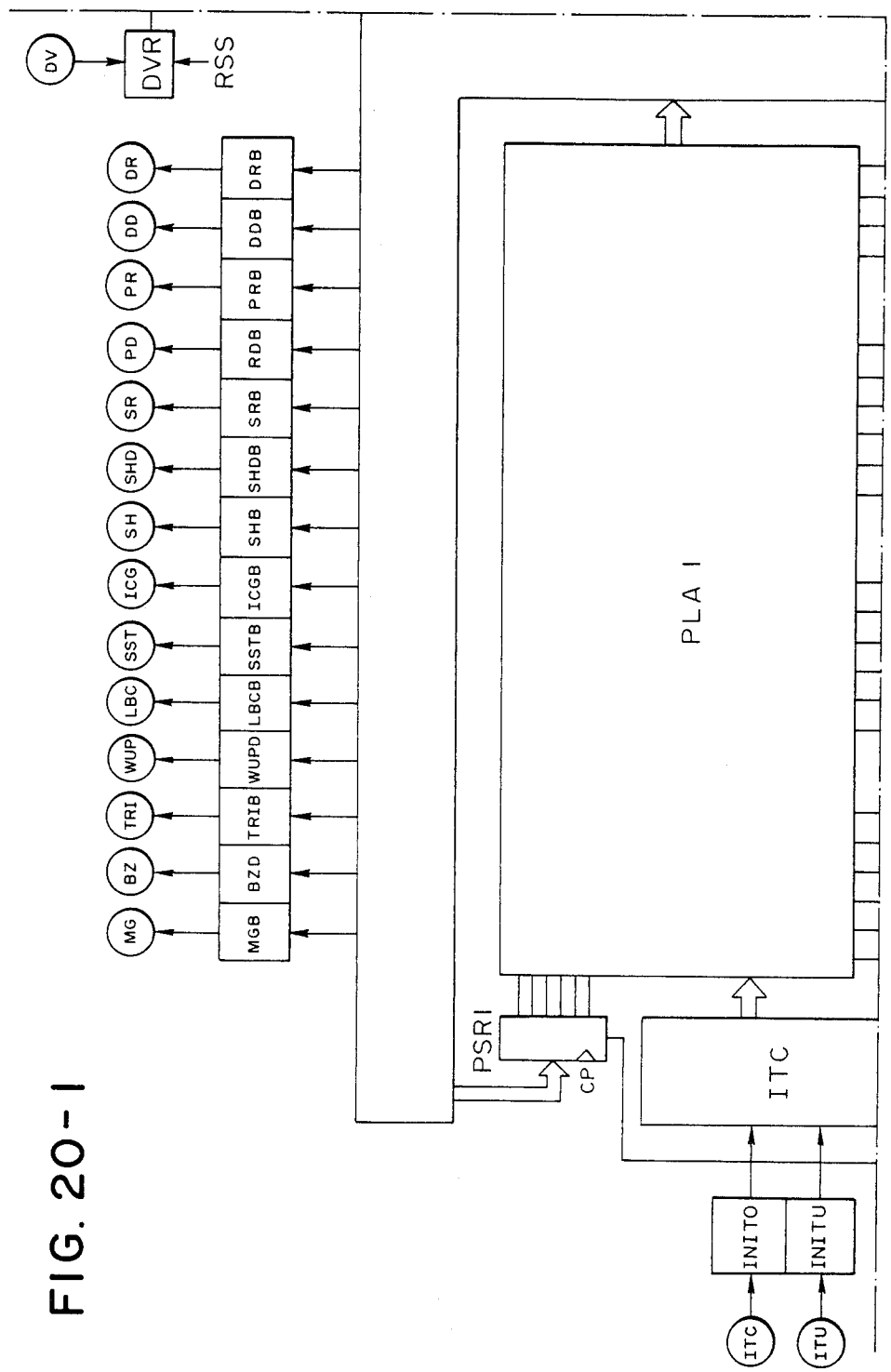
Figures 2, 20:
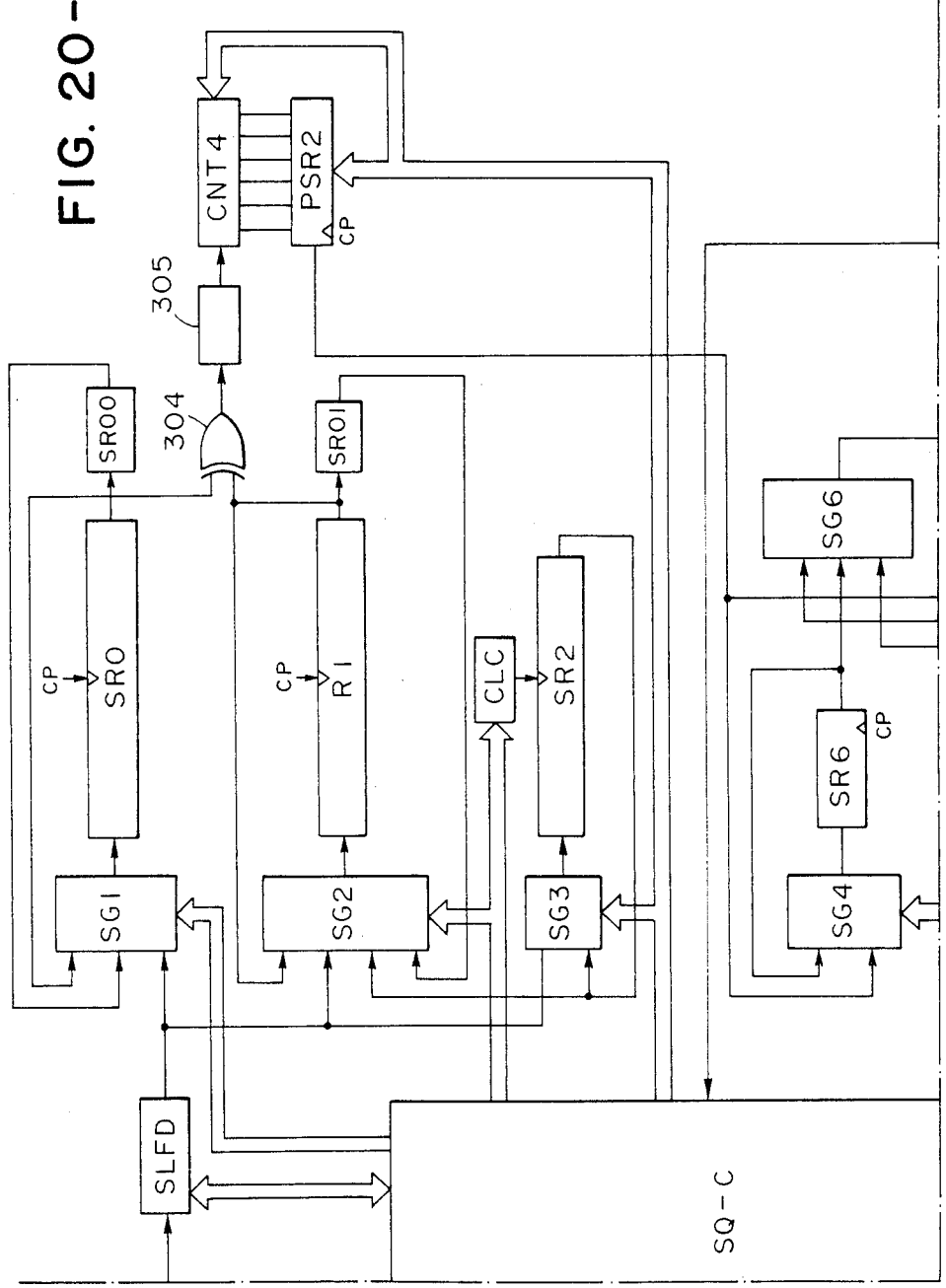
Figures 3, 20:
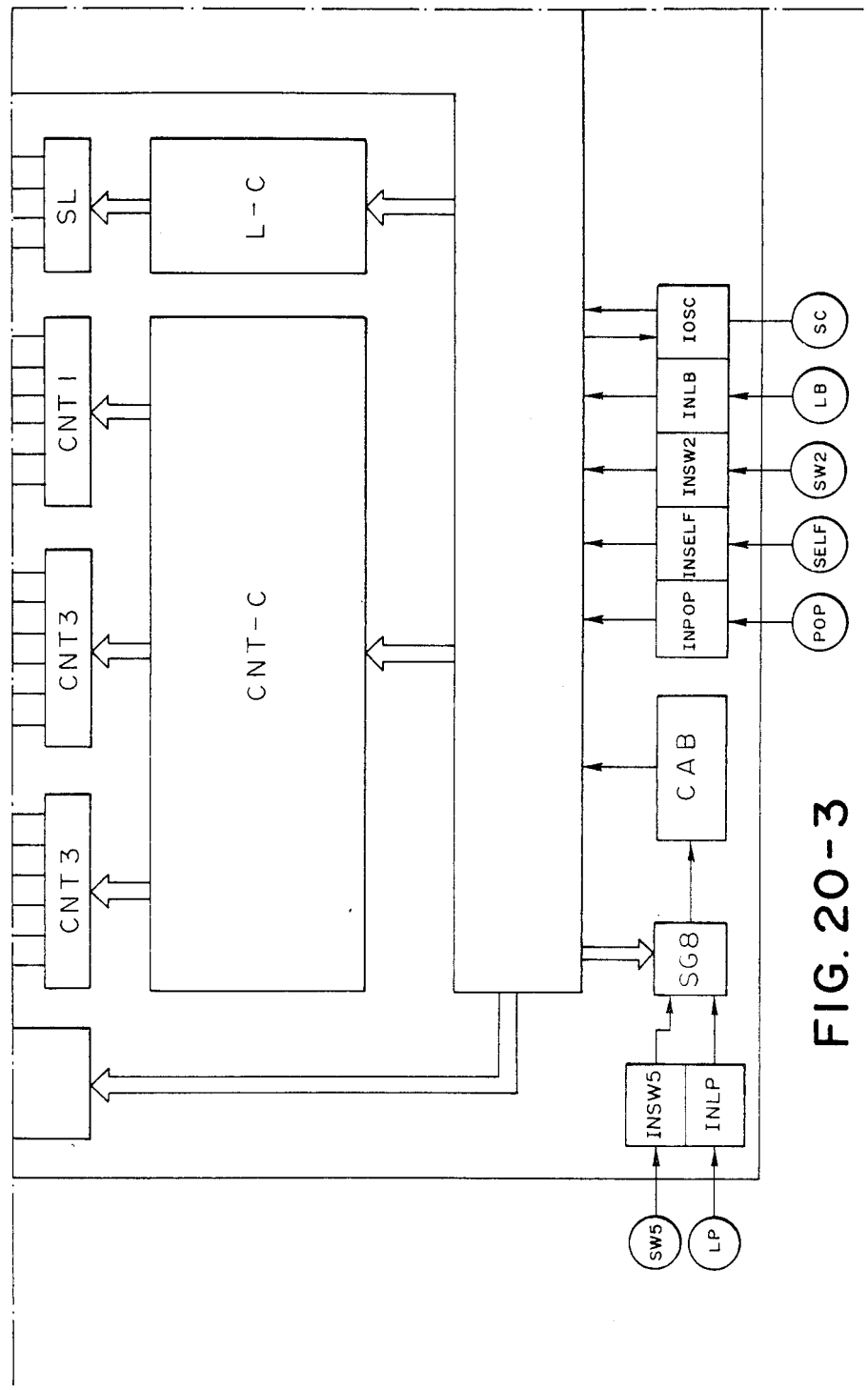
Figures 4, 20:
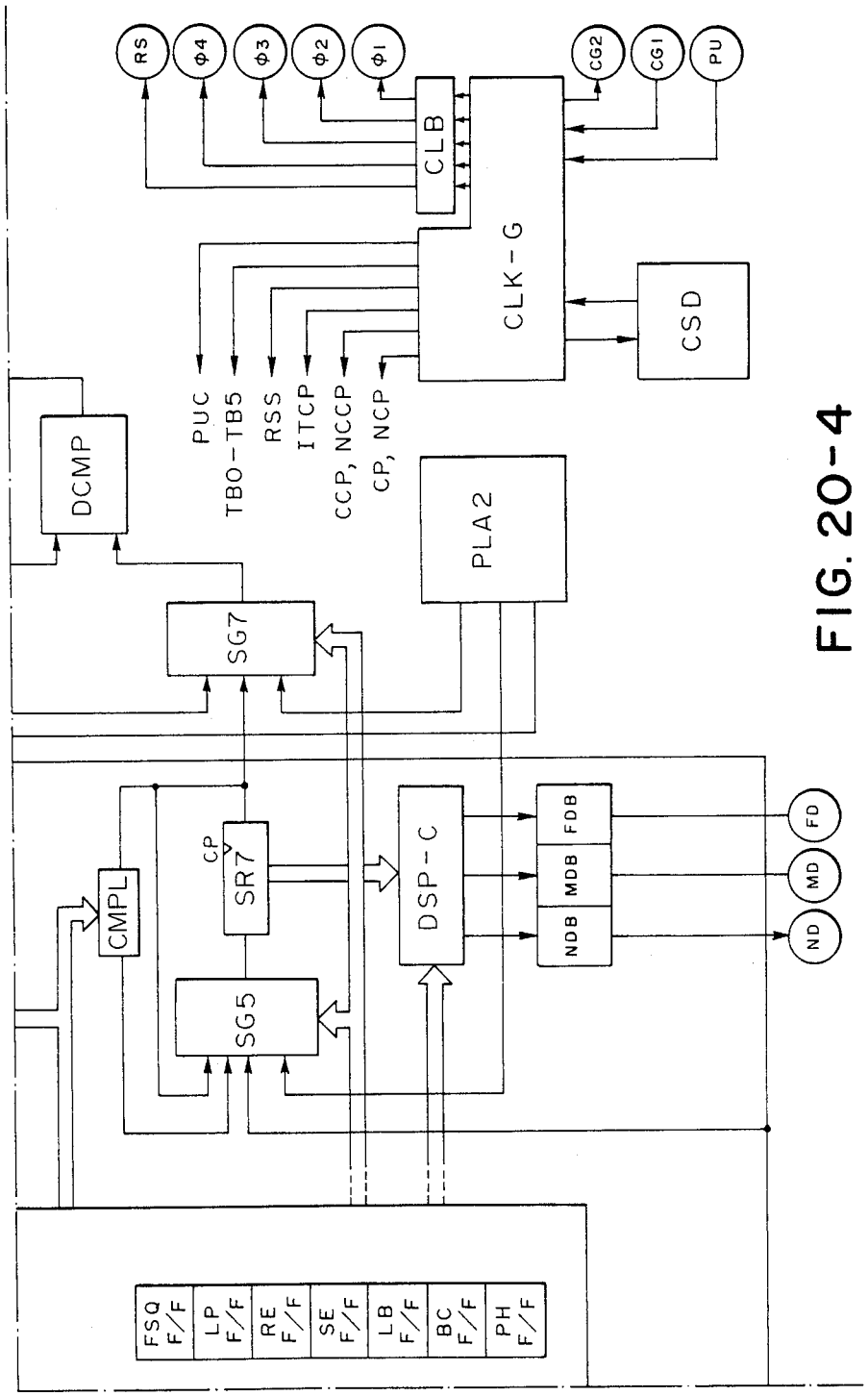
Figures 1, 21:
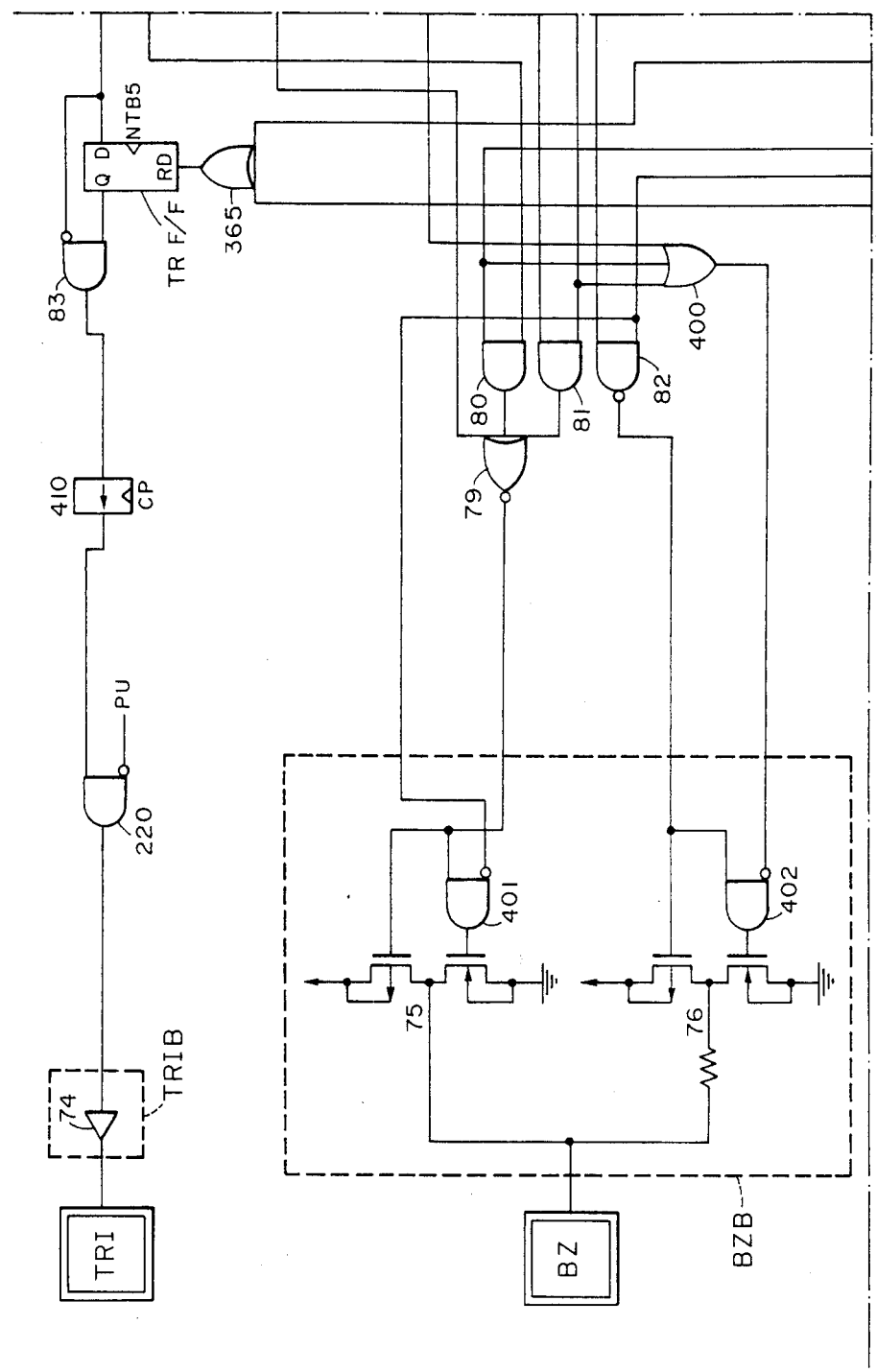
Figures 2, 21:
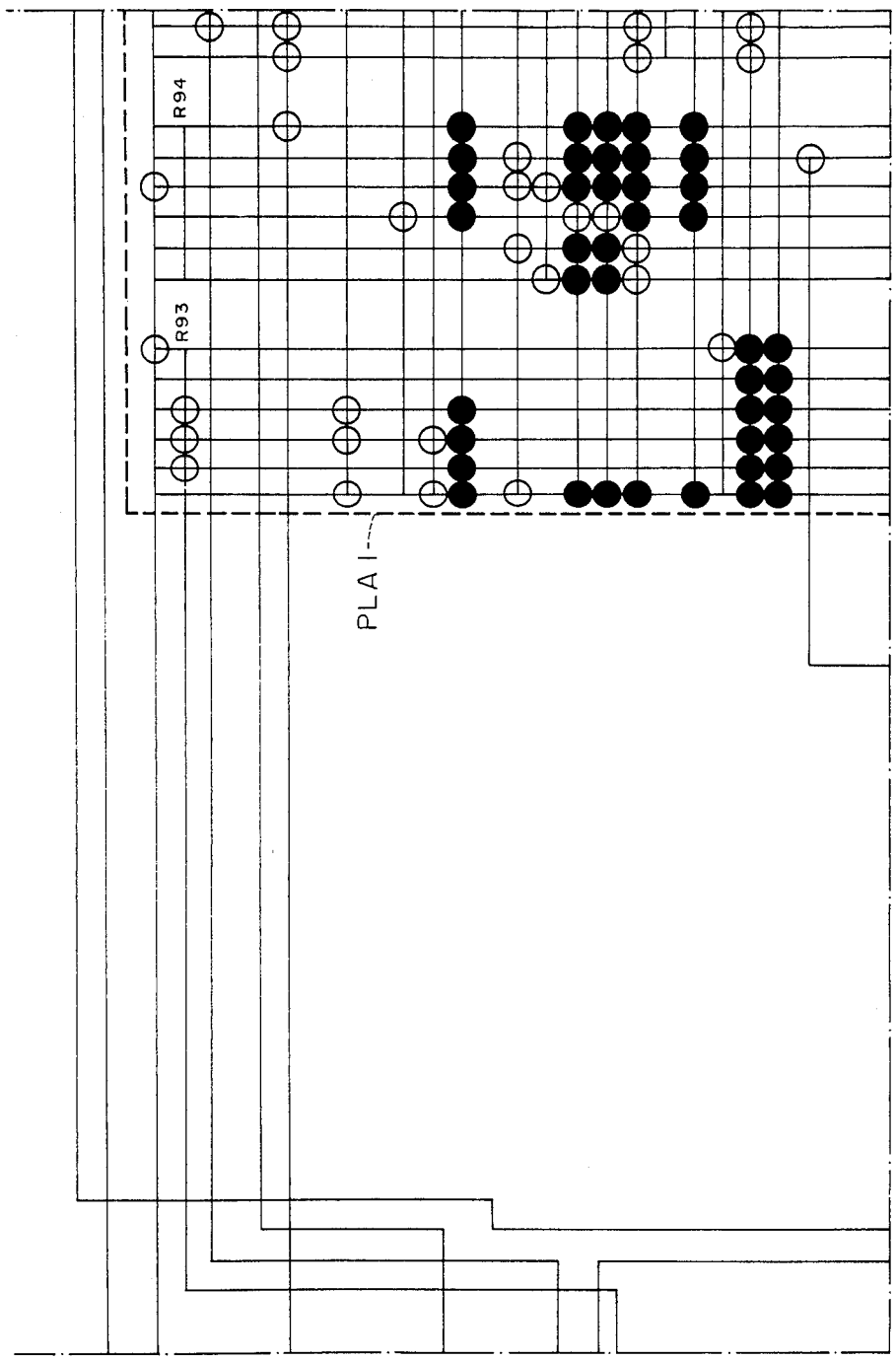
Figures 3, 21:
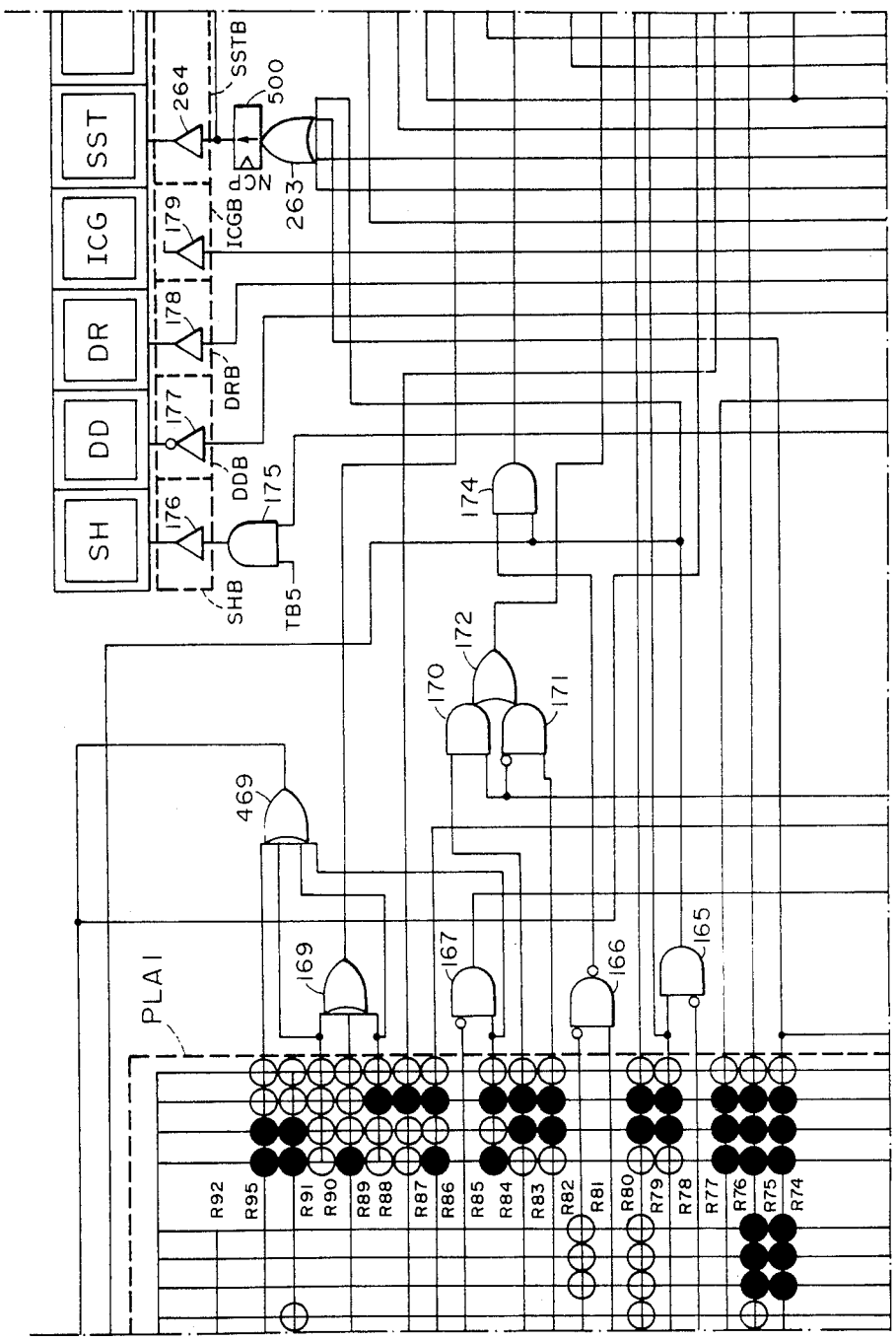
Figures 4, 21:
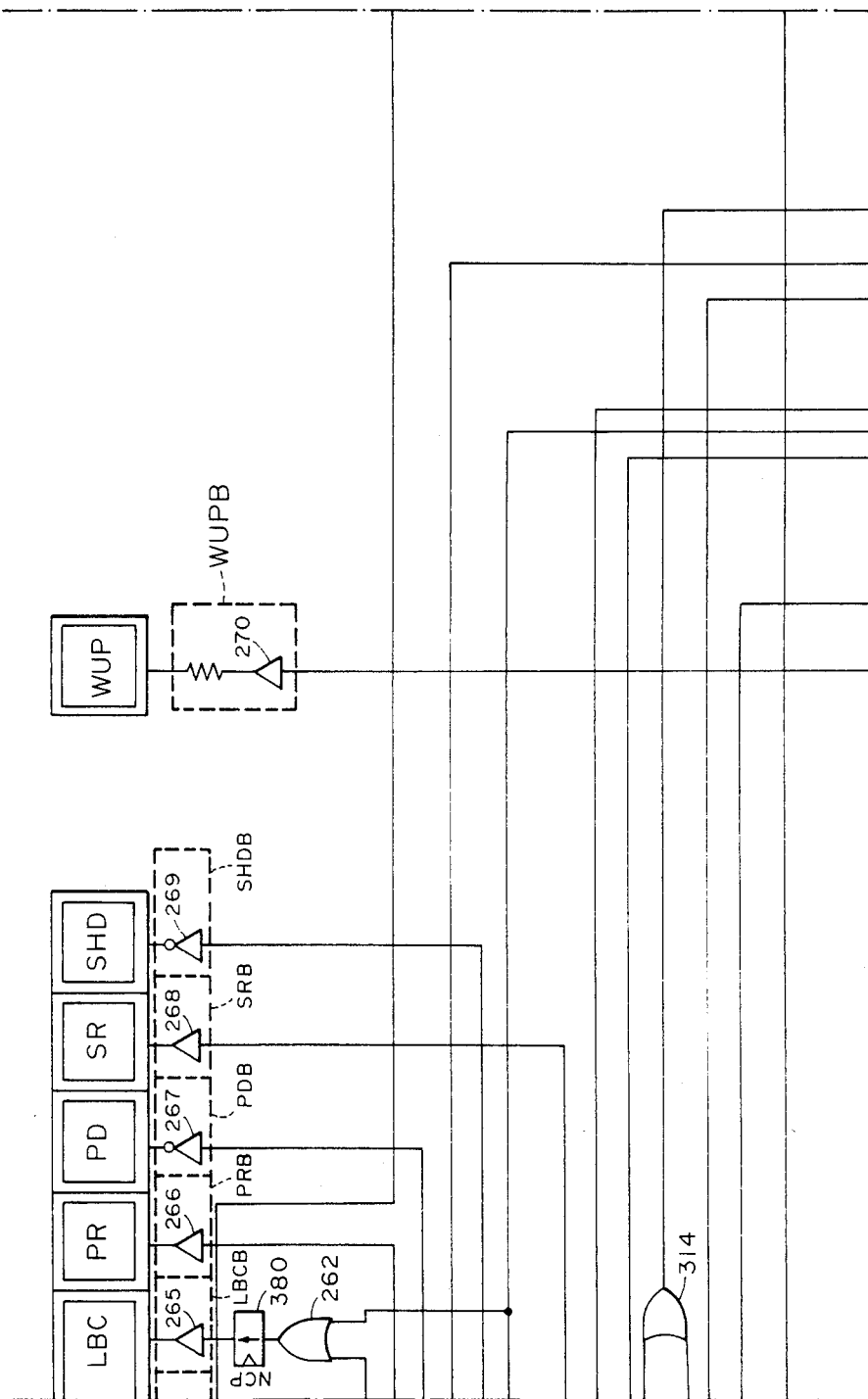
Figures 5, 21:
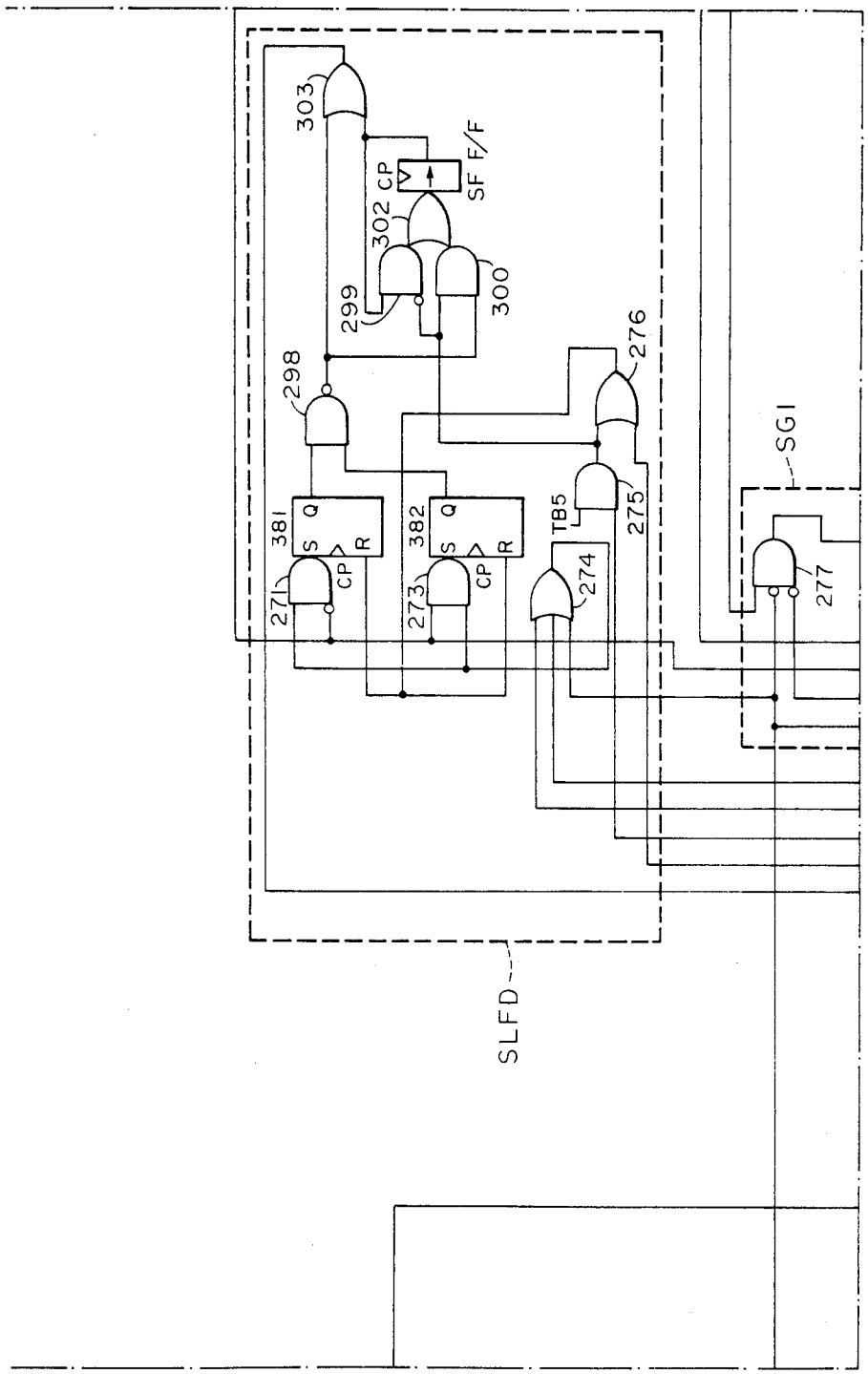
Figures 6, 21:
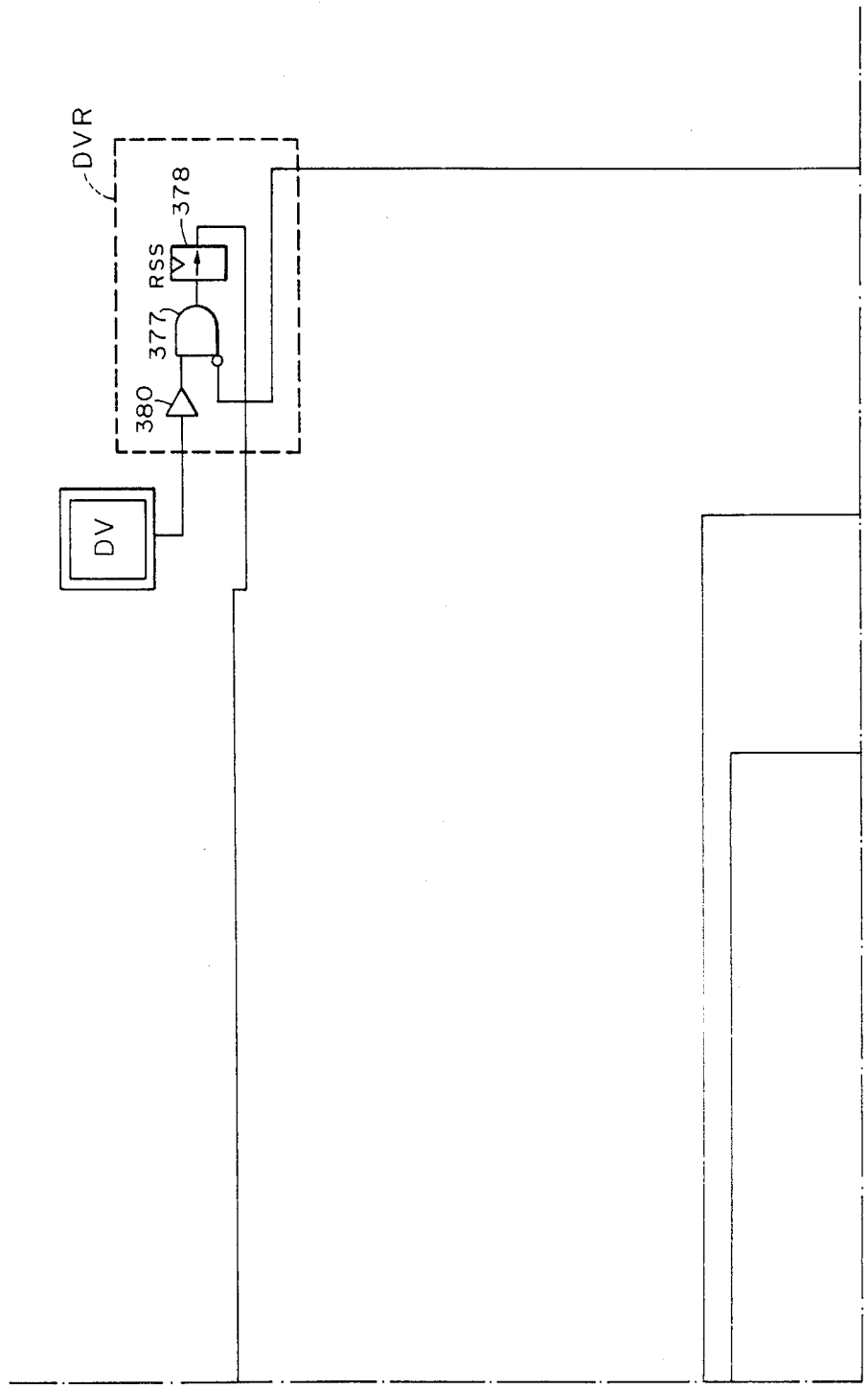
Figures 7, 21:
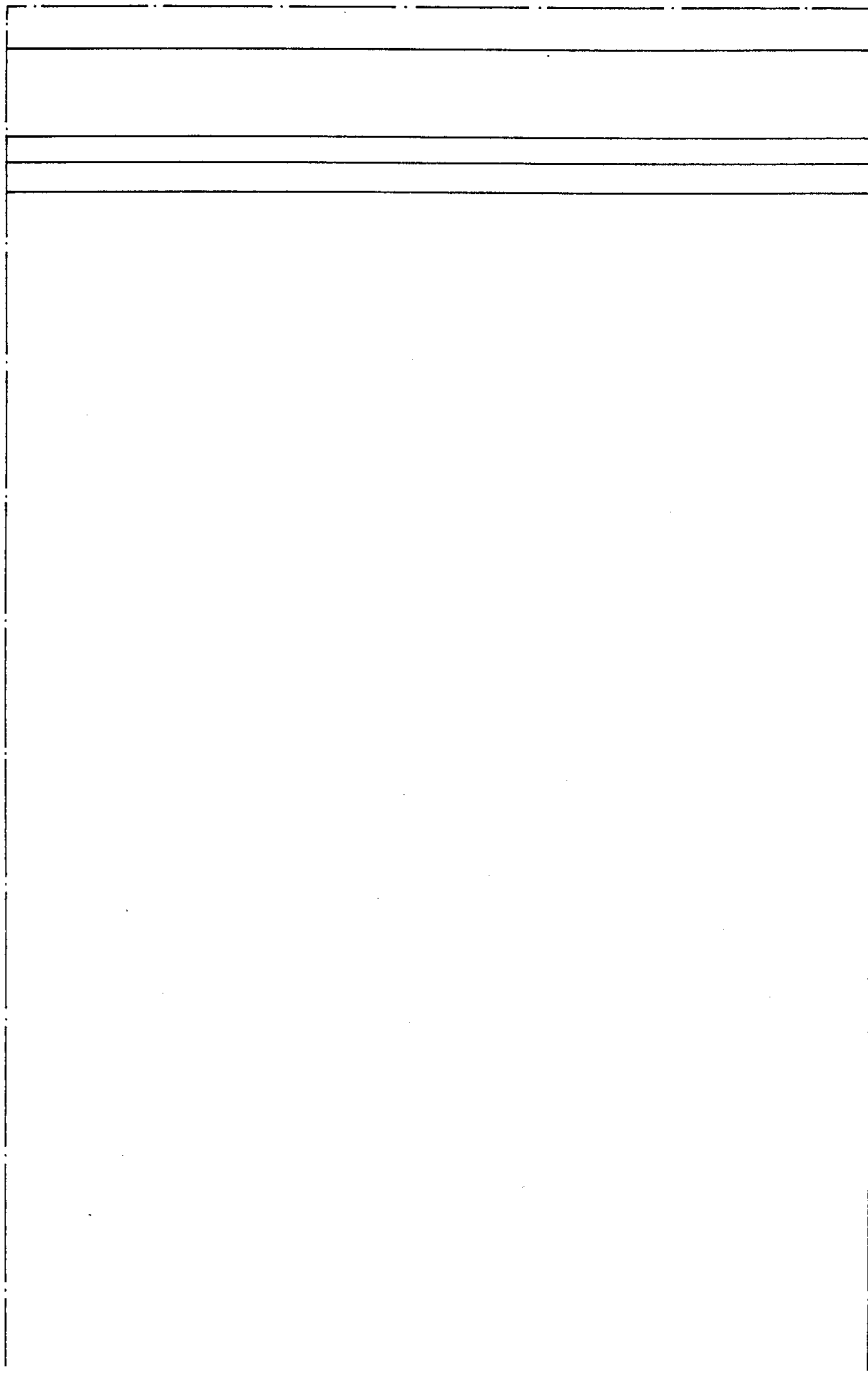
Figures 8, 21:
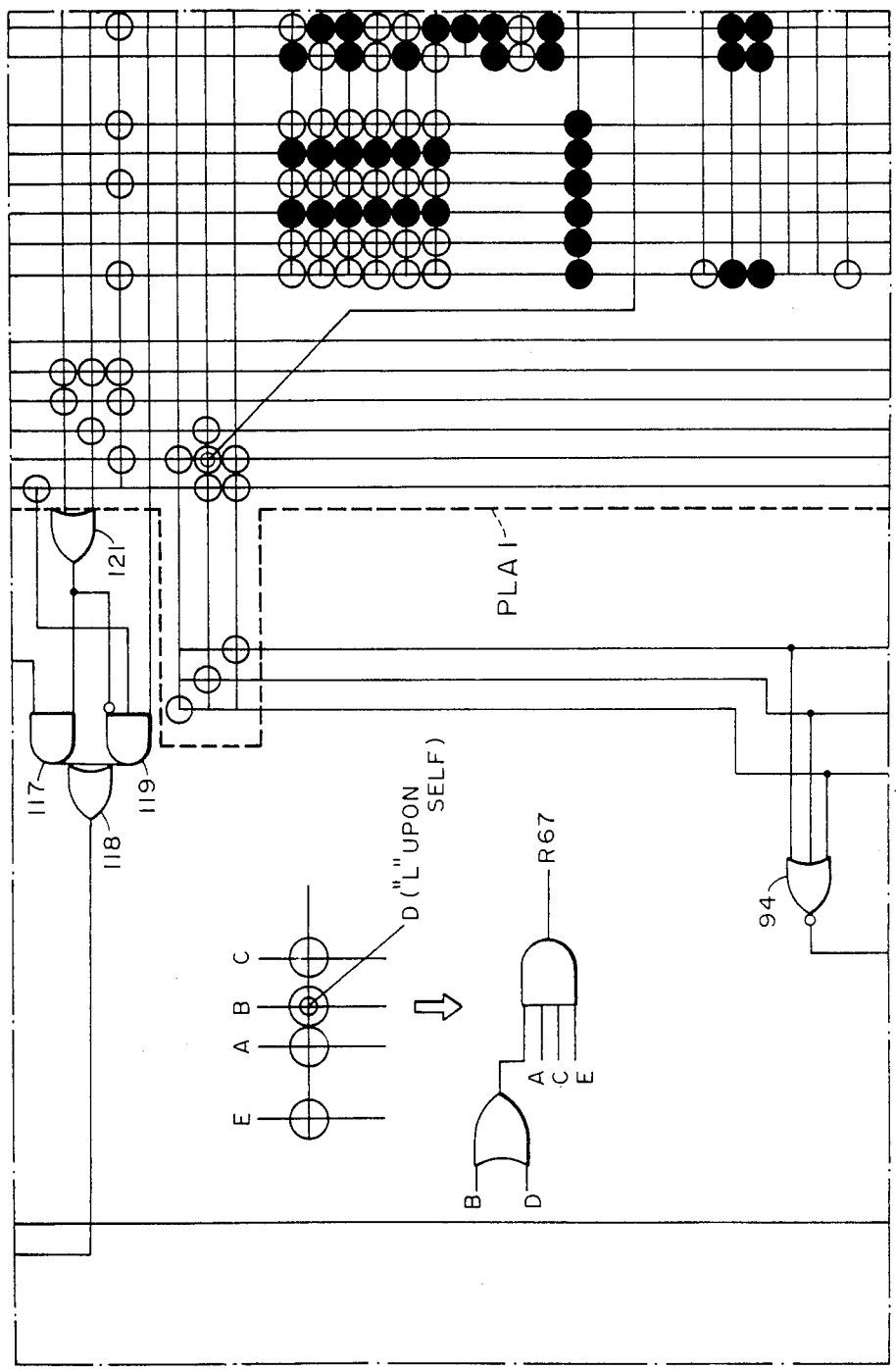
Figures 9, 21:
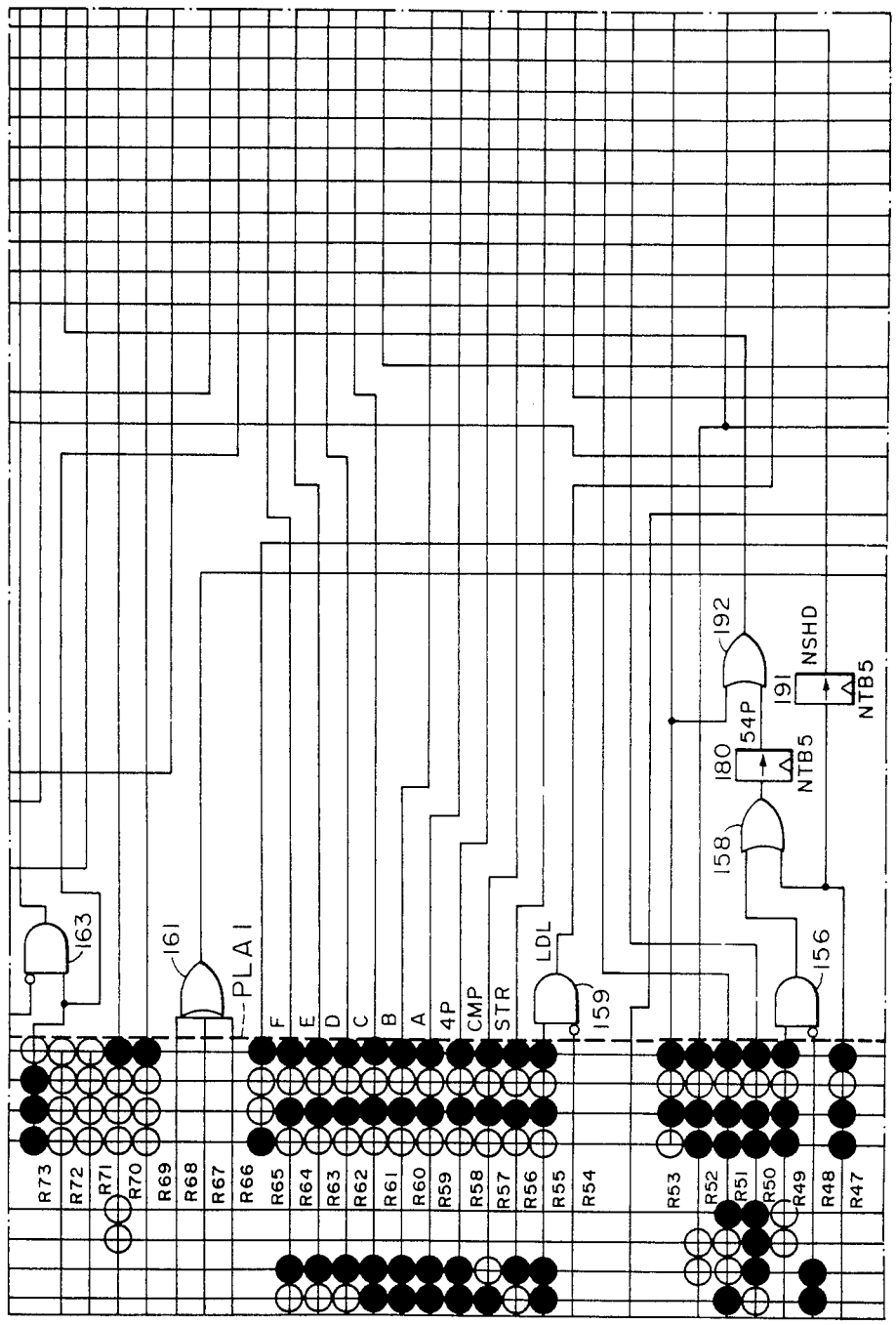
Figures 10, 21:
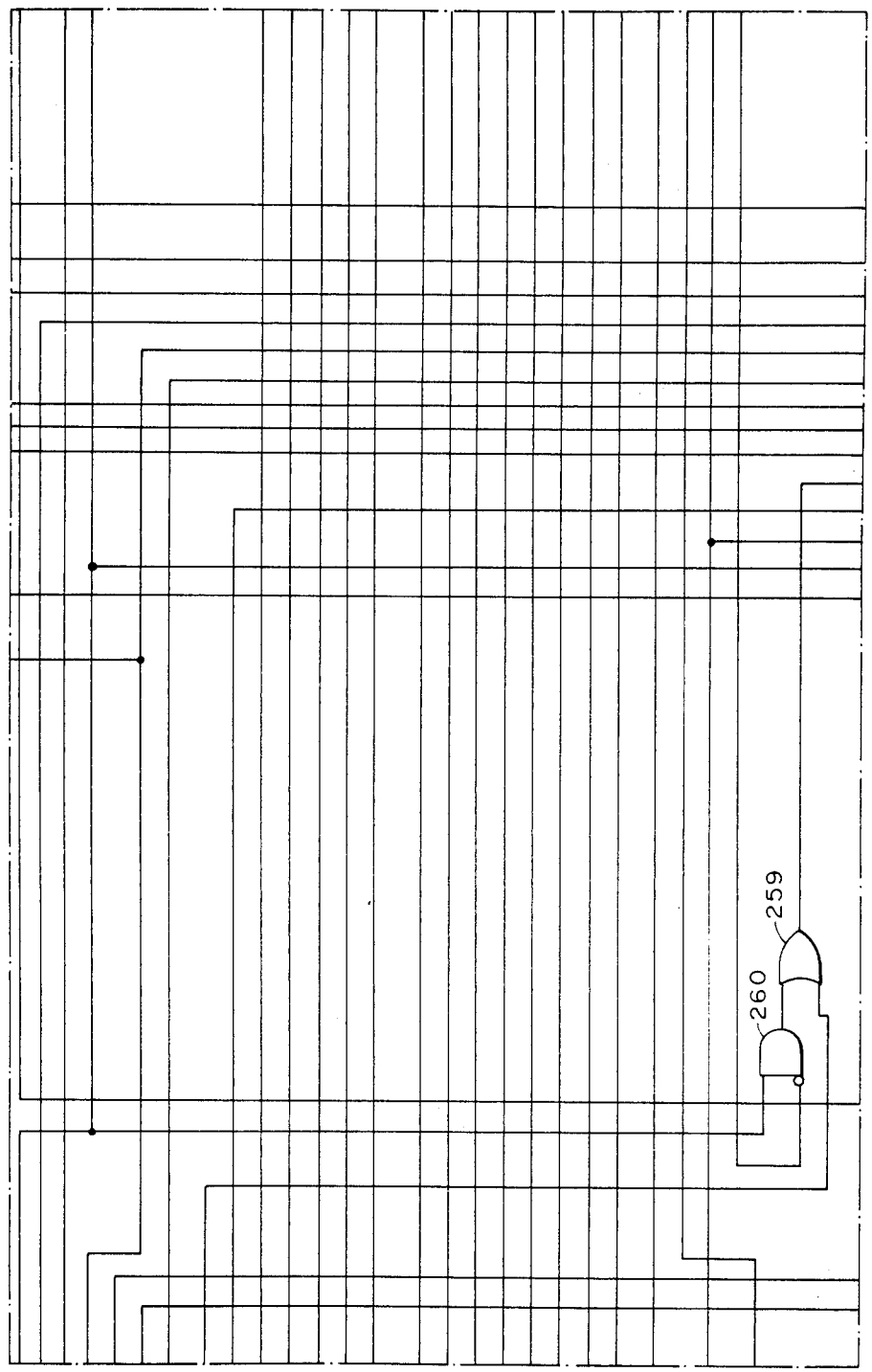
Figures 11, 21:
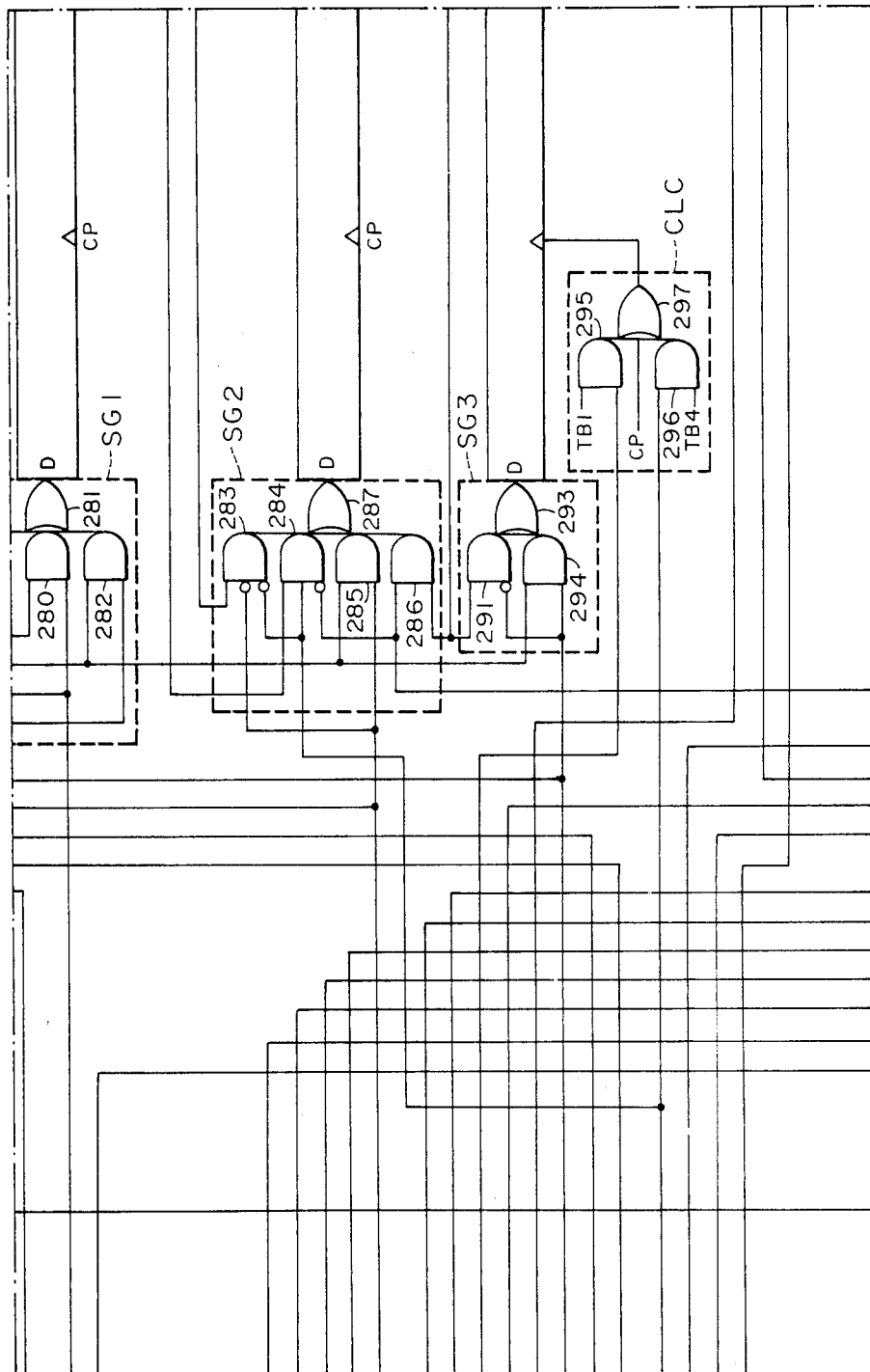
Figures 12, 21:
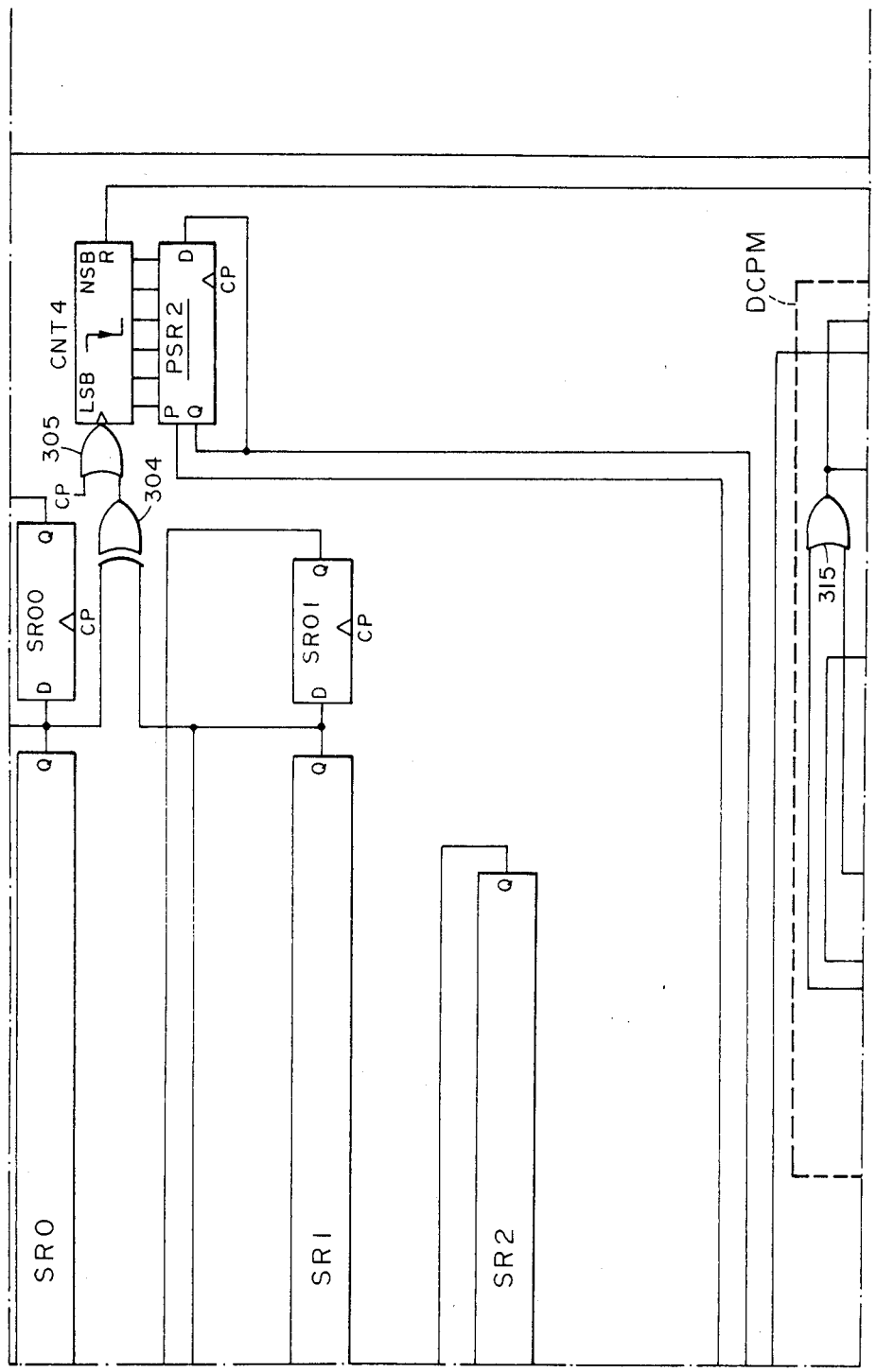
Figures 13, 21:
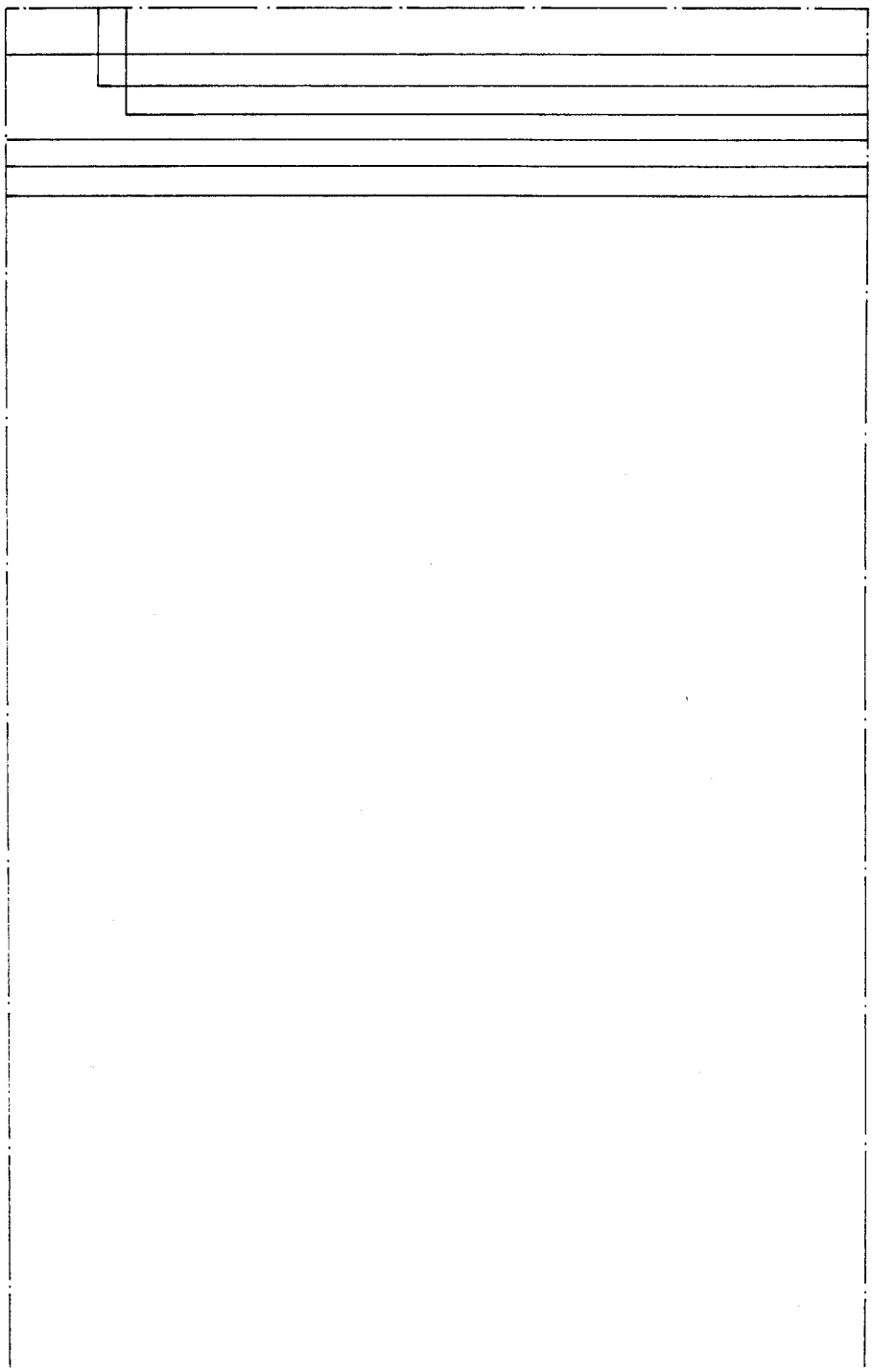
Figures 14, 21:
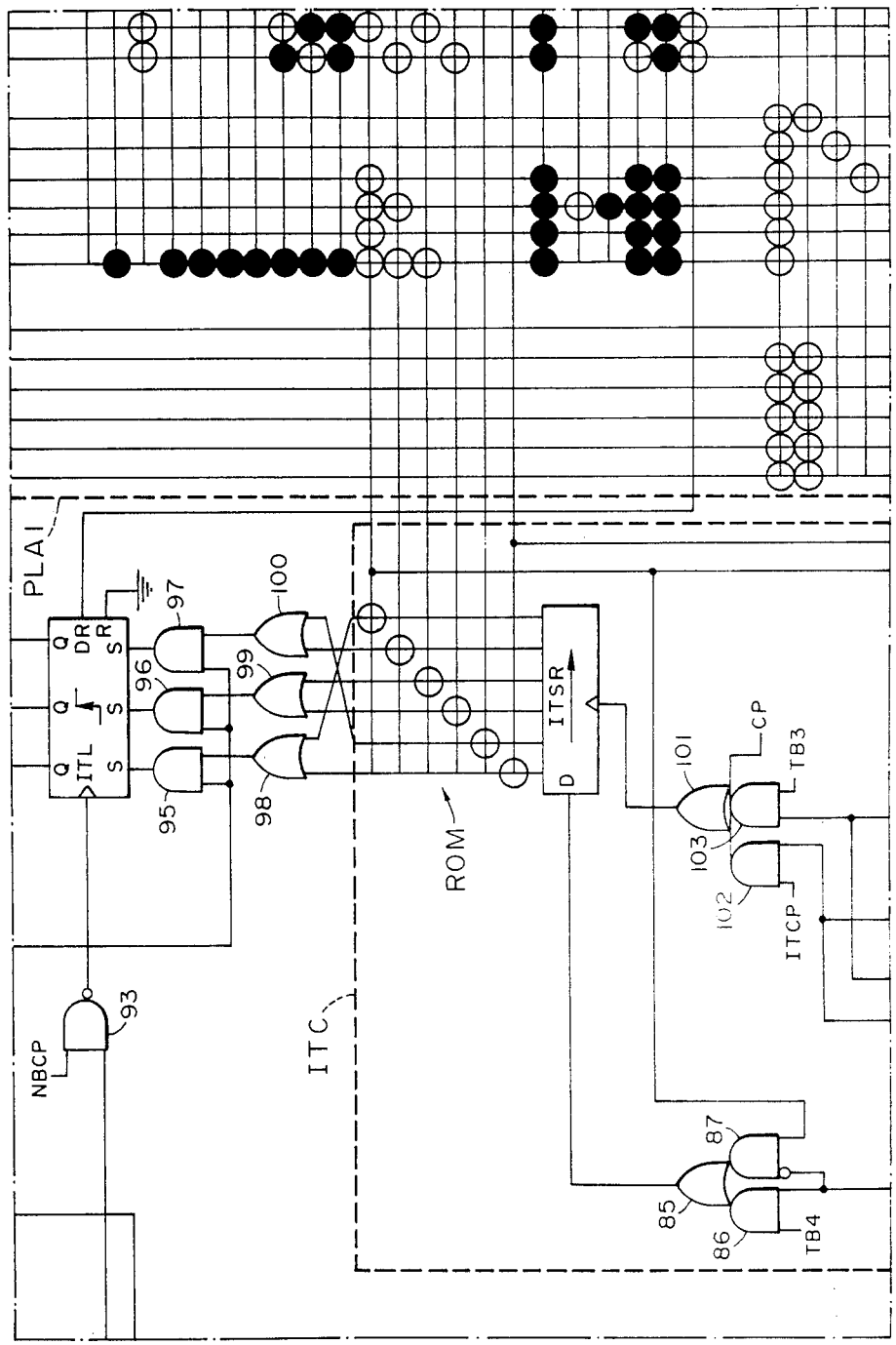
Figures 15, 21:
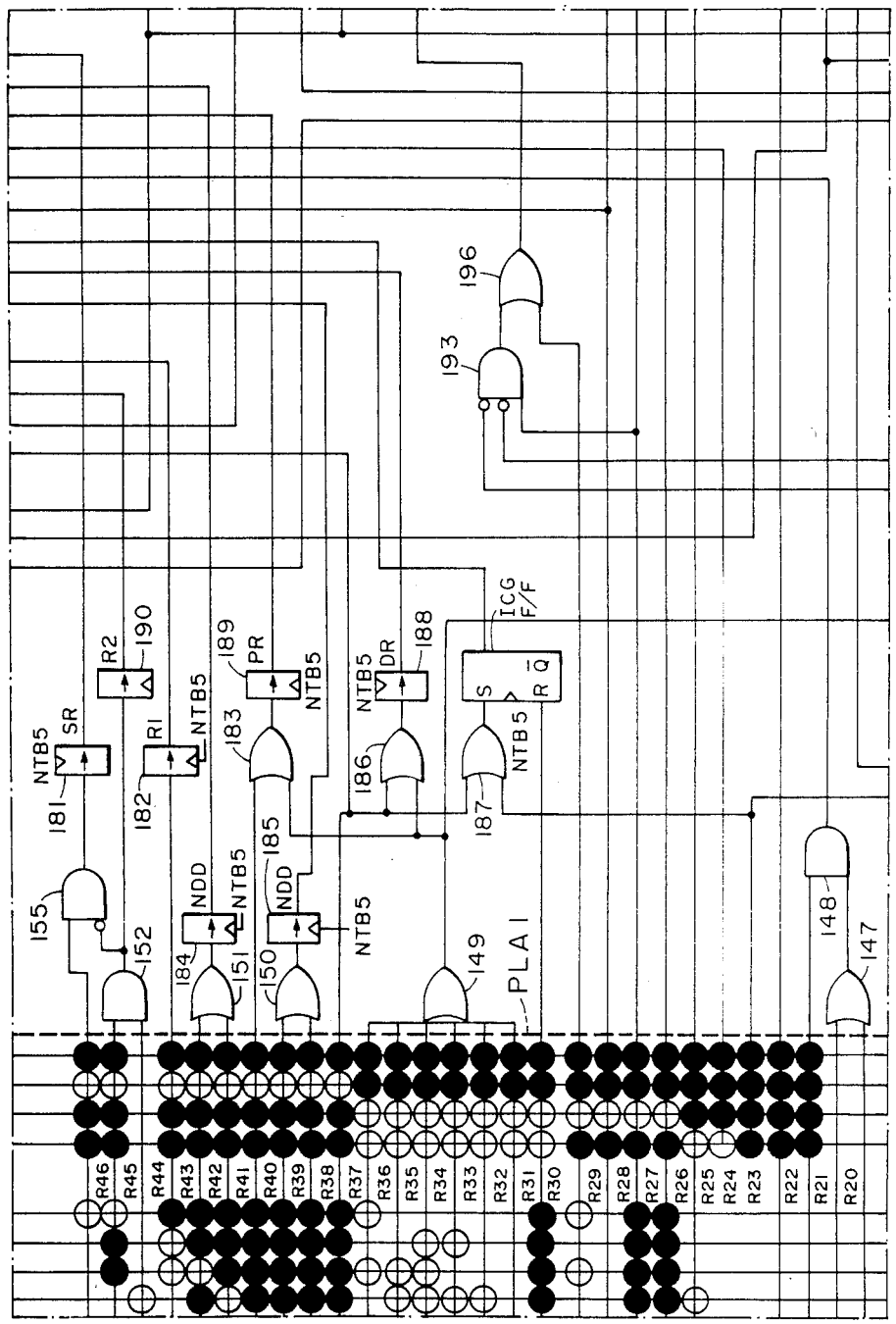
Figures 16, 21:
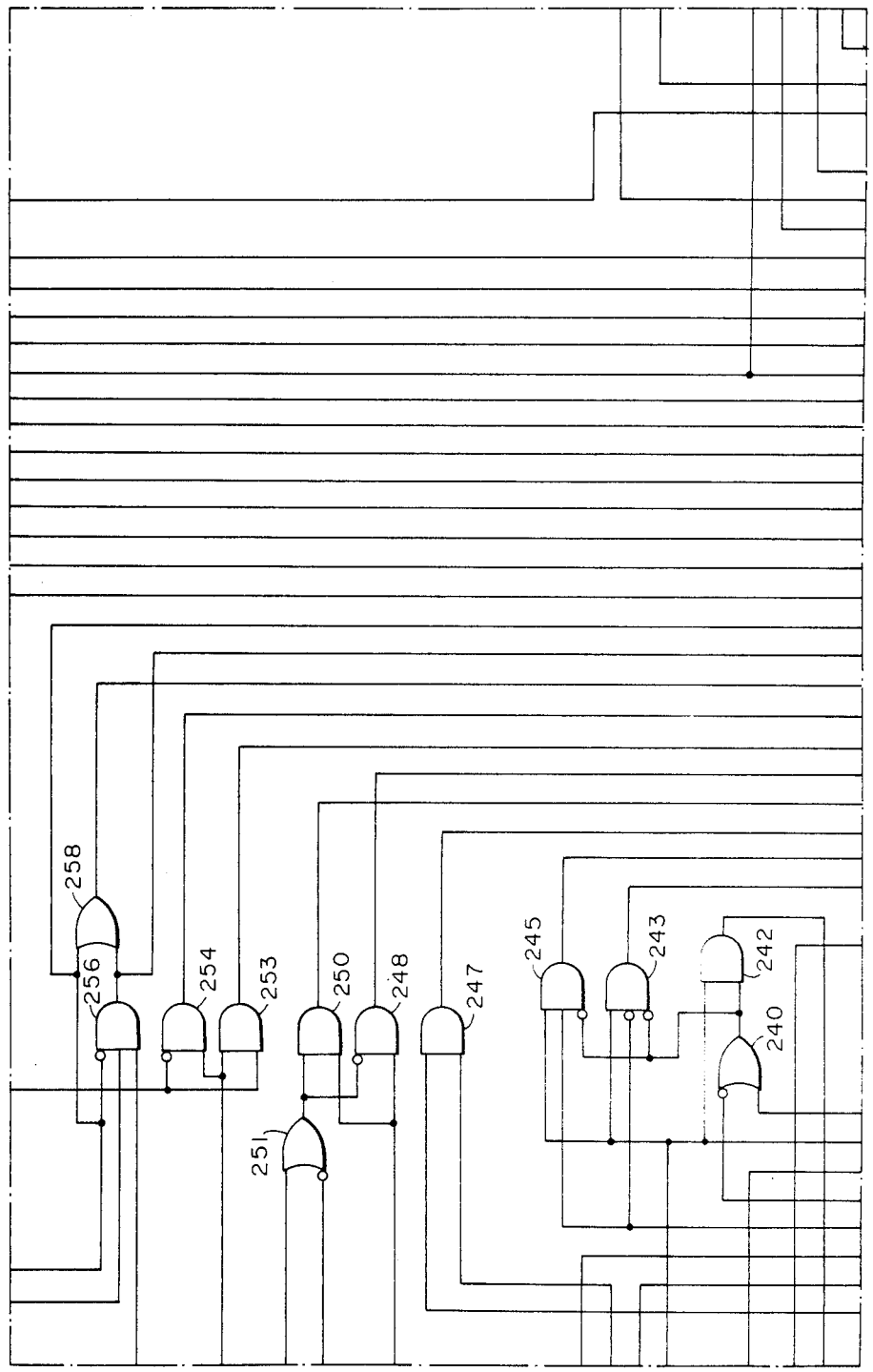
Figures 17, 21:
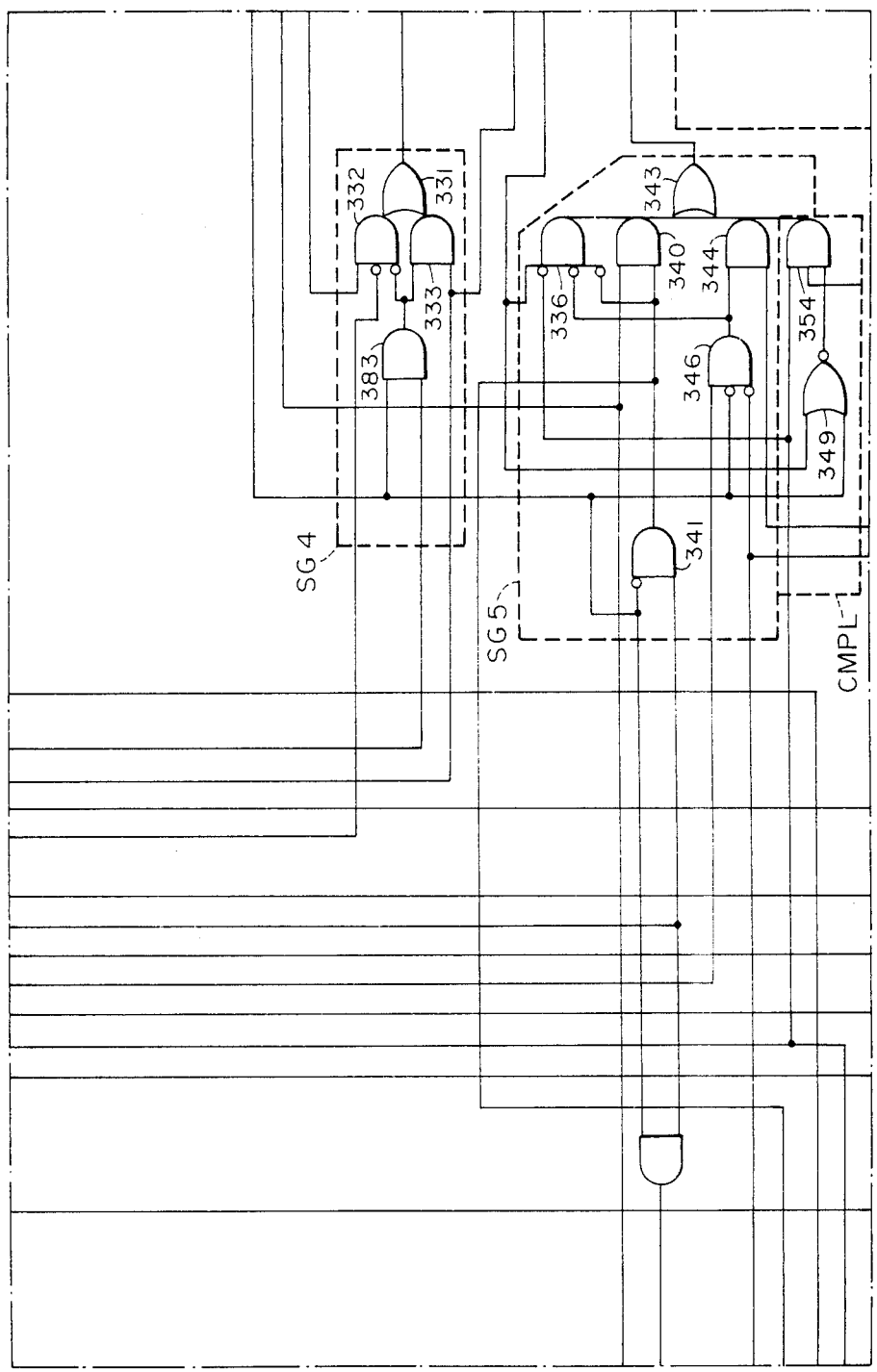
Figures 18, 21:
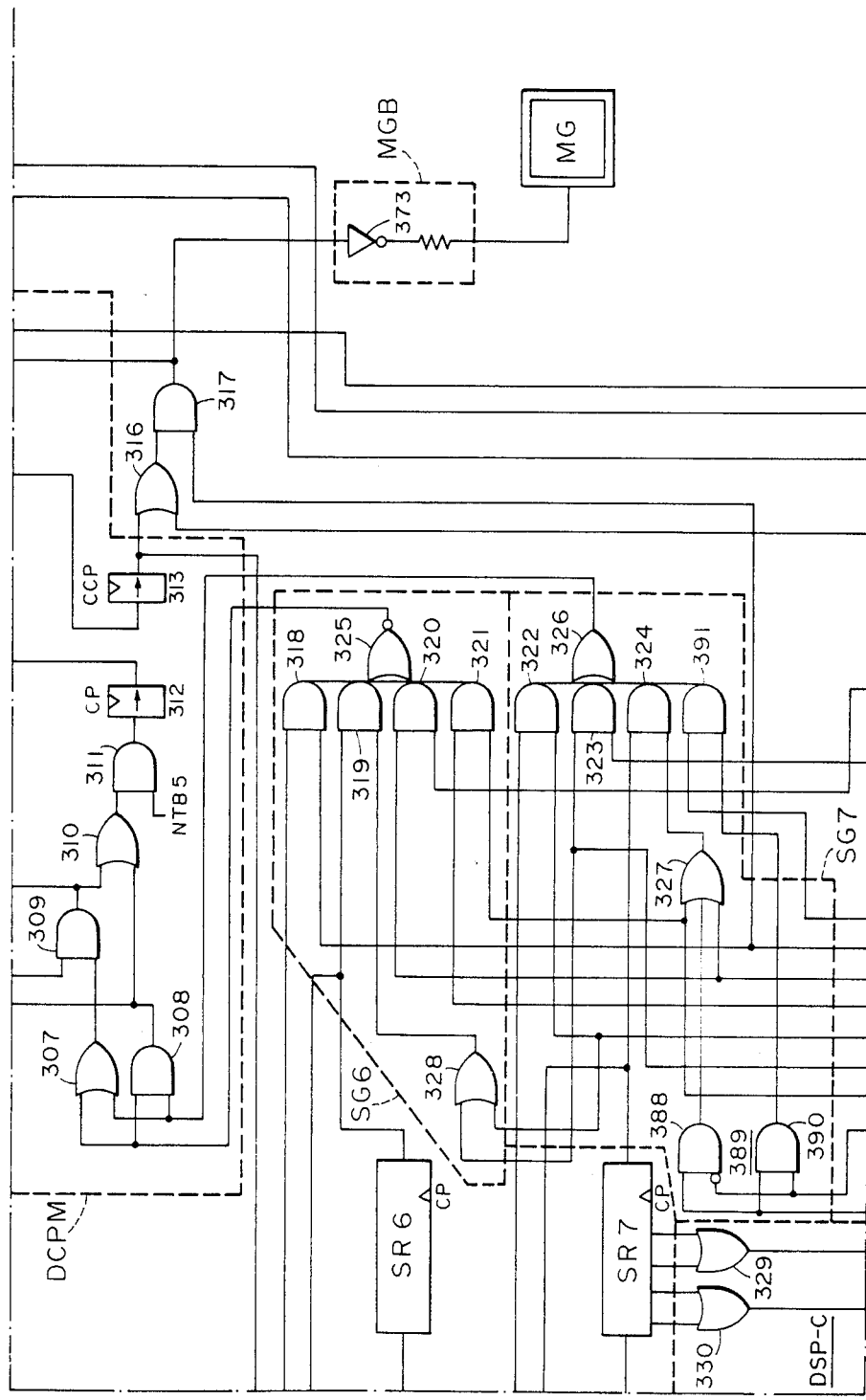
Figures 19, 21:
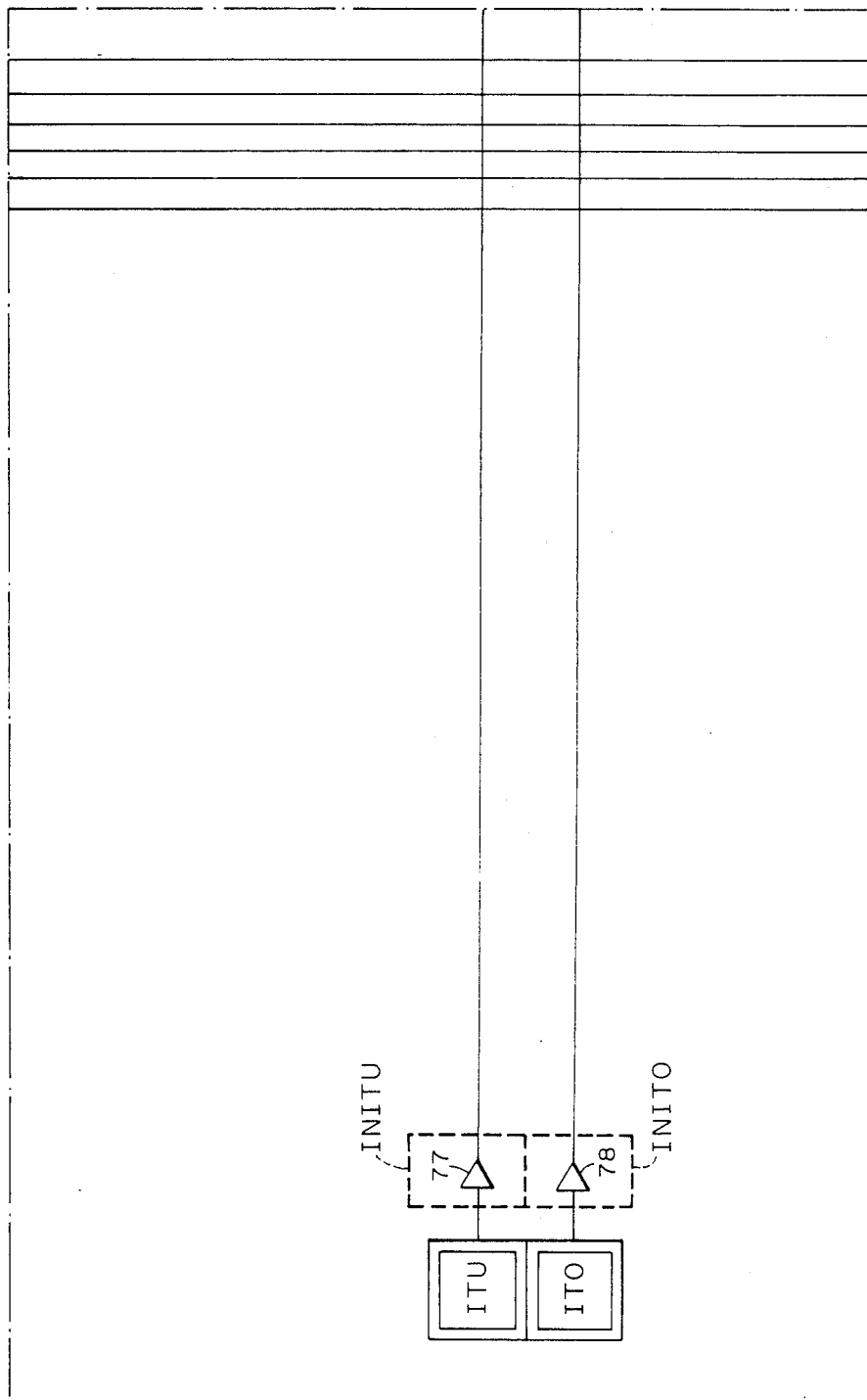
Figures 20, 21:
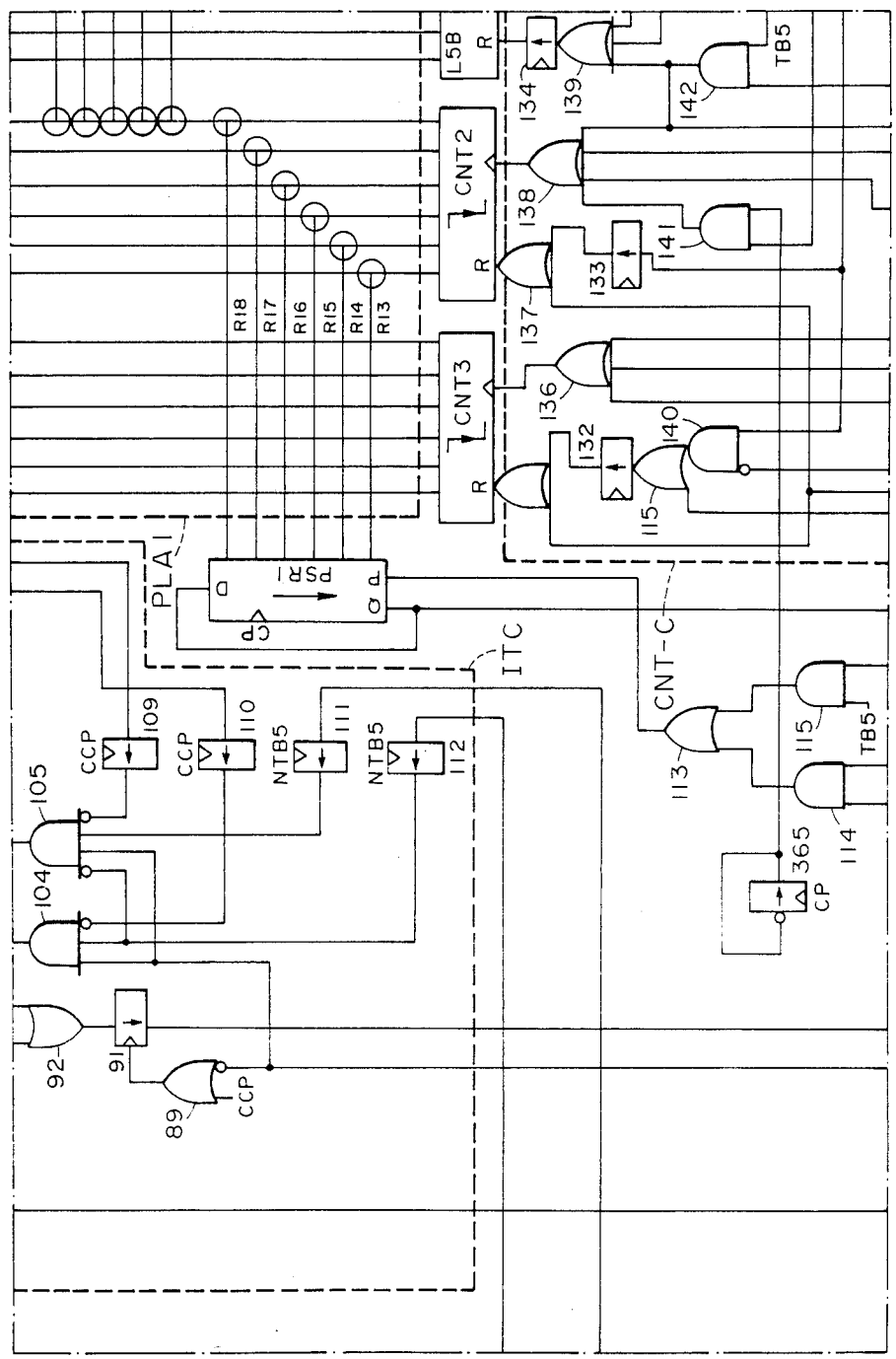
Figure 21:
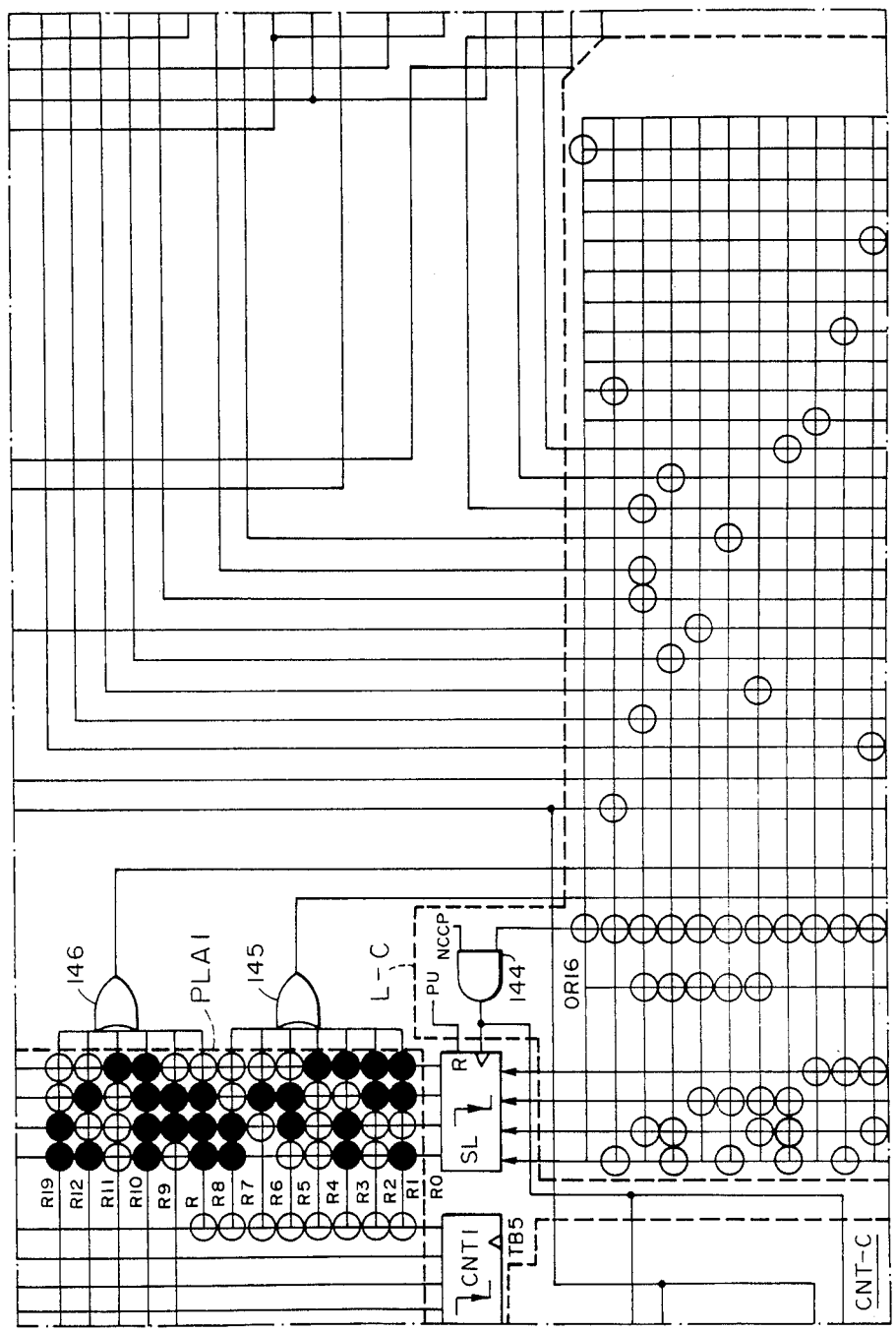
Figures 21, 22:
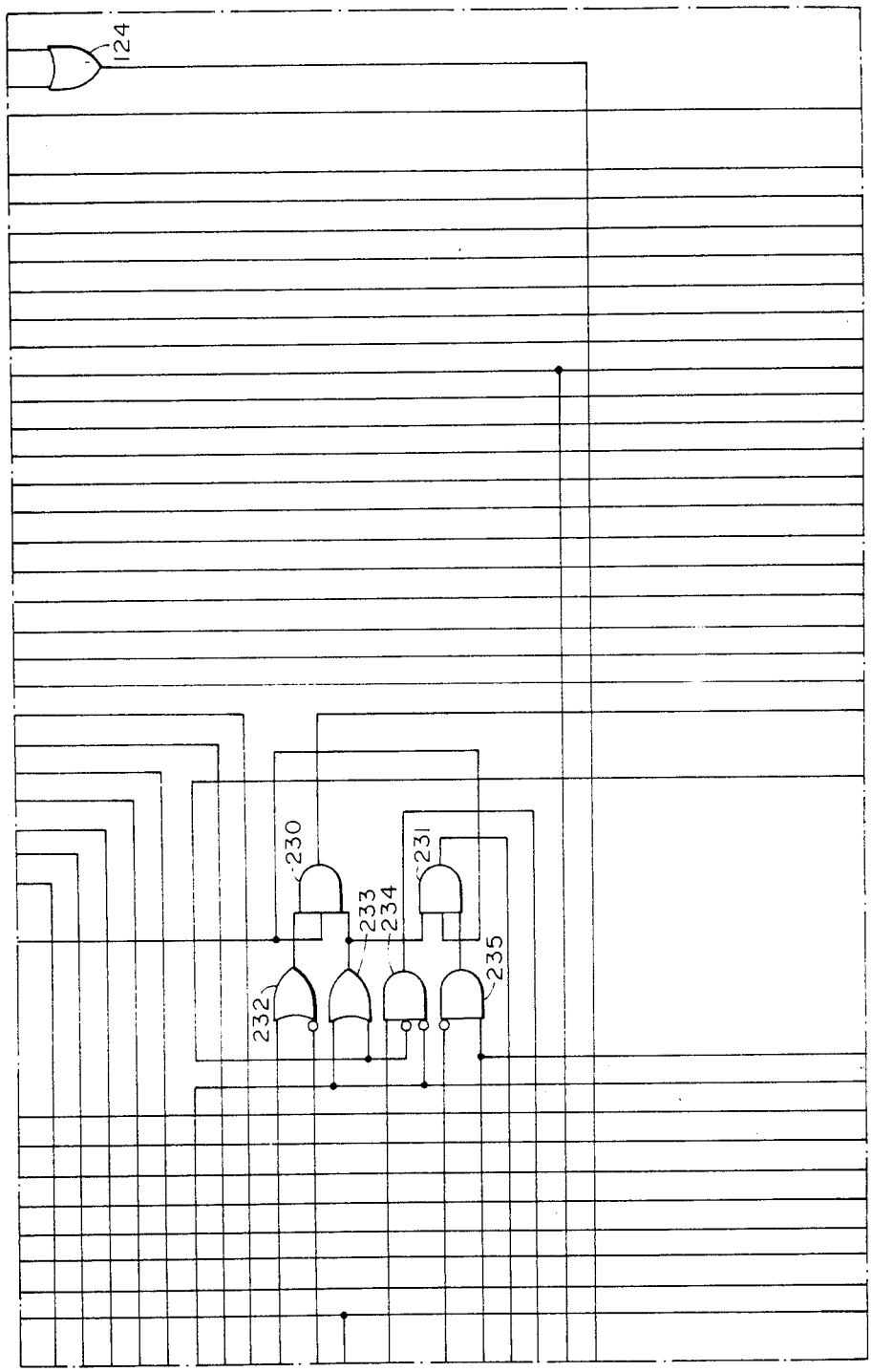
Figures 21, 22, 23:
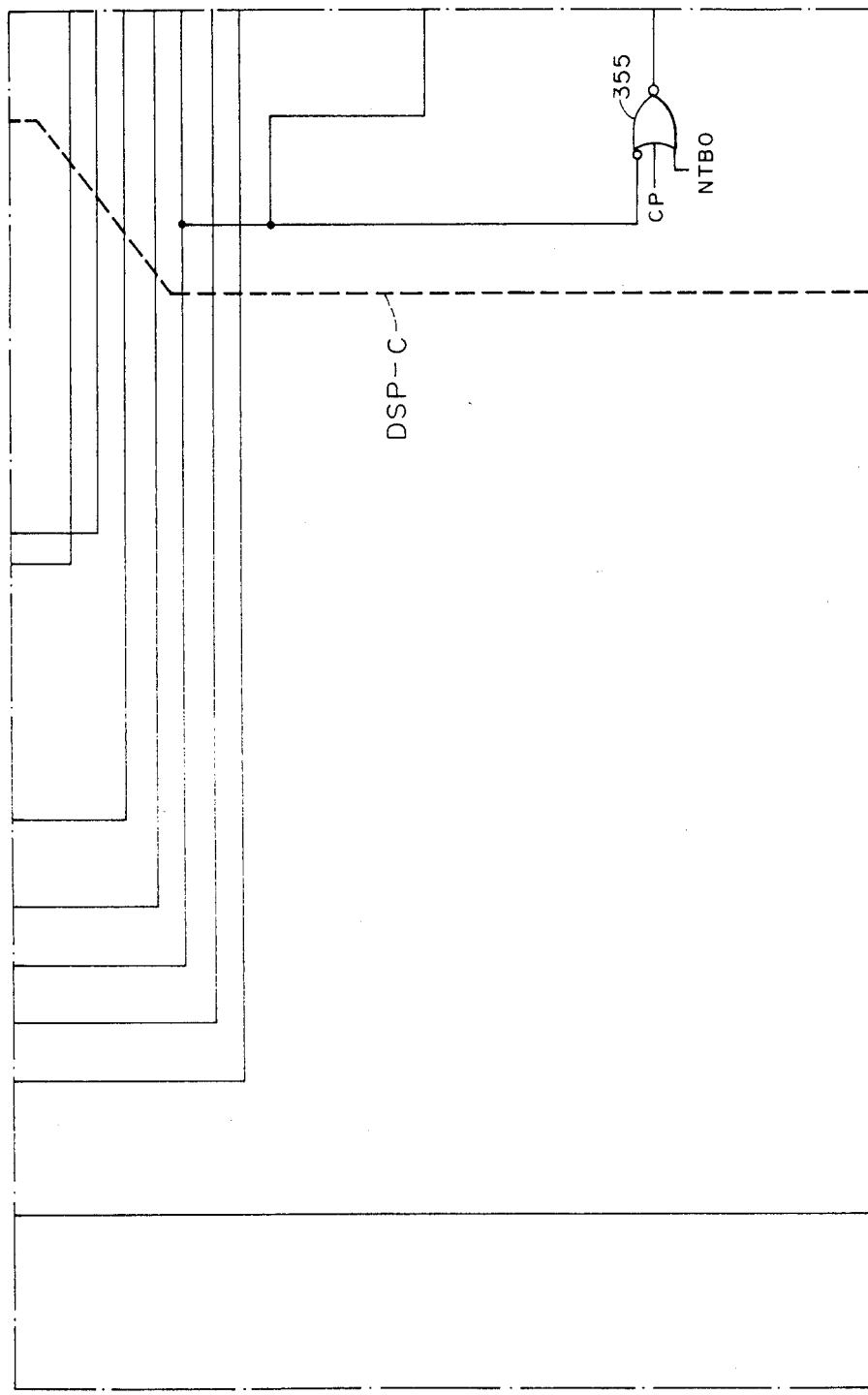
Figures 21, 22, 23, 24:
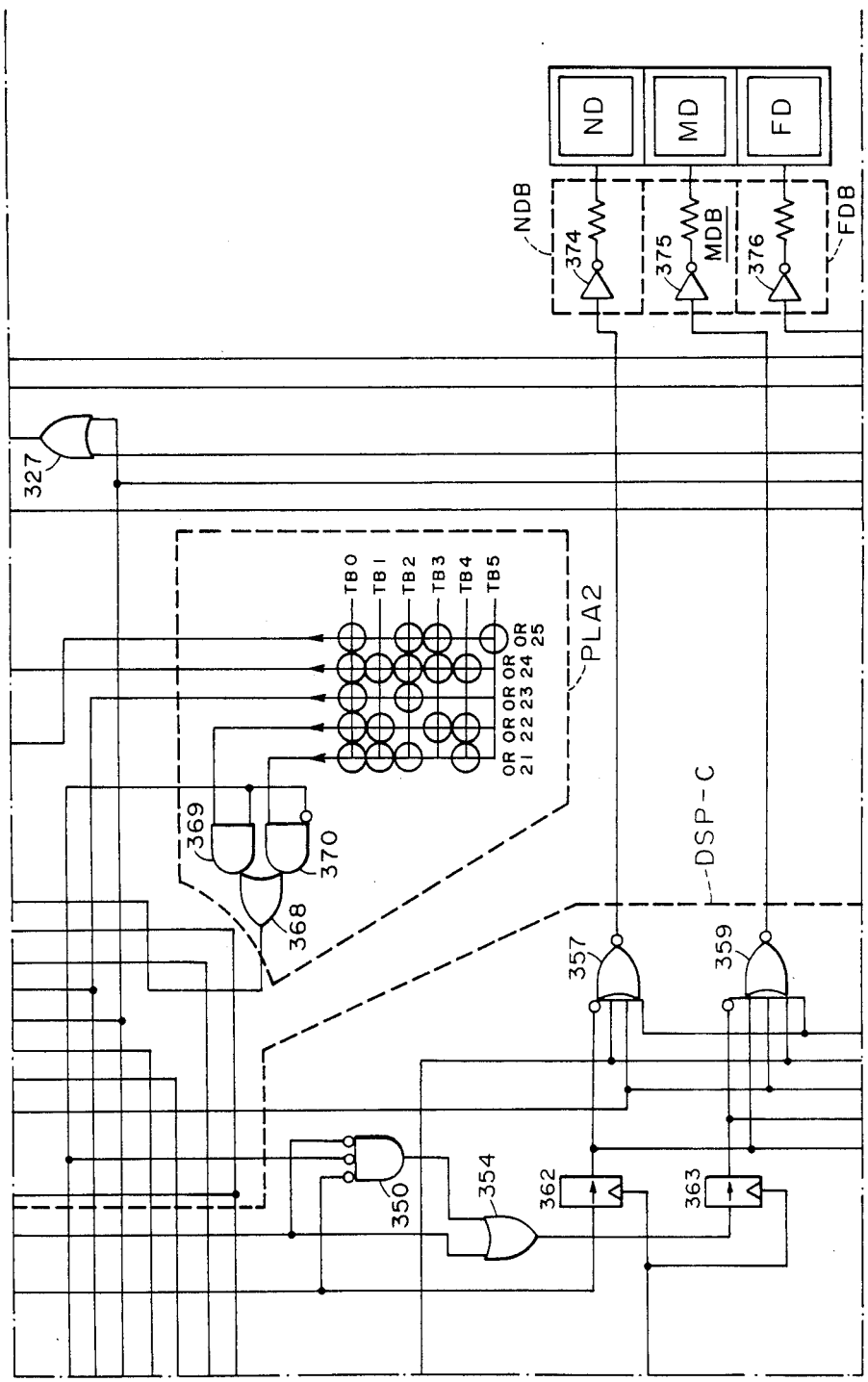
Figures 21, 22, 23, 24, 25:
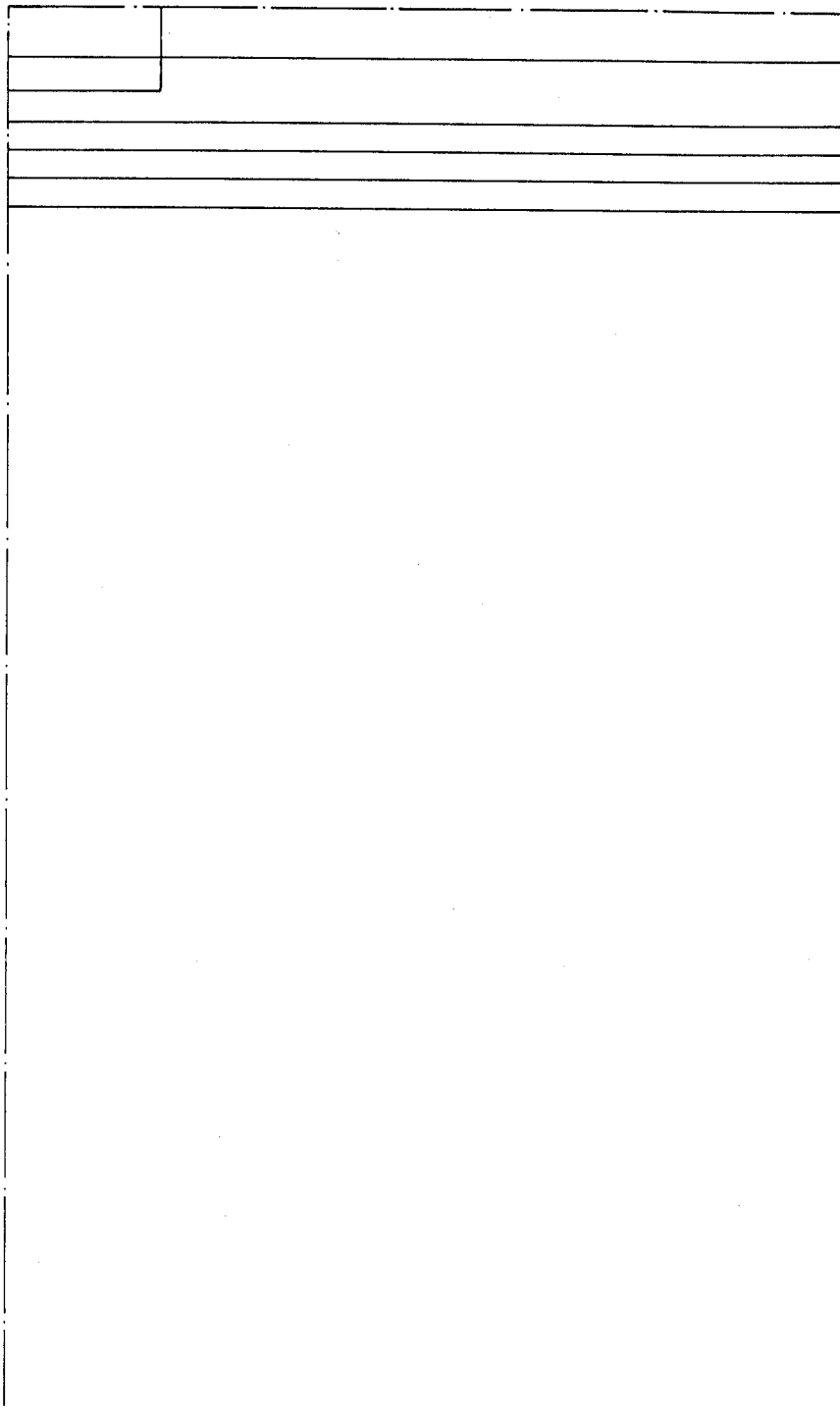
Figures 21, 22, 23, 24, 25, 26:
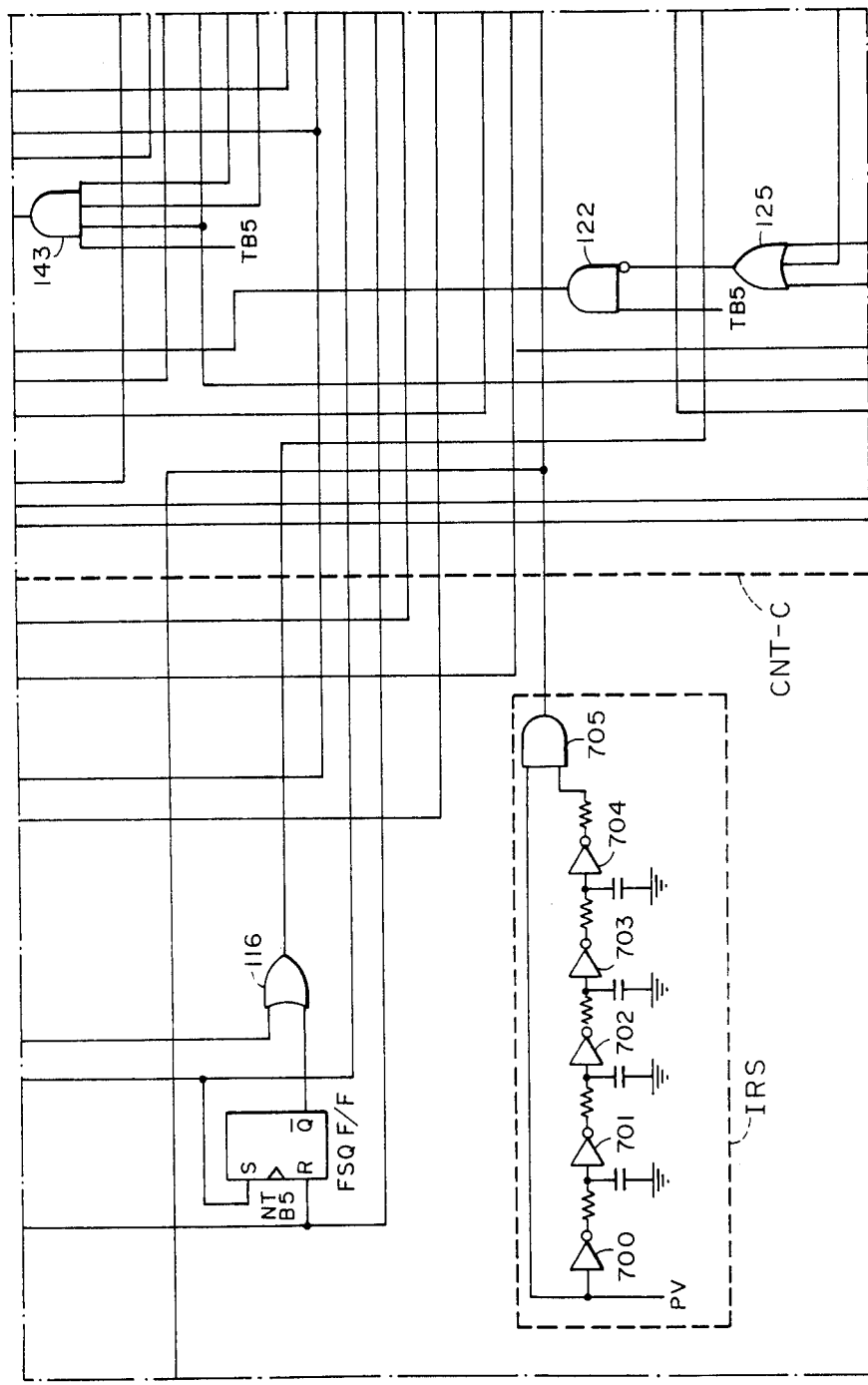
Figures 21, 22, 23, 24, 25, 26, 27:
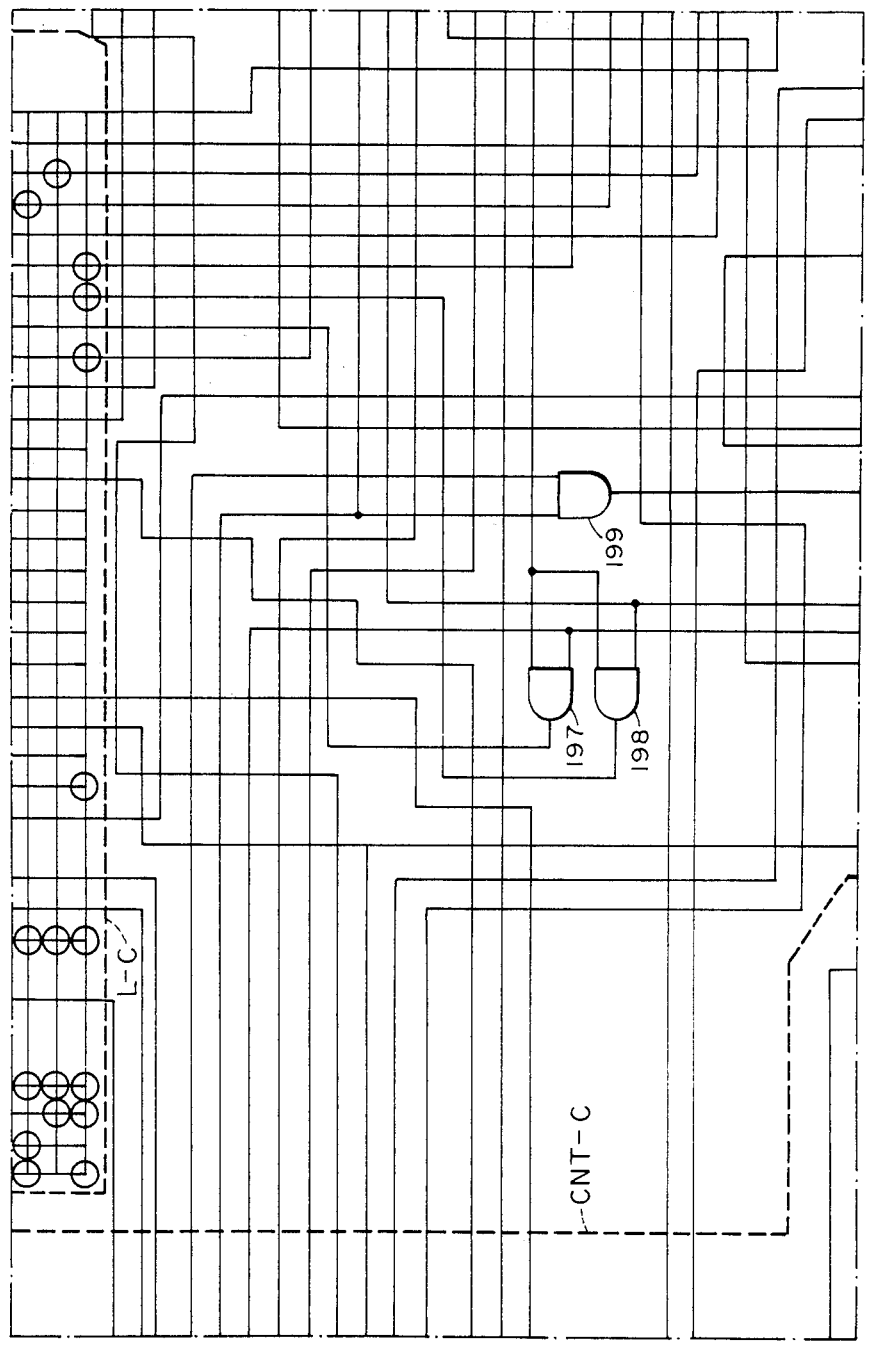
Figures 21, 22, 23, 24, 25, 26, 27, 28:
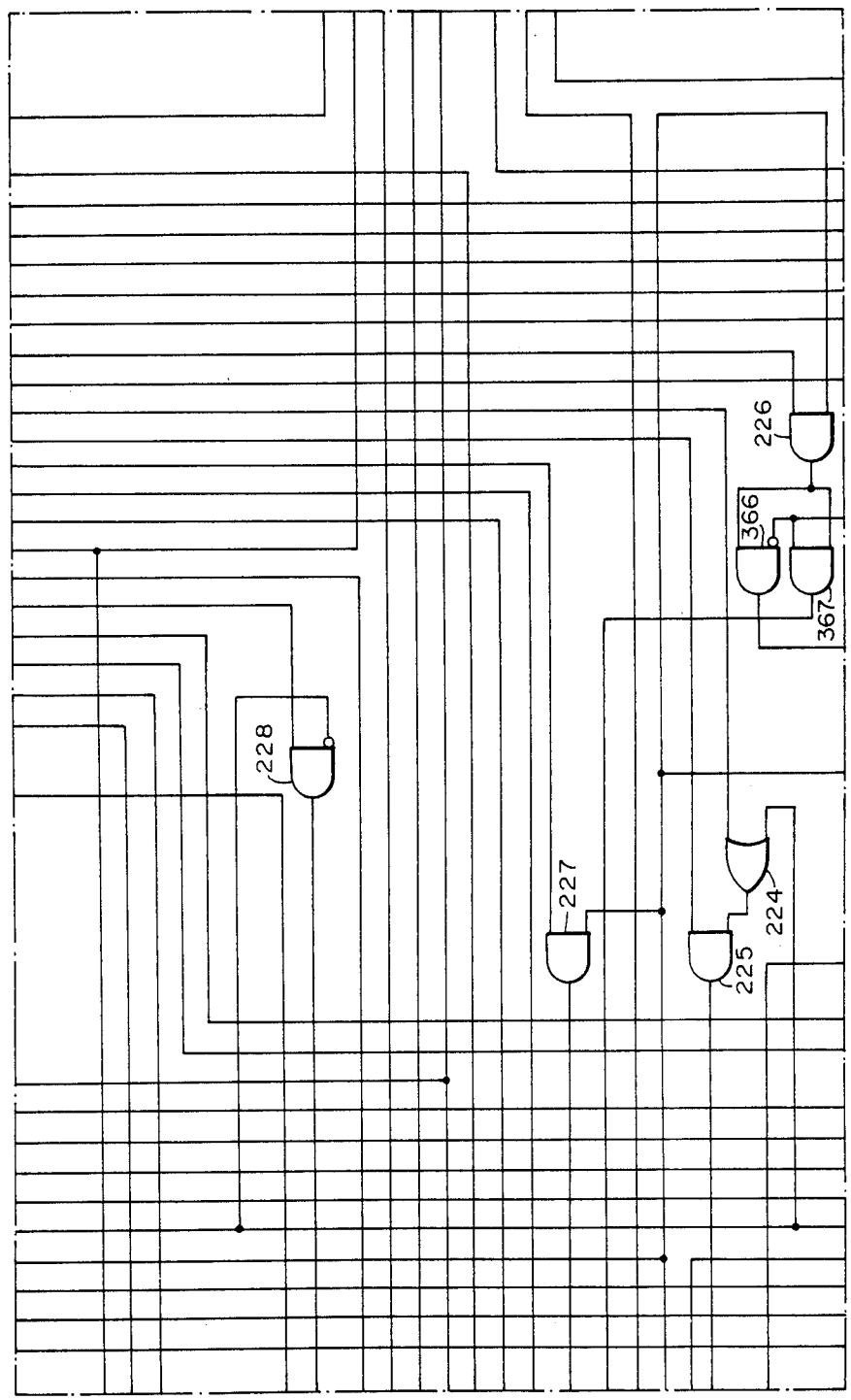
Figures 21, 22, 23, 24, 25, 26, 27, 28, 29:
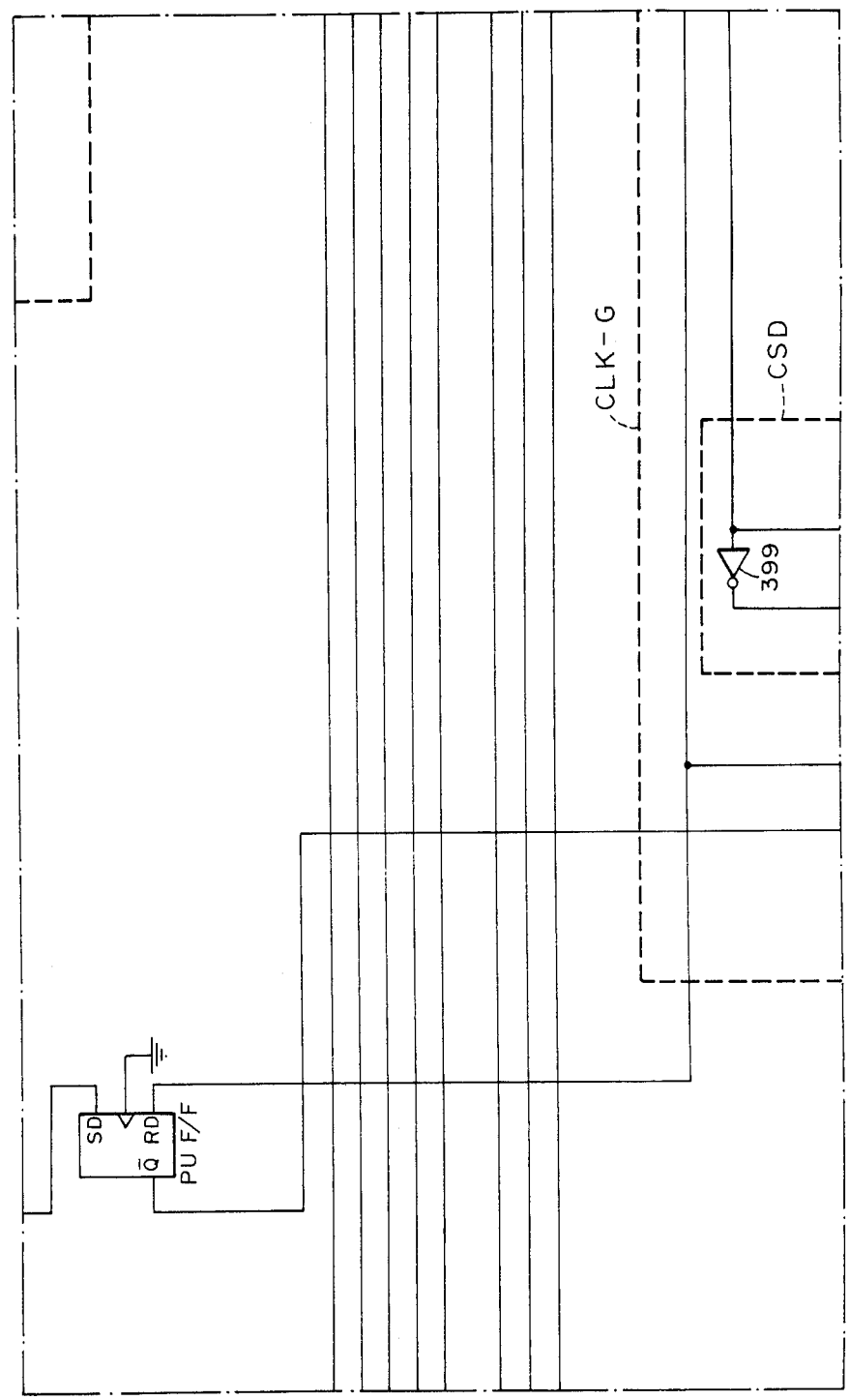
Figures 21, 22, 23, 24, 25, 26, 27, 28, 29, 30:
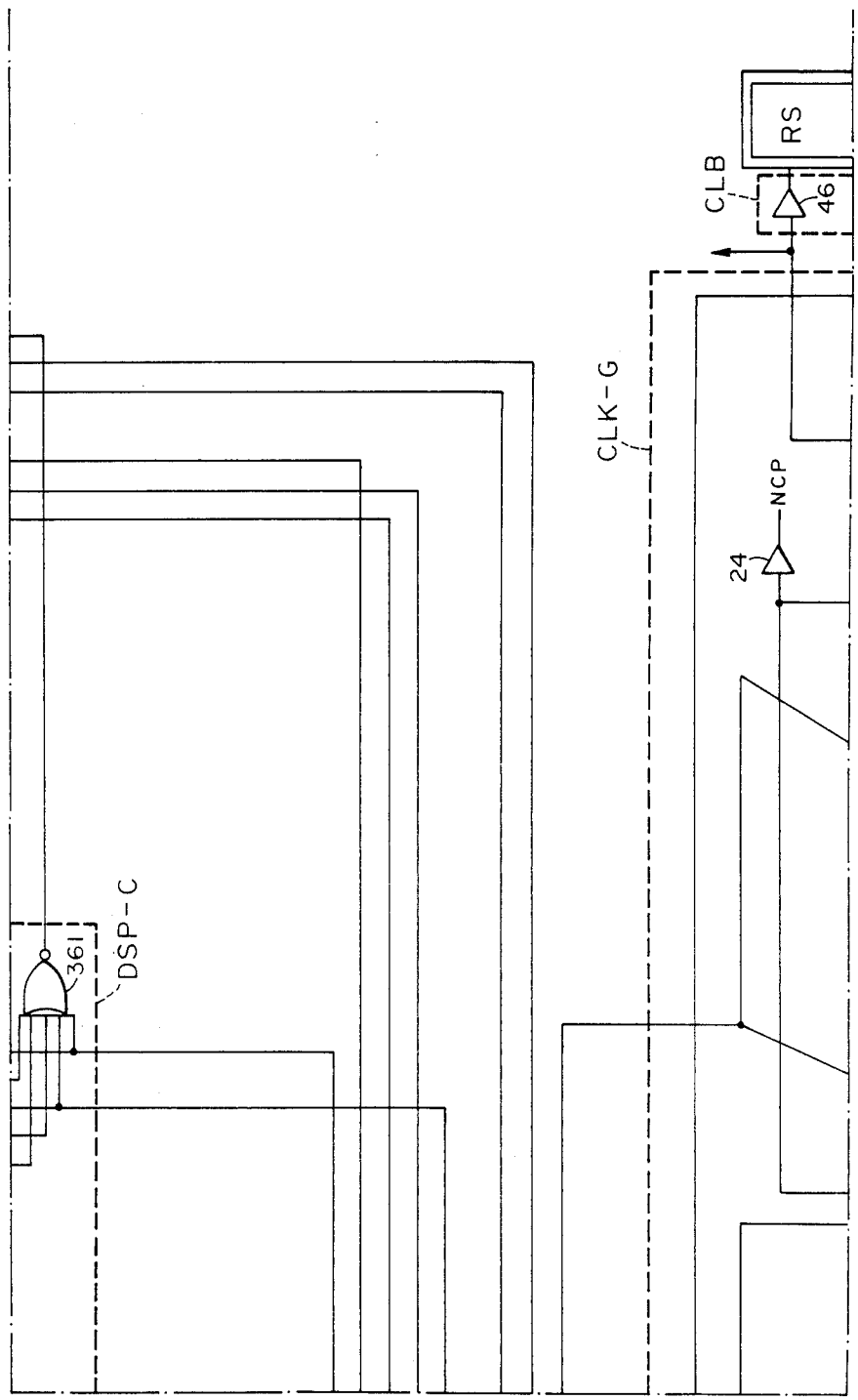
Figures 21, 22, 23, 24, 25, 26, 27, 28, 29, 30, 31:
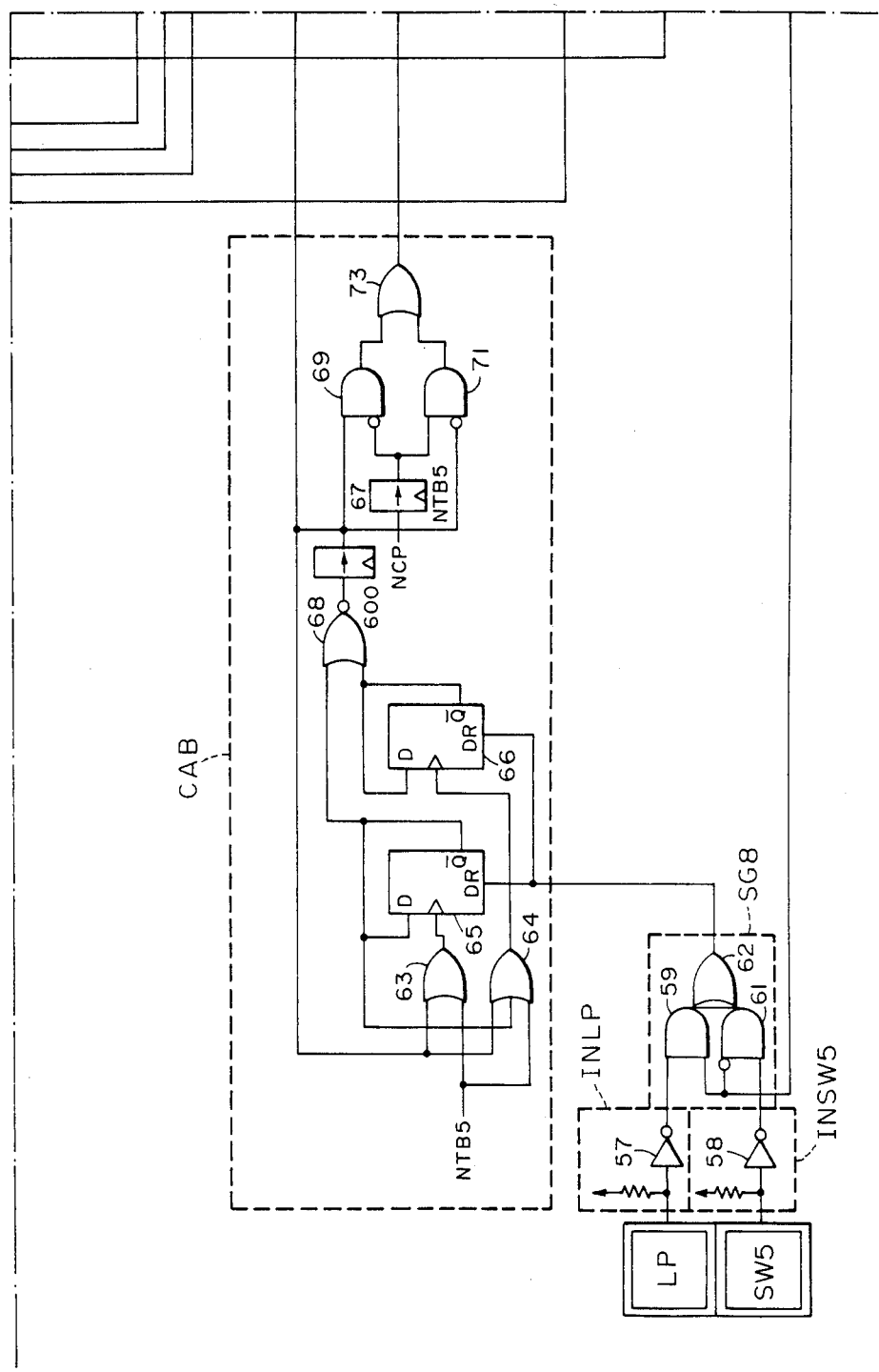
Figures 21, 22, 23, 24, 25, 26, 27, 28, 29, 30, 31, 32:
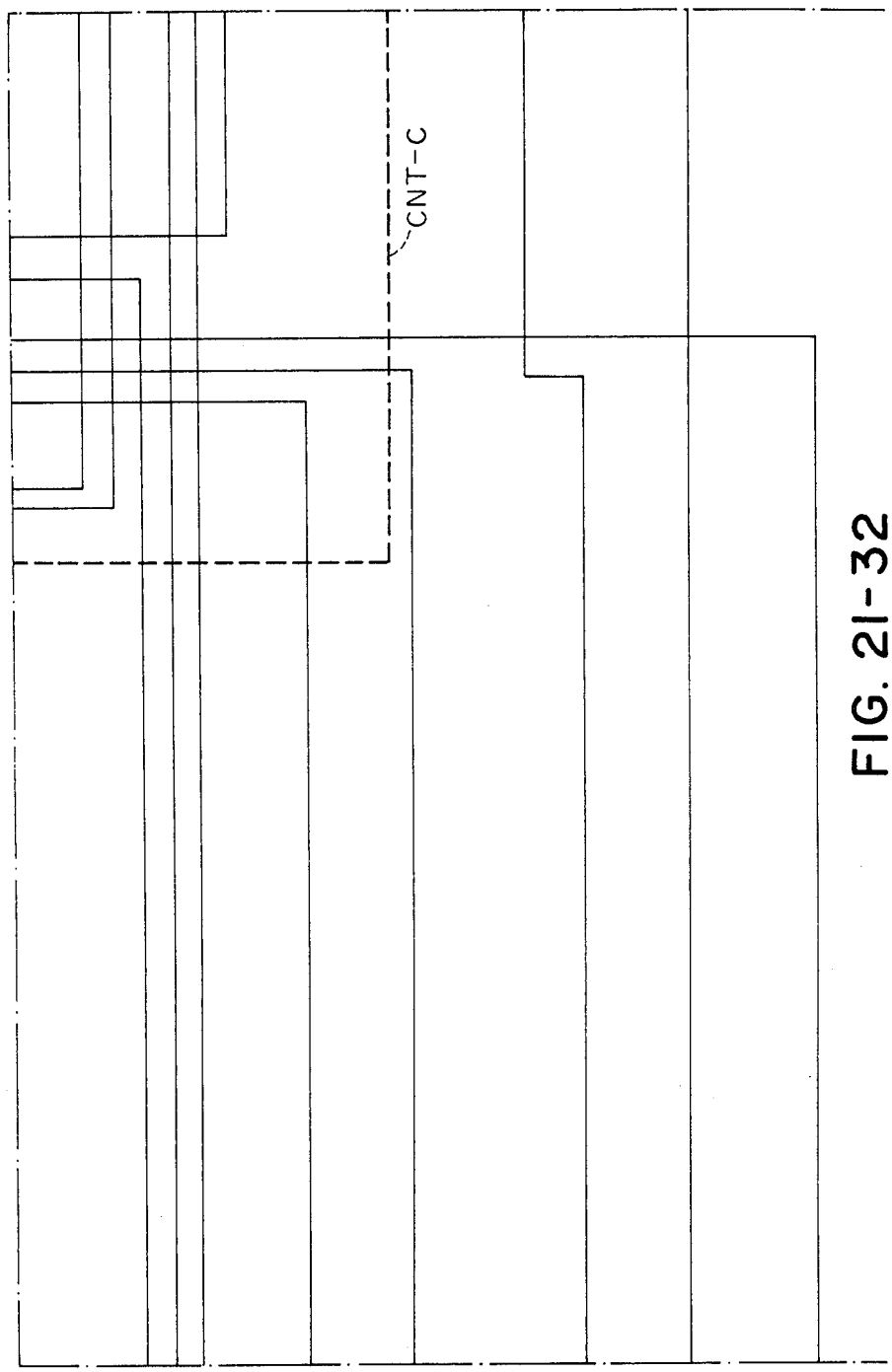
Figures 21, 22, 23, 24, 25, 26, 27, 28, 29, 30, 31, 32, 33:
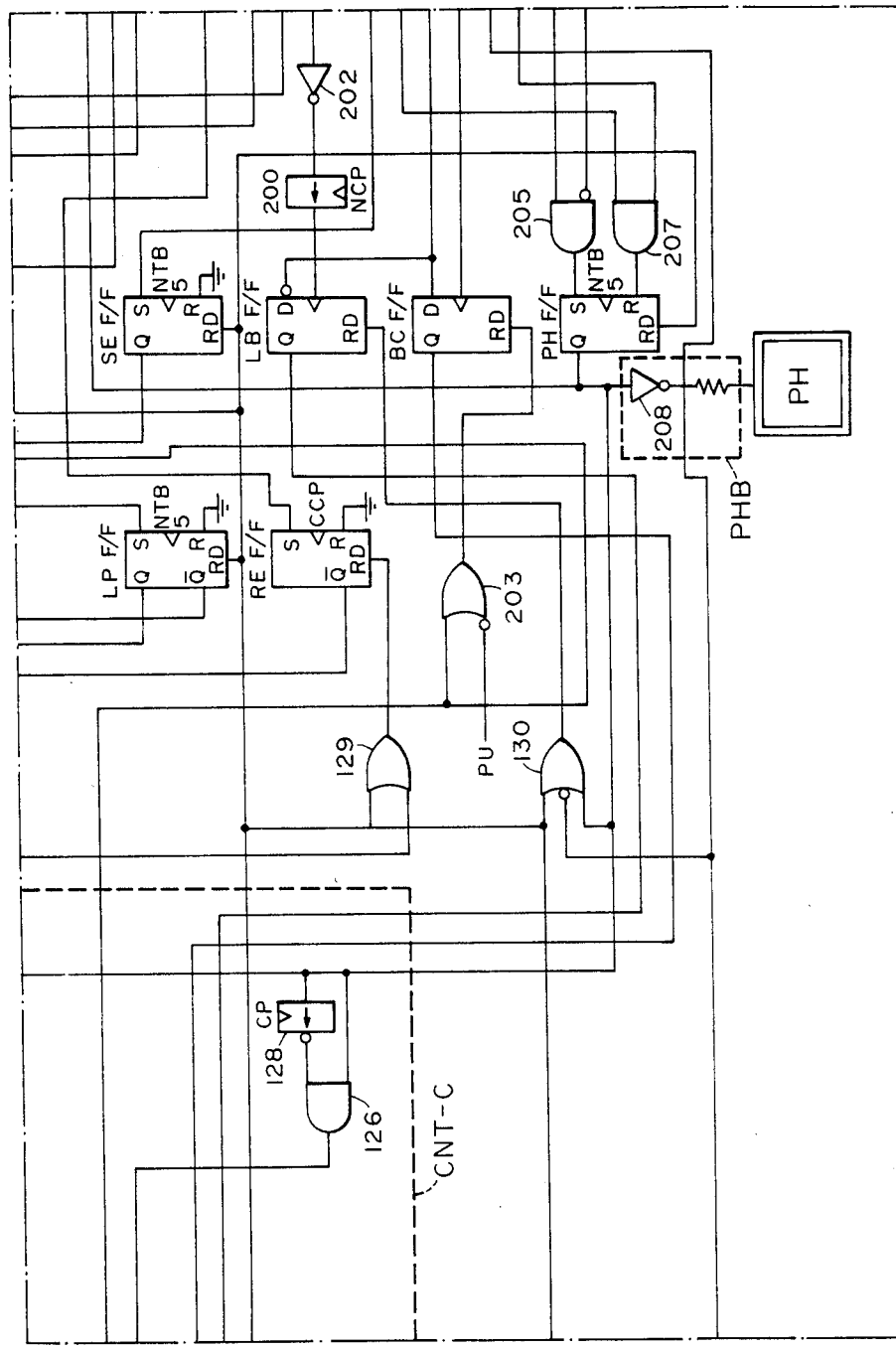
Figures 21, 22, 23, 24, 25, 26, 27, 28, 29, 30, 31, 32, 33, 34:
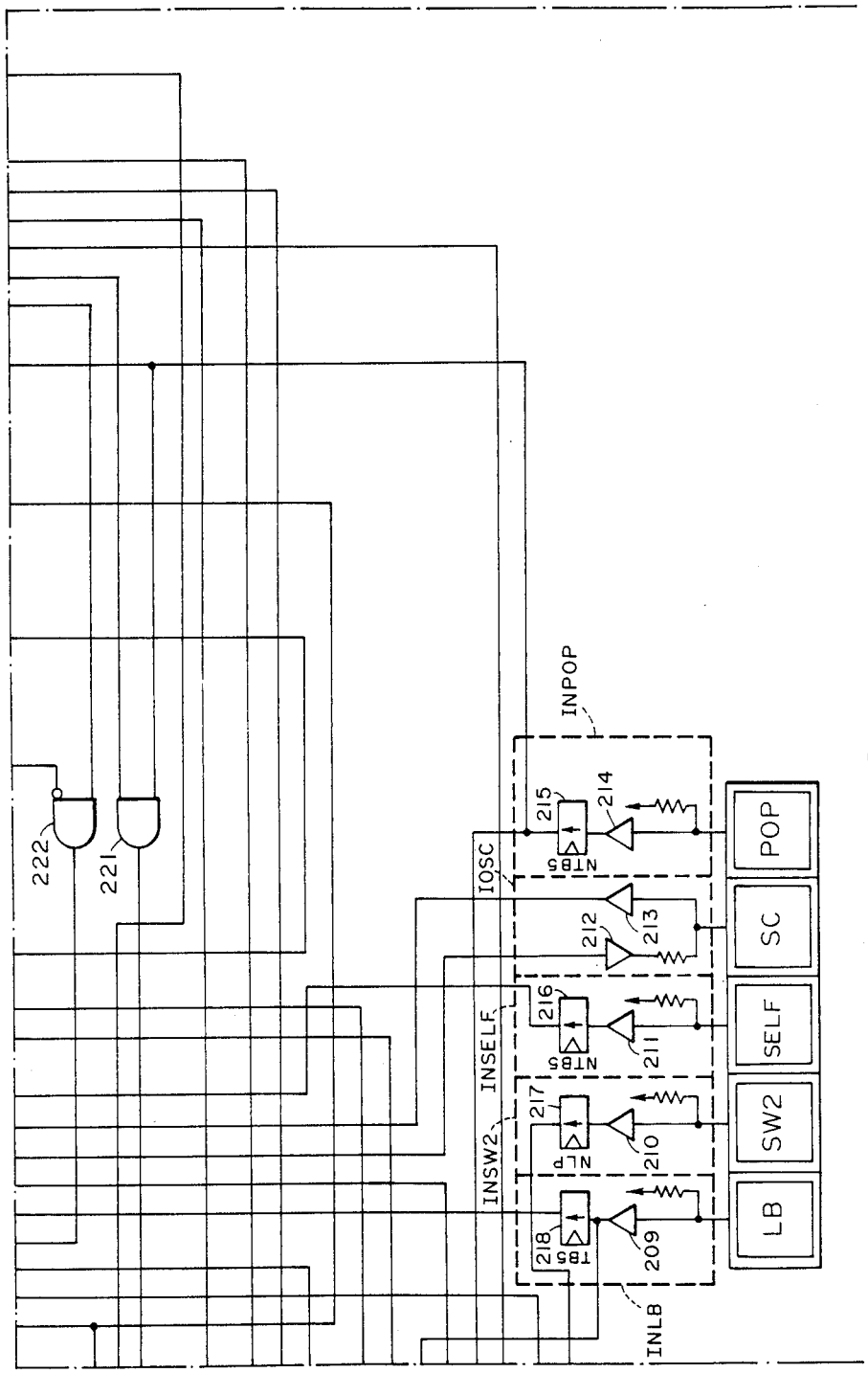
Figures 21, 22, 23, 24, 25, 26, 27, 28, 29, 30, 31, 32, 33, 34, 35:
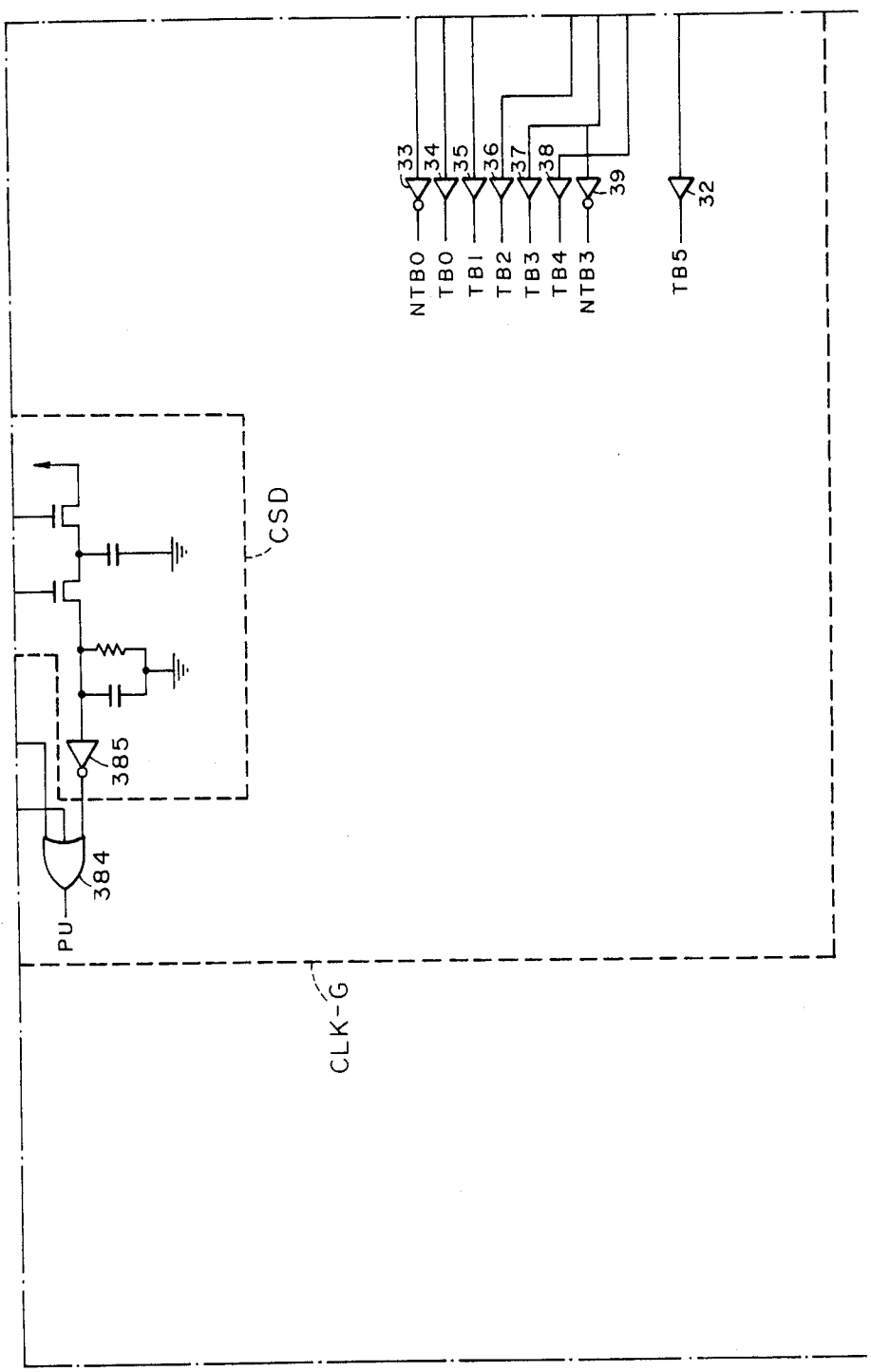
Figures 21, 22, 23, 24, 25, 26, 27, 28, 29, 30, 31, 32, 33, 34, 35, 36:
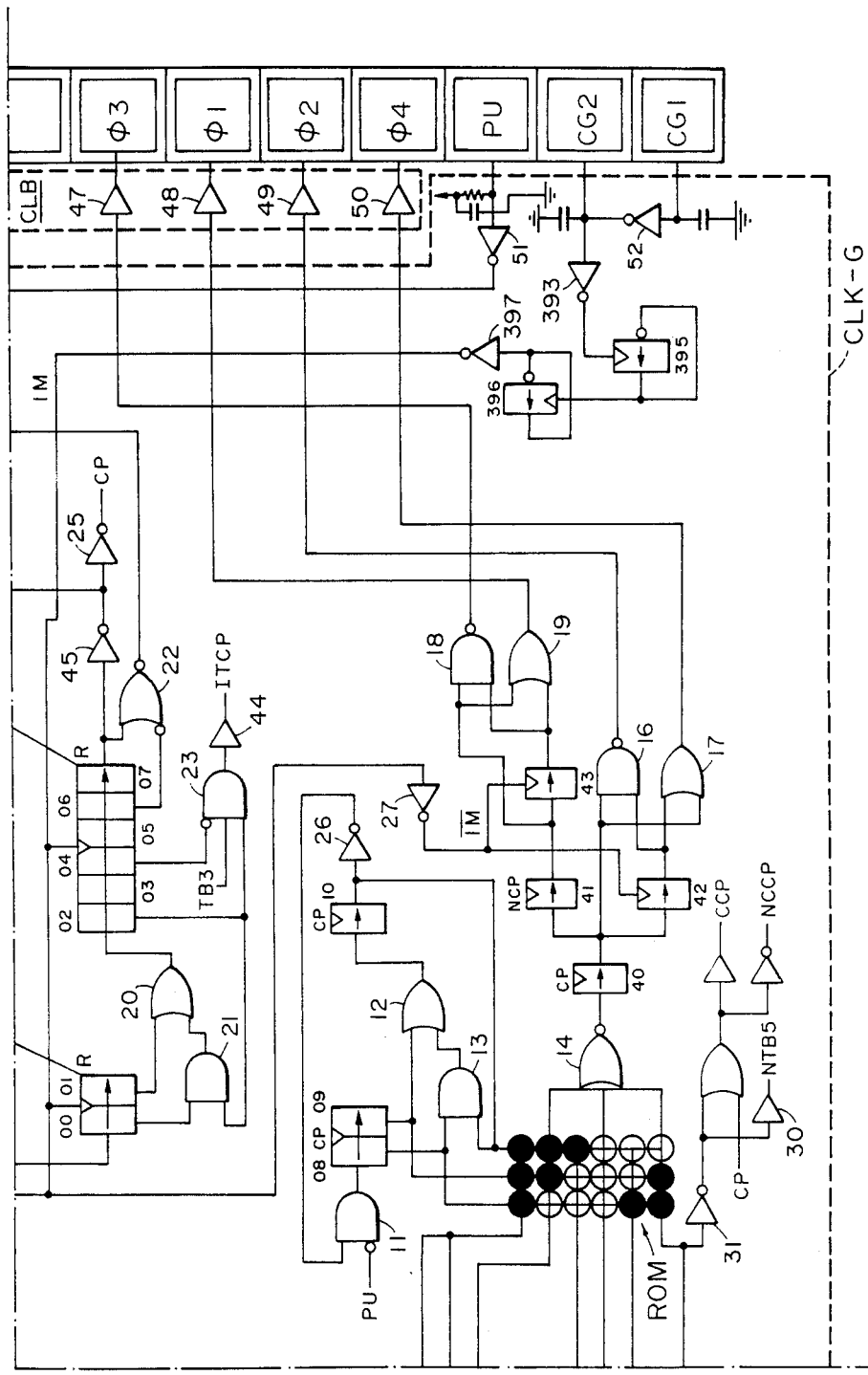
Figure 22:
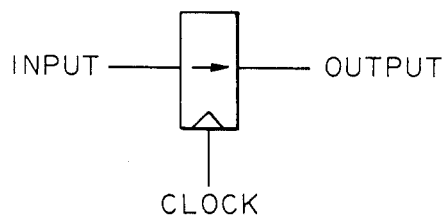
Figure 23:
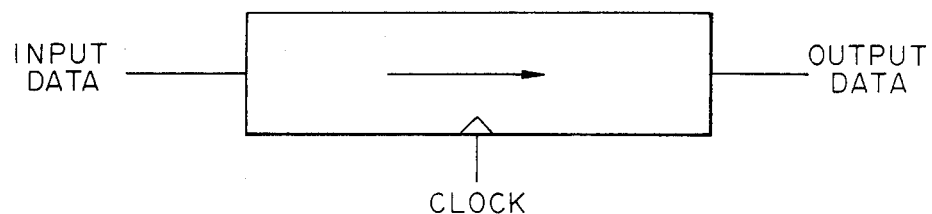
Figure 24:
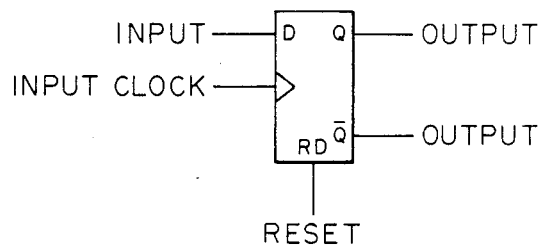
Figure 25:
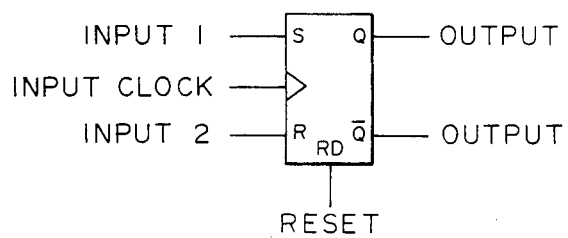
Figure 26:
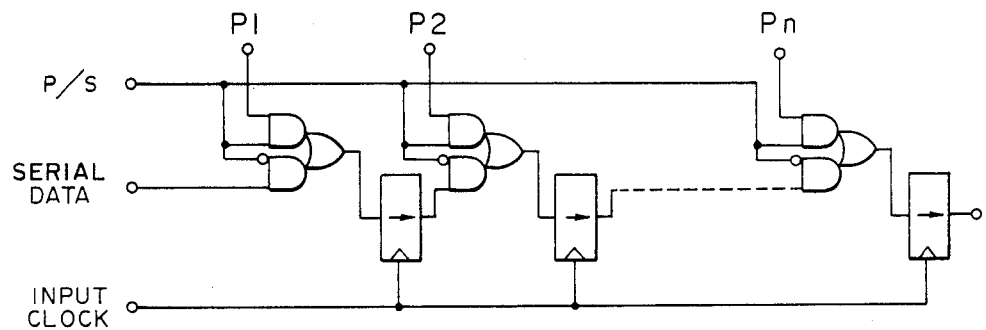
Figure 27:
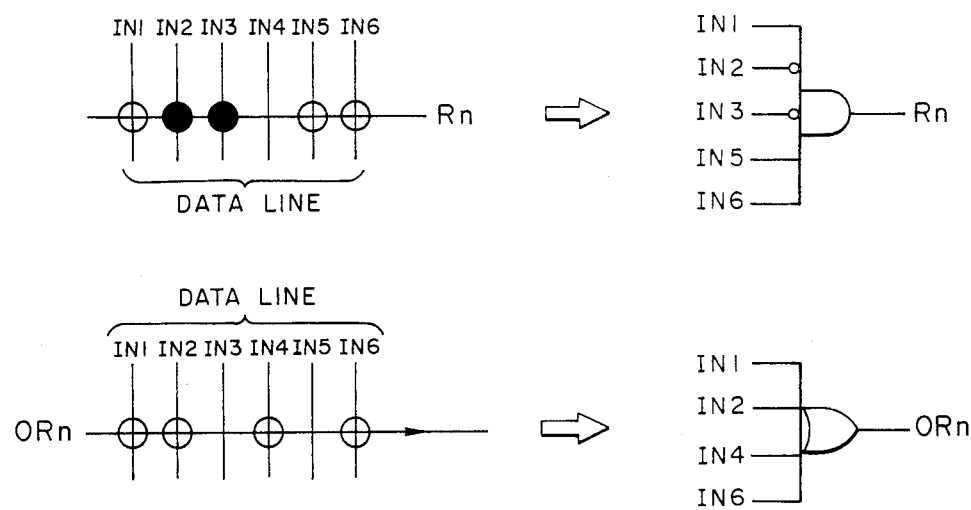
Figure 28:
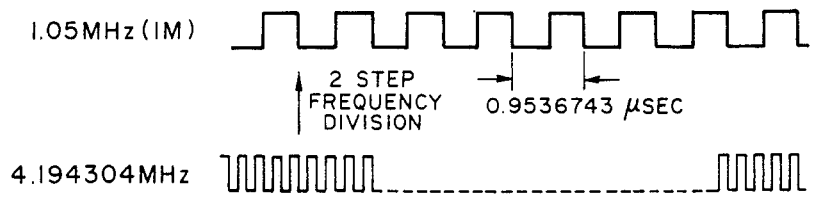
Figure 29:
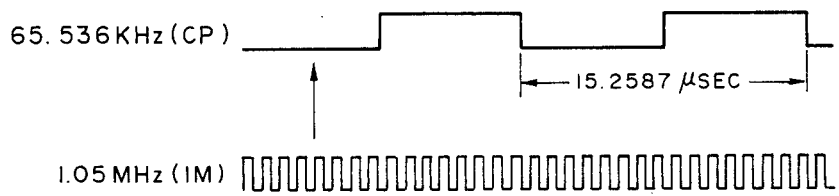
Figure 30:
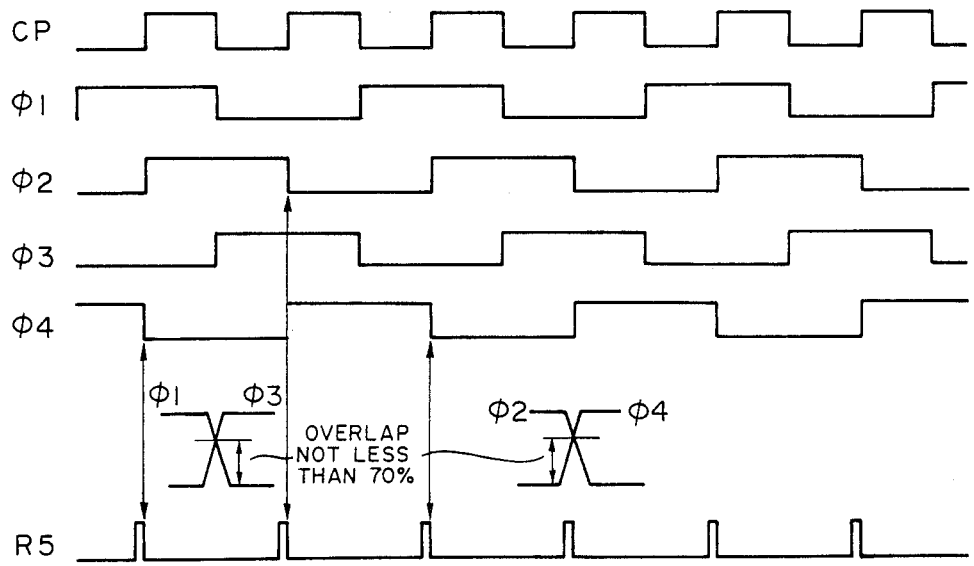
Figure 31:
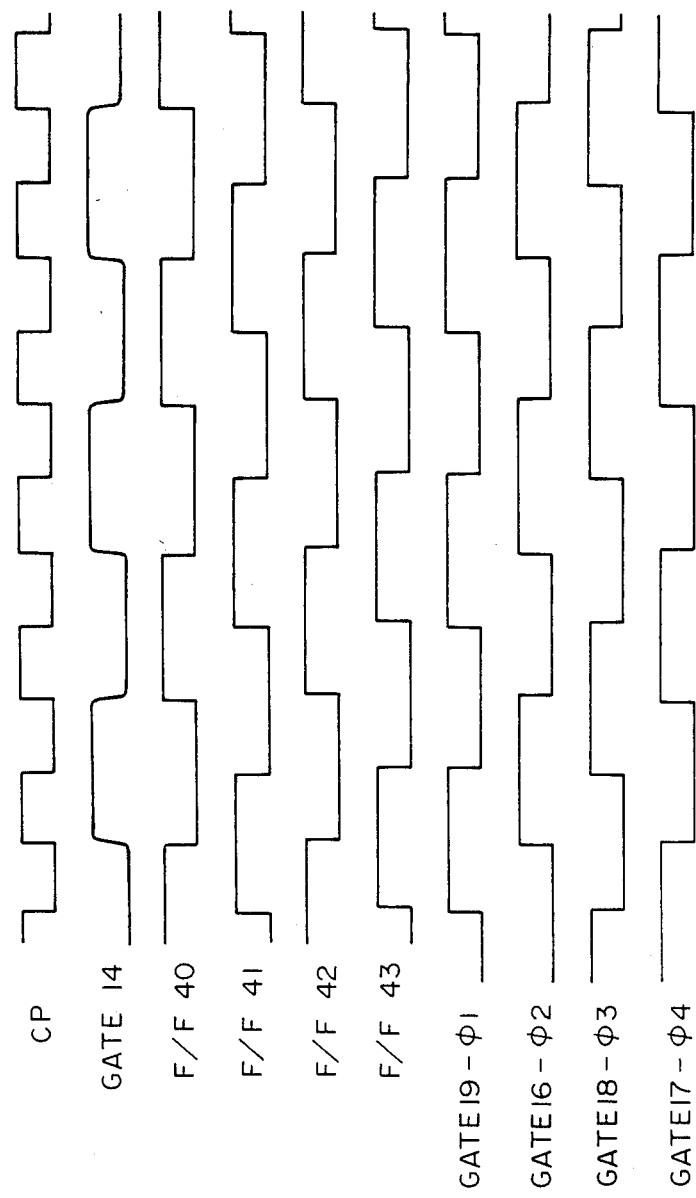
Figure 32:
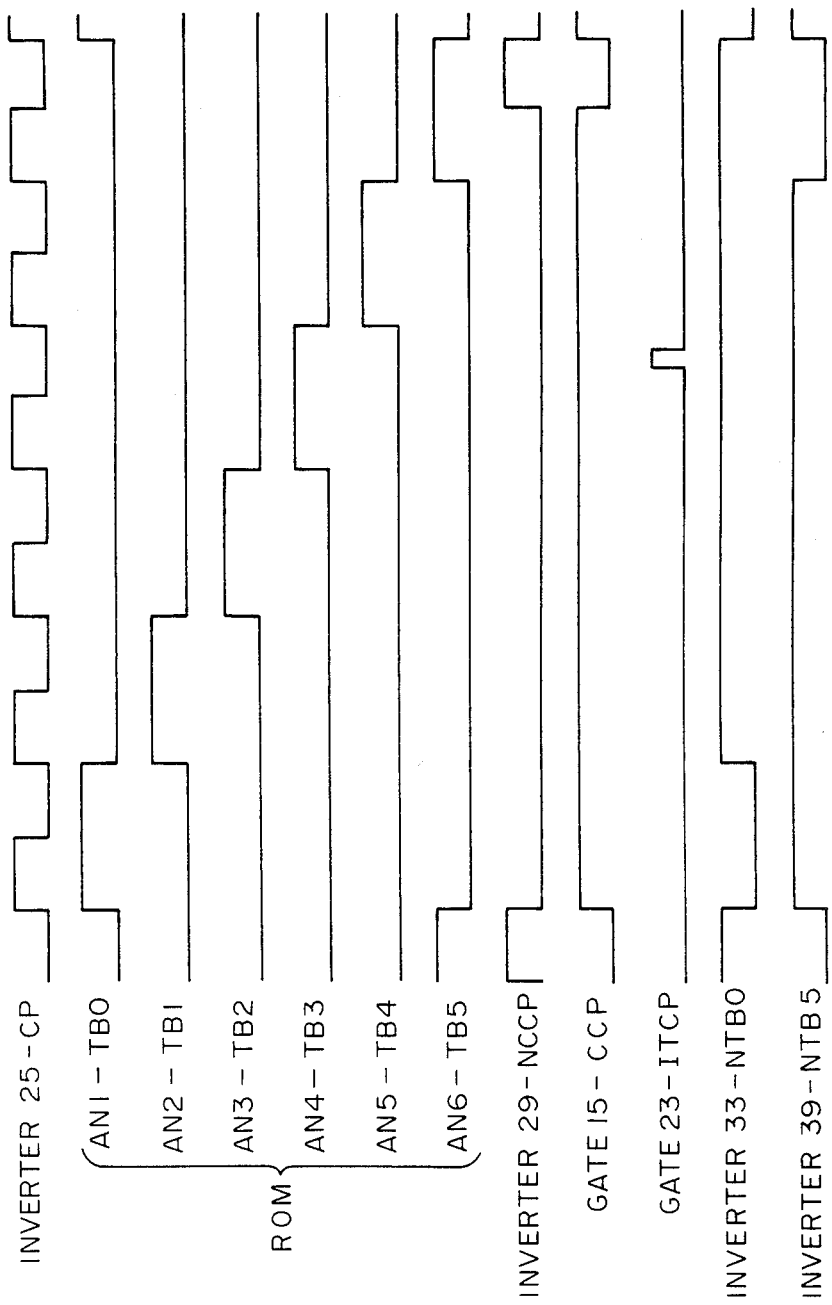
Figure 33:
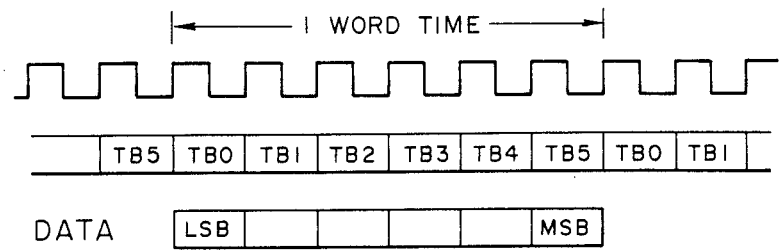
Figure 34:
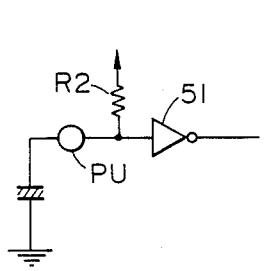
Figure 35:
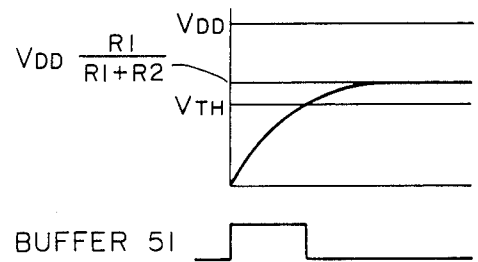
Figure 36:
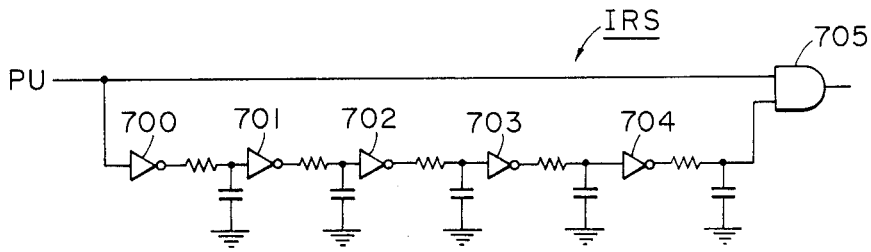
Figure 37:
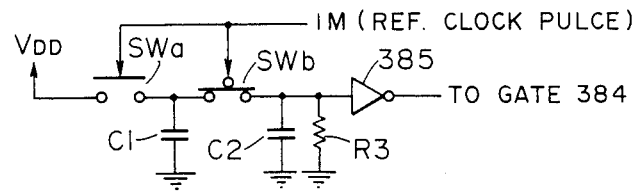
Figure 38:
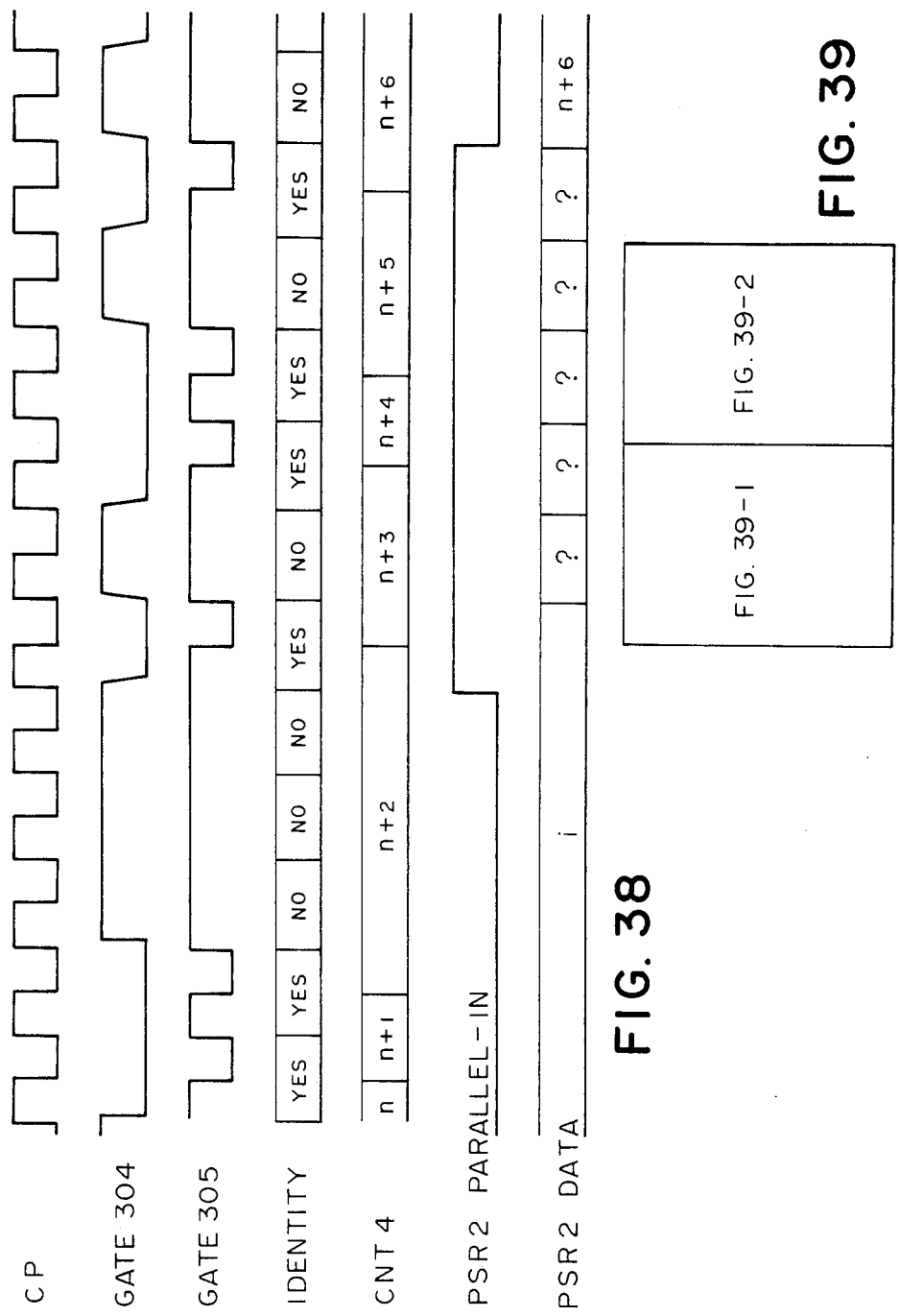
Figures 1, 39:
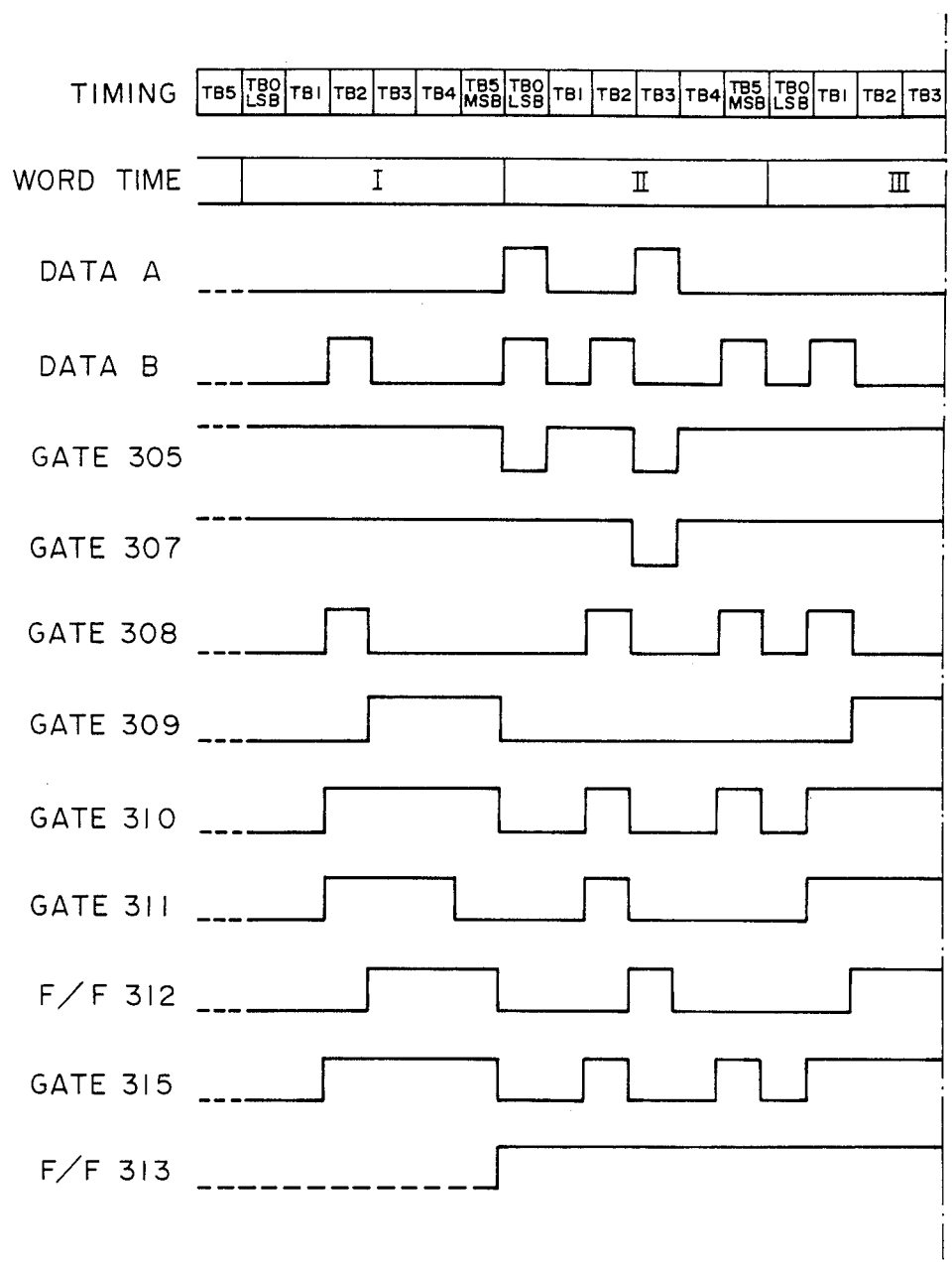
Figures 2, 39:
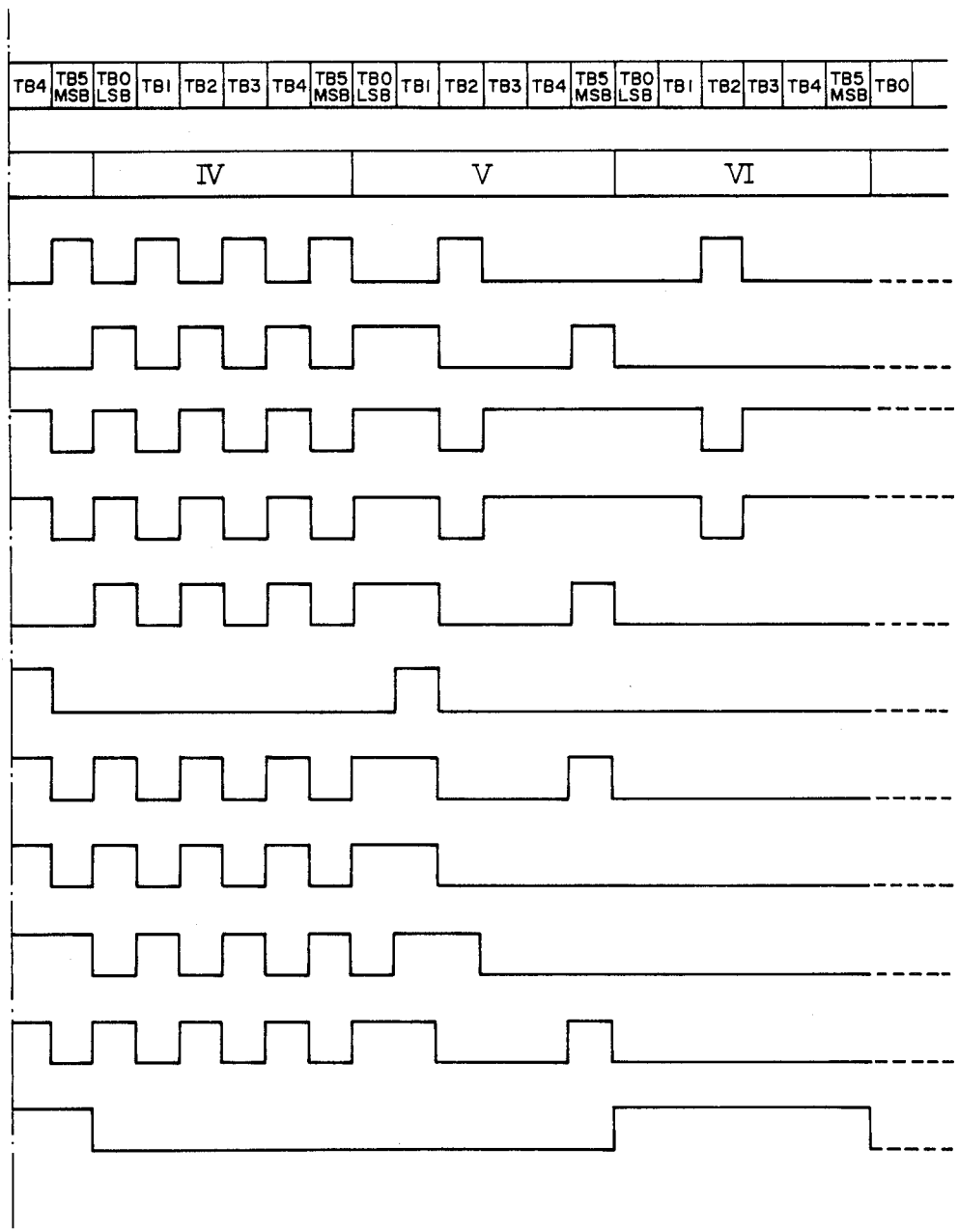
Figure 40:
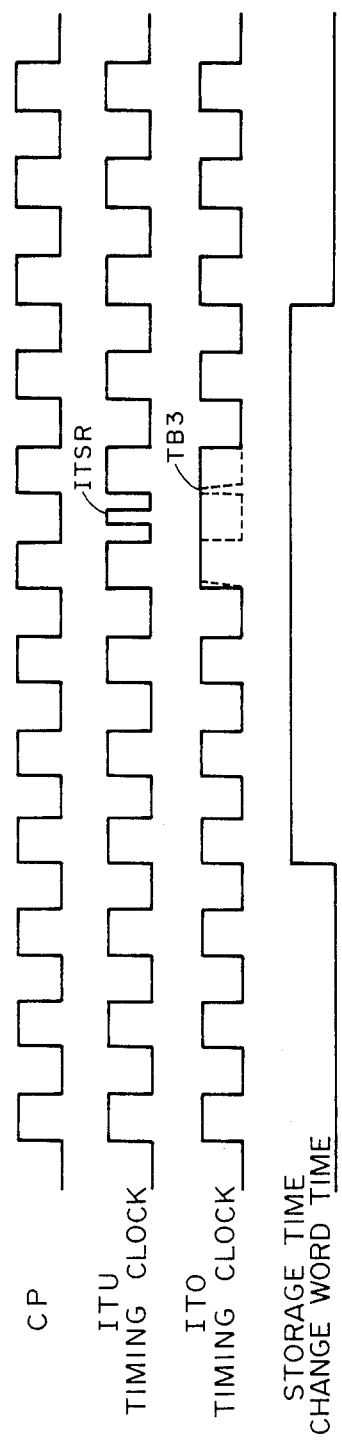
Figure 41:
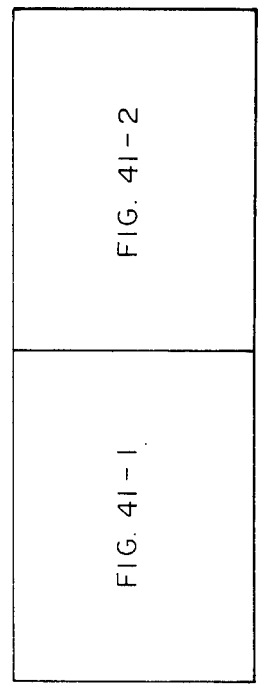
Figures 1, 41:
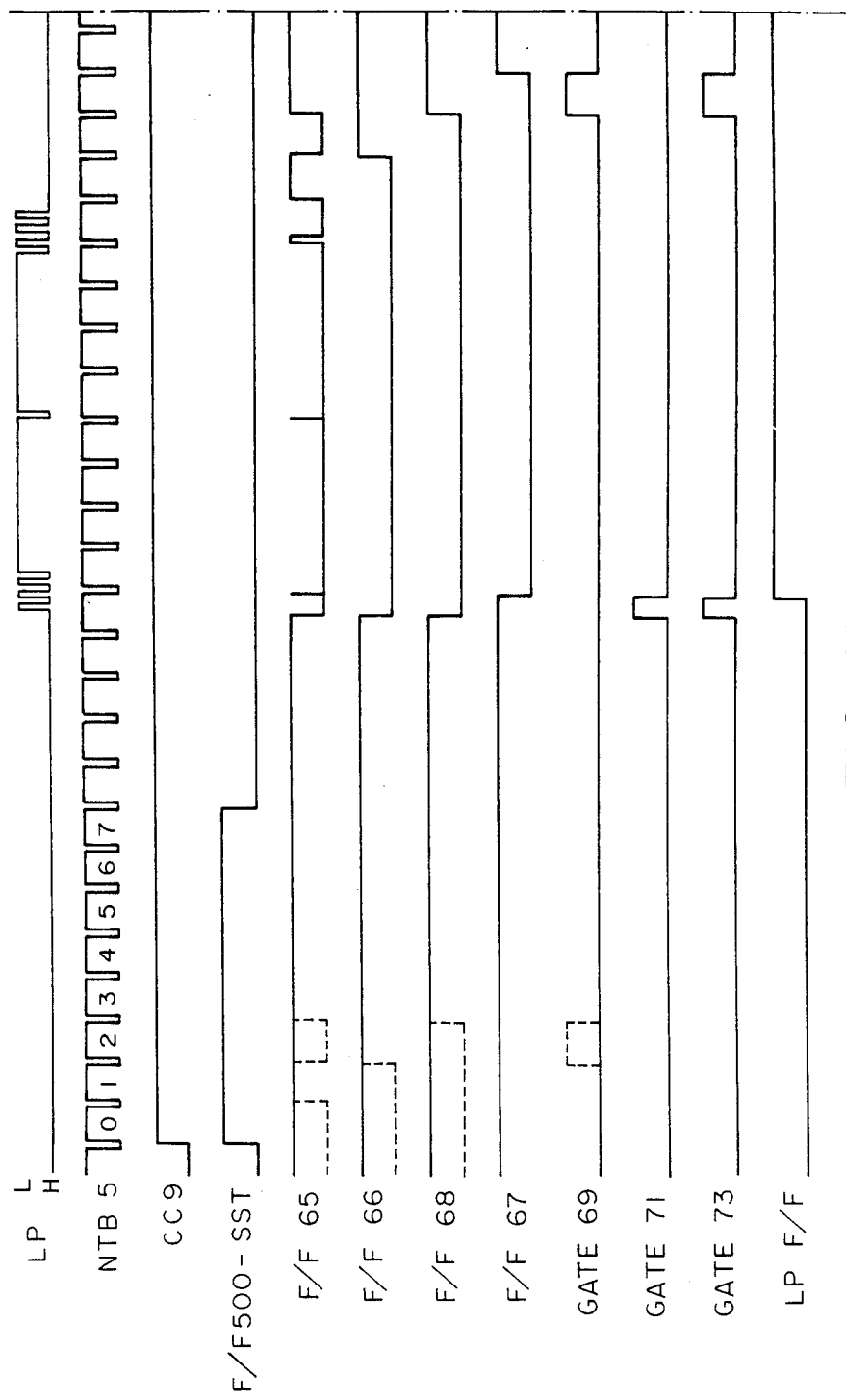
Figures 2, 41:
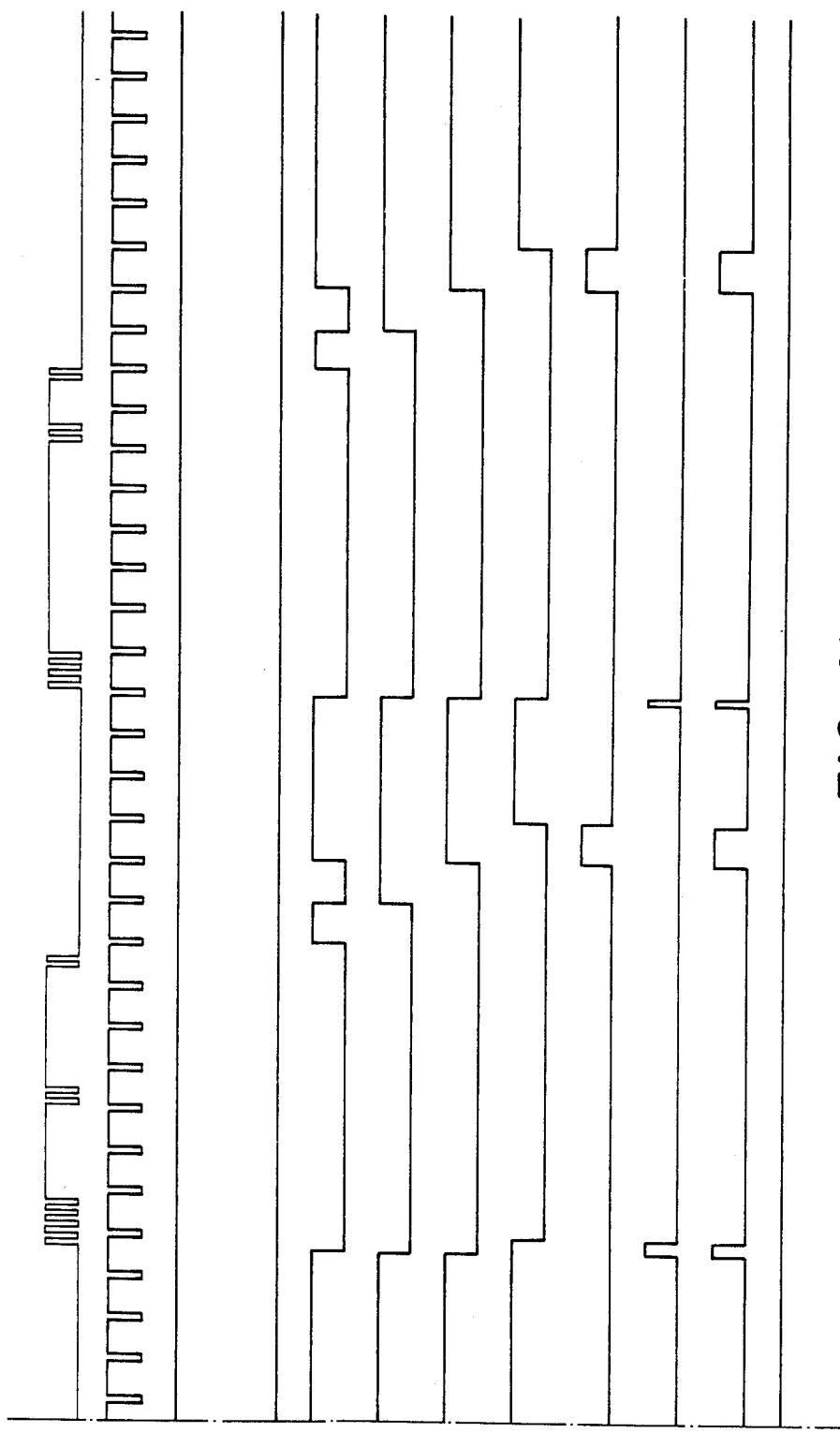
Figure 42A:
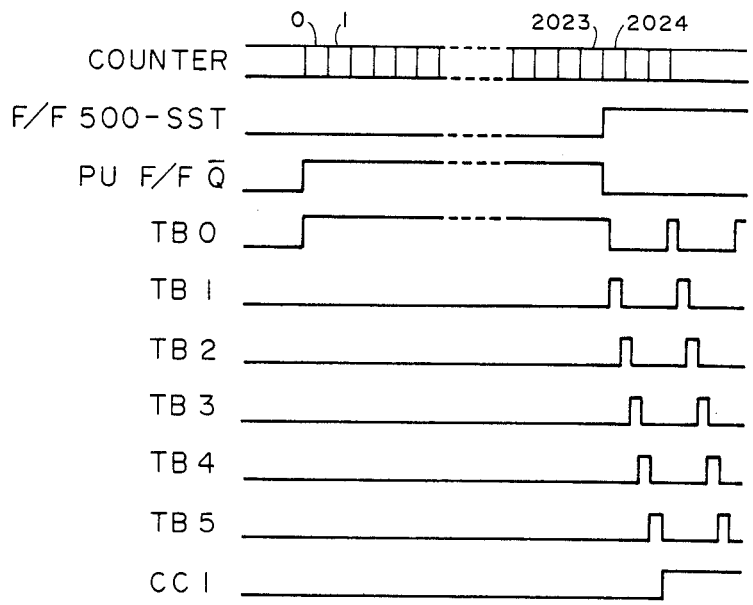
Figure 42B:
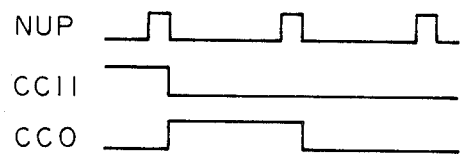
Figure 42C:
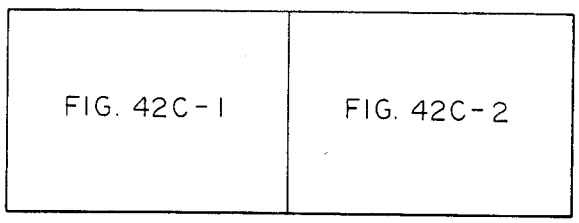
Figures 1, 42C:
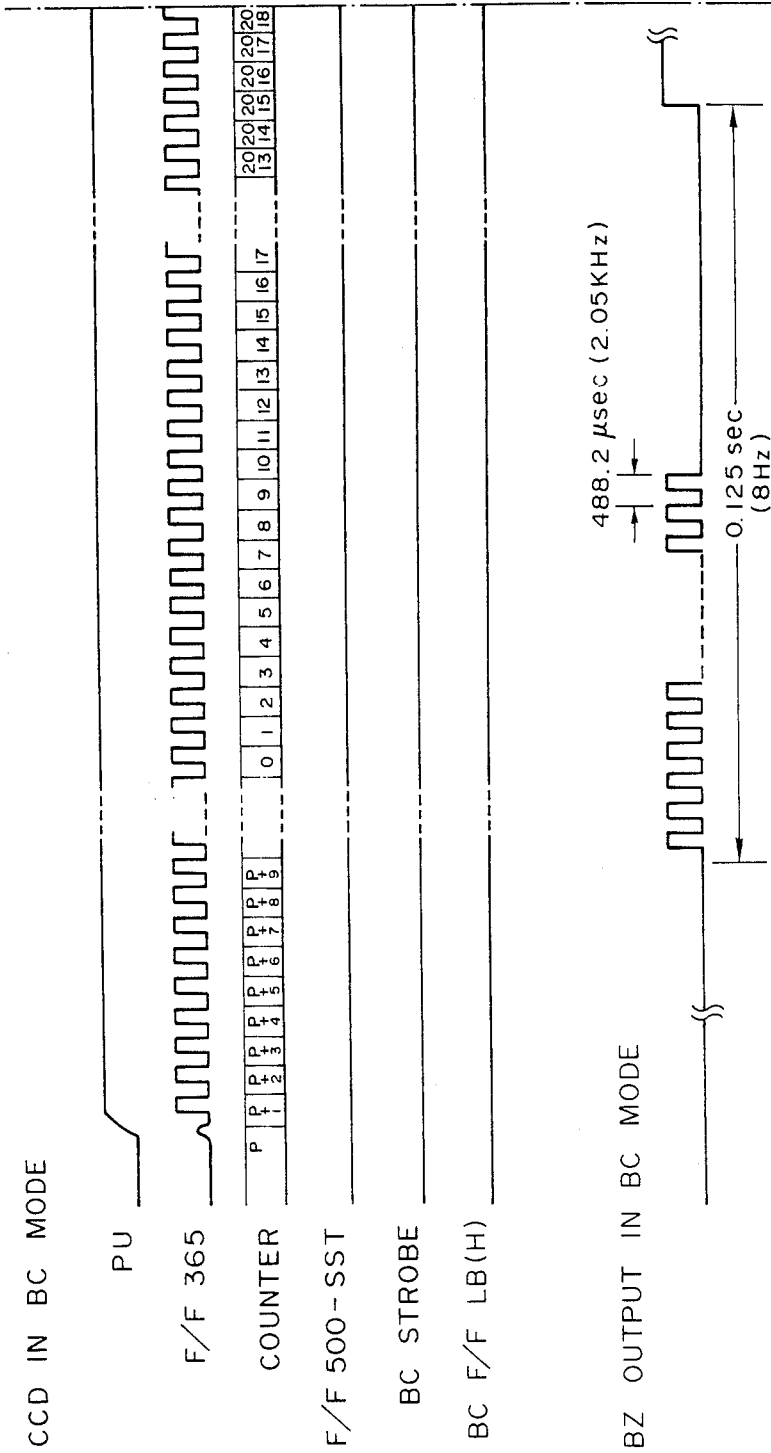
Figures 2, 42C:
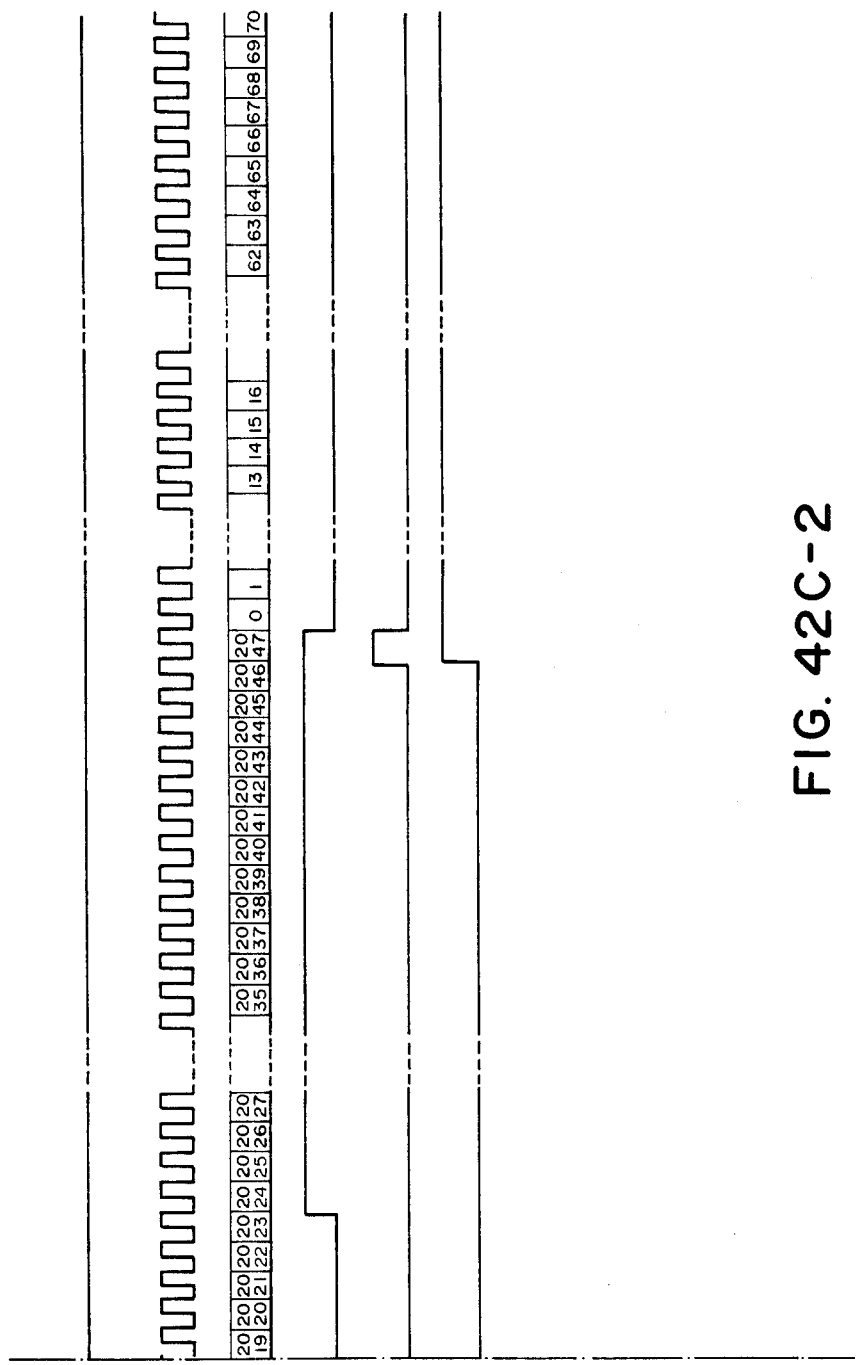
Figure 43:
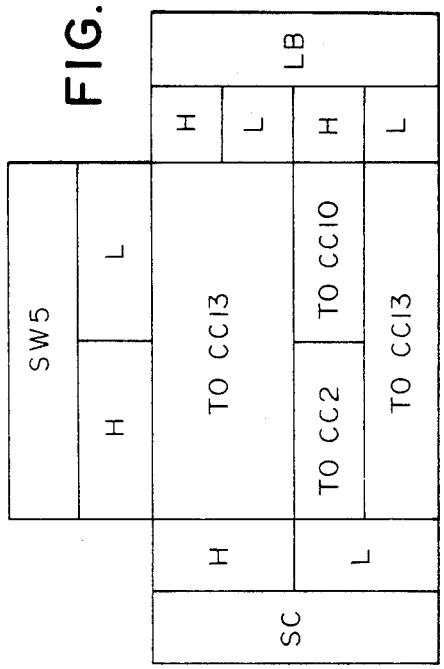
Figure 44:
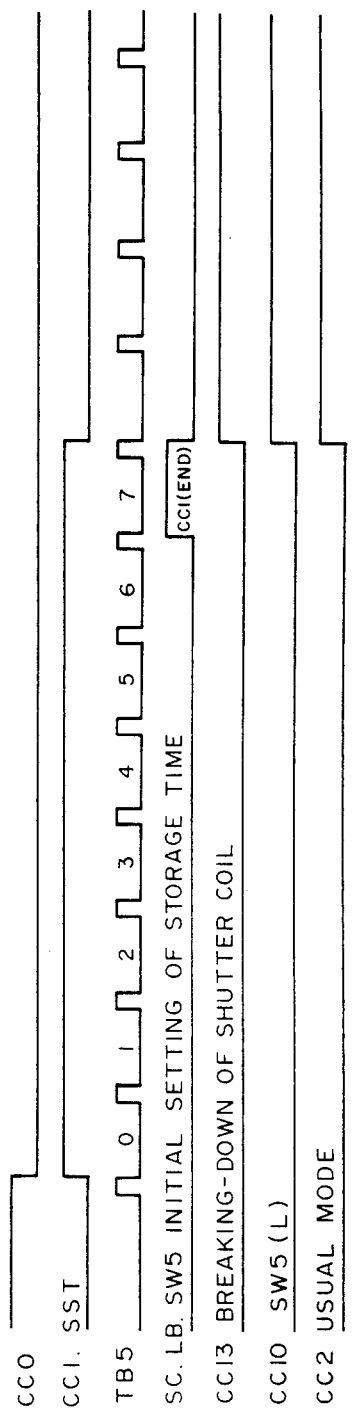
Figure 45:
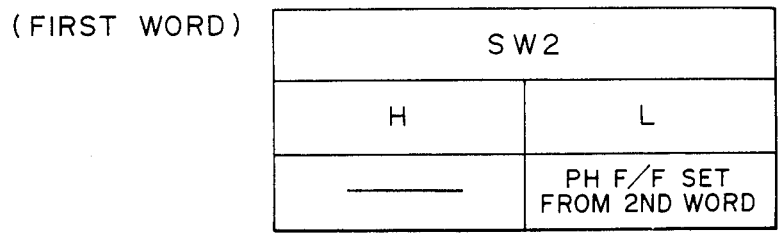
Figure 46:
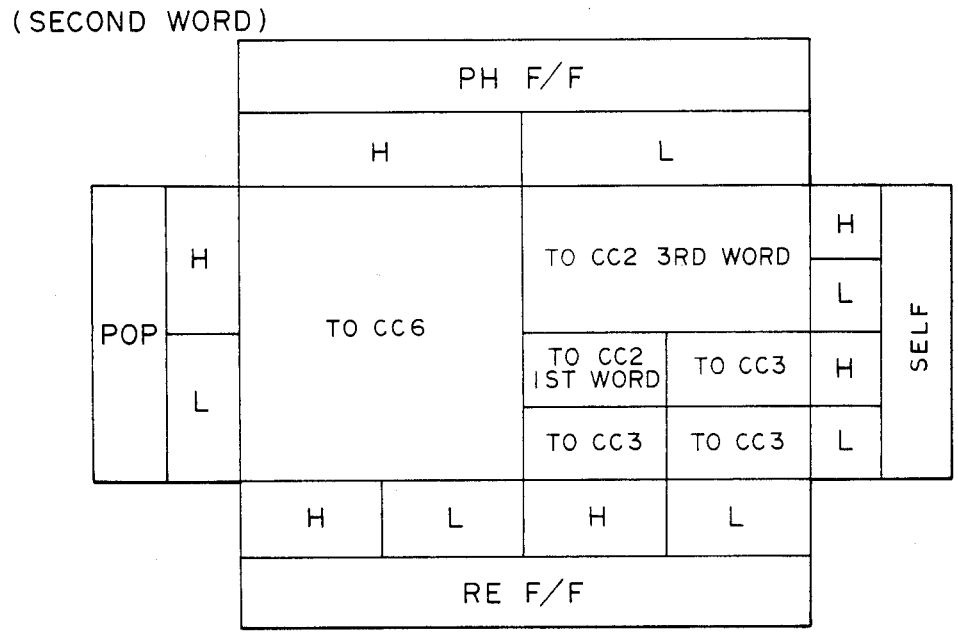
Figure 47:
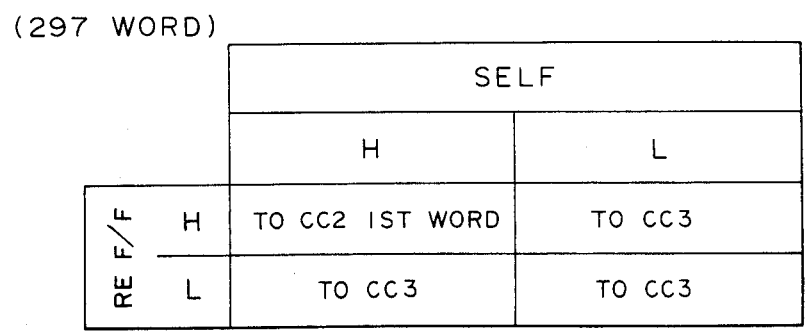
Figures 1, 2, 48, 49:
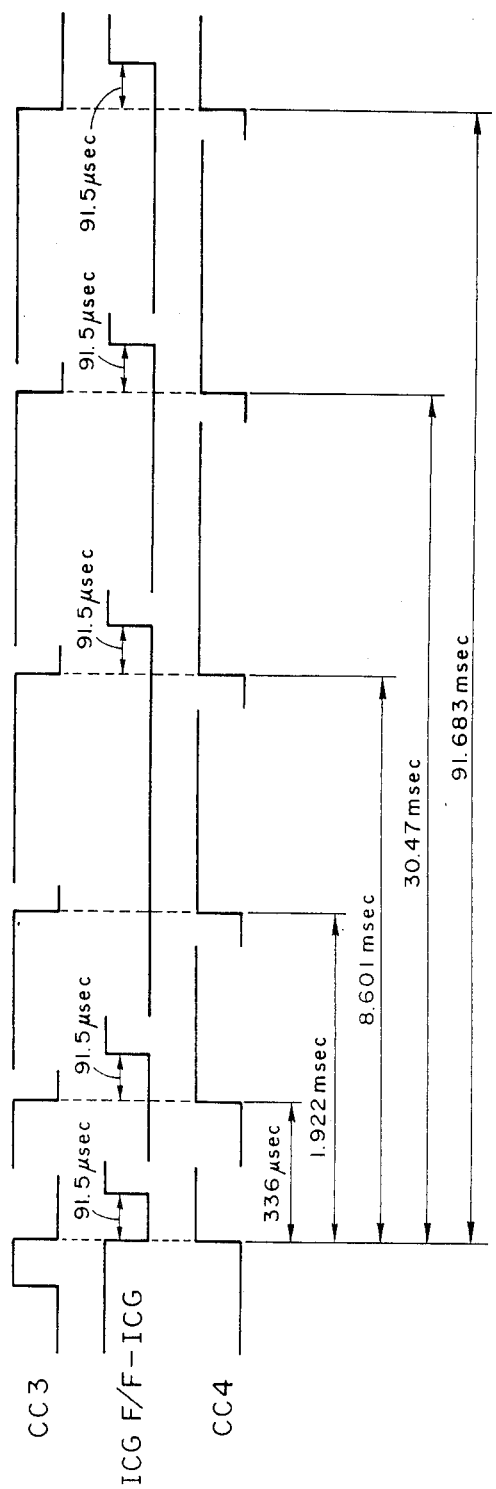
Figures 1, 48:
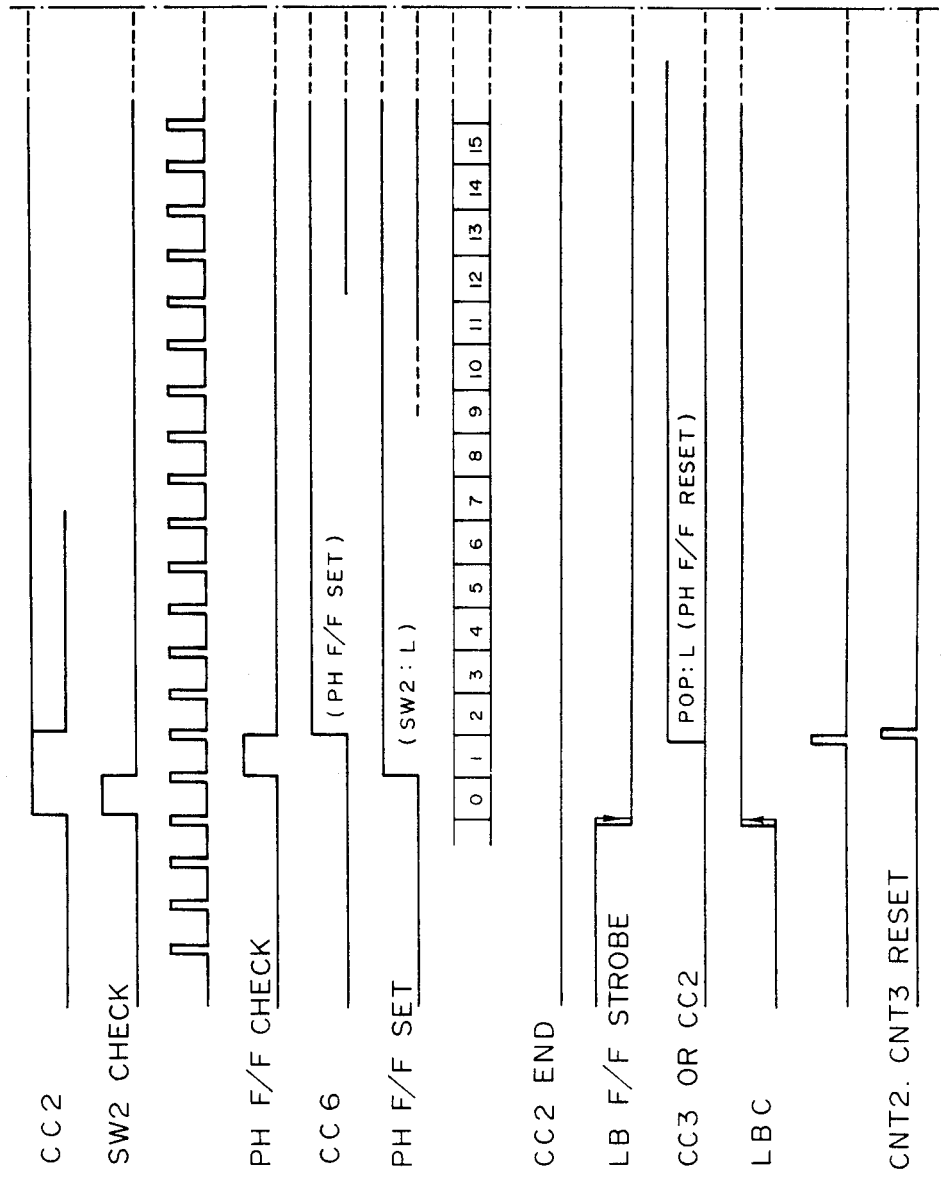
Figure 50:
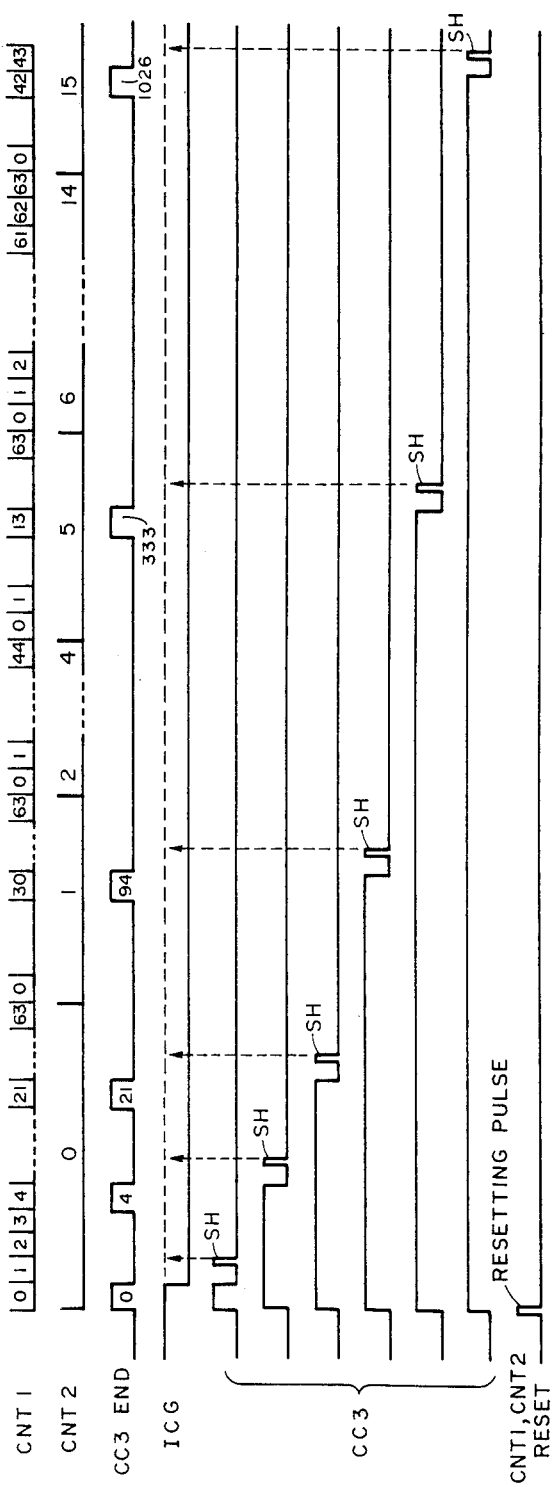
Figure 51:
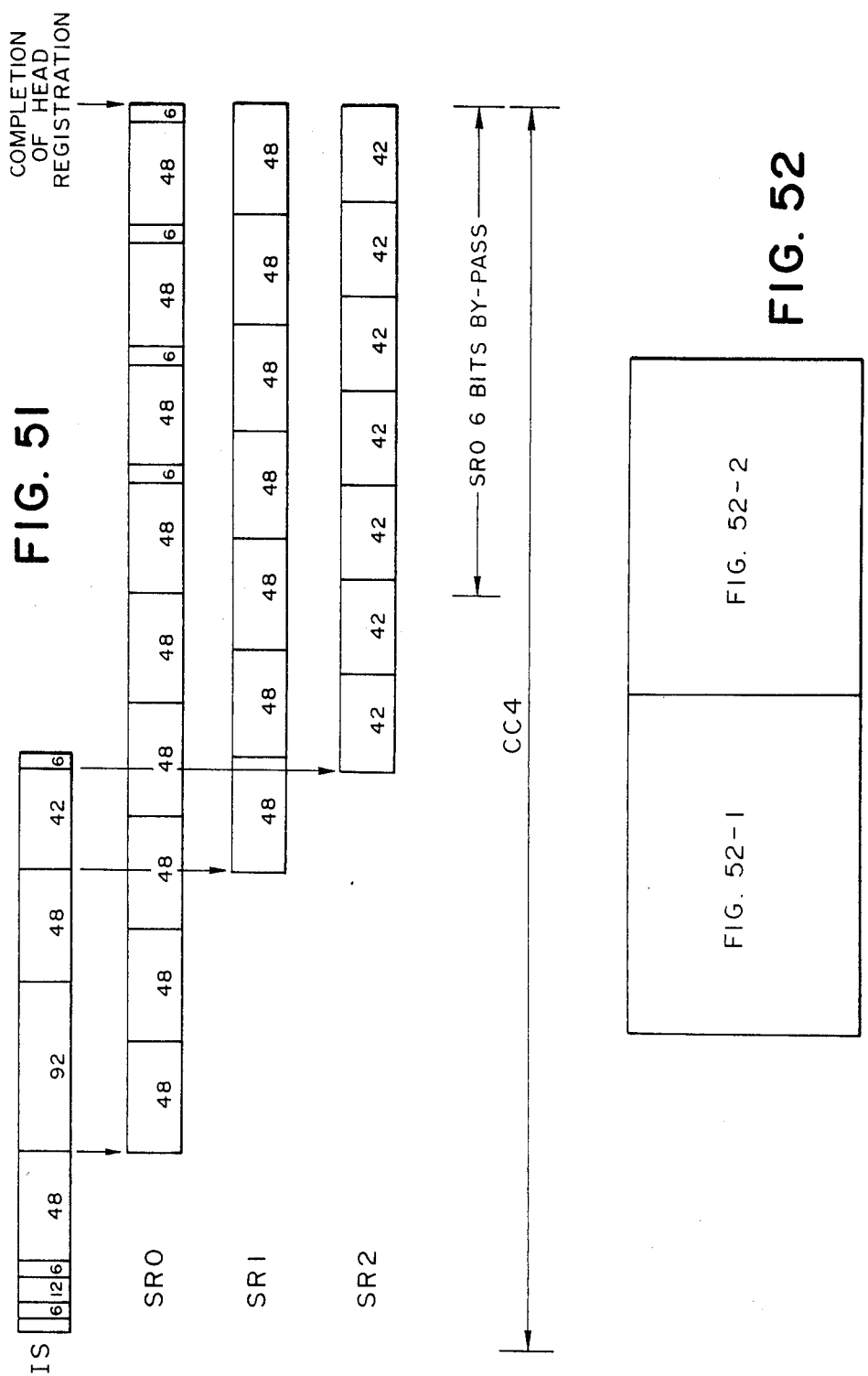
Figures 1, 52:
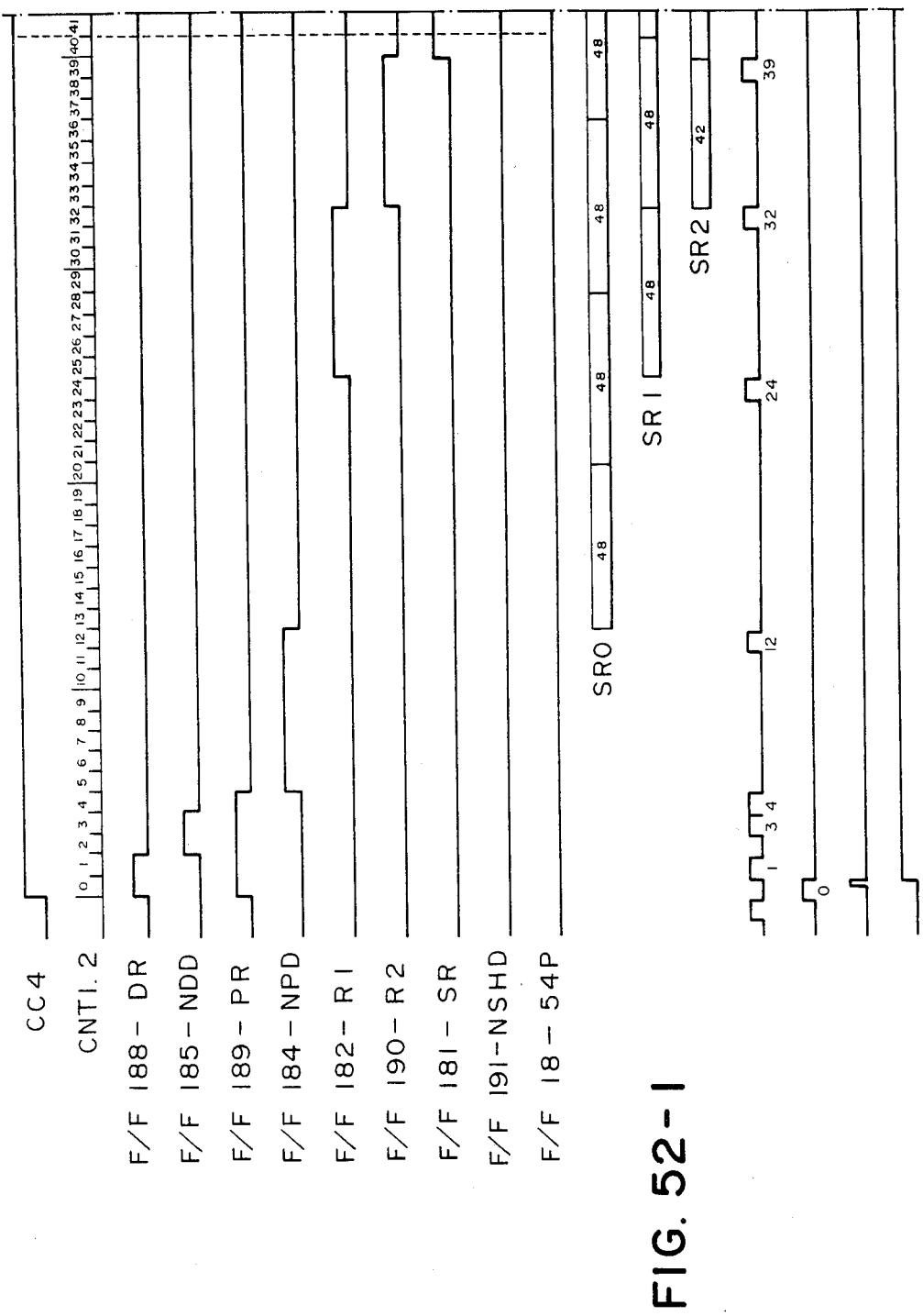
Figures 2, 52:
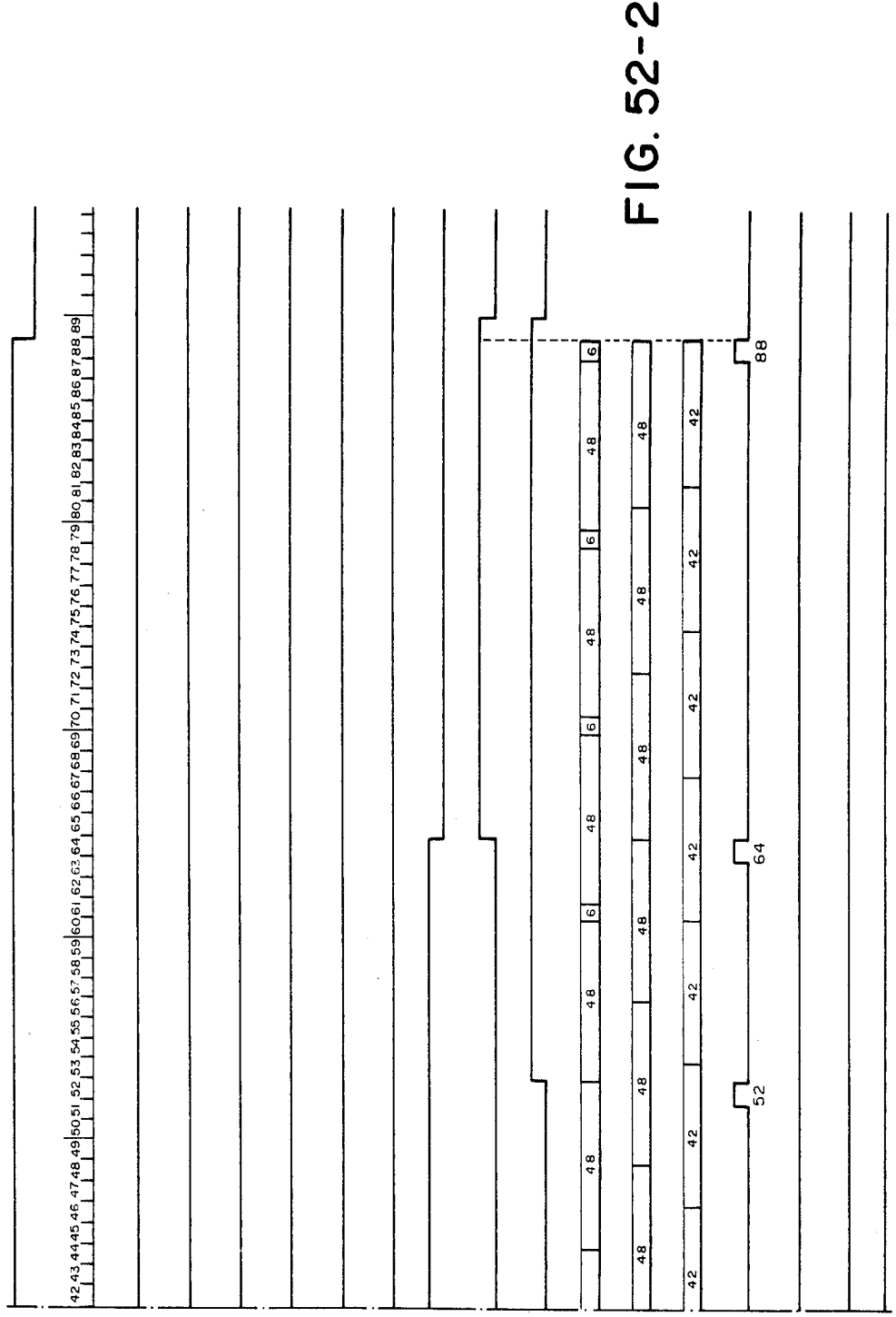
Figure 53:
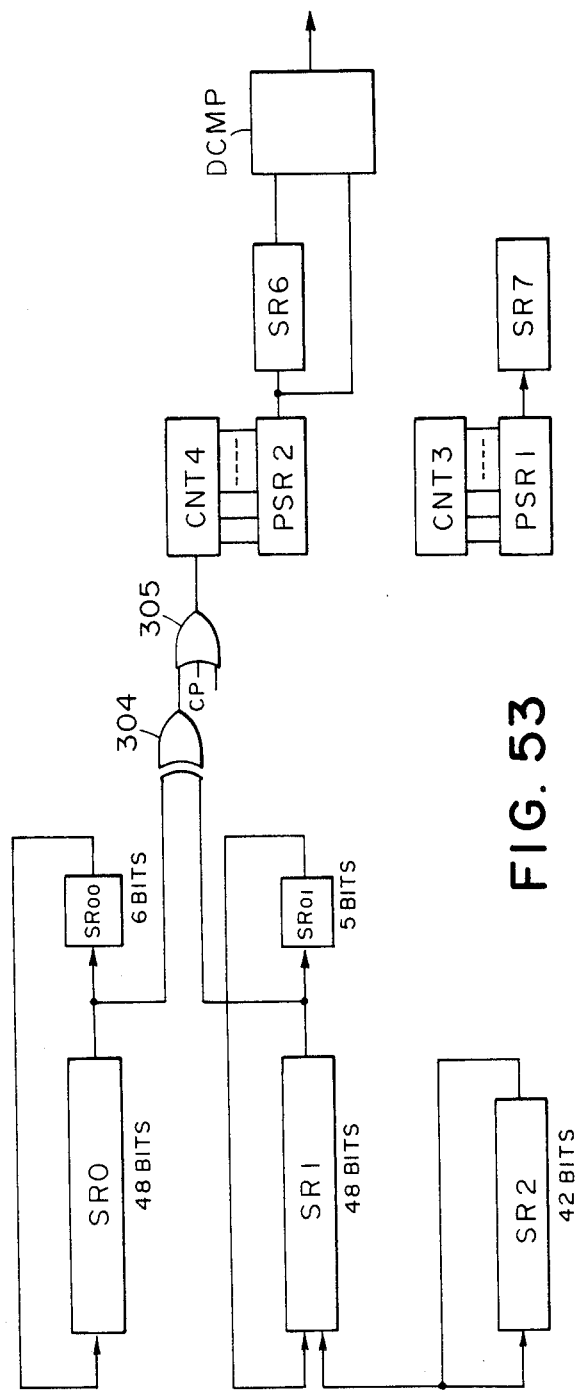
Figure 54:
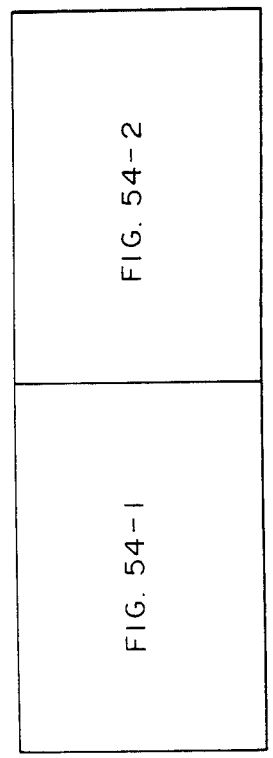
Figures 1, 54:
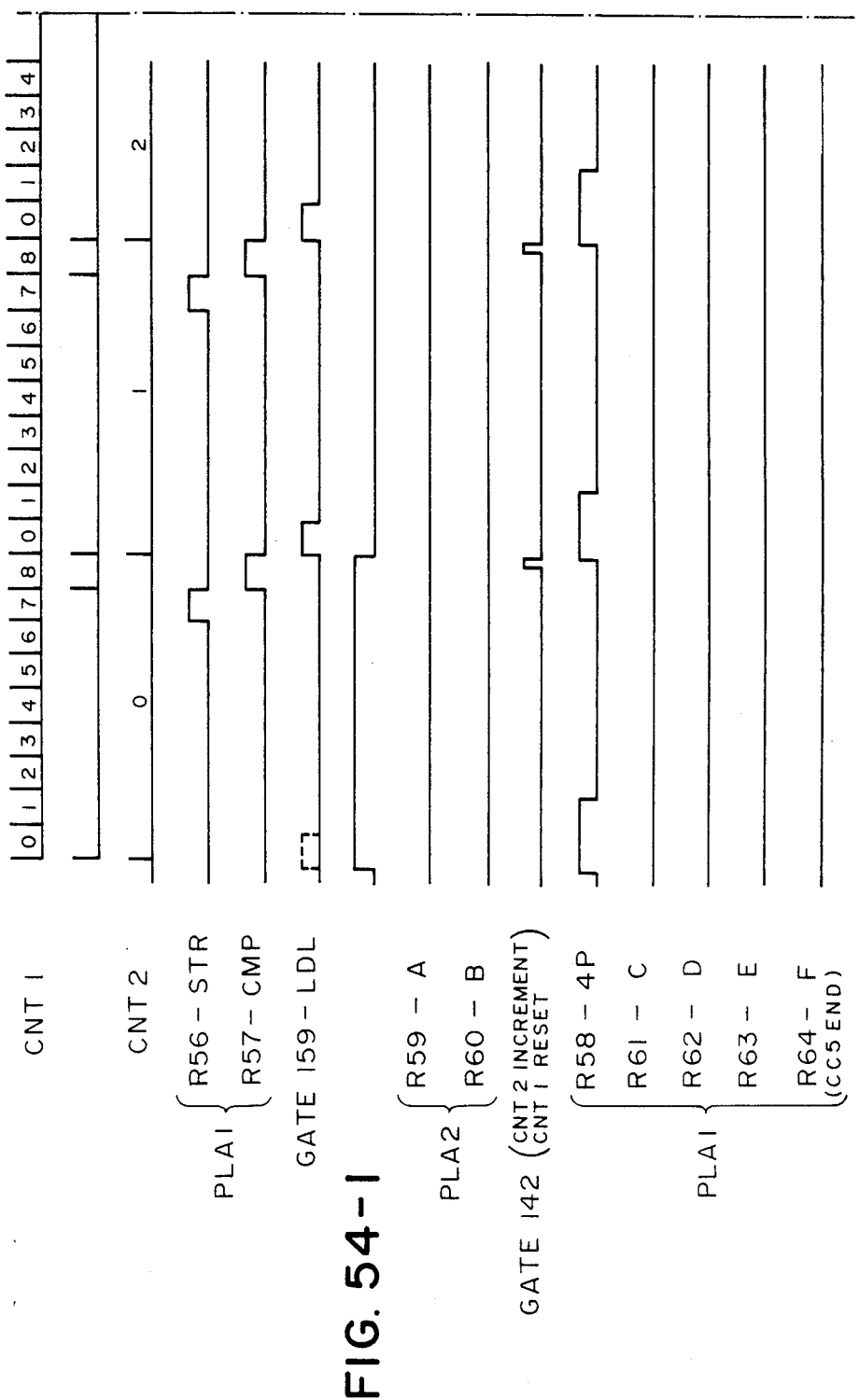
Figures 2, 54:
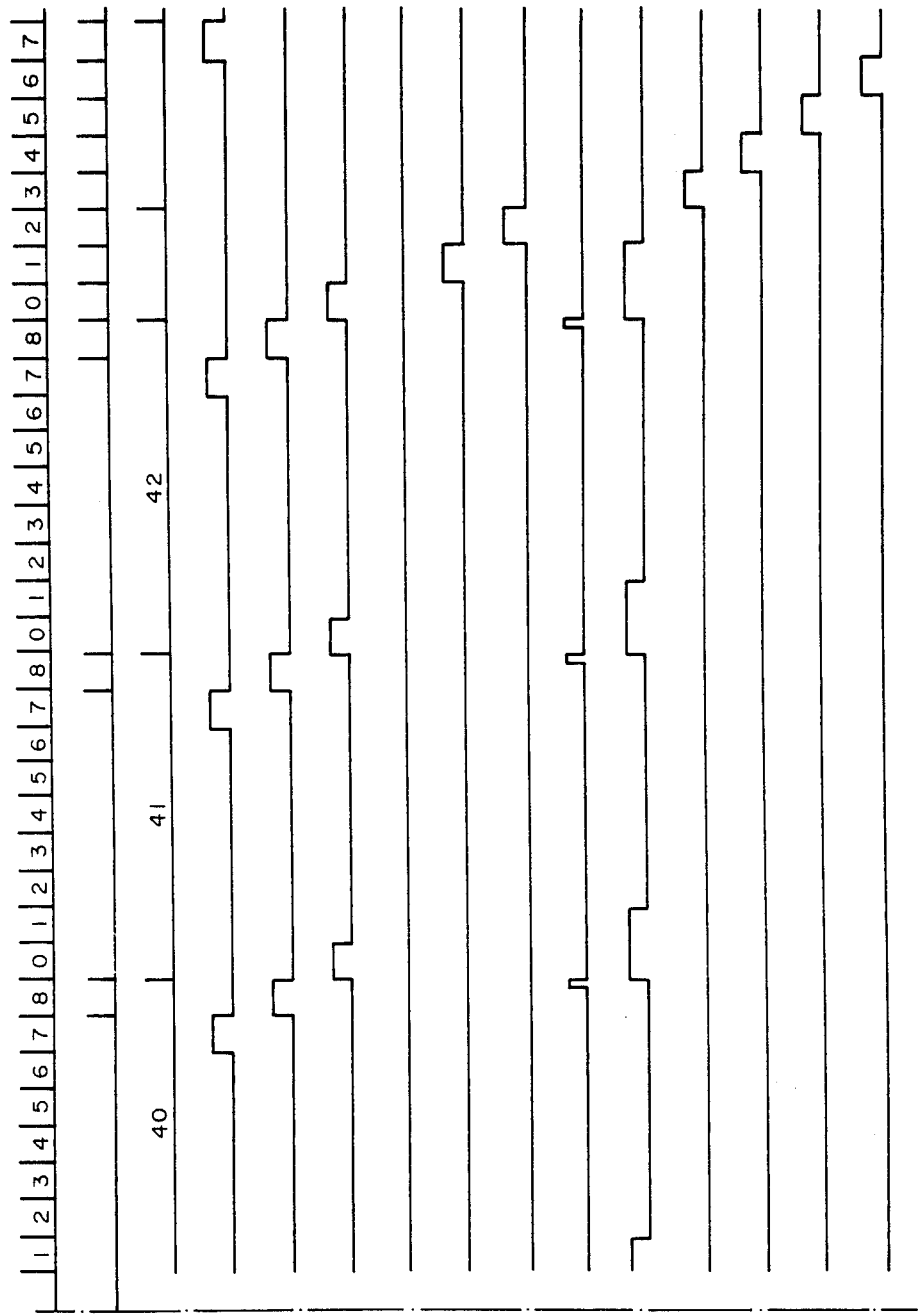
Figure 55:
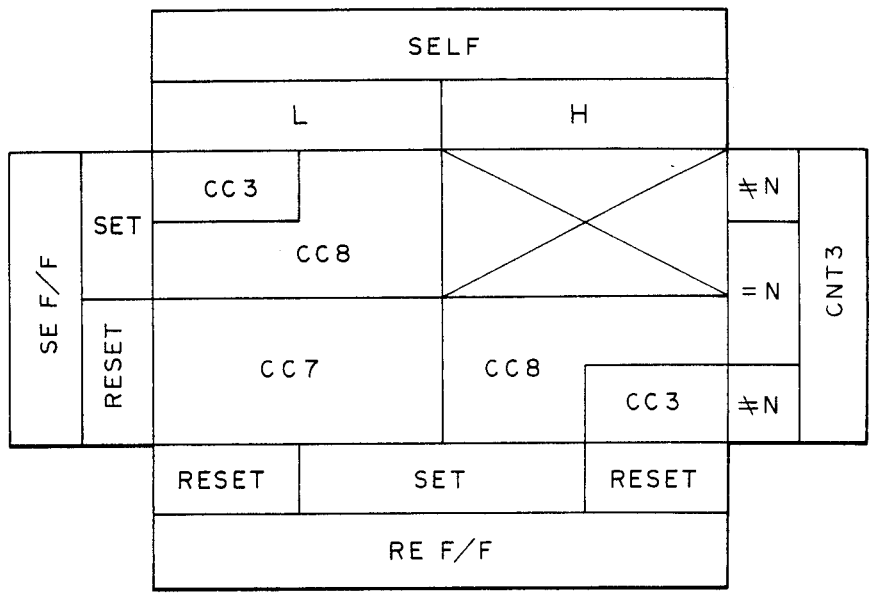
Figure 56:
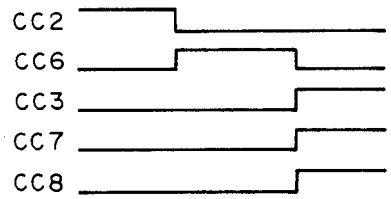
Figure 57:
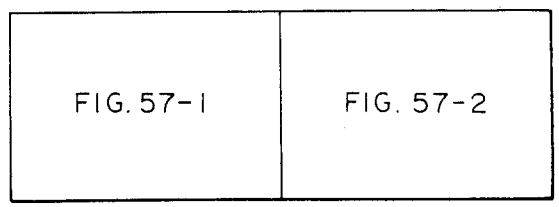
Figures 2, 57:
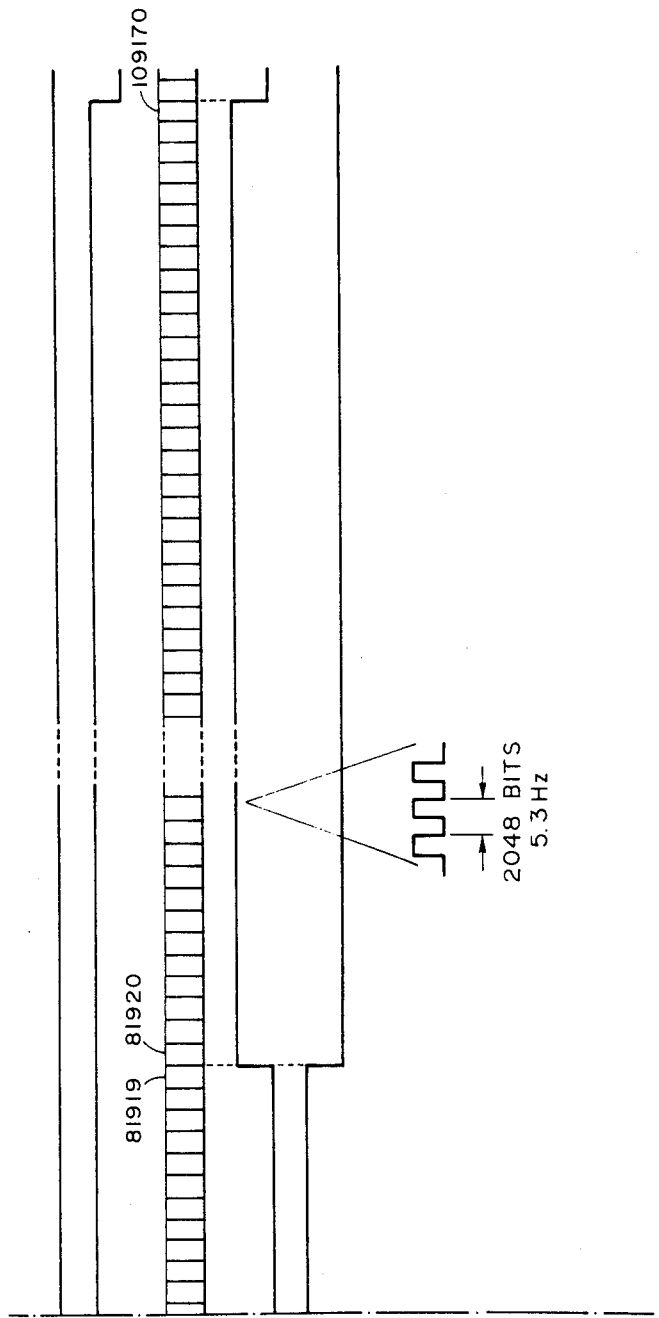
Figure 58:
Figure 59:
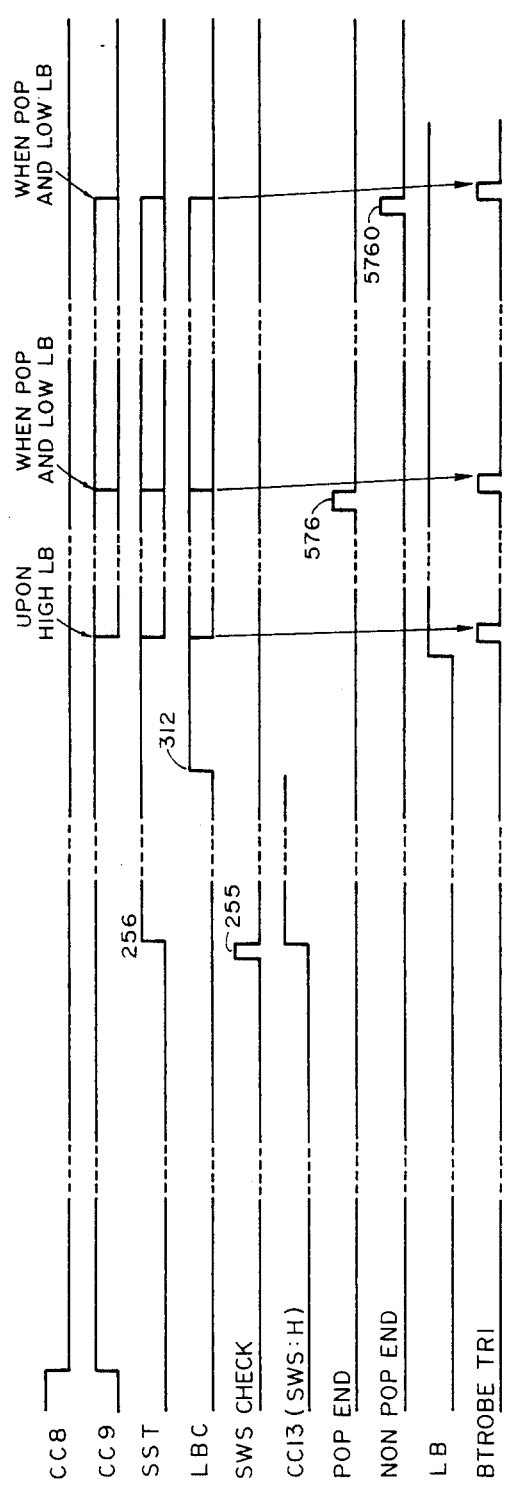
Figure 60:
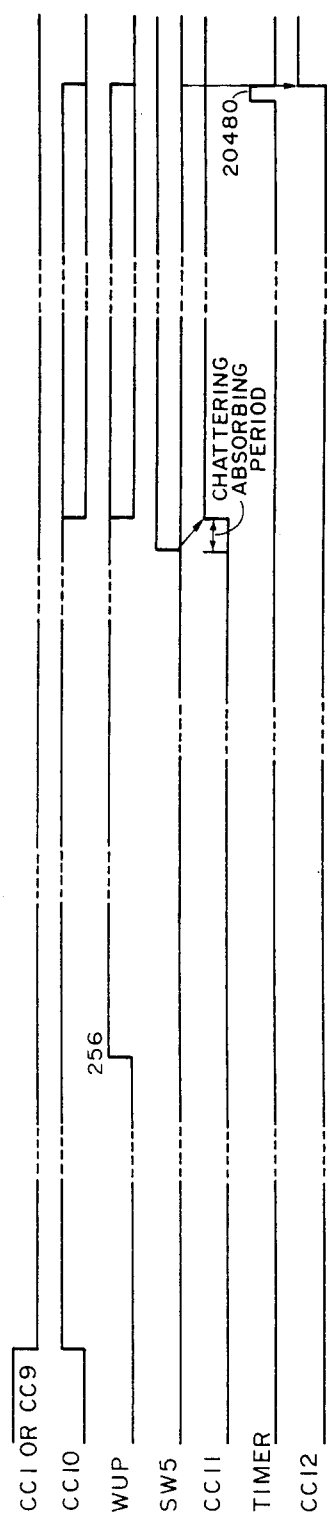
Figure 61:
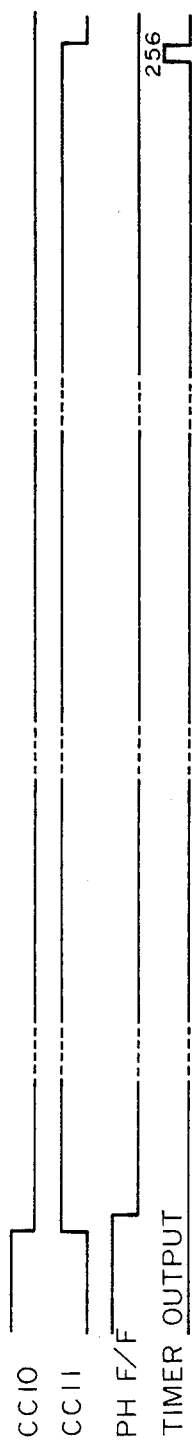
Figure 62:
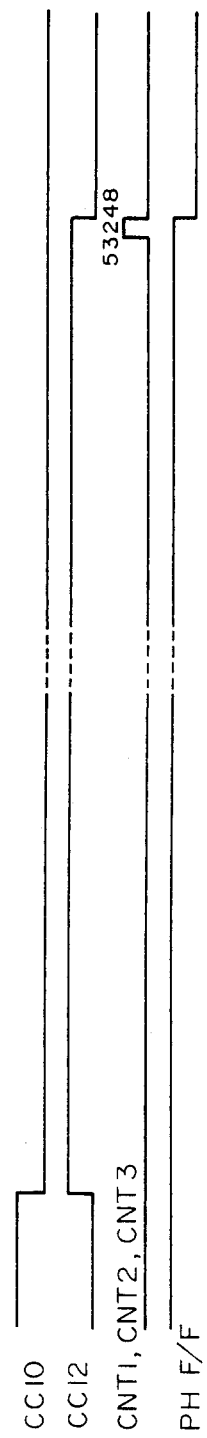
Figure 63:
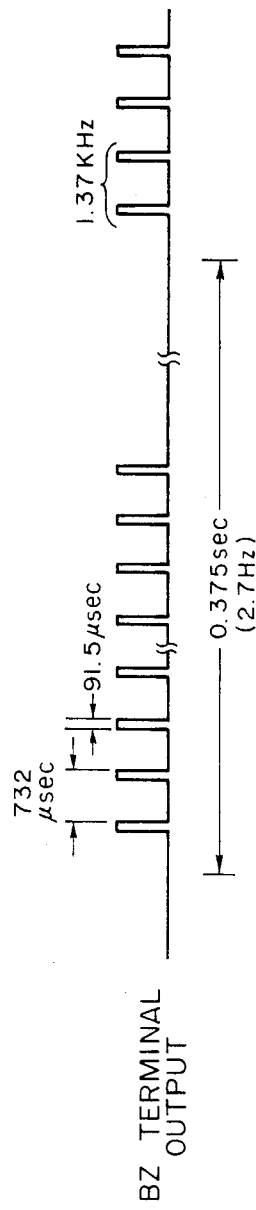
Figure 64:
Figure 65:
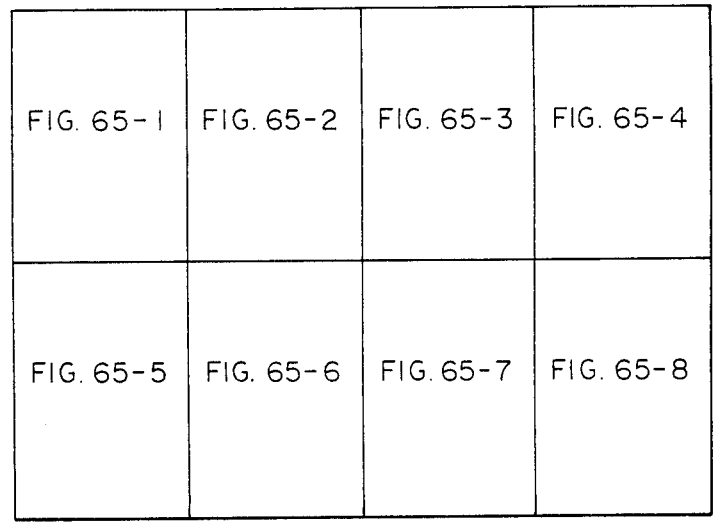
Figure 66:
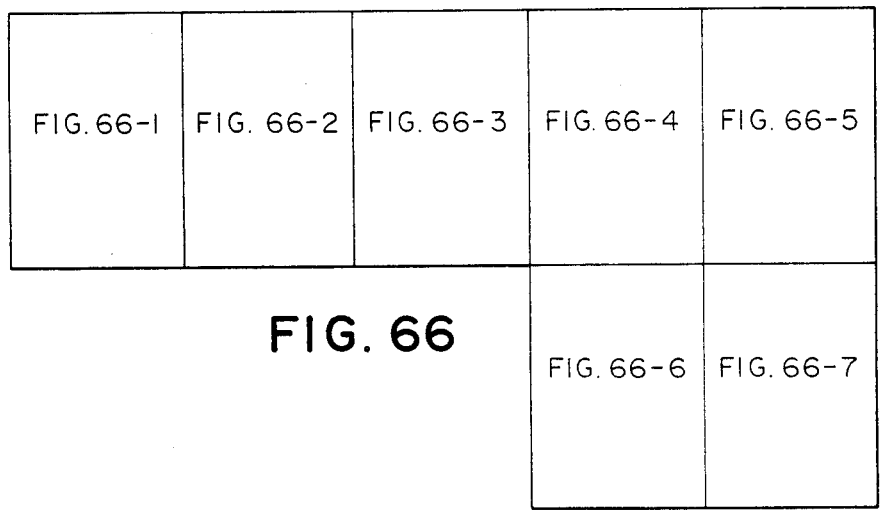
Figure 67:
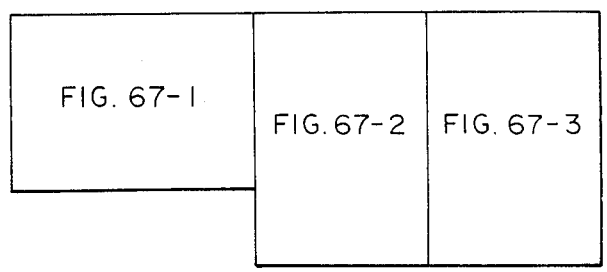
Figures 1, 65:
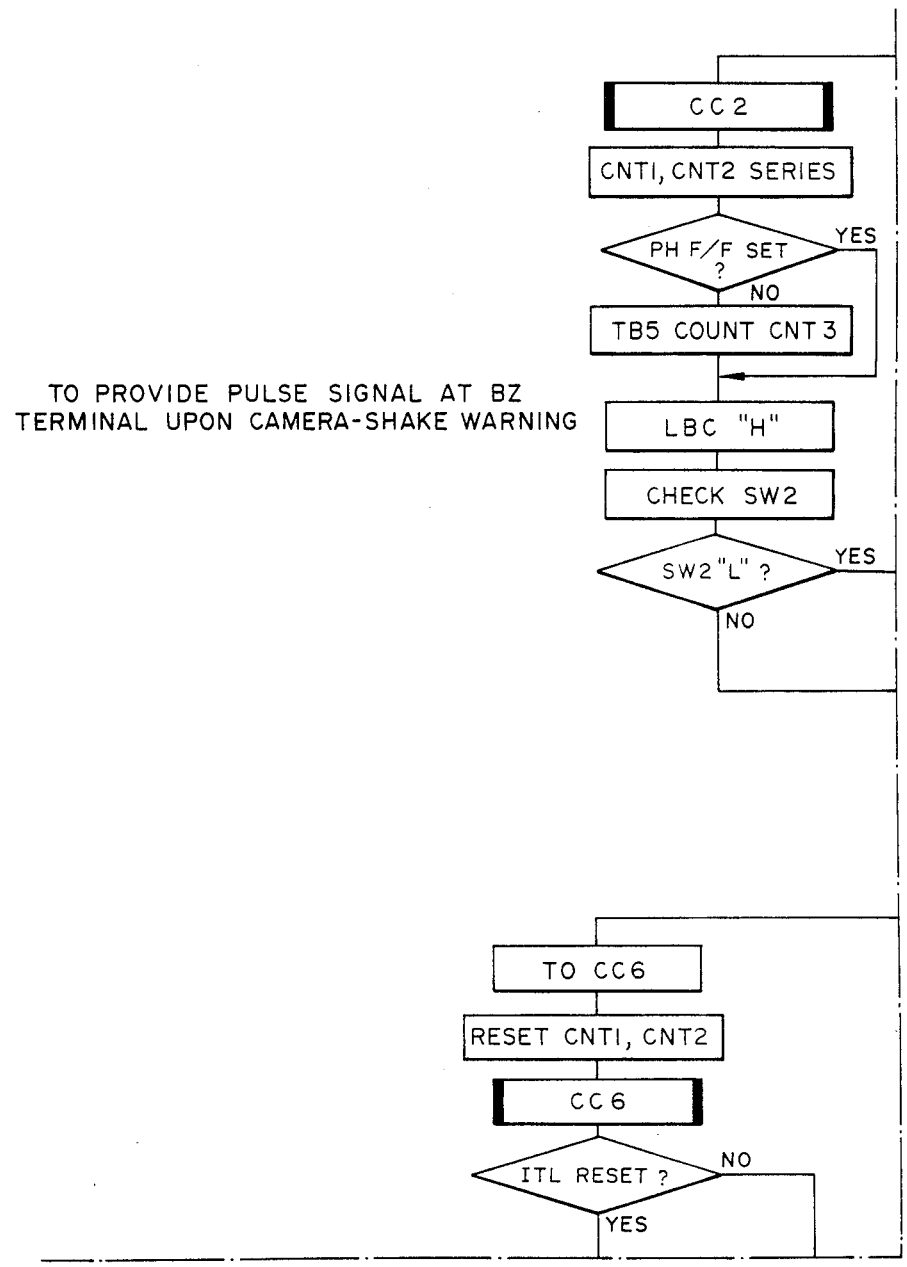
Figures 2, 65:
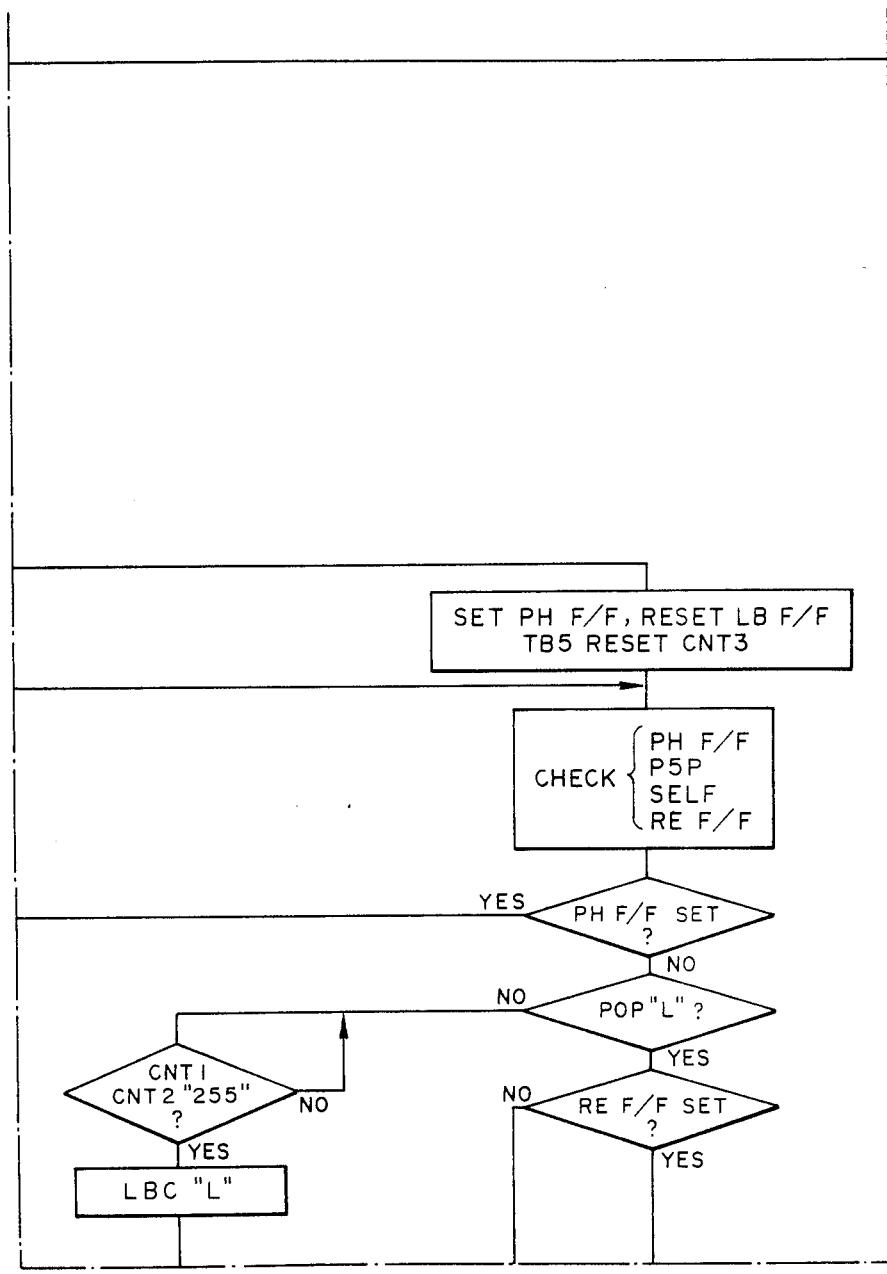
Figures 3, 65:
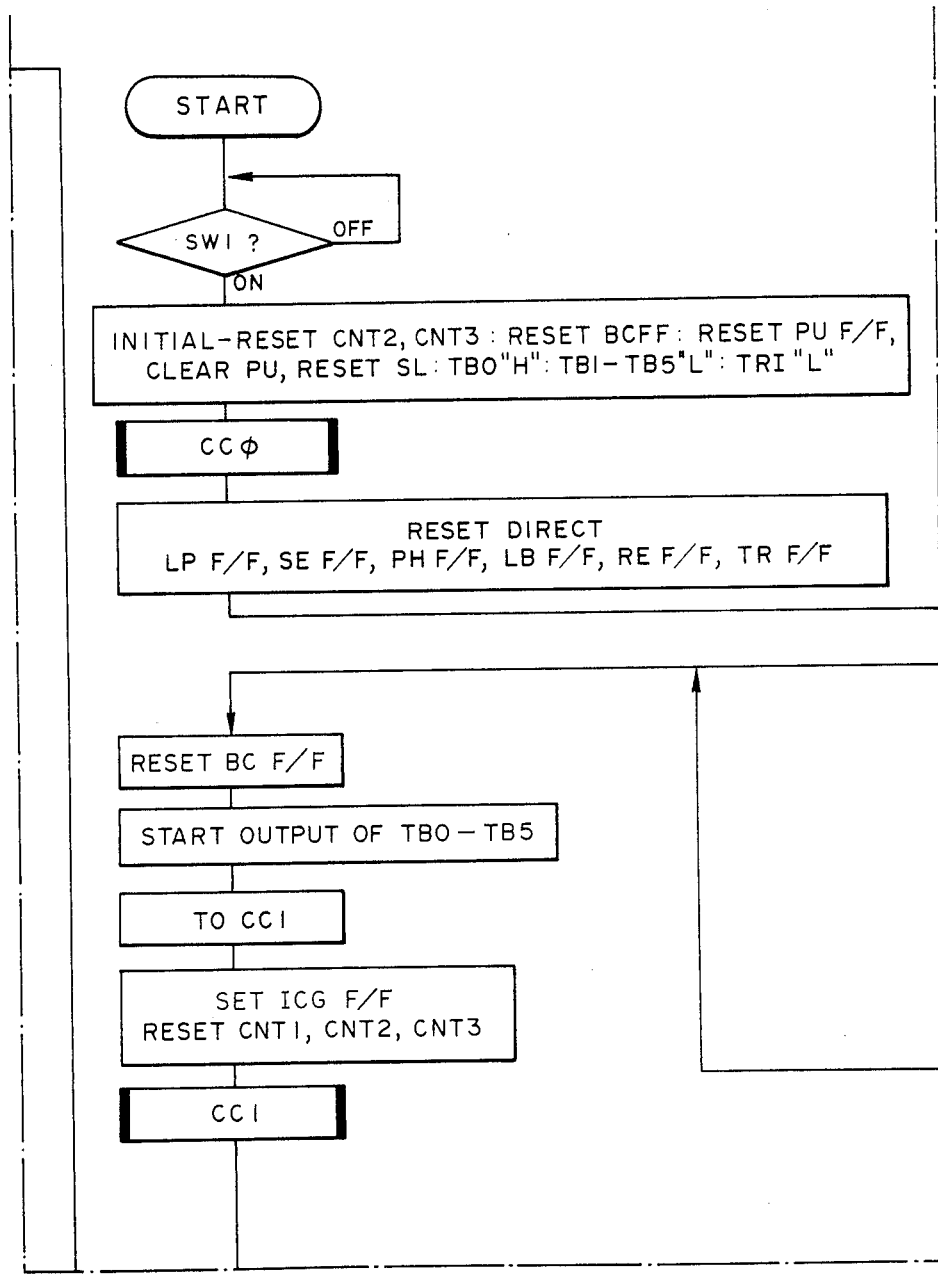
Figures 4, 65:
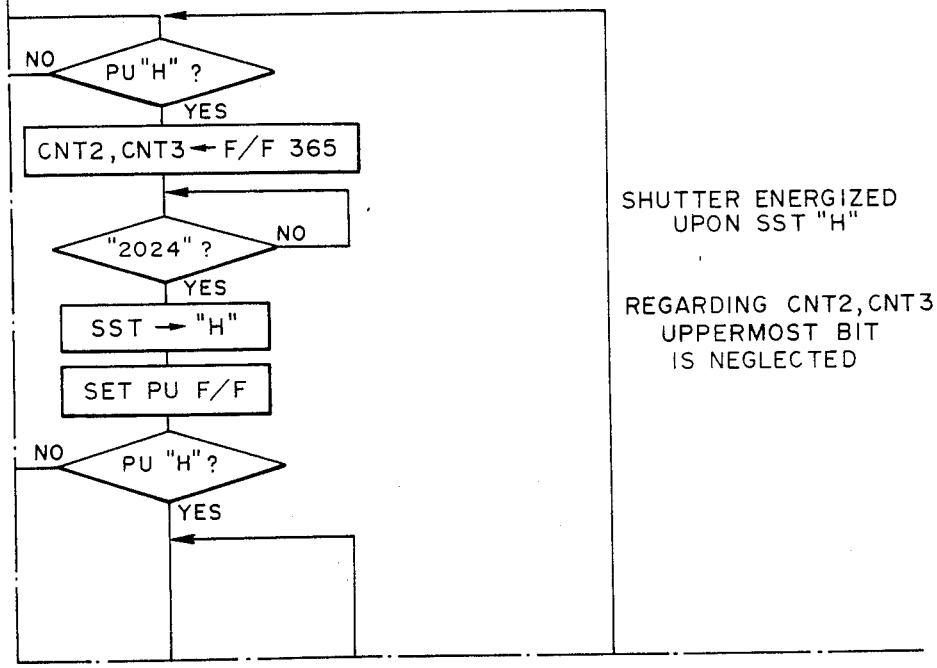
Figures 5, 65:
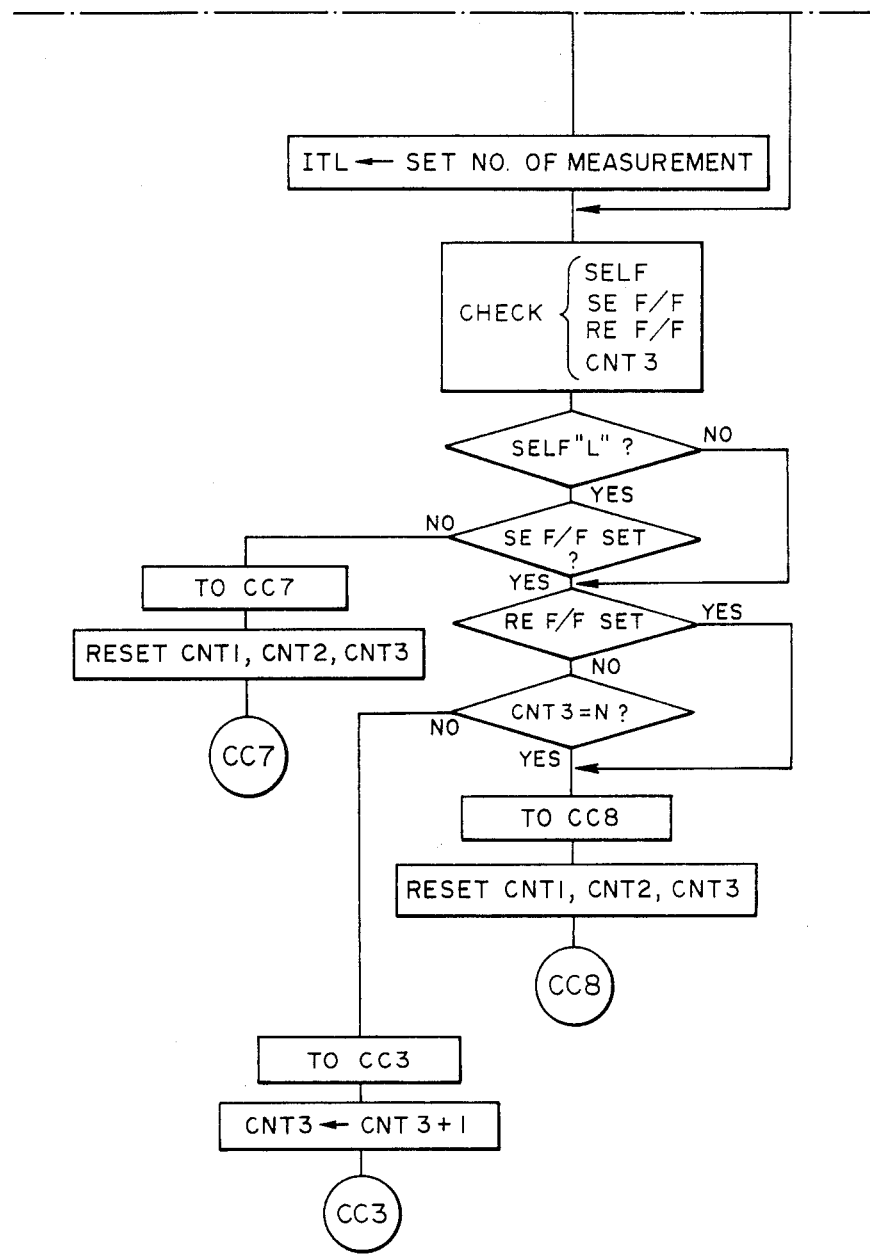
Figures 6, 65:
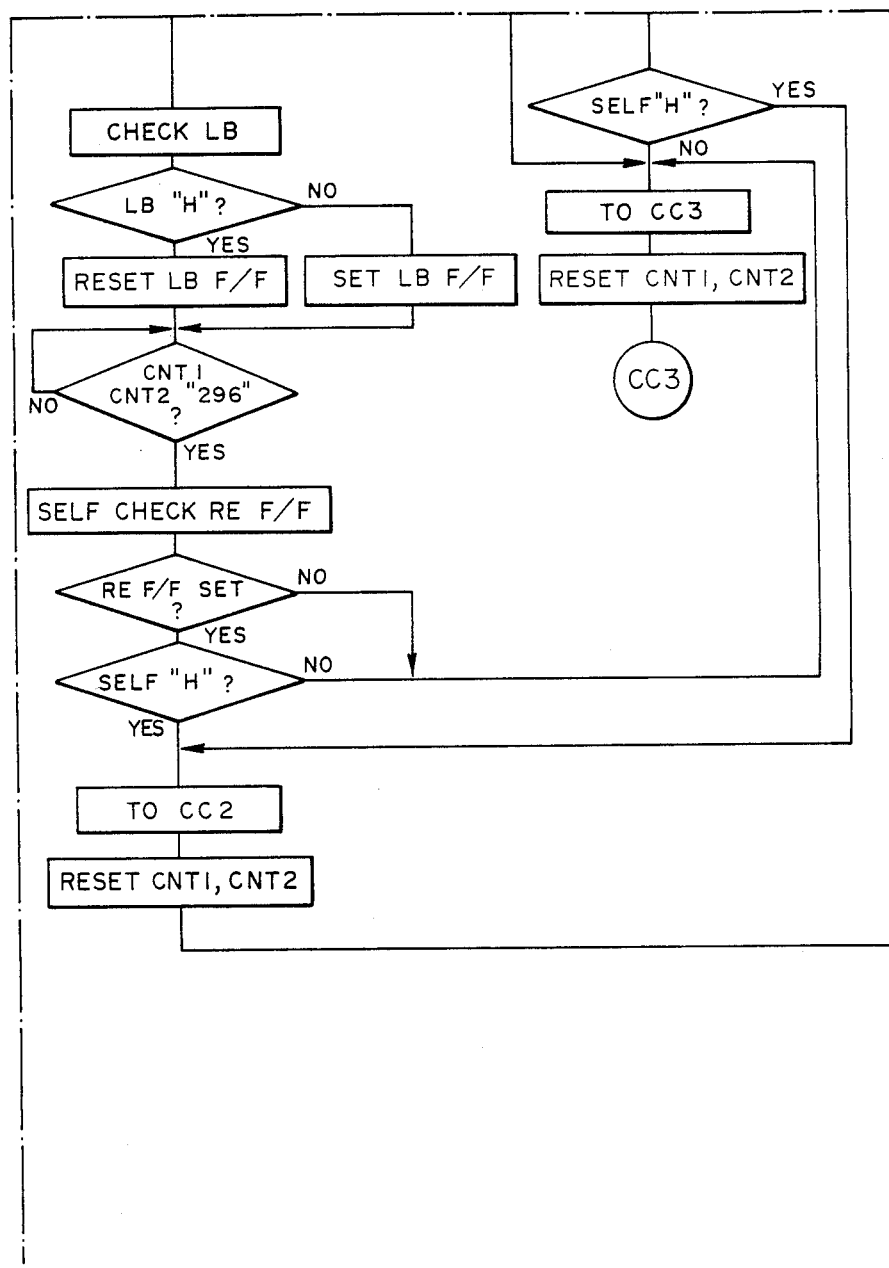
Figures 7, 65:
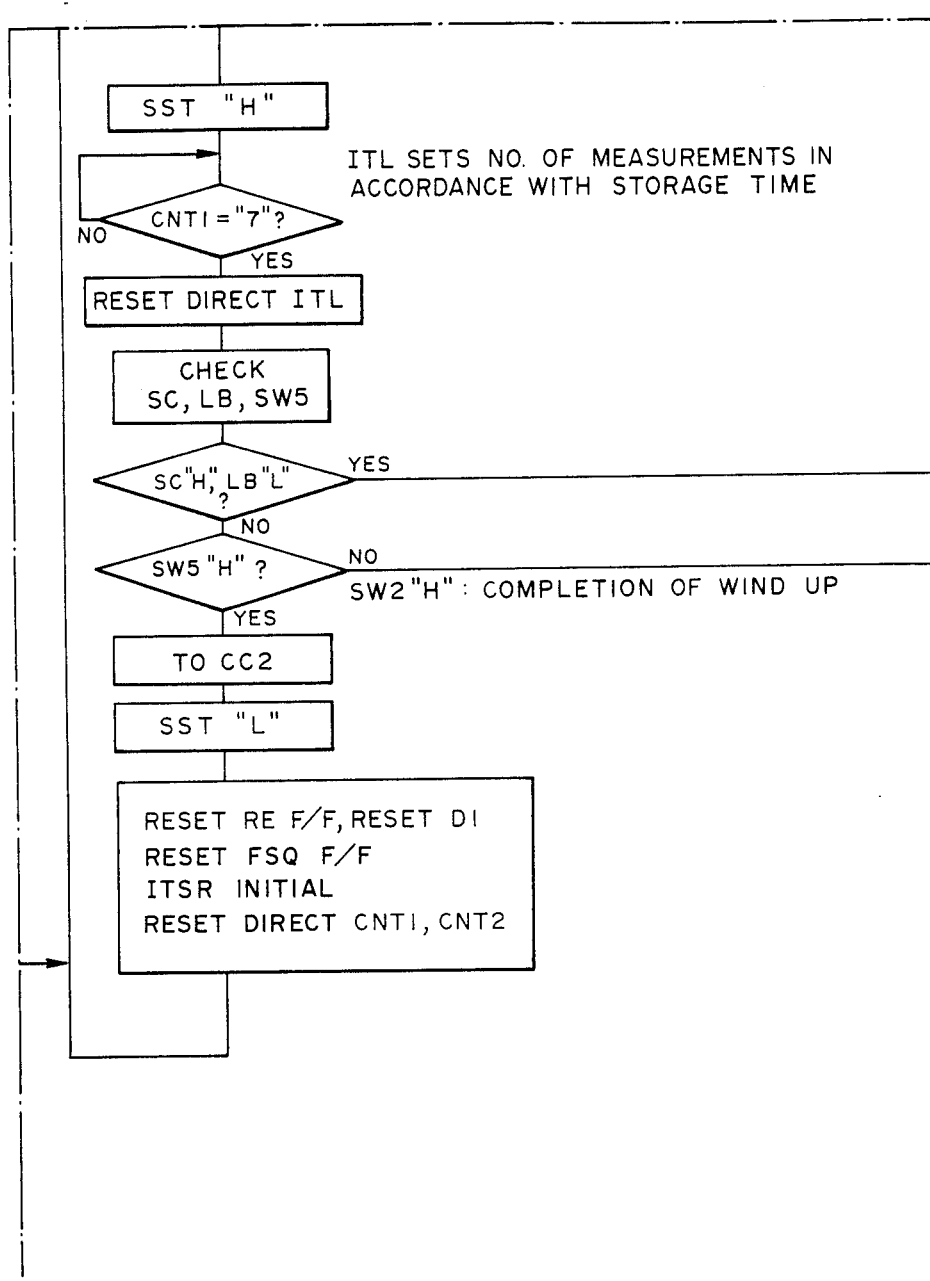
Figures 8, 65:
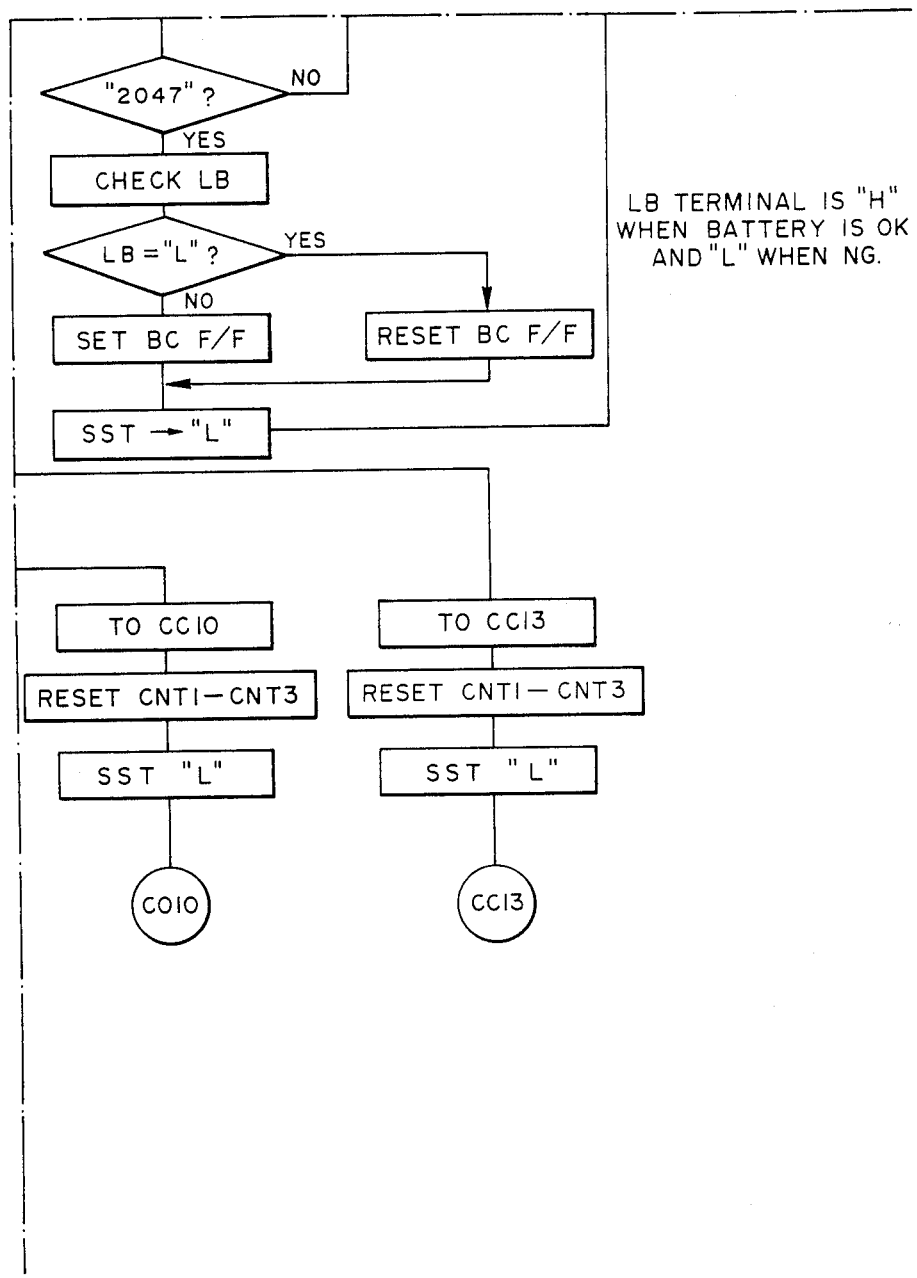
Figures 1, 66:
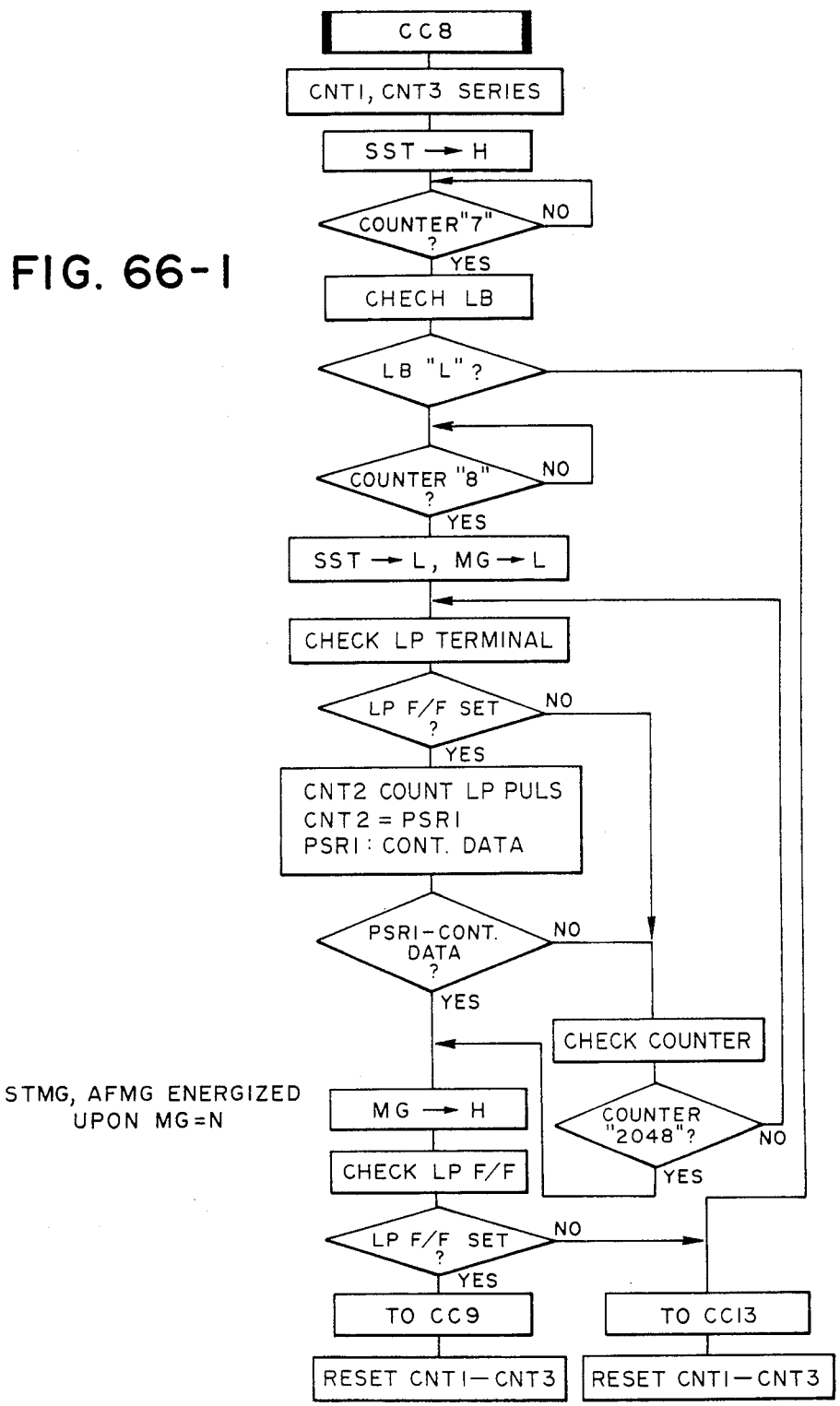
Figures 2, 66:
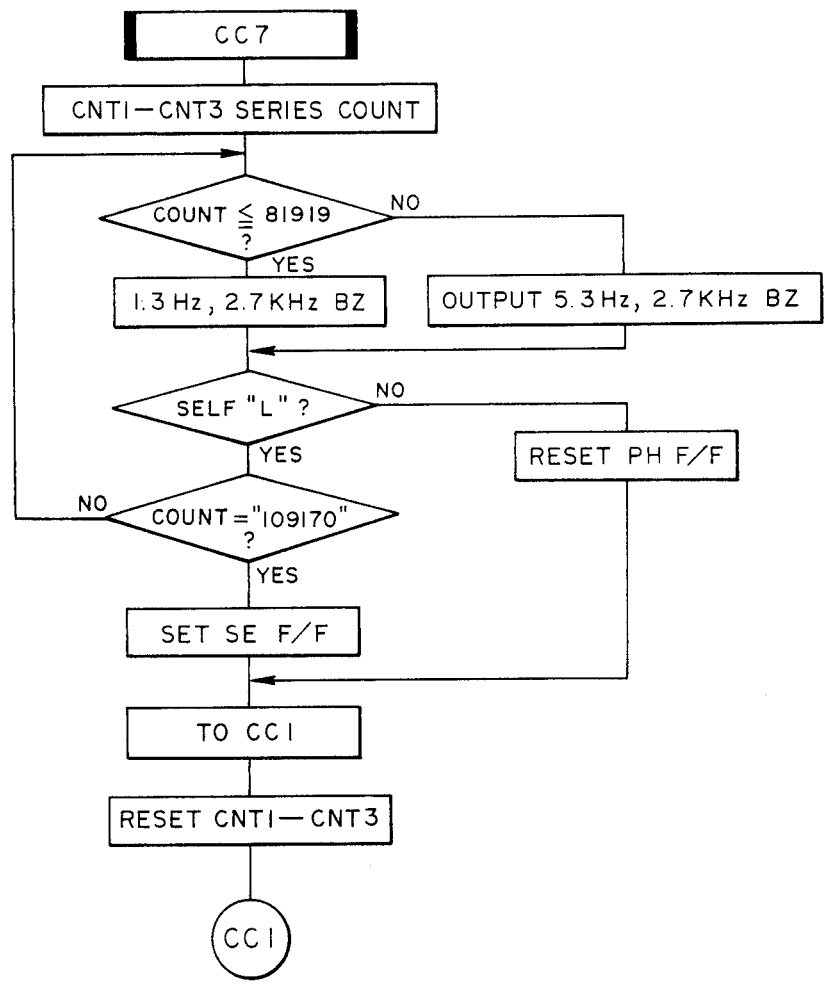
Figures 3, 66:
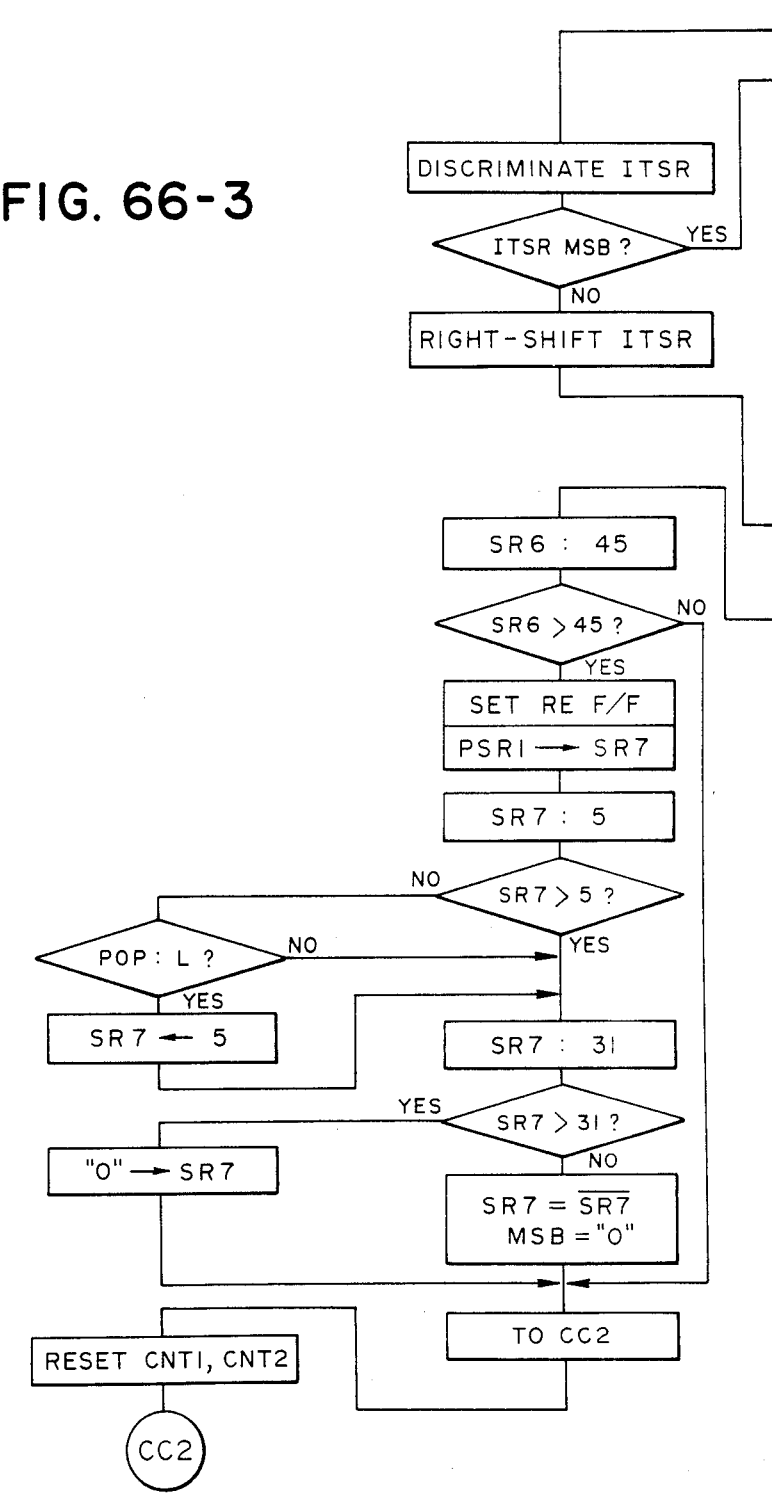
Figures 4, 66:
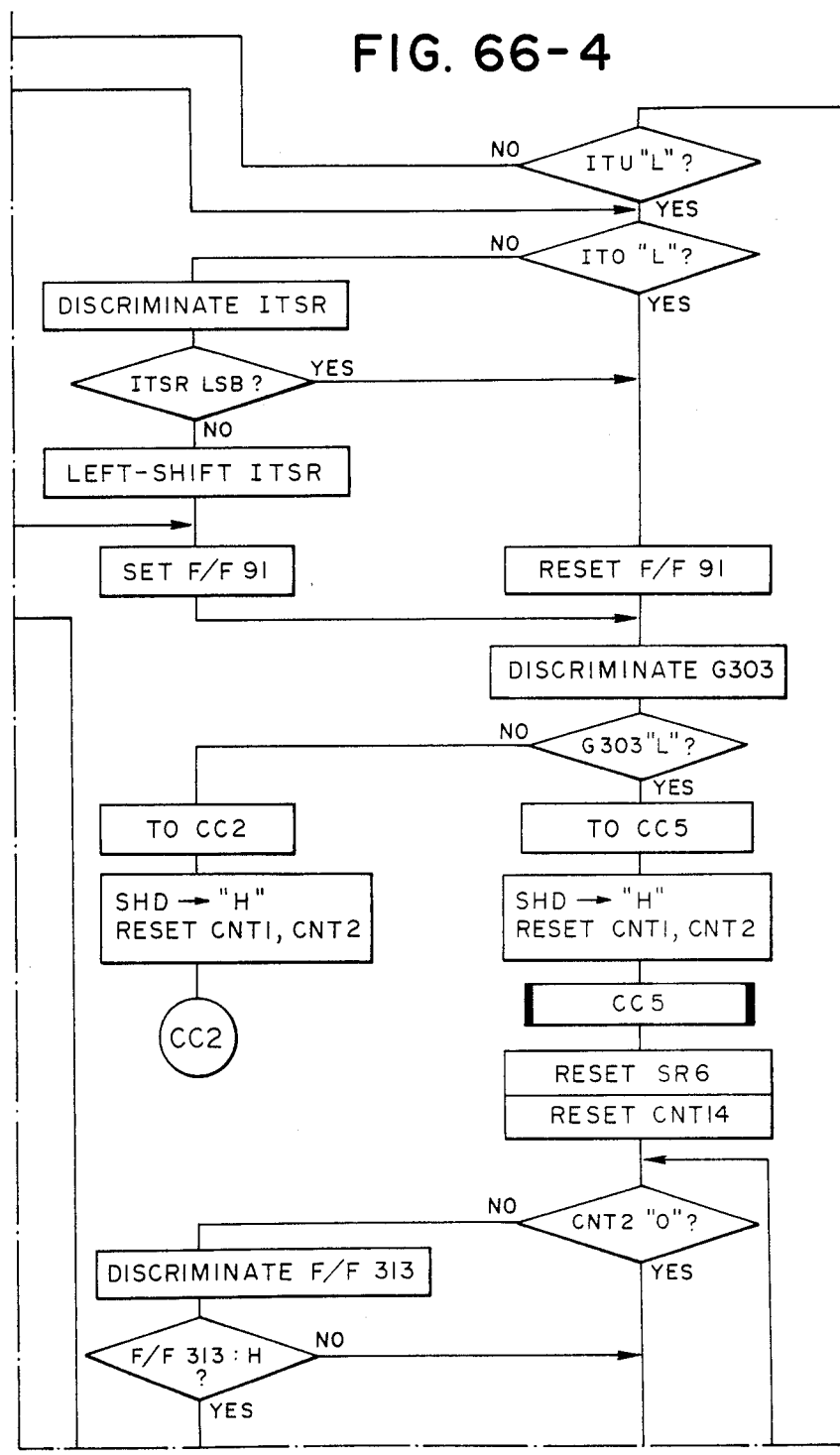
Figures 5, 66:
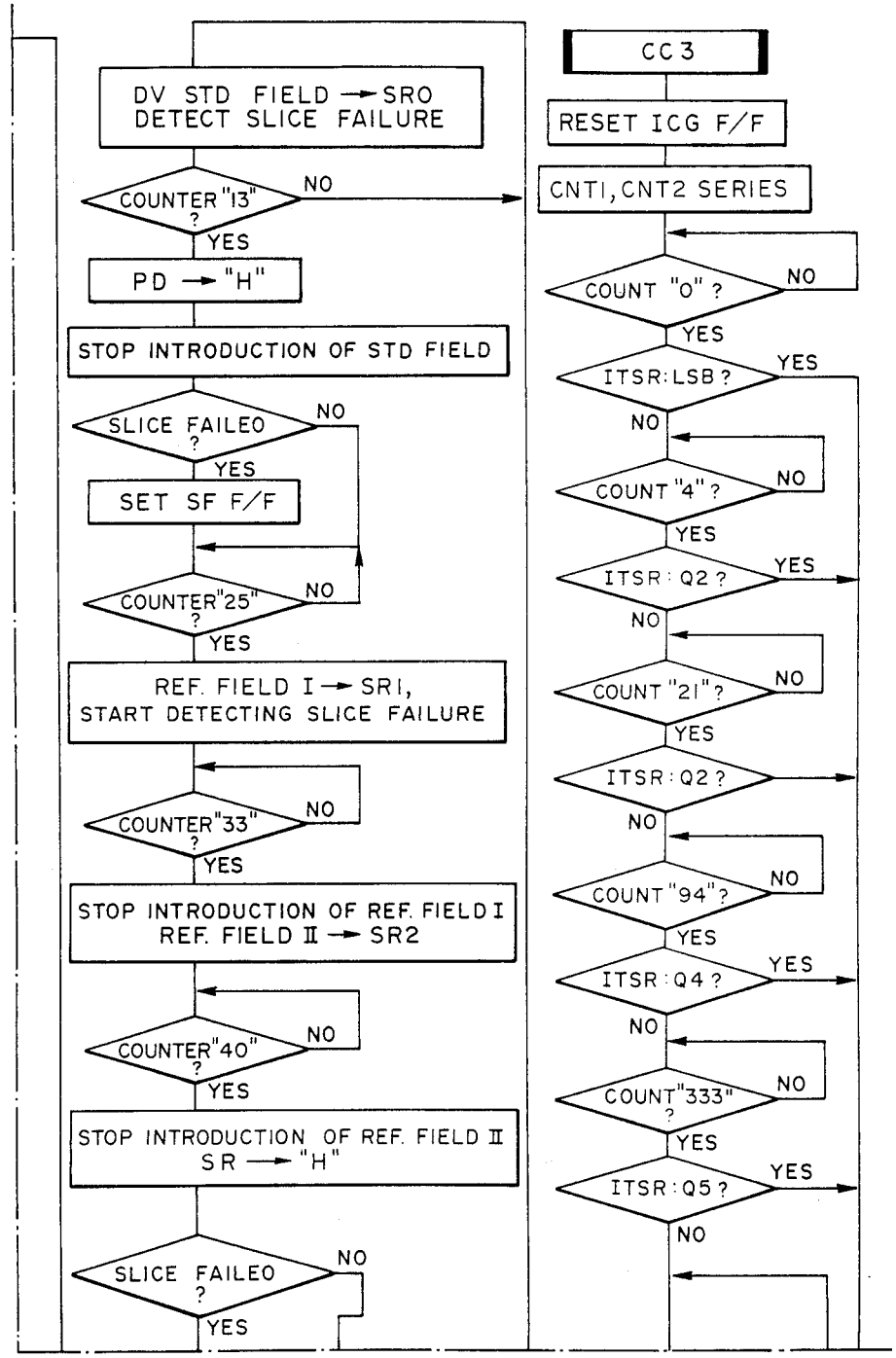
Figures 6, 66:
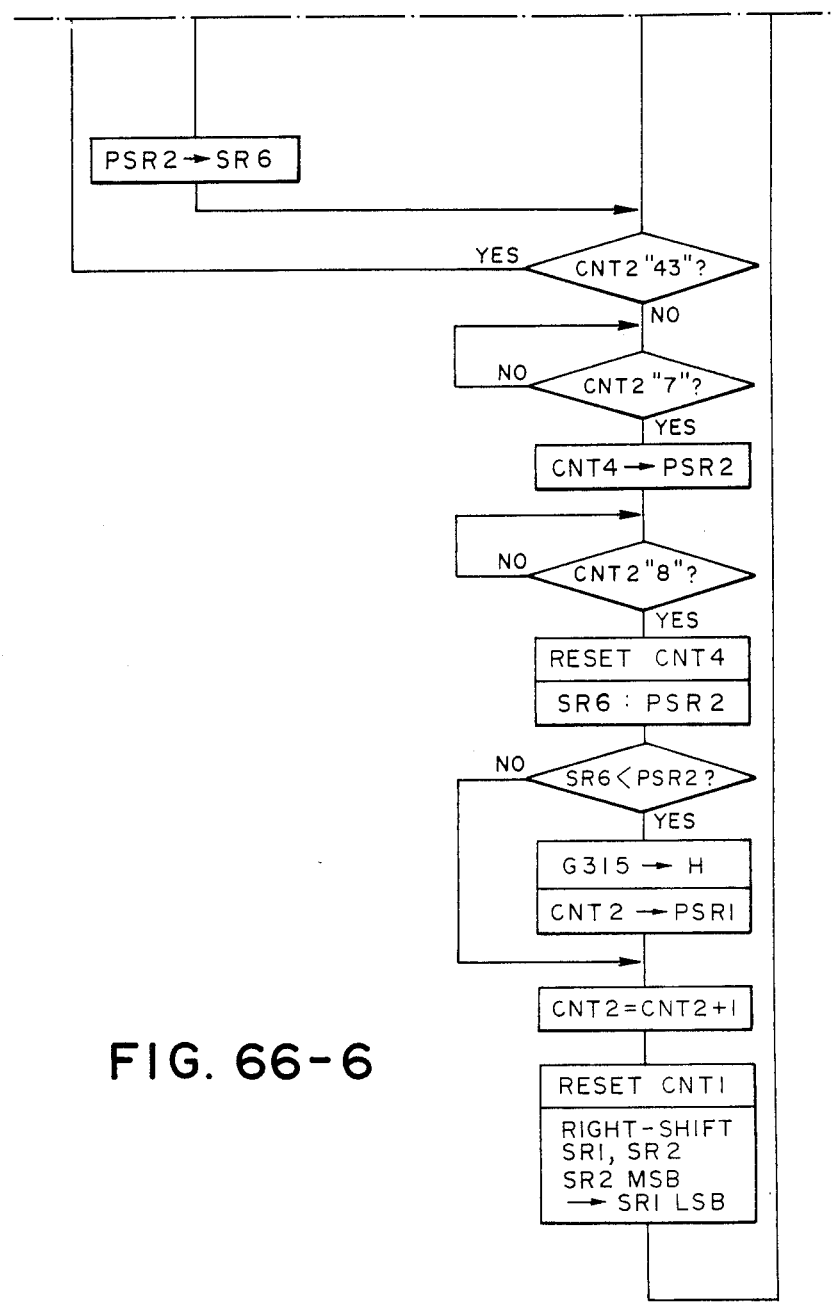
Figures 7, 66:
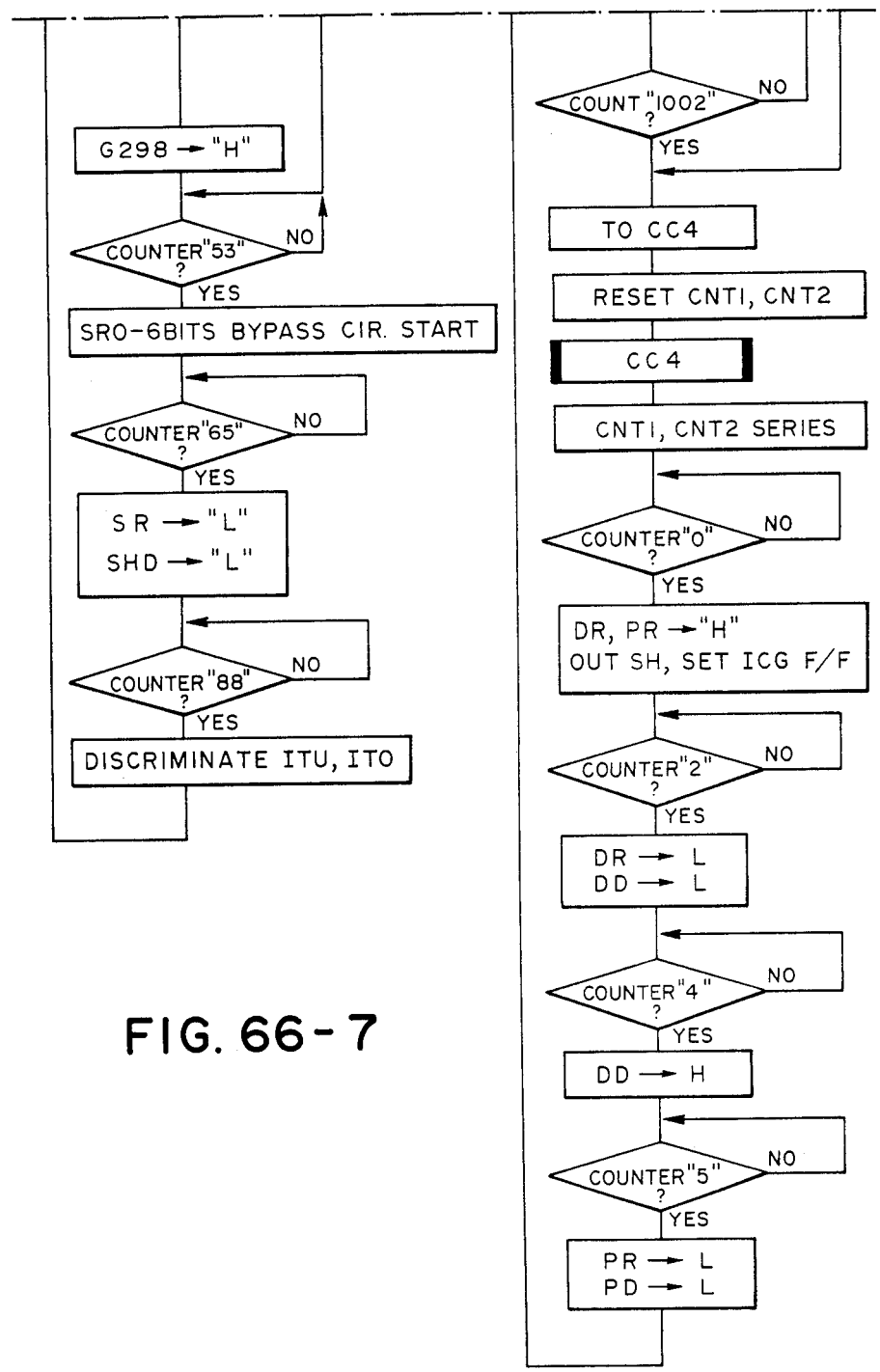
Figures 1, 67:
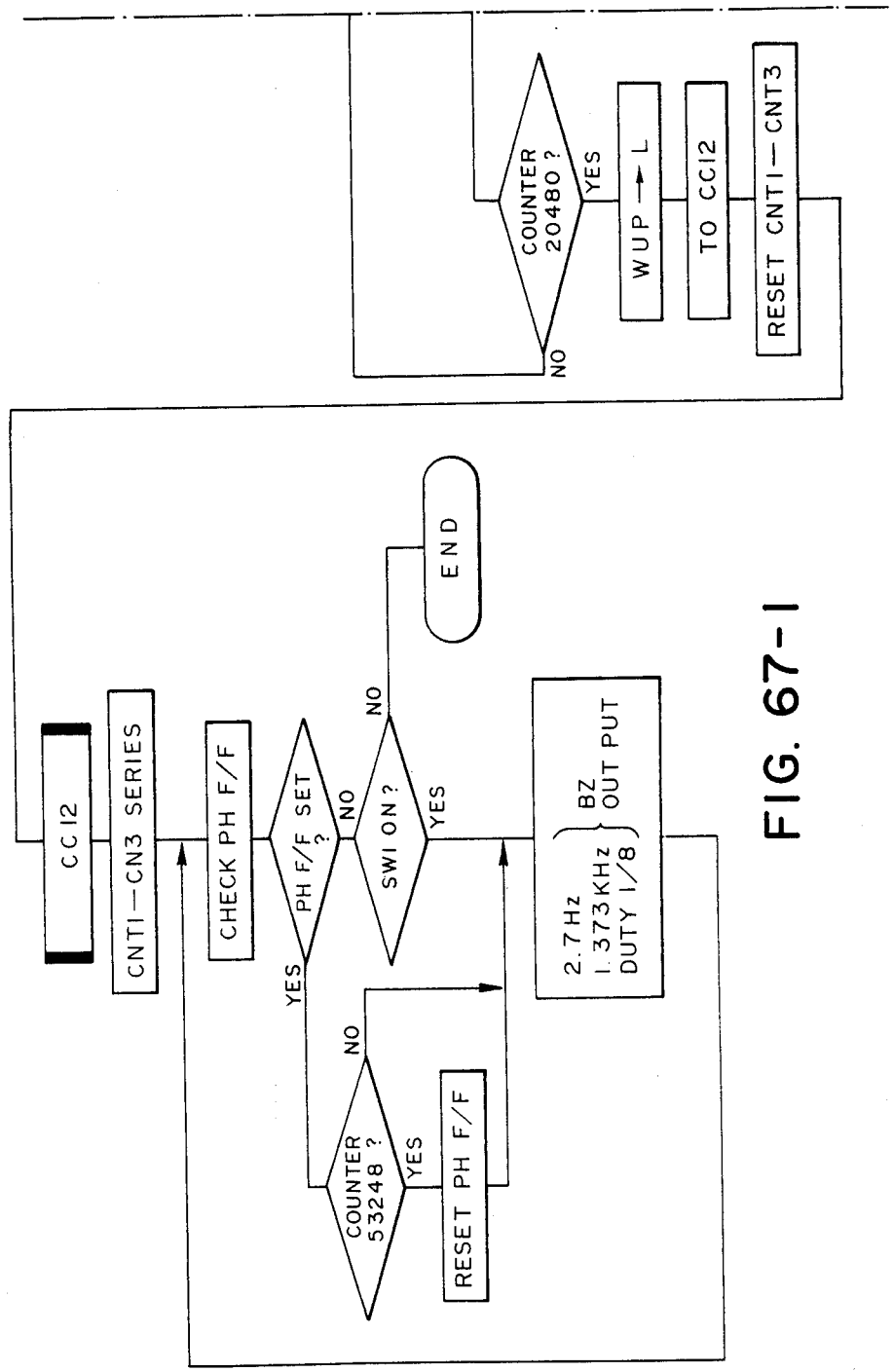
Figures 2, 67:
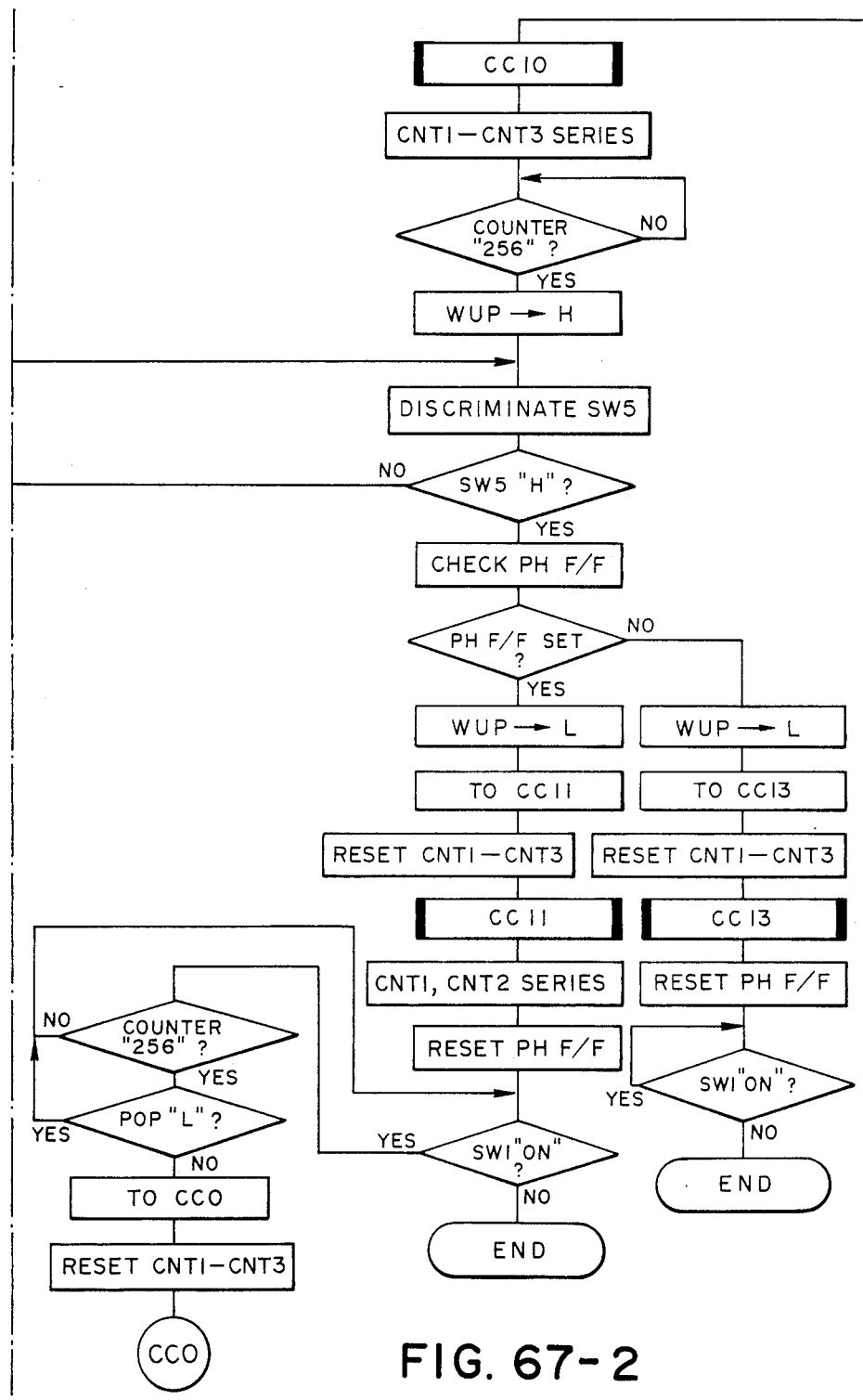
Figures 3, 67:
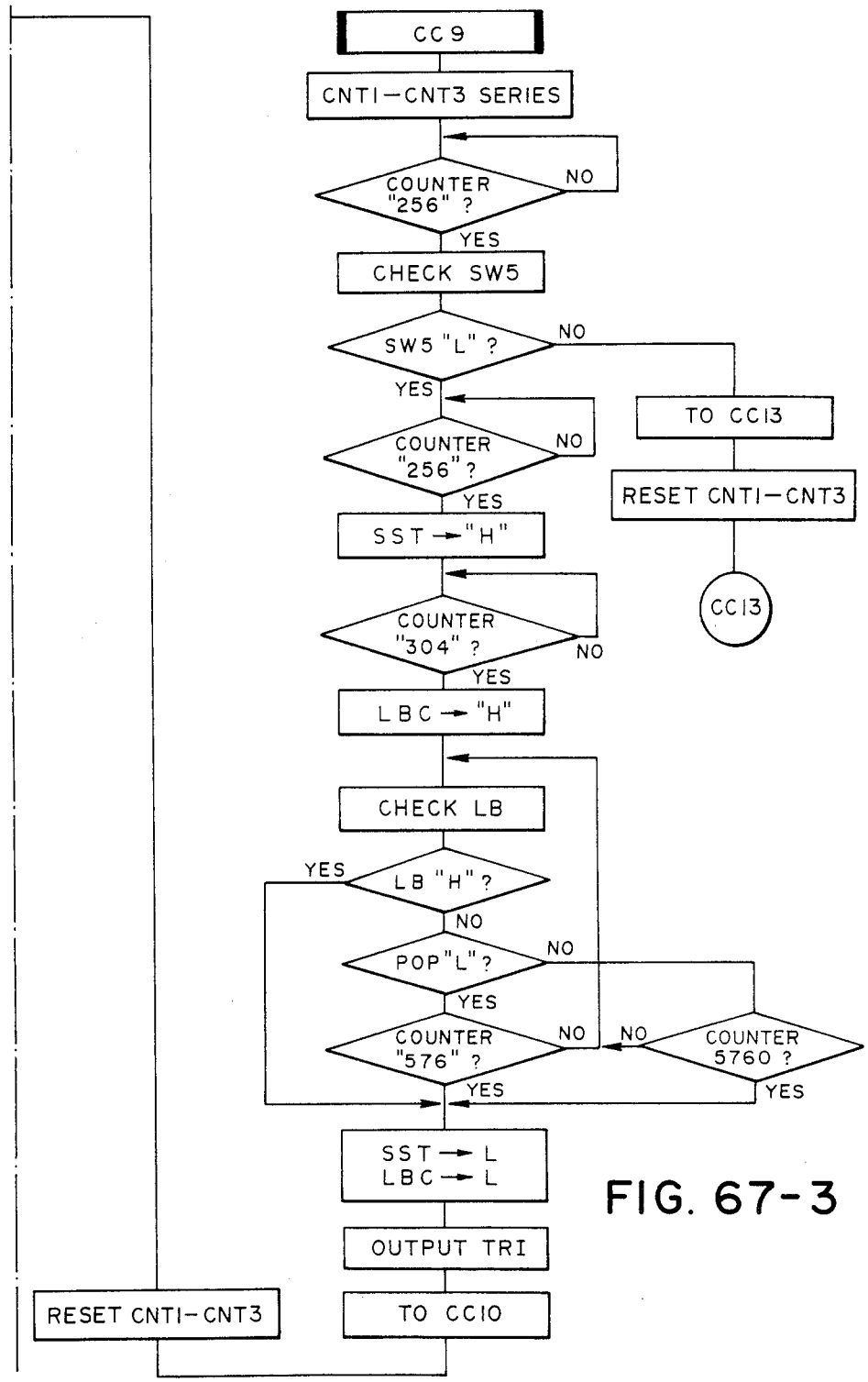
Figure 72:
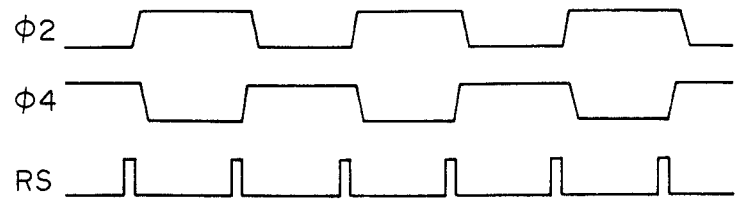
Figure 73:
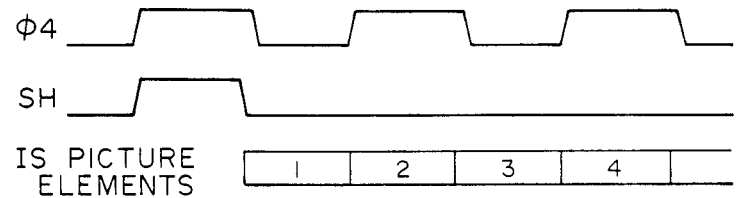
Figure 74:
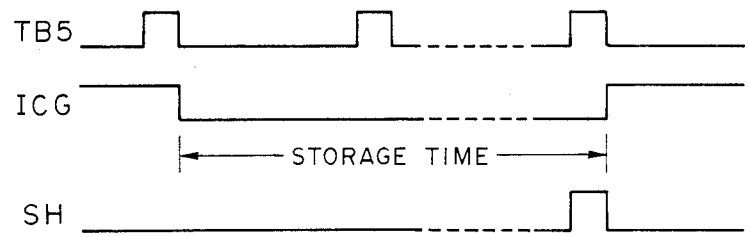
Figure 84:
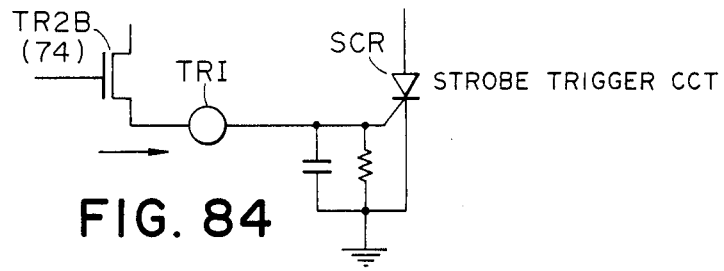
Figure 85:
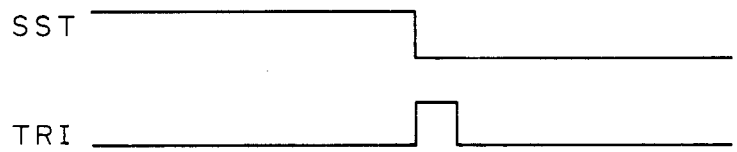

FI. 10 is a model view showing the optical arrangement of an image sensor of the camera shown in FIG. 1;

FIG. 11 is a model view showing the arrangement of picture elements in the image sensor shown in FIG. 10;

FIG. 12 is a block circuit diagram showing the configuration of an analog processing circuit in the circuitry shown in FIGS. 9-1 and 9-2;

FIG. 13 is a timing chart showing the various types of control signals necessary for control of the analog processing circuit shown in FIG. 12;

FIG. 14 is a schematic block circuit diagram showing the construction of a data correlation part for distance measuring computation included in a camera control circuit in the circuitry shown in FIGS. 9-1 and 9-2;

FIG. 15 is a model view showing the method for distance measuring computation by a distance measuring computation part included in the camera control circuit in the circuitry shown in FIGS. 9-1 and 9-2;

FIG. 16 is a view showing the distance data obtained at the distance measuring computation part included in the camera control circuit in the circuitry shown in FIGS. 9-1 and 9-2, as well as the conversion of this distance data into lens control data;

FIG. 17 is a block circuit diagram showing the configuration of an exposure system circuit included in the circuitry shown in FIGS. 9-1 and 9-2;

FIG. 18 is a partial circuit diagram schematically showing the main electronic circuit associated with disconnection in a shutter coil of the electromagnetically driven shutter;

FIG. 19 is a timing chart showing the mode of operation of a camera-shake discrimination comparator and a photometric integrating circuit in an exposure system circuit shown in FIG. 17 and also shows an alarm signal obtained according to an output of the comparator;

FIGS. 20-1 and 20-4 are block circuit diagrams schematically showing the configuration of the camera control circuit in the circuitry shown in FIGS. 9-1 and 9-2;

FIG. 21 is a view showing the relationship among FIGS. 21-1 through 21-36 which are partial circuit diagrams that show details of the configuration of the camera control circuit shown in FIGS. 20-1 to 20-4;

FIGS. 22 through 27 are circuit element views for explaining the definitions of the respective logic circuits used in FIGS. 21-1 through 21-36, wherein FIG. 22 shows a 1-bit shift register, FIG. 23 shows an n-bit shift register, FIG. 24 shows a D-type flip-flop, FIG. 25 shows an RS-type flip-flop, FIG. 26 shows a parallel-in/serial-out type N-bit type shift register, and FIG. 27 shows a logic mesh in a programmable logic array (ROM), and an equivalent logic gate corresponding to this;

FIGS. 28 through 32 are timing charts showing the various types of timing pulses obtained by a timing circuit shown in FIGS. 21-29, 21-30, 21-35 and 21-36;

FIG. 33 is a timing chart showing the relationship between the timing pulse obtained by the timing circuit and the word time used in data processing in the camera control circuit;

FIG. 34 is a partial circuit diagram showing the configuration of a power-up clear circuit (FIGS. 21-29, 21-30, 21-35 and 21-36) in the timing circuit;

FIG. 35 is a timing chart showing the mode of operation of the power-up clear circuit shown in FIG. 34;

FIG. 36 is a partial circuit diagram showing the configuration of an initial resetting circuit (FIGS. 21-25, 21-26, 21-31 and 21-32) of the timing circuit;

FIG. 37 is a partial circuit diagram showing the configuration of an oscillation interrupting circuit (FIGS. 21-29, 21-30, 21-35 and 21-36) of the timing circuit;

FIG. 38 is a timing chart showing the mode of operation of a coincident bit counting part in the data correlation part shown in FIGS. 21-5 21-6, 21-11 and 21-12 in relation to a certain data model;

FIGS. 39-1 and 39-2 are timing charts showing the mode of operation of a magnitude comparator shown in FIGS. 21-17, 21-18, 21-23 and 21-24 in relation to a certain data model;

FIG. 40 is a timing chart showing the control of the shift register by a storage time control circuit shown in FIGS. 21-23, 21-14, 21-19 and 21-20;

FIGS. 41-1 and 41-2 are timing charts showing the mode of operation of a chattering absorbing circuit shown in FIGS. 21-25, 21-26, 21-31 and 21-32;

FIGS. 42A, 42B, 42C-1 and 42C-2 are timing charts showing the mode of operation of the camera control circuit in status CC0;

FIG. 43 is a truth table showing various condition discriminations made in the status CC0;

FIG. 44 is a timing chart showing the mode of operation in status CC1;

FIGS. 45 through 47 are truth tables showing various condition discriminations made by the camera control circuit in status CC2;

FIGS. 48-1 and 48-2 are timing charts showing the mode of operation of the camera control circuit in the status CC2;

FIG. 49 is a timing chart showing storage time control in status CC3;

FIG. 50 is a timing chart showing the mode of operation for the storage time control of the counter in the camera control circuit in the status CC3;

FIG. 51 is a timing chart showing the timing for storing data in a shift register for storing image binary data shown in FIGS. 21-5, 21-6, 21-11 and 21-12 in status CC4;

FIGS. 52-1 and 52-2 are timing charts showing the mode of operation of the camera control circuit in the status CC4;

FIG. 53 is a block circuit diagram schematically showing the main part of the distance measuring computation part included in the camera control circuit;

FIGS. 54-1 and 54-2 are timing charts showing the mode of operation of the camera control circuit in status CC5;

FIG. 55 is a truth table showing various discriminations of the camera control circuit in status CC6;

FIG. 56 is a model view showing the timing and logic discrimination in the status CC6;

FIGS. 57-1 and 57-2 are timing charts showing the mode of operation of the camera control circuit in status CC7;

FIG. 58 is a timing chart showing the mode of operation for each operating condition of the camera control circuit in status CC8;

FIG. 59 is a timing chart showing the mode of operation of the camera control circuit in status CC9;

FIG. 60 is a timing chart showing the mode of operation of the camera control circuit in status CC10;

FIG. 61 is a timing chart showing the mode of operation of the camera control circuit in status CC11;

FIG. 62 is a timing chart showing the mode of operation of the camera control circuit in status CC12;

FIG. 63 shows the waveform of a drive signal which drives a sound generator and which is output in the status CC12;

FIG. 64 is a timing chart showing the mode of operation of the camera control circuit in status CC13;

FIGS. 65-1 to 65-8, 66-1 to 66-7 and 67-1 to 67-3 are flow charts showing the mode of operation of the camera control circuit in statuses CC0 to CC13;

FIGS. 68 through 70, FIG. 81, FIGS. 83 and 84, and FIGS. 86 through 93 are partial circuit diagrams showing electrical connections between external connection terminals of the camera control circuit and external circuits to be connected thereto;

FIG. 71 is a view showing the form of an output from a zone detecting signal output terminal shown in FIG. 70;

FIGS. 72 through 74 are timing charts showing the timing of control signals output from the camera control circuit to the image sensor;

FIGS. 75 through 80 are timing charts showing the timing of various control signals output from the camera control circuit to the analog processing circuit (FIG. 12);

FIG. 82 shows the waveforms of outputs in the respective modes from the output terminal for the drive signal for driving the sound generator;

FIG. 85 is a timing chart showing the timing of the output from the output terminal for a trigger signal for triggering the electronic flash device shown in FIG. 84; and FIG. 94 is a view showing the logic values of the outputs of the camera control circuit of the exposure system circuit (FIG. 17).

FIGS. 9, 20, 21, 39, 41, 42C, 48, 52, 54, 57, 65, 66 and 67 show how other figures fit together.

DETAILED DESCRIPTION OF THE PREFERRED EMBODIMENTS

The main functions of a camera according to an embodiment of the present invention will first be described. This camera has a shutter release button which in turn has two depressing modes: a first stroke or step and a second stroke or step. A first switch is operated at the first stroke, and a second switch is operated at the second stroke. The camera sequence starts when the shutter release button is depressed to the first stroke to close the first switch, that is, when the power is turned on. According to this camera sequence, the battery check, the shutter disconnection check, the luminance check and so on, as well as the distance measuring operation for automatic focusing, are performed. When the shutter release button is subsequently depressed to the second stroke to close the second switch, the power source is maintained. Then, independently of the operation of the shutter release button by the operator, a control sequence is performed based on a discriminating function and sequence control function provided in advance, and a series of camera operations for photography is performed. The main functions of this camera are to be described below.

The shutter release button of this camera is soft release button having the first and second strokes as described hereinabove. At the first stroke, the power source is turned on and, at the second stroke, a series of operations including the distance measurement is performed. The electrical contacts are manipulated upon depression of the shutter release button to the first and second strokes.

This camera also has an automatic focusing function. For achieving this automatic focusing, an electronic distance measuring system using a base line range finder as proposed in the U.S. patent application Ser. No. 121,690 (German Patent Application No. P30 07 390.6: G 80 05 277.3) is used. According to this system, distance signals are calculated as digital data and the position of the photographic lens is controlled according to the calculation result. The indication of the detected distance is performed according to three zones of far, middle, and near distances.

This camera also has a self-timer function. This self-timer measures a time period of up to about 10 seconds by counting clock pulses by a digital counter. The operation of the self-timer is indicated by a sound. The setting operation of this self-timer is effected by a switch connected to a terminal SELF of a camera control circuit to be described hereinafter.

The start of the mechanical sequence of this camera is electromagnetically triggered without the intermediacy of a mechanical member operating in cooperation with the shutter release button. More specifically, the start of the displacement for automatic focusing of the photographic lens is performed with an electromagnet of repulsion type. Therefore, the shutter release button is released from cooperation with any mechanical part. When the mechanical sequence is started, the photographic lens is gradually displaced from the position corresponding to the closest distance to that corresponding to infinite distance. The distance of displacement of the photographic lens is detected by counting the clock pulses generated. When the photographic lens reaches the position corresponding to the distance obtained as the result of distance measurement, the photographic lens is stopped at this position by an electromagnet for stopping the displacement of the photographic lens.

As for the power maintenance of the camer, the power is maintained at the second stroke of the shutter release button. For this reason, the series of sequence operations of the camera may be performed even if the operator releases the shutter release button.

The camera also has an electric shutter. This electric shutter has electrically driven shutter blades which define a gradually larger opening from the time of energizing to achieve the maximum aperture. The opening defined by the shutter blades directly corresponds to the aperture. This opening, the aperture, is determined by the timing of the de-energizing, and the exposure time, or the shutter speed is simultaneously determined.

As this electric shutter may be adopted an electromagnetically driven shutter as proposed in U.S. patent application Nos. 86,523 and 114,497 (corresponding to German Patent Applications Nos. P29 42 636.6 and P30 03 462.9, respectively, of the present assignee.

The camera also has a built-in electronic flash. The charging of this electronic flash is controlled by a switch operative in cooperation with the flash pop. The triggering of this electronic flash is not performed by mechanical contacts, but by electric signals from the camera control circuit to be described hereinafter.

This camera also includes an electronic winder. This automatically winds the film when the exposure is completed. Any wind-up trouble or tension due to the end of the film is detected by a self-timer. When the self-timer detects a trouble or the like, the power is cut off.

The confirmation of various alarms and safeguards in the camera is performed by checking the electromagnetically driving means from the viewpoint of fail safe. As for the shutter, disconnection detection of the electromagnet for driving it is performed. When the camera is detected to be defective, the camera operation is completely stopped or continued in such a manner as to signal the presence of the defect. As for the power source, the battery voltage is checked. If the battery voltage is detected to be insufficient to effect the shutter operation, the camera operation stops completely.

With this camera, the battery check may be performed by operating a battery check button. For performing the battery check, whether or not the voltage is sufficient to drive the shutter or to perform exposure control is checked by an actual loading test. When the voltage is sufficient, it is signaled by a sound.

Finally, this camera also includes the function of signaling camera shake. At the first stroke of the shutter release button, the luminance is detected as the distance to the object is measured. Signaling with a sound is performed when the exposure time is going to be long, leaving room for camera shake. This signaling is not performed during flash pop. The signaling for camera shake is interrupted at the second stroke at which the power source is maintained.

The main functions of the camera have been described. The basic construction of the main part of this camera will now be described.

FIG. 1 shcematically shows the overall camera. Reference numeral 1 denotes a shutter release button having a first stroke and a second stroke. At the first stroke, a first switch is turned on. At the second stroke, a second switch is turned on. These first and second switches are connected as shown in FIG. 2 wherein symbols SW1 and SW2 denote the first and second switches, respectively. When the first switch SW1 is turned on at the first stroke of the shutter release button, a switching transistor for control of power is turned on since its base is low level. Thus, a DC-DC converter DCC is supplied with power from a power source circuit (not shown). Concerned circuits are supplied with power by output voltages Vcc1 and Vcc2 from the DC-DC converter DCC. Power source voltage VE from the power source circuit is 1.3 to 3 V. In contrast with this, Vcc1 is 13 V with a current of 1 to 3 mA and Vcc2 is 7 V with a current of 20 to 35 mA. The second switch SW2 is connected to a second switch connection terminal "SW2" of a camera control circuit IC1. When the second switch SW2 is turned on at the second stroke of the shutter release button 1, the camera control circuit IC1 makes the output signal from a power maintaining signal output terminal PH low level in response to this. Therefore, although the first switch SW1 is being turned off, the power is maintained since transistor TR1 is kept conductive. R1 and R2 denote resistors, respectively. The charging of an electronic flash (not shown) is interrupted by turning on the first switch SW1 or by output of a signal of low level from the power maintaining signal output terminal PH of the camera control circuit IC1. The details of this construction will be described hereinafter.

Figure 3:
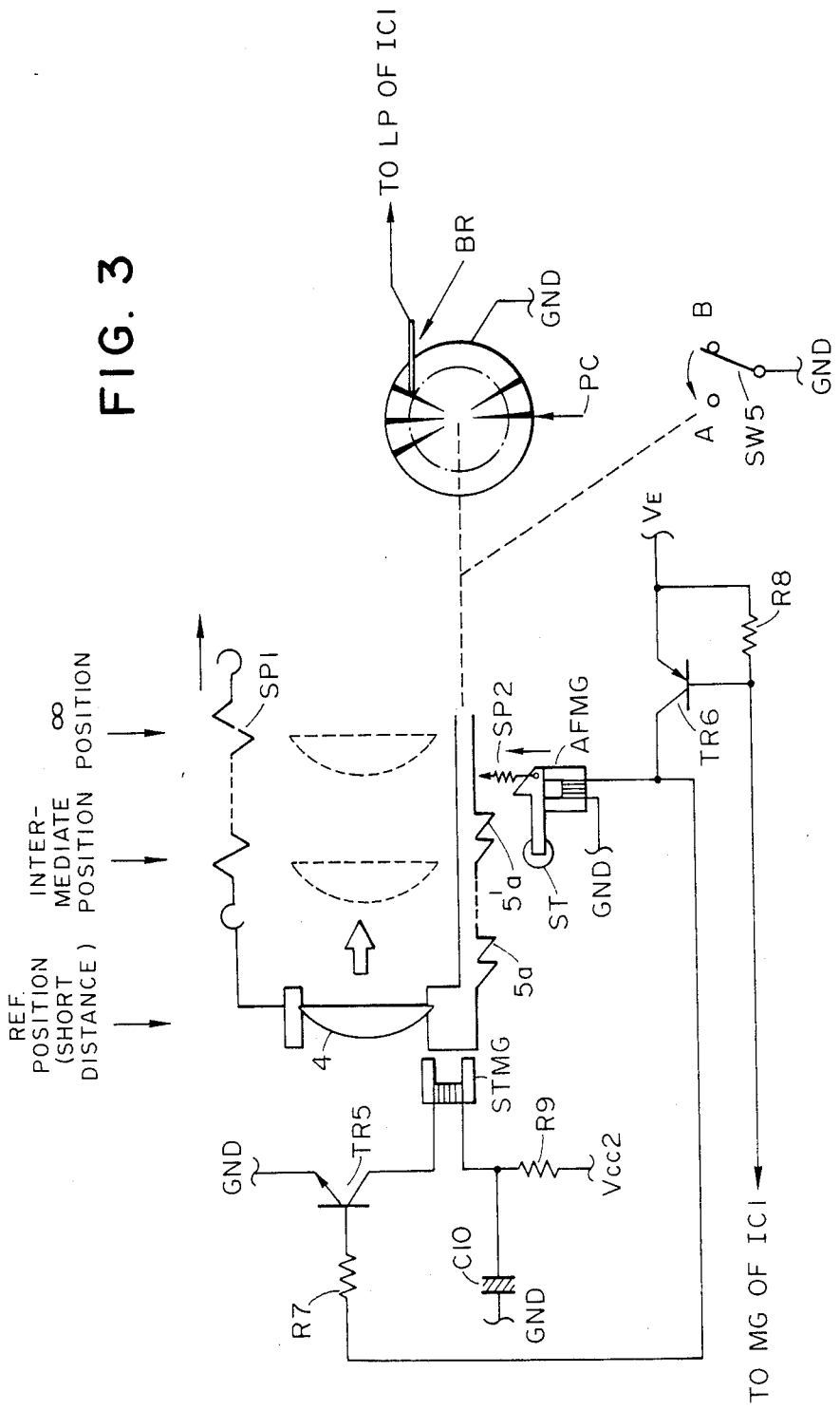
FIG. 3 is a model view schematically showing the construction of a lens control part for automatic focusing of the camera shown in FIG. 1.

Referring to FIG. 1 again, reference numeral 2 denotes an automatic focusing distance measuring part of the camera. This part includes a distance measuring optical system of base line range finder type having no moving parts, and a line type image sensor for sensing two images of an object for distance measurement using a relative distance associated with the distance to the object. The scanning signals for these two images for distance measurement are input to an analog processing circuit, to be described hereinafter, to be converted into binary signals or the like. The binary signals obtained in this manner are input to a distance measuring computation part of the camera control circuit IC1 where the distance to the object is detected based on the binary signals. Reference numeral 3 denotes an automatic lens focusing control part for controlling a photographic lens 4 according to the distance to the object detected by the distance measuring computation part of the camera control circuit IC1. The schematic construction of the automatic lens focusing control part 3 is shown in FIG. 3. Referring to FIG. 3, the photographic lens 4 is constrained by a start magnet STMG at a reference position against the biasing force of a spring SP1 during winding of the film. The start magnet STMG is a permanent magnet and is of repulsion type which may be demagnetized upon energizing. When the start magnet STMG and an automatic focusing magnet AFMG are energized under this condition, the start magnet STMG is demagnetized so that the photographic lens 4 is displaced from the reference position (closest side) toward the infinite position ($\infty$). Since the automatic focusing magnet AFMG is also energized, a stopper ST is released from a stop pawl 5a of a lens mirror cylinder 5 against the biasing force of a spring SP2. A pulse plate PC rotates according to the displacement of the photographic lens 4 to turn on and off a stationary brush BR. The on and off signals are input to the camera control circuit IC1 through its terminal LP. At the camera control circuit IC1, the first signal is used for checking if the start magnet STMG and the automatic focusing magnet AFMG are operating normally, and the subsequent signals are used for indicating the displacement distance of the photographic lens 4. When this count reaches the value obtained as a result of the distance measuring computation, the start magnet STMG and the automatic focusing magnet AFMG are both de-energized. Consequently, the stopper ST pops into the stop pawl 5a, interrupting the displacement of the photographic lens 4. Energizing of the start magnet STMG and the automatic focusing magnet AFMG is controlled by output signals from a magnet control signal output terminal MG of the camera control circuit IC1. When the output from the terminal MG becomes low level, a switching transistor TR6 is turned on so that the automatic focusing magnet AFMG is energized by a power source (VE). Simultaneously, since a switching transistor TR5 is turned on, the start magnet STMG is energized by the output voltage Vcc of the DC-DC converter DCC. C10 is a capacitor for starting the start magnet STMG, and R7, R8 and R9 are resistors. SW5 is a winding completion detection switch of the camera which is switched from a terminal A to a terminal B upon completion of the winding operation of the film and is returned from the terminal B to the terminal A upon energizing of the start magnet STMG.

Referring to FIG. 1, reference numeral 6 denotes an electric shutter, as described hereinabove, which may be of electromagnetically driven type as proposed in U.S. patent application Ser. No. 86,523 (German Patent Application No. P29 42 636.6) and which controls both the shutter speed and the aperture according to a progrm flow chart. This electric shutter is normally fully closed shown in FIG. 4 and is fully opened when the electromagnet is energized. During this procedure, the opening defined by the shutter blades changes from the fully closed condition, to the half-open condition of the aperture, and finally to the fully open condition, and is kept under the fully open condition as long as the electromagnet is kept energized. When the electromagnet is de-energized, the shutter blades are restored to the fully closed condition by the biasing force of the spring. When the electromagnet is de-energized under the half-open condition, the shutter blades are restored from the half-open condition and then to the fully closed condition. Thus, exposure control by the shutter is in the program mode during the process of going from the fully closed condition to the fully open condition, so that the aperture and the shutter speed are controlled according to the program flow chart. When the shutter blades are fully opened, the exposure time control mode with the fully open aperture is entered. The shutter blades also incorporate an auxiliary aperture which opens and closes in cooperation with the shutter blades. This auxiliary aperture normally has a small oepning. The auxiliary aperture is first placed under the fully closed condition upon energizing of the electromagnet, gradually enlarges its opening together with the shutter blades, is fully opened immediately before the shutter blades are fully opened, and is then half opened when the shutter blades are fully opened. This auxiliary aperture serves to control the intensity of light incident on photosensors in a photometer 7 for exposure control. The timing of de-energizing of the electromagnet is controlled according to the integrated value of the intensity of light incident on these photosensors.

The auxiliary aperture has a small opening when the shutter blades are fully closed, so that a too slow exposure time which might intensify the effect of camera shake may be detected in advance and an alarm sound may be generated from a sound output part 14.

Figure 5:
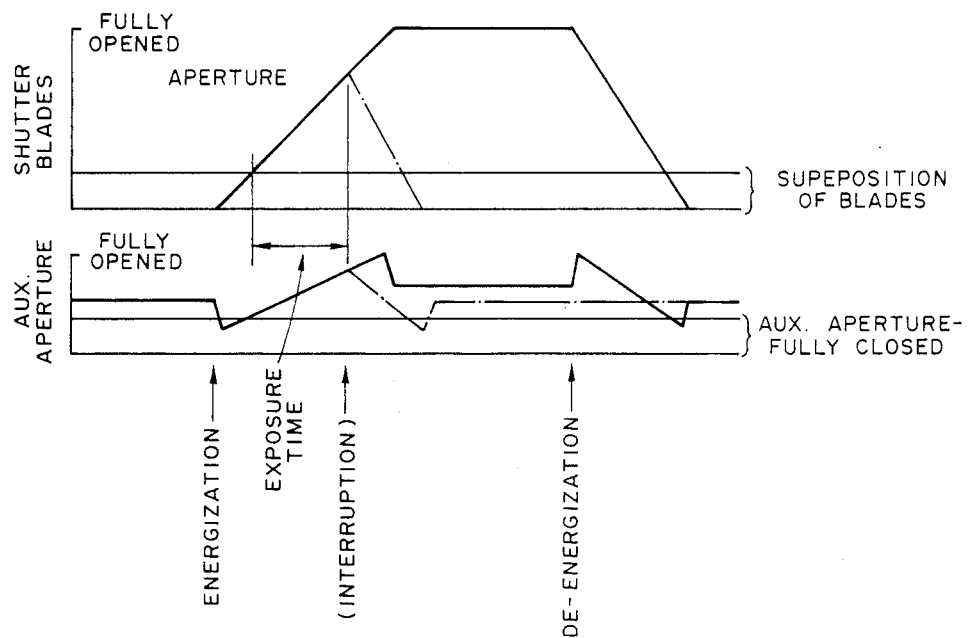

The relationship between the openings defined by the shutter blades and the auxiliary aperture upon the energizing of the coil is as shown in FIG. 5.

Figure 6:
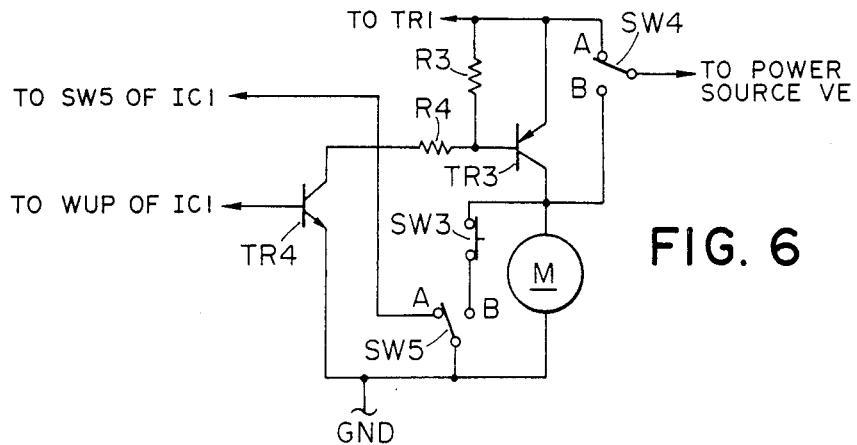
FIG. 6 is a partial circuit diagram showing the configuration of the main electronic circuitry associated with an electronic winder of the camera shown in FIG.1.
Figure 7:
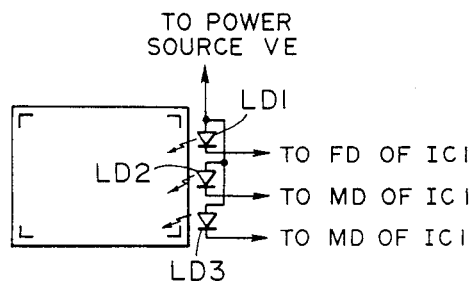
FIG. 7 is a model view schematically showing a finder zone indicating means of the camera shown in FIG. 1.

Referring back to FIG. 1, reference numeral 8 denotes an electronic winder. With the camera of this embodiment, when the exposure of the film through the electric shutter is completed, the film is wound by the electronic winder 8. This winding is performed by energizing a motor which operates in cooperation with a film winding mechanism. The completion of winding is detected through the level of the winding completion detecting switch SW5. A drive circuit for this motor is as shown in FIG. 6. In FIG. 6, the winding completion detecting switch SW5 is switched to the terminal A under the incomplete winding condition. The terminal A is connected to a terminal SW5 of the camera control circuit IC1. When the camera control circuit IC1 detects the completion of film exposure through the shutter 6 under the condition that the switch SW5 is switched to the terminal A, the camera control circuit IC1 outputs high level signal which is obtained from its winding control signal output terminal WUP. Since a switching transistor TR4 is then turned on, a switching transistor TR3 is turned on. A motor M is energized by a power source circuit (VE) to be driven to wind the film. When the winding is completed, the switch SW5 is switched from the terminal A to the terminal B. The camera control circuit IC1 de-energizes the motor M after a predetermined chattering absorption time (about 275 to 366 μsec) has elapsed after the switch SW5 has left the terminal A. When the switch SW5 is switched to the terminal B, a short circuit to the motor M is formed in cooperation with a normally-closed first rewinding switch SW3. A braking force is then exerted on the motor M to immediately stop the motor M. This short circuit is opened when the switch SW5 is restored from the terminal B to the terminal A after the start magnet STMG (FIG. 3) is energized for control of the photographic lens for automatic focusing. An overcurrent flows to the motor M when the motor M stops due to wind-up trouble or tension on the film at the film end during the winding operation by the motor M. In this case, after detecting that the switch SW5 is not switched to the terminal B after the predetermined period of time, the camera control circuit IC1 turns off the transistors TR4 and TR3 to deenergize the motor M. Then, an alarm sound is generated for about 5 seconds from the sound output part 14 shown in FIG. 1, and thereafter the power source is maintained.

The motor M is also involved in rewinding the film which has been exposed. Rewinding of the film is effected by the switching of a clutch (not shown) upon operating a rewinding operation button 9 shown in FIG. 1. In this case, the motor M is energized when a second rewinding switch SW4 is switched from the terminal A to the terminal B upon operating the rewinding operation button 9. Supply of power to all the electric circuits is blocked during the rewinding operation. The short circuit to the motor M is also opened since the first rewinding switch SW3 is turned off. R3 and R4 denote resistors.

Referring to FIG. 1 again, reference numeral 10 denotes a finder of this camera. Within this finder 10 is indicated, in three zones of far, middle and near, the distance to the object by three light-emitting diodes LD1, LD2 and LD3 shown in FIG. 7 which was obtained by a distance measurement computation part in the camera control circuit IC1. These light-emitting diodes LD1, LD2, and LD3 are respectively connected to zone signal output terminals FD, MD, and ND of the camera control circuit IC1. When the distance to the object is detected to be within the range of ∞ to 8.5 m, the camera control circuit IC1 makes the output from the terminal FD low level. When the distance is within the range of 6.4 to 1.7 m, the camera control circuit IC1 makes the output from the terminal MD low level. When the distance is less than 1.6 m, the camera control circuit IC1 makes the output from the terminal ND low level. Accordingly, in each case, the lighting of the light-emitting diode LD1 indicates that the distance to the object is ∞ to 8.5 m, lighting of the light-emitting diode LD2 indicates that the distance to the object is 6.4 to 1.7 m, and the lighting of the light-emitting diode LD3 indicates that the distance to the object is less than 1.6 m.

The zone indication is not performed until the distance to the object has been measured. This zone indication only provides the approximate position for control of the position of the photographic lens. Fifteen actual control steps are set for the photographic lens 4.

Referring back to FIG. 1, reference numeral 11 denotes a self-timer operation button. A self-timer switch operated by this self-timer operation button 11 is connected to a terminal SELF of the camera control circuit IC1. When this self-timer switch is turned on, the camera is placed under the self-timer mode under the control of the camera control circuit IC1. When the shutter release button 1 is depressed to the first stroke, the distance measuring operation is performed. This distance measuring operation is performed in the continuous distance measuring mode. Therefore, the result of the distance measurement is kept up-to-date when the distance to the object changes. When the change in the measured distance to the object involves two of the zones described above, the zone indication also changes. When the self-timer switch is returned to the original state, that is, open under this condition, the immediately preceding measured distance is stored.

When the shutter release button 1 is depressed to the second stroke while the self-timer switch is kept on, the power source is maintained and the self-timer starts measuring time. During the time measurement by the self-timer, the sound output part 14 produces an indication of the self-timer operation with a sound. If the self-timer is returned to the original state, that is, if it is opened during the time measurement by the self-timer, all the operations including the maintenance of the power source are restored to the original state.

When the time measurement by the self-timer is completed, the measured distance at the first stroke of the shutter release button 1 is cleared and the distance measuring operation is resumed. This distance measuring operation is repeated up to a predetermined number of times until the result of distance measurement is obtained. When the distance measurement is obtained or the number of distance measurement operations reaches the predetermined value, the automatic focusing lens control part 3 operates so that the normal sequence of the camera is performed.

Reference numeral 12 denotes a built-in electronic flash. The charging of the electronic flash is initiated when a first pop switch (SW6) to be described hereinafter is turned on in synchronism with the flash pop. When the charging is completed, a neon lamp indicating the completion of charging is lit. When the shutter release button 1 is depressed to the first stroke during the charging process of the electronic flash, the charging of the electronic flash 12 is interrupted by the circuit shown in FIG. 2. This interruption of the charging of the electronic flash continues during maintenance of the power source, so that the excessive current due to charging of the electronic flash 12 may not adversely affect the other electronic circuits of the camera.

Figure 8:
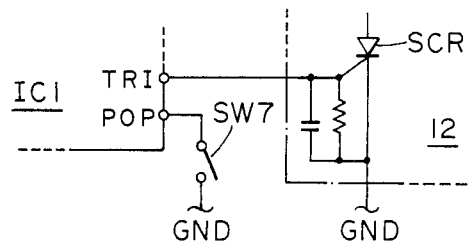
FIG. 8 is a partial circuit diagram showing the configuration of the main electronic circuitry associated with the triggering operation of a built-in electronic flash device of the camera shown in FIG. 1.

A second electronic flash pop switch SW7 to be turned on in synchronism with the electronic flash pop is also incorporated herein, which is connected to a terminal POP of the camera control circuit IC1 as shown in FIG. 8. When the second electronic flash pop switch SW7 is turned on, the camera is placed under the flash photography mode under the control of the camera control circuit IC1. In this mode, various operations are performed, such as setting of the exposure time, determination of the fixed point at which the distance measurement is impossible, or rejection of the measured distance which is outside the range for allowing synchronous operation of the flash.

The triggering of the electronic flash 12 is effected by trigger signals output from a trigger output terminal TRI of the camera control circuit IC1 so as to trigger a trigger thyristor SCR in the light-emitting circuit of the electronic flash 12.

In the flash photography mode, the opening of the shutter 6 is limited according to the photographing distance, that is, the position of the photographic lens 4 determined by the automatic focusing lens control part 3.

Finally, reference numeral 13 denotes a battery check button. When this button 13 is operated, a power-up clear terminal PU of the camera control circuit IC1 is placed at the GND potential. Subsequently, a switch which is connected in parallel with the first switch SW1 is turned on to turn on the power source, and an artificial load is applied. Although the camera control circuit IC1 is kept under the power-up clear condition, the electromagnet for driving the shutter is energized for a short period (short enough so that the shutter may not operate) at a constant frequency. The power source voltage VE at this time is checked by an exposure control IC. When the battery voltage is sufficient, this is indicated by a sound generated from the sound output part 14.

In the construction described above, the sound output part 14 incorporates as a sound output means a piezoelectric buzzer as will be described in detail hereinafter. This buzzer is connected to an alarm signal output terminal of the camera control circuit IC1. The camera control circuit IC1 supplies to the piezoelectric buzzer, from its alarm signal output terminal, square signals of different frequencies and periods as drive signals according to alarms for battery check, camera shake, self-timer indication, wind-up trouble, film tension and so on. Various indications and alarms are thus made with sounds of different frequencies and periods.

The main functions of the camera according to one embodiment of the present invention and the fundamental constructions for guaranteeing these functions are as described above. The overall circuitry of this camera may be as shown in FIG. 9. Referring to FIG. 9, description will now be made of the configuration of the other electronic circuits of this camera and of the connections between the main electronic circuits described above and the other electronic circuits. Symbol IS denotes a line-type image sensor for scanning two detected images, which is included at the automatic focusing distance measuring part 2 (FIG. 1). The image sensor IS herein comprises a four-phase driven type CCD photodiode array with a known overflow drain gate. From the camera control circuit IC1 to this image sensor IS are supplied four-phase drive clock pulses ∅1 to ∅4 (to be supplied to a charge transfer CCD analog shift register), shift pulses SH (to be supplied to the shift gate), resetting pulses RS (to be supplied to a charge resetting FET at the output part/charge/voltage converter part), as well as charge clear signals ICG (to be supplied to the overflow drain gate). When a clear signal ICG (signal of high level) is supplied, the overflow drain gate is opened at the image sensor IS, so that the charge stored on the p-n junctions of the respective photodiodes is cleared through an overflow drain terminal OD. In this embodiment, the time from the trailing edge of the charge clear signal ICG (completion of discharge of the respective photodiodes) to the trailing edge of the shift pulse SH (completion of the writing of the stored charge on the respective photodiodes to the CCD analog shift register) is controlled by the camera control circuit IC1 according to the intensity of illumination of the object (according to the output level of the image sensor IS as will be described in more detail hereinafter). Symbol SB denotes a substrate bias supply terminal. The output voltage Vcc1 of the DC-DC converter is supplied to the substrate bias supply terminal SB and the overflow drain terminal OD. Symbol OS denotes an output terminal for outputting image scanning signals, and DOS denotes an output terminal for outputting signals indicative of internal voltage fluctuations within the image sensor IS with respect to the output voltage Vcc1.

The relationship of the arrangement of the image sensor IS in the distance measuring part 2 to that of the distance measuring optical system, and also its optical principles for distance measurement will now be described. As has already been described, the electronic distance measuring system adopted in this camera is based on the two-image identity system of the base line range finder, which detects the relationship between two images for distance measurement obtained by two optical systems (base line range finder optical systems) to thereby obtain distance data. Referring to FIG. 10, symbol OB denotes an object a distance to which is to be measured, that is, the object of the exposure in the case of a camera. A lens LB and mirrors M1 and M2 collimate the light from the object OB on its optical axis a of the lens LB and form a standard optical system. In contrast with this, a lens LR and mirros M3 and M4 are arranged at a distance of base length L from the standard optical system (LB, M1, and M2) and form a reference optical system. The images of the object OB are formed on the photosensitive plane of the image sensor IS via the lenses LB and LR. The image via the standard optical system (LB, M1, and M2) is formed in a standard field of view A, and the image via the reference optical system (LR, M3, and M4) is formed in a reference field of view B. If it is assumed that the object OB is at an infinite distance, the object OB is positioned on the respective axes a and b of the standard and reference optical systems. Therefore, the images of the object are formed as IMB in the standard field of view A and as IMR1 in the reference field of view B. If the object OB draws near along the axis a of the standard optical system (LB, M1, and M2), the optical path from the object OB is inclined as shown by C with respect to the reference optical system (LR, M3, and M4). For this reason, the image of the object OB formed via the reference optical system (LR, M3 and M4) deviates in the reference field of view B to become IMR2 according to the distance. Therefore, data on distance to the object OB may be obtained by detecting at which location of the reference field of view B is formed the image corresponding to the image IMB in the standard field of view A.

The image sensor IS is of 240-bit construction having 240 photodiodes. In this embodiment, among the 240 picture elements, 48 bits are assigned to the standard field of view A, 90 bits are assigned to the reference field of view B, and 72 bits are assigned to the separating region between the two fields of view. Analog electric signals corresponding to the illuminance distribution of the two images IMB and IMR for distance measurement are output from the terminal OS together with time-serial signals of the 240 picture elements.

The two images of the object OB obtained through the distance measuring optical system of the base line range finder type as has been described hereinabove are formed on the photosensitive plane of the image snesor IS. The distribution of the intensity of light on the photosensitive plane may be as shown in FIG. 11.

The photosensitive part of 240 picture elemtns of the image sensor IS will now be described in more detail. Referring to FIG. 11, 6 bits at D1 are initial dummy bits. The next 12 bits at DM are for a CCD dark level detecting zone for detecting the dark current level at a CCD analog shift register. D2 is the zone for separating the standard field of view A from the CCD dark level detecting zone DM. The next 48 bits at A are the zone for the standard field of view. The next 72 bits at IV are the zone for separating the standard field of view A from the reference field of view B. 90 bits at B are the zone for the reference field of view. 6 bits at D3 are dummy bits at the end. Photoelectric conversion signals of the image sensor IS are read out in the direction of arrow P. As for the 12 bits of the CCD dark level detecting zone DM, measures are taken so that the charge stored in the CCD dark level detecting zone DM may not be written in the CCD analog shift register, by eliminating the part of the charge writing shift gate corresponding to the CCD dark level detecting zone DM or by forming a channel stopper therebetween. In this embodiment, as will be described in more detail, detection of the drak current component at the CCD analog shift reigster is accomplished by the signals corresponding to the 12 bits of the CCD dark level detecting zone DM, among the time-serial signals of 240 picture elements from the image sensor IS.

Referring back to FIG. 9, symbol IC2 denotes an analog processing circuit which, in response to the image scanning signals OS and the internal voltage fluctuation signals DOS output from the image sensor IS, performs compensation for the internal voltage fluctuation for the image scanning signals OS and for the CCD dark level, and which encodes the compensated signals into binary signals and discriminates the magnitude of the charge storage time of the image sensor IS. The configuration of the analog processing circuit IC2 is as shown in FIG. 12. As has been described above, the image scanning signals OS and the internal voltage fluctuation signals DOS are output from the image sensor IS; they are input to a differential amplifying circuit DA1 for compensating for the voltage fluctuations. The differential amplifying circuit DA1 takes the difference between the two inputs and produces image signals which are adjusted to compensate for the internal voltage fluctuation noise. The output of the differential amplifying circuit DA1 is then input to a dark holding circuit DHC for holding the CCD dark level. The dark holding circuit DHC detects and holds the CCD dark level based on the signals corresponding to the CCD dark level detecting zone DM. The output of the dark holding circuit DHC is input, together with the output of the differential amplifying circuit DA1, to a differential amplifying circuit DA2 for CCD dark level compensation. The differential amplifying circuit DA2 takes the difference between the two inputs, and outputs image signals which are adjusted for the CCD dark level. The output of the differential amplifying circuit DA2 is then input to the peak detecting circuit PDC which detects and holds a peak level of the signal component corresponding to the standard field of view A of the image sensor IS. The output of the peak detecting circuit PDC is transferred and held at a peak holding circuit PHC after completion of one scanning operation of the image sensor IS, that is, after the read-out of signals corresponding to the 240 picture elements from the image sensor IS. The output of the peak holding circuit PHC is input to a slice level determination circuit SLC for determining the slice level SL as a reference for encoding of data into binary data. The output of the peak holding circuit PHC is multiplied at this slice level determination circuit SLC by a suitable coefficient smaller than 1 (e.g., 0.8), and the multiplication product is input, as the slice level for encoding of data into binary data, together with the output of the differential amplifying circuit DA2, to a comparator CP1 for encoding into binary data. The comparator CP1 converts (quantizes) the signals above the slice level SL into signals of logic value "1" and signals of less than the slice level SL into signals of logic value "0", and outputs binary image data DV. The output of the peak holding circuit PHC is also input to a window comparator CP2 for discriminating the storage time, together with a predetermined upper limit reference voltage VMAX and a predetermined lower limit reference voltage VMIN from a reference voltage setting circuit RC. The window comparator CP2 discriminates the magnitude of the storage time of the image sensor IS. When the output of the peak holding circuit PHC exceeds the upper limit reference voltage VMAX, the window comparator CP2 makes an output ITO high level and an output ITU low lvel. When the output of the peak holding circuit PHC is less than the lower limit reference voltage VMIN, the window comparator CP2 makes the output ITU high level and the output ITO low level. In other cases, both the outputs ITO and ITU are made low level. In this context, the output ITO of high level alone means a too-long storage time, and the output ITU of high level alone means a too-short storage time. Outputs ITO and ITU both of low level mean that the storage time is appropriate. Symbols C4, C5, and C6 represent holding capacitors of the dark holding circuit DHC, the peak detecting circuit PDC, and the peak holding circuit PHC, respectively. Symbol R13 denotes a resistor for setting a slice level coefficient for the slice level determination circuit SLC. The output voltage Vcc1 from the DC-DC converter DCC is supplied to the differential amplifying circuit DA1 for voltage fluctuation compensation and the output voltage Vcc2 is supplied to other circuits in the circuit of the configuration as described above. The dark holding circuit DHC, the peak detecting circuit PDC, and the peak holding circuit PHC are all sampling and holding circuits of constant current charging type. In order to achieve the functions as described above, during read-out of the output of the image sensor IS, the camera control circuit IC1 supplies control signals as shown in FIG. 13 to the dark holding circuit DHC, the peak detecting circuit PDC, and the peak holding circuit PHC. DR is a dark reset signal supplied to the dark holding circuit DHC. The dark resetting signal DR becomes high level until the read-out of the signals from the initial dummy bits D1 is completed during the read-out of the output of the image sensor IS. When the resetting signal DR is of high level, the capacitor C4 for the dark holding circuit DHC is reset, that is, the holding value is cleared. DD is a dark detecting signal supplied to the dark holding circuit DHC. The dark detecting signal DD becomes low level only in the period corresponding to the CCD dark level detecting zone DM during readout of the output from the image sensor IS. When the dark detecting signal DD is of low level, the dark holding circuit DHC detects the peak level of the output from the differential amplifying circuit DA1 supplied during this period, and holds the detected peak level as the CCD dark level in the capacitor C4. PR is a peak resetting signal supplied to the peak detecting circuit PDC. The peak resetting signal becomes high level until the read-out of the signals from the separating zone D2 is completed during the read-out of the output from the image sensor IS. When the resetting signal PR is of high level, the peak detecting circuit PDC resets the capacitor C5, that is, clears its holding value. PD is a peak detecting signal to be supplied to the peak detecting circuit PCD. The peak detecting signal PD becomes low level only in the period corresponding to the standard field of view A during the readout of the output from the image sensor IS. In response to the peak detecting signal PD, the peak detecting circuit PDC detects the peak level of the output from the differential amplifying circuit DA2 and holds the detected value in the capacitor C5. SR is a sampling and resetting signal to be supplied to the peak holding circuit PHC. The sampling and resetting signal SR becomes high level only for a predetermined period when the read-out of the output from the image sensor IS is completed. When the sampling and resetting signal SR is of high level, the peak holding circuit PHC resets the capacitor C6, that is, clears its holding value. Finally, SHD is a sampling and holding signal to be supplied to the peak holding circuit PHC. The sampling and holding signal SHD becomes low level only for a predetermined period after the sampling and resetting signal SR becomes low level. When the sampling and holding signal SHD becomes low level, the peak holding circuit PHC stores the output from the peak detecting circuit PDC and holds this value at the capacitor C6. As may be seen from this, the comparator CP1 converts the image signals obtained in the current scanning operation according to the slice level SL based on the peak level of the signal component for the standard field of view A in the preceding scanning operation.

Instead of the configuration of the analog processing circuit IC2 described hereinabove, the configuration of the analog processing circuit disclosed in U.S patent application Ser. No. 25,544 (German Patent Application No. P29 12 453.6: G79 08 940.0) or U.S. patent application Ser. No. 121,690 (German Patent Application No. P30 07 390.9: G80 05 277.3) of the present assignee may alternatively be directly adopted.

The shift pulse SH and the charge clear signal ICG to be supplied to the image sensor IS are the output from the camera control circuit IC1 at timings as shown in FIG. 13. Time T (equal to the low level period of the clear signal ICG in this embodiment) from the trailing edge of the high-to-low level part to the clear signal ICG to the trailing edge of the shift pulse SH is the charge storage time of the image sensor IS. The camera control circuit IC1 controls the time T based on the high or low level of the storage time discrimination outputs ITO and ITU from the analog processing circuit IC2, such that the output of the peak holding circuit PHC may fall within the predetermined voltage range defined by the upper limit reference voltage VMAX and the lower limit reference voltage VMIN.

The binary image data DV output from the analog processing circuit IC2 is input to the distance measurement computation part in the camera control circuit IC1 which detects the object distance based on the binary image data DV. The distance detection in this case will now be briefly described.

In the manner described above, the binary image data output from the analog processing circuit IC2 is supplied to a shift register for storing data at the distance measurement computation part to be stored therein. One 48-bit shift register (SR0) for the standard field of view A, and one 48-bit shift register (SR1), and one 42-bit shift register (SR2) for the reference field of view B are used as the shift register for storing data. The identity or non-identity of the 48-bit data for standard field of view stored in the shift register SR0 and the 48-bit data for reference field of view (I) stored in the shift register SR1 is discriminated bit-by-bit through an exclusive OR gate EOG. Coincidence pulses output from a pulse generator PG are counted by a counter CNT for counting the number of coinciding bits.

When this counting is completed, the data of the reference field of view (I) stored in the shift register SR1 is shifted to the right by one bit, and the data at the rightmost bit of the reference field of view (II) stored in the shift register SR2 is stored in the leftmost bit of the shift register SR1. After this operation, identity or non-identity of the 48-bit data of the standard field of view stored in the shift register SR0 and the 48-bit data of the reference field of view (I) stored in the shift register SR1 is discriminated, and the number of coinciding bits is counted. For achieving the one-bit shift of the data, a 6-bit circulation delay (bypass) shift register is provided in the data circulation bus of the shift register SR0, and a 5-bit circulation delay (bypass) shift register is provided in the data circulation bus of the shift register SR1, such that the data stored in the shift register SR1 may be relatively advanced by one bit after each circulation of the data stored in the shift register SR0, and the data at the rightmost bit of the shift register SR1 may be stored in the leftmost bit of the shift register SR1.

This operation is repeated until each bit of data of the reference field of view (II) stored in the shift register SR2 is stored once in the leftmost bit of the shift register SR1. Then the coincidence detection is terminated. Through this operation, the maximum number of coincident bits and the relative shift number of the reference fields of view (I) and (II) when this maximum value is obtained are counted (this is performed by other counters). In the ideal case, the maximum number of coincident bits is "48". Since the image of the standard field of view A correlates with the image of the standard field of view B when the number of coincident bits is maximized, the shift amount at this time is the distance data corresponding to an infinite object distance.

The operation as described above may be as shown in FIG. 15.

When the maximum number of coincident bits is obtained at the postion (a), the shift amount is "0" and the obtained distance corresponds to infinite object distance. In contrast with this, when the maximum number of coincident bits is obtained at the position (b) or (c), the distance may be toward the closest side by 24 bits or 42 bits, respectively.

The distance D may be given as $$D = (L \times F)/\lambda \times N)$$

where L is the base length as described with reference to FIG. 10, F is the focal length of the distance measuring lenses LB and LR, λ is the spacing (pitch) of one bit of the photosensors in the image sensor IS, and N is the shift amount described above.

The distance measurement computation part in the camera control circuit IC1 performs the processing as described above to calculate the distance data.

Although all of the bits are involved in providing the maximum number of coincident bits and hence the distance data, which preferably corresponds to 48 bits of the standard field of view in coincidence, it is less probable in practice that all the data coincide due to factors such as errors in the optical systems, quantizing errors of data and so on. When the maximum number of coincident bits is very small, the reliability of the obtained distance data is very low. For this reason, in this embodiment, only distance data obtained with the maximum number of coincident bits above "45" is considered reliable.

As may be seen from the above, the distance data thus obtained corresponds to a zone of 43 steps starting from the bit of infinite distance, "0", to the closest, "43". However, in actual lens control, the photographic lens 4 is gradually displaced toward the position corresponding to infinite distance from a predetermined reference position "0" while the pulses from the pulse plate PC are counted as has been described with reference to FIG. 3. Therefore, the obtained distance data must be converted to data suitable for such control.

Therefore, in this embodiment, the data is converted into control data as shown in FIG. 16, wherein the obtained distance data "32" and above are "0" and the data "31" or less are complement-converted, so that the reference position is "0" and the infinite distance is "31".

In the case of the flash pop, the distance data "0" to "4" are arbitrarily turned into "5" and then converted into the control data "26" since they exceed the allowable distance for flash photography.

Referring back to FIG. 9, IC3 shown at the right corner of the figure is an exposure system circuit which has the functions of determination of exposure, discrimination of camera shake, battery voltage discrimination, and energizing of an electromagnetic coil SCL (hereinafter referred to as a shutter coil) of the electric shutter 6 (FIG. 1) described with reference to FIGS. 4 and 5. The configuration of the exposure system circuit IC3 is as shown in FIG. 17. Referring to FIG. 17, SPC denoted a photometric photosensor which is so arranged as to receive the light from the object through the opening of the auxiliary aperture operating in cooperation with the shutter blades of the electric shutter 6 described with reference to FIGS. 4 and 5. LMC is a photometric integrating circuit which integrates the output of the photosensor SPC in response to an integration control signal LBC (a logic signal of high or low level; the high level corresponds to an integrating command and the low level corresponds to an integration interrupting command) of high level from the camera control circuit IC1. CP3 is an exposure determination comparator which receives the output of the photometric integrating circuit LMC and a predetermined reference voltage Vref1 set in a reference voltage setting circuit RVC as a suitable exposure. The exposure determination comparator CP3 outputs a signal of low level when the output of the photometric integrating circuit LMC is lower than the reference voltage Vref1, and a signal of high level when the output of the photometric integrating circuit LMC has reached the reference voltage Vref1. CP4 is a camera shake discrimination comparator which receives the output of the photometric integrating circuit LMC and a predetermined reference voltage Vref2 set in the reference voltage setting circuit RVC as a reference for discriminating camera shake. The camera shake discriminating comparator CP4 outputs a signal of low level when the output of the photometric integrating circuit LMC is less than the reference voltage Vref2, and a signal of high level when the output of the photometric integrating circuit LMC has reached the reference voltage Vref2. CP5 is a battery voltage discrimination comparator which receives a potential BC at a voltage-dividing point of voltage-dividing resistors R11 and R12 connected in series with a power source battery E shown in FIG. 9. CP5 also receives a predetermined reference voltage Vref3 set in the reference voltage setting circuit RVC as a reference for discriminating the battery voltage. The battery voltage discrimination comparator CP5 outputs a signal of high level when the divided potential BC is greater than the reference voltage Vref3, and a signal of low level when the divided potential BC is less than the reference voltage Vref3. G1 is an AND gate which receives the output of the exposure determination comparator CP3, the integration control signal LBC from the camera control circuit IC1, and a shutter control signal SST (a logic signal of high or low level; high level corresponds to a shutter opening command, that is, an energizing command to the shutter coil SCL, and low level corresponds to a shutter closing command, that is, a de-energizing command to the shutter coil SCL). The AND gate G1 produces an output of high level when all these three inputs are of high level. G2 is an AND gate which receives the output of the camera shake discrimination comparator CP4, the integration control signal LBC, and an inverted signal of the shutter control signal SST and produces an output of high level when all these three inputs are of high level. G3 is an AND gate which receives the output of the battery voltage discrimination comparator CP5, the inverted signal of the integration control signal LBC, and the shutter control signal SST and produces an output of high level when all these three inputs are of high level. G4 is an OR gate which takes an OR product of the outputs of the AND gates G1, G2 and G3 and the output of the OR gate G4 is fed back to the camera control circuit IC1. OA denotes an operational amplifier which controls the base potential of the shutter coil energizing control transistor TR2, so that the current flowing to the shutter coil SCL for energizing it may become substantially constant. The operational amplifier OA receives the potential at the voltage-dividing point of resistors R'1 and R'2 receiving the emitter current of the transistor TR2, and a predetermined reference voltage Vref4 set in the reference voltage setting circuit RVC and determined with reference to the temperature coefficient of the shutter coil SCL. Output SE of OA controls the base potential of the transistor TR2. As may be represented by the switch in the figure, the operational amplifier OA has its own switching characteristics, so that it may start operating in response to the shutter control signal SST of high level from the camera control circuit IC1.

The exposure system circuit IC3 is constructed as described hereinabove. For the battery check (which includes checking under the actual load plus the dummy load as well as checking under the actual load alone, as will be described below), the camera control circuit IC1 keeps the integration control signal LBC low level while repeatedly making the shutter control signal SST high level for a period which is short enough that the shutter 6 does not open, but is long enough that the power source voltage VE is lowered and atabilized upon application of the load. Therefore, in the exposure system circuit IC3, the AND gate G3 selects the output of the battery voltage discrimination comparator CP5. This output is fed back to the camera control circuit IC1 as a battery voltage discrimination output (LB) through the AND gate G3 and the OR gate G4. Based on the discrimination output LB, if it is of high level at this instant, the camera control circuit IC1 controls the sound output part 14 to produce the sound indicative of sufficient power source voltage VE. For camera shake discrimination (low luminance discrimination), the camera control circuit IC1 keeps the shutter control signal SST low level while repeatedly making the integration control signal LBC high level for a predetermined period of time. Therefore, in the exposure system circuit IC3, the photometric integrating circuit LMC integrates the output of the photosensor SPC for the above-mentioned predetermined period of time. At the same time, the AND gate G2 selects the output of the camera shake discrimination comparator CP4, which is fed back to the camera control circuit IC1 as a camera shake discrimination output (LB) through the AND gate G2 and the OR gate G4. Based on the discrimination output LB, if it is of low level at this instant, the camera control circuit IC1 controls the sound output part 14 to produce a sound alarm indicative of the danger of camera shake due to low luminance. Finally, for shutter control, the camera control circuit IC1 makes the shutter control signal SST high level. Thereafter, the camera control circuit IC1 makes the integration control signal LBC high level with the auxiliary aperture condition fully open. Therefore, in the exposure system circuit IC3, the photometric integrating circuit LMC integrates the output of the photosensor SPC. The AND gate G1 selects the output of the exposure determination comparator CP3, which is fed back to the camera control circuit IC1 as an exposure discrimination output (LB) through the AND gate G1 and the OR gate G4. Based on the discrimination output LB, when it changes from low level to high level, the camera control circuit IC1 makes both the integration control signal LBC and the shutter control signal SST low level to interrupt the integrating operation of the photometric integrating circuit LMC as well as to de-energize the shutter coil SCL. As has already been described, in response to the shutter control signal SST of high level from the camera control circuit IC1, the operational amplifier OA in the exposure system circuit IC3 operates, the output of which renders the transistor TR2 conductive. Therefore, the shutter coil SCL is energized by the substantially constant current.

Referring back to FIG. 9, SW9, SW10 and SW11 are three battery check switches which are arranged so as to be turned on upon the operation of the battery check button 13 (FIG. 1). The first battery check switch SW9 in connected in parallel with the first switch SW1. The second battery check switch SW10 is so arranged that, when it is turned on, a dummy load resistor R10 may be connected to the power source battery E in parallel with the voltage-dividing resistors R11 and R12 for battery voltage check. The third battery check switch SW11 is so arranged that, when it is turned on, the power-up clear terminal PU of the camera control circuit IC1 may be dropped to the GND level. C9 is a capacitor for power-up clear which is connected to the power-up clear terminal PU. UMB is a piezoelectric buzzer as a sound output means in the sound output part 14 (FIG. 1), which is connected to an alarm signal output terminal BZ of the camera control circuit IC1. SW8 is a self-timer switch which is operated by the self-timer switch operation button 11 (FIG. 1) described hereinabove and which is connected to the self-timer terminal SELF of the camera control circuit IC1. XL is a quartz oscillator for clock pulse generation, which is connected between clock pulse generator terminals CG1 and CG2 of the camera control circuit IC1. The terminal SC of the camera control circuit IC1 is a terminal for checking disconnections in the shutter coil SCL. L1 and L2, and C2, C3, C7 and C8 are coils and capacitors, respectively, constituting an $\pi$ type filter at the output side of the DC-DC converter DCC. SW6 is the first flash pop switch described with reference to FIG. 8, which is arranged in the supply path between the power source battery E and the electronic flash 12. TR7 and TR8 are charging control switching transistors for the electronic flash 12. The transistor TR7 is arranged in the supply path to the electronic flash 12 as shown in the figure. The transistor TR8 is arranged in the base circuit of the transistor TR7. The base of the transistor TR8 is connected to the base of the transistor TR1. Therefore, when the transistor TR1 is under the non-conductive condition with its base at high level, and when the first flash pop switch SW6 is turned on, the transistor TR8 is rendered conductive so that the transistor TR7 is rendered conductive to charge the electronic flash 12. Therefore, in the pop mode, the electronic flash 12 is charged except when the battery check is performed as the battery check switches SW9, SW10 and SW11 are turned on, or when the camera is in operation in response to the closure of the first switch or the output of high level from the power maintaining signal output terminal PH of the camera control circuit IC1, R5 and R6 denote resistors.

This embodiment is of the same configuration as that described with reference to FIGS. 2, 3, 6, 7, and 8 except for the points described above. As may be seen from the above description, the main part of the camera is the camera control circuit IC1, and the configuration of this circuit will be described hereinafter.

The construction of the camera according to this embodiment is as has been described above. However, the operation of this camera is controlled according to a sequence consisting of a plurality of status modes and the mode of sequence control will now be described.

The camera first has fourteen statuses CC0 to CC13. The mode of control in each status is as shown in Table 1 below.

TABLE 1

| Status Name | Control Mode | Control Condition |
| --- | --- | --- |
| CC0 | Initial mode | Initialization of camera control circuit IC1 and battery check (Sound output) |
| CC1 | Initial check mode | Shutter electromagnet disconnection check, battery |

TABLE 1-continued

| Status Name | Control Mode | Control Condition |
|---|---|---|
| | | check, winding completion/incompletion check and AF reset |
| CC2 | Distance measuring discrimination mode | Check for on/off of second switch SW2, low luminance check (camera shake discrimination) and AF reset completion check |
| CC3 | Storage mode | Storage time control of image sensor IS |
| CC4 | Read-out mode | Writing of image data from image sensor IS through analog processing circuit IC2, and slice failure discrimination |
| CC5 | Distance measuring processing mode | Calculation of distance data by processing of image data, and conversion of distance data into control data |
| CC6 | Sequence discrimination mode | Selective execution of each sequence of AF, self-timer and lens control after turning on second switch SW2 |
| CC7 | Self-timer counting mode | Time counting by self-timer (Sound output) |
| CC8 | Lens control mode | Positioning of photographic lens 4 under the control of magnets STMG and AFMG according to lens control data |
| CC9 | Shutter control mode | Supply of control signal to exposure system circuit IC3 and supply of trigger signal to trigger circuit of flash 12 |
| CC10 | Winding mode | Energizing of winding motor M to wind the film |
| CC11 | Winding completion mode | After normal winding operation, this mode is entered. if not in electronic flash photography mode, return to CC0. |
| CC12 | Alarm mode | In the case of wind-up trouble, this mode is entered. Sound alarm over a predetermined period of time |
| CC13 | Defect mode | In the case of shutter disconnection, low battery voltage, and defective magnets STMG and AFMC, this mode is entered. |

Although the content of control in each status will now be briefly described, the details will not be described until later.

The battery check in status CC0 (initial mode) will first be described. This battery check is performed by operating the battery check button 13. The battery check button 13 serves to turn on the first battery check switch SW9 for turning on the power source connected in parallel with the first switch SW1 which is turned on at the first stroke of the shutter release button 1, the second battery check switch SW10 for connecting the dummy load resistor R10, and the third battery check switch SW11 for placing the camera control circuit IC1 under the power-up clear condition. Therefore, the battery check is performed in this case under the condition that all the circuits (excluding the motor M) which are supplied with electric power are in normal operation of the camera, the dummy load is inserted as the resistor R10, and the camera control circuit IC1 is under the power-up clear condition, that is, under the condition in which the operation sequence is forcibly interrupted.

The purpose of the battery check is to check whether or not there is sufficient battery voltage available to guarantee the normal operation of the camera. This voltage is related to the degree of importance of the load and the current drawn. In the camera of this embodiment, the loads with the largest relative current consumption in the operation sequence are firstly, the winder motor M, and secondly, the shutter 6. However, from the viewpoint of importance for achieving photography with current exposure, the shutter 6 is of prime importance.

In this embodiment, it is checked whether or not the voltage VE of the battery E for energizing the shutter coil SCL exceeds the voltage necessary for exposure control by application of the dummy load, the resistor R10. For this purpose, in response to the shutter control signal SST from the camera control circuit IC1, the shutter coil SCL is energized for a period of time which is short enough that the shutter blades are not opened but is long enough that the voltage of the battery E is lowered and stabilized upon application of the load. The voltage VE of the battery E at this instant is checked by the battery voltage discrimination comparator CP5 in the exposure system circuit IC3. This battery check is repeatedly performed at constant intervals. The detection result is supplied to the camera control circuit IC1. When the battery voltage is sufficient, a sound indication is produced by the piezoelectric buzzer UMB.

Status CC1 (initial check mode) will now be described. When the shutter coil SCL is disconnected, the shutter 6 naturally does not operate. In the camera of this embodiment, the shutter 6 operates independently of the mechanical sequence including the mechanical constraining mechanism. For this reason, even when the shutter 6 does not operate, the camera performs the lens control and winding operations. Thus, the film is not exposed, and this will only become apparent after development.

In order to solve these problems, the shutter coil SCL is checked for disconnections immediately before the start of each sequence. More specifically, the detection of disconnections in the shutter coil SCL is performed utilizing the following fact. The resistance of the shutter coil SCL is only about 3Ω. Even when a current of 1 to 2 mA flows, the terminal voltage of the coil becomes only about 5 mV, which is substantially the GND level. On the contrary, when the shutter coil SCL is disconnected, the resistance becomes substantially infinite, so that the terminal voltage of the coil becomes high.

In practice, a resistor R14 of about 20 KΩ is connected in parallel with the shutter coil SCL as shown in FIG. 18. Therefore, the check for disconnections is performed by applying a voltage of VDD (Vcc2) level from disconnection check terminal SC of the camera control circuit IC1 through a resistor R'3 of about 5 KΩ. The disconnection may be appropriately checked utilizing the VTH (threshold level) of a C-MOS since the voltage at the terminal SC becomes 4/5 VDD in the case of the disconnection of the shutter coil SCL. When a disconnection in the shutter coil SCL is confirmed to exist, the sequence enters the defect mode (status CC13). In FIG. 18, B1 and B2 are buffers.

As has been described, in the camera of this embodiment, the battery check is performed by operating the battery check button 13. When the battery voltage has dropped, this is signaled by no sound output being produced so that the normal operation may not be performed due to the low battery voltage. However, the battery check is not performed before taking every photograph. Therefore, if the battery check is performed only manually, photographs may be taken without the low battery voltage being noticed.

In order to solve this problem, the battery check is automatically performed by applying an actual load immediately before the sequence starts. When the battery voltage is detected to be too low, the sequence enters the defect mode (status CC13).

This automatic battery check is performed in a similar manner as the manual battery check described with reference to the status CC0, except that the dummy load of the resistor R10 is not applied, but an actual load is applied instead. In response to the shutter control signal SST from the camera control circuit IC1, the shutter coil SCL is energized for a very short period of time. The voltage VE of the battery E of the exposure system circuit IC3 at this instant is detected by the battery voltage discrimination comparator CP5. The detection result is discriminated by the camera control circuit IC1. When the battery voltage is too low, the sequence enters the defect mode (status CC13).

As in the case of a disconnection in the shutter coil SCL, the entire sequence of the camera is halted and the defect mode is entered. In this case, the diagnosis is the same as the case of a disconnection in the shutter coil SCL. However, these two different cases may be differentiated by operating the battery check button 13. When the sound output indicating that the battery voltage is sufficient is obtained, the camera is defective and requires repair. When this sound output is not obtained, the battery must be replaced with a new one.

In the camera of this embodiment, as has already been described, the winding completion detection switch SW5 is switched between the terminals A and B based on the winding condition of the film and the operating condition of the start magnet STMG. When the camera sequence is effected when the switch SW5 is not at the winding completion side, that is, at the side of the terminal B, exposure is made outside the frame. This results in overlapping of the frames or the like. Therefore, in the camera of this embodiment, discrimination of complete or incomplete winding is performed immediately before the camera sequence starts. When the winding is incomplete, the sequence proceeds to the winding mode (status CC10), and the winding is performed until it is completed.

This winding operation is performed without maintaining the power source regardless of whether the shutter release button 1 is depressed to the first or second stroke. Therefore, during the winding operation, the shutter release button 1 must be kept depressed. This will prevent energizing of the winding motor M for a long period of time, as in the case of the normal sequence of the camera, in the event that the incomplete winding condition is caused by tension at the film end.

This feature is also utilized for idle winding for indexing of the film immediately after replacing the film. The idle winding of the film by operation of the shutter release button 1 is enabled by mechanically holding the switch SW5 at the incomplete winding side, that is, at the side of the terminal A until the film counter reaches "0".

Status CC2 (distance measuring discrimination mode) will now be described.

In the camera of this embodiment, luminance level discrimination for the camera shake alarm is performed for every distance measuring operation, except during the flash pop. When the luminance of the object is so low as to necessitate the use of the flash 12 for photography, the camera shake alarm sound is generated.

As has been described hereinbefore, the auxiliary aperture operating in cooperation with the shutter blades has a small opening when the shutter blades are fully opened. The amount of incident light at this instant is integrated by the photosensor SPC and the photometric integrating circuit LMC in the exposure system circuit IC3. A command for integration is supplied as the integration control signal LBC from the camera control circuit IC1 as shown in FIG. 19. The integration result is compared with the reference level Vref2 for detection of camera shake by the camera shake discrimination comparator CP4 in the exposure system circuit IC3. The comparison result is fed back to the camera control circuit IC1. Based on this result, when the discrimination output LB is low, that is, when the luminance level is low, the sound output signaling the danger of camera shake is produced by the piezoelectric buzzer UMB.

This camera shake alarm vanishes when the shutter release button 1 is depressed to the second stroke and the power source is maintained.

Status CC3 (storage mode), status CC4 (read-out mode), and status CC5 (distance measuring mode) will now be described.

The distance measuring operation by the distance measuring computation part in the camera control circuit IC1 will be described in detail, in which three steps are fundamentally required for distance measurement. The first step is the step of storing at the image sensor IS data on the images of the object for a period of time which is determined by the luminance level of the object (storage mode status CC3). The next step is the step of converting the image signals, that is, the scanning signals obtained from the image sensor IS, into binary image data at the analog processing circuit IC2 and for storing the binary image data in shift registers SR0, SR1 and SR2 at the distance measuring computation part of the camera control circuit IC1 described with reference to FIG. 14 (read-out mode status CC4). The third step is the step of processing the binary image data stored in the shift registers SR0, SR1, and SR2 into data on the distance to the object (distance measuring processing mode status CC5).

Although it was not mentioned hereinabove, in the second step, that is, the status CC4 among the three steps, a judgment (a slice failure discrimination to be described later) is made as to whether or not the binary image data taken in the distance measuring computation part of the camera control circuit IC1 is converted into binary data appropriate for distance detection. When the binary data is detected to be inappropriate (slice failure), the third step, that is, the status CC5, is not performed and the sequence returns to the status CC3.

In a similar manner, if the storage time in the first step is inappropriate, it is switched over and the slice level appropriate for conversion of the image data into the binary image data is determined. In the third step, if the distance data obtained as a result of the computation of the binary image data is inappropriate, the distance measurement output is not produced and the output of fixed point data is produced. This fixed point is defined as the point between the closest and the infinite distance at which blurring of the photograph is minimized; it differs depending upon whether or not the flash is used.

When the distance measurement output is produced in the third step, the zone indication described hereinbefore is effected in the finder by one of light-emitting diodes LD1, LD2 and LD3, to signal the distance measurement result. When the distance measurement result is not produced in the third step, the sequence returns to the first step to perform another distance measuring operation.

A judgment is made as to whether or not the second switch SW2 is operated by the second stroke of the shutter release button 1 immediately before executing the first step. If the shutter release button 1 is not depressed to the second stroke, the camera shake discrimination as described with reference to the status CC2 is performed first, and the first step of distance measurement is performed. In the flash pop, the camera shake discrimination is not performed after the shutter release button is depressed to the second stroke and the sequence enters the first step. When the distance measurement output is produced in the third step of distance measurement, the next operation is determined depending upon whether or not the self-timer has been set. If the self-timer is not set, a subsequent distance measuring operation is not performed. Instead, the judgment concerning the second stroke of the shutter release button and the camera shake discrimination are alternately performed. If the self-timer is set, the continuous distance measuring operation is performed wherein the zone indication is changed when a new distance measurement is obtained.

Status CC6 (sequence discrimination mode) will now be described.

Whether or not the second switch SW2 has been operated in cooperation with the second stroke of the shutter release button 1 is repeatedly determined during the distance measuring operation and after compeltion of the distance measuring operation. When the shutter release button has been depressed to the second stroke, the power source is maintained and the status CC6 (sequence discrimination mode) is entered.

Whether or not the self-timer has been set is first determined. If the self-timer has not been set, a judgment is then made as to whether or not the distance measurement result is produced in the preceding distance measuring operation, that is, status CC5. If the distance measurement result is detected to have been output, a lens control mode (status CC8) is entered. On the other hand, if the distance measurement result has not been output, the distance measuring operation is repeated until it is obtained. However, the distance measurement result may sometimes not be obtainable regardless of how many times the distance measuring operations are made in the case of an object with which the distance measurement is difficult. Therefore, a limiting number is set for the distance measurement operation. The limiting number is variable according to the storage time of the image sensor IS upon depressing the shutter release button 1 to the second stroke. When the distance measurement result is produced or the number of distance measurement operations reaches the limiting number, the lens control mode (status CC8) is entered.

In contrast with this, when the self-timer has been set, a self-timer counting mode (status CC7) is entered immediately after the status CC6 (sequence discrimination mode) to start the counting operation with the self-timer. If the counting of the self-timer is terminated, even when the distance measurement result is produced before the second stroke of the shutter release button 1, it is cancelled and a new distance measuring operation is performed. When the distance measurement result is produced or the number of distance measuring operations reaches the limiting number (7 times, in the case of this embodiment), the lens control mode (status CC8) is entered.

Status CC7 (self-timer counting mode) will now be described.

When the self-timer is detected to have been set when the sequence discrimination mode (status CC6) is entered after the shutter release button 1 has been depressed to the second stroke, counting by the self-timer is initiated. During this counting of the self-timer, the sound for the self-timer indication is produced by the piezoelectric buzzer UMB. The self-timer indication is accomplished with a sound of 2 kHz at a frequency of 1.3 Hz for the first 7.5 seconds and this sound at a frequency of 5.2 Hz for the remaining 2.5 seconds.

When the set time of the self-timer is released during operation of the self-timer, the maintenance of the power source is released and the sequence returns to the initial check mode (status CC1).

Status CC8 (lens control mode) will now be described.

In the camera of this embodiment, a discrimination of prohibiting conditions is made at the first stroke of the shutter release button 1. The current consumption at the first stroke of the camera is not very small, and the first stroke may be kept depressed. Therefore, the battery may be depleted during this time. The time in the camera sequence for checking prohibiting conditions without wasting film is immediately before performing the lens control.

In view of this, a battery check by application of an actual load is also performed immediately before the lens control, so that the sequence may enter the defect mode (status CC13) if the battery voltage is too low.

Since this operation is the same as the battery check operation in the status CC1 (initial check mode), the description thereof will be omitted.

The photographic lens 4 is moved to the in-focus position or to the fixed point described above according to the lens control data (including the fixed point data when distance measurement cannot be performed) obtained by the distance measuring operation in the status CC5 (distance measuring mode). For this purpose, the start magnet STMG is energized to be demagnetized in order to release the photographic lens 4 which is biased by the spring SP1 and is held by the magnetic force of the start magnet STMG. Simultaneously, the automatic focusing magnet AFMG is energized to ensure that the stopper ST may not be caught in a first pawl 5'a (hereinafter referred to as a disconnection detection stop pawl) of the lens mirror cylinder 5. The release of the photographic lens 4 is not performed if the coil of the stop magnet STMG is disconnected. If the coil of the automatic focusing magnet AFMG is disconnected, the stopper ST is caught in the disconnection detection stop pawl 5'a so that the photographic lens 4 is stopped without displacement. In this case, since pulses are not produced by the pulse plate PC which normally generates pulses in synchronism with the displacement of the photographic lens 4, a disconnection in the coil of either of the magnets STMG and AFMG may be detected. As a result, the sequence advances to the defect mode (status CC13).

When both of the magnets STMG and AFMG are normal and the stopper ST passes over the disconnection detection stop pawl 5'a after the release of the photographic lens 4, the pulse plate PC generates pulses. Thus, it is detected that the photographic lens 4 began to be displaced from the closest toward the infinite distance. From this point, the pulses output from the pulse plate PC are counted and the count data is compared with the lens control data. When the count data coincides with the lens control data, the magnets STMG and AFMG are de-energized and the stopper ST is caught in the stop pawl 5a of the lens mirror cylinder 5. The photographic lens 4 is thus stopped at the position corresponding to the lens control data.

When the photographic lens 4 reaches the position corresponding to the infinite distance after being released, the count of the pulses from the pulse plate PC becomes the full count of the lens control data. Therefore, the magnets STMG and AFMG are de-energized during the displacement of the photographic lens 4 from the closest to the infinite distance position. However, when there has been a count error or the lens is caught by some mechanism, the magnets STMG and AFMG are de-energized and the camera stops operating while the power is maintained. In order to solve this problem, the lens control is time-limited by the timer. When the count data does not reach the lens control data after a predetermined period of time has elapsed after the magnets STMG and AFMG are energized, the next sequence step is initiated.

Status CC9 (shutter control mode) will now be described.

As has already been described, if the start magnet STMG is energized and the photographic lens 4 is released in the status CC8, the winding completion detection switch SW5 is switched from the complete winding side, that is, the side of the terminal B, to the incomplete winding side, that is, the side of the terminal A. If this is not accomplished under normal conditions, winding after the next shutter operation becomes impossible, resulting in multiexposure of the same frame of the film.

It is thus necessary to check if the winding completion detection switch SW5 has really been switched to the side of the terminal A after the completion of the lens control by energizing the start magnet STMG. This is performed after a predetermined period of time has elapsed after the lens control mode (status CC8) is completed. This is because, if this is checked at the same moment when the magnets STMG and AFMG are de-energized, the switch SW5 may not yet be switched to the side of the terminal A, so that some extra time must be considered. Furthermore, the time required for stabilization of the photographic lens 4 after the lens control is completed must also be considered.

If the switch SW5 is not switched to the side of the terminal A, the sequence enters the defect mode (status CC13) wherein no operation is performed so that the operator may recognize this as a camera defect.

After the start magnet STMG is energized, it is judged whether or not the winding detection switch SW5 is switched to the side of the terminal A. If the switch SW5 has been switched to the side of the terminal A, the shutter coil SCL of the electric shutter 6 is energized. As a result of this, as has been described with reference to FIGS. 4 and 5, the shutter gradually opens from the state where the blades overlap. The auxiliary aperture which is operative in cooperation with the shutter blades is first closed when the shutter blades overlap on each other, and gradually opens as the shutter blades open. The auxiliary aperture reaches its maximum opening immediately before the shutter blades are fully opened, and has an opening half that of the maximum opening when the shutter blades are fully opened.

For the purpose of the shutter control, the shutter coil SCL of the electric shutter 6 must be energized. This is accomplished by feeding a substantially constant current to the shutter coil SCL by output SE of the exposure system circuit IC3, based on the shutter control signal SST supplied to the exposure system circuit IC3 from the camera control circuit IC1. After the shutter coil SCL is energized, the auxiliary aperture is fully closed. At the timing of this full closure, the camera control circuit IC1 supplies an integration control signal (LBC) to the photometric integrating circuit LMC in the exposure system circuit IC3. Thereafter, the auxiliary aperture gradually opens as the shutter blades are opened. The amount of light incident on the auxiliary aperture is integrated by the photosensor SPC and the photometric integrating circuit LMC. The integrated value obtained corresponds to the amount of light on the film surface. Therefore, by comparing the integrated value with the reference level Vref1 for determining the exposure at the exposure determination comparator CP3 in the exposure system circuit IC3, the judgment is made as to whether or not the opening is sufficient for providing the appropriate exposure.

The output of the comparator CP3 is supplied to the camera control circuit IC1 which, based on this result, releases the shutter control signal (SST) and the integration control signal (LBC). When the shutter control signal (SST) is released, the exposure system circuit IC3 interrupts the energizing of the shutter coil SCL of the electric shutter 6. The shutter blades finish opening under inertia and close thereafter. In the case of the full opening of the shutter blades, since the opening operation under inertia is regulated by the stopper, the shutter blades are immediately closed.

If the luminance level of the object is extremely low, the integrated value of the amount of incident light, that is, the output of the photometric integrating circuit never reaches the reference level Vref1. In this case, the shutter is opened for an extremely long period of time. Therefore, an exposure will be obtained but the resultant photograph may suffer from camera shake. In order to solve this problem, exposure times longer than 250 msec are rejected.

In the case of the flash pop, the opening of the shutter is regulated by the photographic lens 4 controlled according to the measured distance and the stopper operating in cooperation therewith, such that the appropriate exposure may be attained with the fully operating flash 12. In this case, 16 msec is set for the cutoff time, the time required for fully opening the shutter blades after energizing the shutter coil SCL. The shutter achieves the open position as defined by the stopper during this time period. The light emitting command to the flash 12 is supplied from the camera control circuit IC1 at the same time that the shutter control signal (SST) is released.

Status CC10 (winding mode) will now be described. When the shutter coil SCL is de-energized in the status CC9, the winding mode is entered. When the winding is performed before the shutter blades are fully closed, the image plane may be displaced. Therefore, the winding is performed by energizing the winding motor M after a predetermined period of time has elapsed.

In this winding mode, the winding motor M is energized while the switching over of the winding completion detection switch SW5 is constantly checked. When the switch SW5 is switched to the complete winding side, that is, to the side of the terminal B, the motor M is de-energized and the sequence advances to the subsequent winding completion mode (status CC11).

When there is some wind-up trouble during the winding process such as scratching, film jamming or film tension at the film end, the winding motor M stops while it remains energized and the switch SW5 is not switched to the side of the terminal B. With a wind-up trouble like this, a large current keeps flowing to the winding motor M, resulting in leakage of battery solution or the like. In order to solve this problem, as the winding motor M is energized, the timer is simultaneously started. If the switch SW5 is not switched to the side of the terminal B after 3 seconds has been counted by the timer, this is considered as a wind-up trouble. Then, the motor M is de-energized and the sequence advances to the alarm mode (status CC12).

Status CC11 (winding completion mode) will now be described. When the winding is completed in the previous winding mode (status CC10), this mode is entered. In this mode, the power source is released from maintaining power. If there is no flash pop, the sequence returns to the initial status CC0 (initial mode).

When the shutter release button 1 is kept depressed to the first and second strokes, this camera performs continuous photography.

In the case of flash pop, the sequence remains in this mode as the maintenance of the power source is released. Therefore, the camera takes only one photograph.

Status CC12 (alarm mode) will now be described. When there is wind-up trouble during the winding process as has been described with reference to the previous status CC10, this mode is entered and the piezoelectric buzzer UMB produces a sound alarm for the operator. This alarm continues as long as the operator keeps the shutter release button 1 at the first stroke. If the operator has already released his finger from the shutter release button 1, this alarm is produced for 5 seconds and the maintenance of the power source is released thereafter.

Status CC13 (defect mode) will now be described. As has been described with reference to the previous statuses CC1, CC8 and CC9, the sequence enters the defect mode when there is a problem such as a disconnection in the shutter coil SCL, low power source voltage VE, a disconnection in either of the magnets STMG and AFMG, or non-switching of the winding completion detection switch SW5. In this defect mode, the maintenance of the power source is released. However, if the shutter release button 1 is kept depressed to the first stroke, this mode is sustained so that the camera will not operate.

This defect mo-e is also entered during the idle winding immediately after the mounting of the film, although this does not represent any defect. This regulates the continuous photography operation.

The configuration of the camera control circuit IC1 will be described with reference to FIG. 20. FIG. 20 is a schematic block diagram showing the configuration of the camera control circuit IC1.

Referring to the lower right corner of FIG. 20, CLK-G denotes a timing circuit which outputs clock pulses CP and NCP; other timing pulses CCP, NCCP, ITCP, RSS, and TB0 to TB5; and a power-up clear signal PUC as well as transfer clock pulses $\phi 1$ to $\phi 4$ to be supplied to the image sensor IS, and a resetting pulse RS. CLB is a buffer circuit of the output stage for the transfer clock pulses $\phi 1$ to $\phi 4$ and the resetting pulse RS. CSD is an oscillation interruption detecting circuit which detects if the pulse generated from the timing circuit CLK-G has dropped in frequency due to lower voltage or the like; it effects a system reset in such a case. Referring to the left half of FIG. 20, SL is a status latch circuit for setting the statuses CC0 to CC13 of the system operation. L-C is a status control circuit for controlling the status latch circuit SL. CNT1, CNT2, and CNT3 are counters for operation control or various types of counting in the respective statuses of this system. CNT-C is a counter control circuit for controlling the counters CNT1 to CNT3. PLA1 is a programmable logic array (hereinafter referred to as a decoder) for obtaining decoded output signals according to the conditions of the status latch circuit SL and the counters CNT1 to CNT3. ITC is a storage time control circuit to be used for setting the storage time of the image sensor IS. INITO and INITU are input buffer circuits for writing discrimination outputs ITO and ITU on the length of the storage time from the storage time discrimination comparator CP2 (FIG. 12) in the analog processing circuit IC2. PSR1 is a shift register to which is input the output of the counter CNT2 through the decoder PLA1 to be sequentially output from the lower significant bits according to parallel-in/serial-out. INSW5 is an input buffer circuit in which is written data of the switch SW5 (FIG. 6) operative in synchronism with the winding operation of the film and the displacement of the photographic lens. INLP is an input buffer circuit in which is written the status of a switch (the pulse plate PC and brush BR of FIG. 3) which is turned on and off according to the displacement of the photographic lens 4. INPOP is an input buffer circuit in which is written the status of the switch SW7 (FIGS. 8 and 9) operative in synchronism with the pop of the flash 12. INSELF is an input buffer circuit in which is written the status of the switch SW8 (FIG. 9) operative in synchronism with the set time of the self-timer. INSW2 is an input buffer circuit in which is written the status of the switch SW2 operative in cooperation with the second stroke of the shutter release button 1. INLB is an input buffer circuit in which is written the discrimination output LB from the exposure system circuit IC3 shown in FIG. 3. IOSC is an input/output buffer circuit for disconnection detection of the shutter coil SCL shown in FIG. 9. Referring to the right half of FIG. 20, DVR is an input circuit which receives the binary image data DV from the binary encoding comparator CP1 in the analog processing circuit IC2 and which converts the data into binary signals synchronizable with this system by a synchronizing signal RSS synchronized with the resetting pulse RS to the image sensor IS. SLFD is a slicing failure detecting circuit which detects a slicing failure (inappropriate binary encoding), the state of no effective data when all the writing data in the standard field of view A is "1" or "0" or all the writing data in the reference field of view B is "1" or "0" during data input through the input circuit DVR. SR0 is a dynamic shift register for storing the part of the binary image data DV written through the input circuit DVR which corresponds to the standard field of view A. SR00 is a bypass register of the dynamic shift register SR0. SR1 is a dynamic shift register of the same bit construction as that of the shift register SR0, which stores the part of the binary image data DV written through the input circuit DVR which corresponds to part of the reference field of view B. SR2 is a dynamic shift register for storing the part of the binary image data DV written through the input circuit DVR which corresponds to the remaining part of the reference field of view B. SR01 is a bypass register of the dynamic shift register SR1. SG1 is a select gate circuit for selecting the input data to the dynamic shift register SR0. SG2 is a select gate circuit for selecting the input data to the dynamic shift register SR1. SG3 is a select gate circuit for selecting the input data to the dynamic shift register SR2. Numeral 304 denotes a coincidence detection exclusive OR gate for comparing bit-by-bit the output data from the dynamic shift registers SR0 and SR1. Numeral 305 denotes a pulse generating circuit for converting the output signals of the exclusive OR gate 304 into countable pulse signals of clock pulse CP units. CNT4 is a counter for counting the output pulse signals from the pulse generating circuit 305. PSR2 is a shift register for receiving the parallel output from the counter CNT4 to convert it into serial data to be serially output from the lower significant bits. CLC is a clock control circuit for controlling the supply of the clock pulses to the dynamic shift register SR2. SR6 is a shift register for storing the maximum number of coincident bits obtained by comparison of data of the standard field of view A and the reference field of view B. SR7 is a shift register for storing the shift amount with the maximum number of coincident bits obtained as a result of comparing data of the standard field of view A and the reference field of view, that is, the distance measuring signal and the control signals for lens control. DSP-C is a zone detecting circuit which stores the distance measuring signal as divided into small zones for indication purposes when the distance measuring signal is written in a shift register SR7, and which outputs signals on a signal line corresponding to the zone after completion of the distance measurement. PLA2 is a data storage table (programmable logic array) which stores data on the minimum allowable value for the maximum number of coincident bits obtained at the shift register SR6 as a result of the comparison of the data of the standard field of view A and the reference field of view B; it also stores data on the fixed point for controlling the photographic lens when the distance measurement result is not obtained, and data on control distance in the case of the flash pop. DCMP is a magnitude comparing circuit for comparing the magnitude of two serially input data. SG6 is a select gate circuit for selectively inputting the data of the data storage table PLA2, the shift register SR6, and the shift register PSR1 as one input to the magnitude comparing circuit DCMP. SG7 is a select gate circuit for selectively inputting the data of the shift register PSR2, the shift register SR7, and the data storage table PLA2 as the other input to the magnitude comparing circuit DCMP. SG4 is a select gate circuit for switching between the circulation mode of the shift register SR6 and the writing mode of the data from the shift register SR6. CMLP is a data converting circuit having data conversion functions such as complement conversion in which only desired digits or all the bits of the data of the shift register SR7 are converted to "0". SG5 is select gate circuit for switching between the circulation mode of the shift register SR7 and the data writing mode of the data from the shift register PSR1, the data converting circuit CMPL and the data storage table PLA2. SG6 is a select gate circuit for selecting the input buffer circuits INSW5 and INLP. CAB is a chattering absorbing circuit for removing chattering components from the signals of select gate circuit SG6. SQ-C is a control circuit for distributing control signals over the entire system based on the output from the decoder PLA1 and the signals from the other circuits. DRB, DDB, PRB, PDB, SRB, SHDB, SHB, ICGB, SSTB, LBCB, WUPB, TRIB, BZB, and MGB are buffer circuits for obtaining outputs DR, DD, PR, PD, SR, SHD, SH, ICG, SST, LBC, WUP, TRI, BZ, and MG from the control circuit SQ-C. NDB, MDB and FDB are buffer circuits for obtaining outputs ND, MD, and FD from the zone detecting circuit DSP-C. FSQF/F is a flip-flop which is reset to prohibit the writing of the binary image data DV from the analog processing circuit IC2 in the first distance measuring operation and which is set thereafter. LPF/F is a flip-flop which is set when the displacement of the photographic lens is confirmed in the lens control. REF/F is a flip-flop which is set when the distance measuring operation is completed. SEF/F is a flip-flop which is set when the operation of the self-timer is completed. LBF/F is a flip-flop which is set when the camera shake alarm level is reached during the photometric operation. BCF/F is a flip-flop which is set when the battery voltage is found to be sufficient in the battery check. PHF/F is a flip-flop which is set when the power source is maintained by the switch SW2 operative in cooperation with the second stroke of the shutter release button 1.

FIGS. 21-1 to 21-36 are detailed block diagrams of the respective function blocks shown in FIG. 20. FIGS. 21-1 to 21-36 constitute the camera control circuit IC1 when combined as shown in FIG. 21. The construction and detailed function of the camera control circuit IC1 will now be described with reference to FIGS. 21-1 to 21-36. In FIGS. 21-1 to 21-36, a block as shown in FIG. 22 indicates a 1-bit shift register for latching out the input status to the output side in synchronism with the leading edge of the input clock pulse. Whether a dynamic type register or a static type memory is used is determined according to the frequency of the clock pulses. The arrow shows the direction of data. When the shift register is used as a D-type flip-flop, it will be designated as F/F. All the flip-flops will also be designated as F/F hereinafter. A block as shown in FIG. 23 is an n-bit shift register having a construction of serial 1-bit registers numbering n which operate in synchronism with the leading edge of the input clock. This n-bit shift register achieves a serial-in/parallel-out construction by individually obtaining outputs from the respective bits. This construction is applied to the shift registers SR0, SR1, SR2, SR00, SR01, and SR6; to shift registers 00 to 10 in the timing circuit CLK-G shown in FIGS. 21-29, 21-30, 21-35 and 21-36; and to a shift register ITSR in the storage time control circuit shown in FIGS. 21-13, 21-14, 21-19 and 21-20. A block shown in FIG. 24 is a DF/F (flip-flop) which latches out the D input to the Q output side in synchronism with the leading edge of the input clock. A $\overline{Q}$ output is an inverted output. By making the RD (resetting direct) terminal high level, the DF/F is reset independently of the input clock and the D input. Under the reset condition, the Q output is low level, and the $\overline{Q}$ output is high level. A block as shown in FIG. 25 is an RSF/F (flip-flop) which latches out the input status to the output side in synchronism with the leading edge of the input clock. When both S and R inputs are low level, Q and $\overline{Q}$ outputs are not changed, regardless of the input clock. When the S input alone is high level, the Q output becomes high level and $\overline{Q}$ output becomes low level in synchronism with the leading edge of the input clock. When the R input alone is high level, the Q output becomes low level and the $\overline{Q}$ output becomes high level in synchronism with the leading edge of the input clock. Although both the S and R inputs do not become high level in this system, the reset terminal has priority in such a case. When the resetting direct terminal RD is at high level, the Q output becomes low level and the $\overline{Q}$ outout becomes high level independently of the conditions of the S input, the R input, and the clock. A storage time latch ITL to be described later is included in the control circuit SQ-C and is of the construction of three parallel F/Fs of this type. A block as shown in FIG. 26 is a shift register of parallel-in/serial-out type wherein each bit of an n-bit shift register has parallel-in/serial-out gates. In this construction, when input P/S is high level, each bit receives inputs P1 to Pn and latches the level of P1 to Pn in synchronism with the leading edge of the input clock. When the input P/S is low level, the normal serial mode is entered. This construction is applied to the shift registers PSR1 and PSR2. A block as shown in FIG. 27 is a mesh for obtaining AND or OR conditions for each data line. Parts indicated by hollow circles denote non-inverted inputs, and parts indicated by solid circles denote inverted inputs. From these inputs AND and OR conditions are obtained. Parts designated by arrows denote OR meshes and the remaining parts denote AND lines. In this system, R0 to R94 and AN1 to AN6 are AND lines and OR1 to OR25 are OR meshes.

Based on the construction described above, the functions of the circuitry shown in FIGS. 21-1 to 21-36 will now be described in more detail.

The clock pulse CP and the respective timing signals will first be described. The timing circuit CLK-G is a function block consisting of shift registers 00-10; gates 11 to 23 and 384; F/Fs 40 to 43, 395 and 396; and buffer and inverters 24 to 39, 44, 45, 51, 52, 393, and 397. Quartz oscillator XL (FIG. 9) of 4,194,304 MHz oscillating frequency is connected between terminals CG1 and CG2 of the timing circuit CLK-G. The pulses of 4,194,304 MHz are 2-step frequency divided by flip-flops 395 and 396 to be converted into pulses of 1.05 MHz as shown in FIG. 28. This system adopts this pulse as a reference clock 1M as a reference for preparing the other timing signals.

The reference clocks 1M are converted by the F/Fs (flip-flops) 00 to 07 into clock pulses CP of 1/16 frequency. The relationship between the clock pulses CP and the reference clocks 1M is as shown in FIG. 29.

The image sensor IS controlled by the camera control circuit IC1 basically requires four-phase transfer clock pulses $\emptyset 1$, $\emptyset 2$, $\emptyset 3$ and $\emptyset 4$ and resetting pulses RS which are output at each bit of the read-out of the image signal. The four-phase transfer clock pulses $\emptyset 1$ to $\emptyset 4$ and resetting pulses RS required by the image sensor IS and the resetting signals RS must satisfy the requirements represented in FIG. 30. Although not less than 70% must overlap for the pairs of clock pulses $\emptyset 1$ and $\emptyset 3$ and clock pulses $\emptyset 2$ and $\emptyset 4$ among the four-phase transfer clock pulses $\emptyset 1$ to $\emptyset 4$, it is difficult to obtain pulses which satisfy this 70% minimum overlap in a digital system constituting the camera control circuit IC1. Therefore, in this system, 100% overlapping is obtained within the system. The overlapping time in this case is a half phase of the reference clock pulse 1M, that is, about 477 nsec. The resetting pulses RS are output for a time period of about 954 nsec immediately before the leading edge of the transfer clock pulses $\emptyset 2$ and $\emptyset 4$. In order to achieve such a timing, this system obtains the transfer clock pulses $\emptyset 2$ to $\emptyset 4$ and the resetting pulses RS to be supplied to the image sensor IS by appropriately processing the clock pulses CP (gate 25) as outputs of the F/Fs (shift registers) 00 to 07, inverted pulses NCP (gate 24) thereof, and outputs of the frequency-dividing F/Fs (shift registers) 08 to 10. F/Fs 08, 09 and 10 produce pulses of high and low levels alternating after every three clock pulses in synchronism with the clock pulses CP. The outputs of the F/Fs 08, 09, and 10 are relatively shifted in phase by one clock CP, respectively. Thus, by obtaining these outputs as three signals which become high level during one clock pulse CP at intervals of six CPs at the AND lines AN2, AN4 and AN6 and obtaining these signals as OR conditions at the gate 14, the pulses as the base of the transfer pulses $\emptyset 2$ are obtained. Since these pulses are the output of ROM, they might have a time delay with respect to the clock pulses CP. Therefore, these pulses are shaped by F/F 40 to be converted into pulses which are synchronized with the clock pulses CP. This output is delayed by about 477 nsec by the F/F 42 which operates in response to an inverted reference clock 1M of the reference clock obtained by the inverter 27. By outputting the outputs of the F/F 40 and F/F 42 according to the NAND condition by the gate 16, the transfer clock pulses $\emptyset 2$ are obtained. Similarly, by outputting the outputs according to the OR condition by the gate 17, the transfer clock pulses $\emptyset 4$ are obtained. The output of the F/F 40 is delayed by about one half clock pulse CP by the F/F 41 operating in response to the inverting clock pulse NCP to obtain the pulses as the base of the transfer clock pulses $\emptyset 1$. These pulses are delayed by about 477 nsec by the F/F 43 operating in response to the inverted reference clock 1M from the inverter 27. Thereafter, by outputting the outputs of the F/F 41 and F/F 43 according to the OR condition by the gate 19, the transfer clock pulses $\emptyset 1$ are obtained, and by outputting these outputs according to the NAND condition by the gate 18, the transfer clock pulses $\emptyset 3$ are obtained.

The resetting pulse RS is obtained from the inverted signal obtained by inverting the output of the F/F 06 by a gate 55 and from a NOR output of the output of the F/F 07 by the gate 22.

The operation described above is shown in FIG. 31. The transfer clock pulses $\emptyset 1$ to $\emptyset 4$ and the resetting pulses RS obtained in this manner are output to the image sensor IS through buffers 46 to 50 in the output buffer circuit CLB. The output of the resetting pulse generating gate 22 is also supplied as a synchronizing signal RSS to an F/F 378 in the input circuit DVR shown in FIGS. 21-5, 21-6, 21-11 and 21-12.

The timing circuit CLK-G also generates various kinds of timing pulses TB0 to TB5, CCP, NCCP, ITCP, NTB0, and NTB5 as shown in FIG. 32. These timing pulses are prepared by the output lines AN1 to AN6 of the ROM which receives the outputs of the F/Fs (08, 09, and 10) and gates 15 and 28 to 39 for logic processing of the output lines. The timing pulse ITCP is prepared by processing the outputs from F/F 02 and F/F 04 at the gate 23 at the timing of the timing pulse TB3 so that only one timing pulse TB3 may be generated when the clock pulse CP is of low level.

In response to these timing pulses described above, in the camera control circuit IC1, the period of 6 bits of the clock pulse CP is treated as 1 word time, and this system operates in synchronism with this word time. Each bit of the word time is specified by one of the timing pulses TB0 to TB5. The data is treated as serial data wherein the LSB (least significant bit) corresponds to TB0 and the MSB (most significant bit) corresponds to TB5. This is as shown by the timing chart in FIG. 33.

The function of the function block in the camera control circuit IC1 which is performing a special operation will be described.

The power-up clear circuit and the oscillation interruption detecting circuit CSD included in the timing circuit CLK-G will first be described. The camera control circuit IC1 has a power-up clear circuit comprising a buffer 51 which is capable of producing an output of high level for a relatively long period of time defined by an external capacitor connected to the terminal PU; an initial resetting circuit IRS (FIGS. 21-25, 21-26, 21-31 and 21-32) with a gate 705 and buffers 700 to 704 for outputting initial resetting signals for a relatively short period of time defined by the internal capacitance; and the oscillation interruption detecting circuit CSD with buffers 399 and 385. These circuits are used for separate purposes.

The power-up circuit is a circuit which operates according to a time constant of a pull-up resistor and the capacitor connected to the terminal PU as shown in FIG. 34 and also according to the Vth (threshold voltage) of the input buffer 51 of the terminal PU. The operation of the power-up clear circuit depends on the high level output from the input buffer 51 upon turning on the power for a certain period of time. This operation is as shown in FIG. 35.

The output signal of the input buffer 51 is supplied to the system as a system resetting signal PU through the gate 384 and also to the resetting direct terminal RD of PUF/F. By returning the Q output of this buffer 51 to the gate 384, the system resetting signal PU is maintained. The PUF/F is set and the output of the system resetting signal PU is released by receiving the signal SST which is generated upon the operation of the counters CNT2 and CNT3 (FIGS. 21-13, 21-14, 21-19 and 21-20) to a setting direct terminal SD through an F/F 500. Through this operation, this system obtains predetermined system resetting signals PU controlled according to the clock pulses CP.

The initial resetting circuit IRS has the basic configuration as shown in FIG. 36 and functions to output signals for initializing the shift registers 00 to 07, the counters CNT2 and CNT3, and BCF/F (FIGS. 21-27, 21-28, 21-33 and 21-34), at the leading edge of the system resetting signals PU. Under the normal condition, the initial resetting circuit IRS initializes the counters CNT2 and CNT3 so as to guarantee the correct power-up clear time. The system is continuously reset by connecting the terminal PU to ground. In this case, the system execute the battery check mode.

The oscillation interruption detecting circuit CSD is included to prevent the latch-up condition of the system when the oscillations stop due to a low power source voltage; it has the basic configuration as shown in FIG. 37. The output of the buffer 385 is kept low level by charging capacitor C2 through capacitor C1 by alternately turning on and off switches SWa and SWb (electronic switches) with the reference clock pulses 1M. In the case of interruption of oscillation under the condition that the switch SWa is on and the switch SWb is off, the output of the buffer 385 is made high level by discharging the capacitor C2 through the resistor R8 to thereby reset the system. When the oscillation is interrupted under the condition that the switch SWa is off and the switch SWb is on, the output of the buffer 385 is made low level by discharging the capacitors C1 and C2 through the resistor R3 to thereby reset the system. This system resetting signal is supplied to the system as the system resetting signal PU output through the gate 384. This oscillation interruption detecting circuit CSD is incorporated for the case wherein the voltage becomes extremely low during the film winding, the supply of clock pulses are interrupted, and the timer no longer operates.

The silice failure detecting circuit SLFD is a function block consisting of F/Fs 381 and 382, SFF/F, and gates 271, 273 to 276, 298 to 300, 302 and 303. The slice failure detecting circuit SLFD serves to detect and store whether or not all the binary image data corresponding to the standard field of view A is "1" or "0" or all the binary image data corresponding to the reference field of view B is "1" or "0".

If all of the data corresponding to the standard field of view A is "0", F/F 381 is set while F/F 382 is not set during the read-out period from the standard field of view. Therefore, the output of the gate 298 becomes "1". If all of the data corresponding to the standard field of view is "1", the F/F 381 is not set while the F/F 382 is set during the read-out from the standard field of view. Therefore, the output of the gate 298 becomes "1". In contrast with this, if the data corresponding to the standard field of view A is a mixture of "1" and "0", both the F/Fs 381 and 382 are set during the read-out from the standard field of view, and the output of the gate 298 becomes "0". The output of the gate 298 is transferred to the SFF/F to reset both the F/Fs 381 and 382. Detection of whether or not all of the data corresponding to the reference field of view is "1" or "0" is performed, and the result is output from the gate 298.

The outputs from the SFF/F and the gate 298 are output from the gate 303 according to the OR condition. If this output is "1", it indicates that there has been a silice failure (inappropriate binary encoding) in either the standard field of view A or the reference field of view B.

The coincident bit counting part is a function block consisting of the exclusive OR gate 304, the pulse generating circuit 305, the counter CNT4, and the shift register PSR2 for comparison of the contents of the shift registers SR0 and SR1. This coincident bit counting part functions to count the total number of coincident bits as a result of comparison of the respective bits of the standard field of view and the reference field of view.

The exclusive OR gate 304 has an exclusive OR logic which outputs "0" when two inputs are identical and which outputs "1" when the two inputs are not identical. The OR gate 305 as the pulse generating circuit combines the clock pulses CP with the output of the exclusive OR gate 304 for conversion into countable pulses.

The output of the OR gate 305 is counted by the counter CNT4 and the obtained result is written parallel-in at the final timing of the data in the shift registers SR0 and SR1. The result is converted into the serial data and is transmitted. The details of the timing of this operation are as shown in FIG. 38.

As shown in FIGS. 21-5, 21-6, 21-11 and 21-12, the input circuit DVR is a function block consisting of a gate 377, a buffer 380, and the F/F 378. The select gate circuit SG1 at the input side of the shift register SR0 is a function block consisting of gates 277 and 280 to 282. The select gate circuit SG2 at the input side of the shift register SR1 is a function block consisting of the gates 283 to 287. The select gate circuit SG3 is a function block consisting of the gates 291, 293, and 294. The clock control circuit CLC corresponding to the shift register SR2 is a function block consisting of the gates 295 to 297.

The magnitude comparing circuit DCMP will now be described. The magnitude comparing circuit DCMP is a function block consisting of the gates 307 to 311 and 315 and F/Fs 312 and 313; it serves to compare the magnitudes of the data from output gate 325 (data from the gate 325 is inverted data) of the select gate circuit SG6 and from the output gate 326 of the select gate circuit SG7. The gate 325, together with gates 318 to 321 and 328, constitutes the select gate circuit SG6, and inverts the selected data and outputs the inverted data. The data before the inversion is designated as A. The gate 326, together with gates 322 to 324, 327, and 388 to 391 constitutes the select gate circuit SG7. The output data from this circuit SG7 is designated as B.

For comparing data, two serial data input from the side of the LSB are compared for a time period corresponding to 1 word. At the final word, that is, the timing of the timing pulse TB5, the result of magnitude comparison is determined and is stored for the next 1 word in the F/F 313. This output becomes "0" when $A \geq B$ and "1" when $A < B$.

More specifically, if the respective compared bits of the input data A and B are both "1" or both "0", the output of the gate 307 becomes "1" and the output of the gate 308 becomes "0". If the respective compared bits of the data A and B are "1" and "0", and thus the data A is greater than the data B, both outputs of the gates 307 and 308 become "0". If the respective compared bits of the data A and B are "0" and "1", and thus the data B is greater than the data A, both outputs of the gates 307 and 308 become "1".

When "1" is output from the gate 308 after the comparison of bits, it indicates that the corresponding bit of the data B is greater. This output is supplied from the gate 310 to the F/F 312 through the gate 311 and "1" is stored in the F/F 312.

In contrast with this, when "0" is output from the gate 308 and "1" is output from the gate 307, it indicates that the corresponding bits of the data A and B are equal to each other. Therefore, the gate 309 is restored and the data stored in the F/F 312 is maintained.

If both outputs from the gates 307 and 308 are "0", it indicates that the corresponding bit of the date A is greater than that of the data B. Therefore, the output of the gate 309 is regulated. Since the output of the gate 308 is also "0", the data of the F/F 312 is made "0".

The operation as described above is repeatedly performed during the timing pulses TB0 to TB4. At the timing of the timing pulse TB5, the magnitude relationship between the corresponding bits excluding the MSBs of the data A and B is stored in the F/F 312 and is output. At the timing of the timing pulse TB5, the output of the gate 311 is forcibly made "0". For the purpose of performing the magnitude comparison at the next word, the output of the F/F 312 is made "0" at the timing of the subsequent timing pulse TB0.

At the timing of the timing pulse TB5, the most significant bits, that is, the MSBs of the data A and B are compared. If the comparison result is obtained, the discrimination on the magnitude of the data A and B may be performed independently of the output of the F/F 312. If the MSBs of the data A and B are confirmed to be equal to each other, the output of the F/F 312 becomes the magnitude discrimination result. Gates 309 and 315 are used as the logic units for performing the magnitude discrimination at the timing of the timing pulse TB5. When the level of the gate 315 is checked at the timing of the timing pulse TB5, the magnitude relationship between the data A and B in this 1-word period may be known. The status of the gate 315 is stored in the F/F 313 for the next 1 word.

A data comparison example according to the operation described above will now be described.

The zone detecting circuit DSP-C is a function zone having the function of indicating the data of the shift register SR7, that is, the distance data obtained as a result of distance measurement in one of the three zones; it consists of gates 329, 330, 350, 354, 355, 357, 359, and 361, and F/Fs 362 and 363 as shown in FIGS. 21-17, 21-18, 21-23 and 21-24.

When the distance measurement is obtained, the distance data consisting of digital data "0" to "42" is written in the shift register SR7. The shift register SR7 outputs, as a display indication, which of the ranges this content belongs to ("0" to "3", "4" to "15", and "16" to "42") to the respective output terminals FD, MD, and ND through the output buffer circuits NDB, MDB, and FDB (374, 375, and 376).

More specifically, the gate discriminates if the distance data is within the range of "16" to "42" to store the discrimination result in the F/F 362 at the timing of the word time subsequent to that at which the distance data is written in the shift register SR7 from the shift register PSR1. This gate 329 also discriminates if either the 3rd or 4th bit of the distance data is "1" and stores the discrimination result in the F/F 362, In the case of the flash pop, that is, when the terminal POP is at the GND potential, the gate 350 detects if the distance data is determined by the 2 lower significant bits. If it is confirmed that the distance is within the range of "0" to "4", it is stored in the F/F 363.

The output of the F/Fs 362 and 363 are discriminated by the gates 357 to 361. If the distance data is within the range of "0" to "3", "1" is output from the gate 361. If it is within the range of "4" to "15", "1" is output from the gate 359. If it is within the range of "16" to "41", "1" is output from the gate 357. In the case of the flash pop, the data within the range of "0" to "3" is invalidated (for distance limit), and the FD indication is converted into the MD indication by the gate 350 for performing the MD indication.

As shown in FIGS. 21-17, 21-18, 21-23 and 21-24, the select gate circuit SG4 at the input side of the shift register SR6 is a function block consisting of gates 331 to 333 and 383. The select gate circuit SG5 at the input side of the shift register SR7 is a function block consisting of gates 336, 340, 341, 343, 344, and 346. The data converting circuit CMPL is a function block consisting of gates 345 and 349. The data storing table PLA2 is a function block consisting of an ROM and gates 368 to 370. The buffer circuits NDB, MDB, and FDB respectively consist of buffers 374, 375, and 376 and respective resistors.

The storage time control circuit ITC is, as shown in FIGS. 21-13, 21-14, 21-19 and 21-20, a function block consisting of the 6-bit shift register ITSR of serial-in/parallel-out type; gates 85 to 87, 89, 92, and 101 to 108; and F/Fs 91 and 109 to 112. Output lines R31 to R36 of the decoder PLA2 as shown in FIGS. 21-15, 21-16, 21-21 and 21-22 are involved in the control of the storage time of the image sensor IS. The select gate circuit consisting of the gates 85, 86 and 87 connected to the D input of the shift register ITSR writes the initial data in the shift register ITSR. By inputting the timing pulse TB1, the select gate circuit outputs "1" from the 3rd bit from the right at the timing of the timing pulse TB5. The shift register ITSR determines the storage time according to from which bit a "1" is output at the timing of the timing pulse TB5, and it switches the storage time by shifting the data 1 bit to the right or to the left. In the shift register ITSR, the leftmost bit corresponds to the shortest time, the rightmost bit corresponds to the longest time, and the other bits correspond to respective intermediate storage times. The F/F 109 is a flip-flop for detecting if the data in the shift register ITSR corresponds to the shortest time. The F/F 110 is a flip-flop for detecting if the data in the shift register ITSR corresponds to the longest time.

The storage time of the image sensor IS is switched according to the levels of the ITU and ITO supplied from the storage time discrimination comparator CP2 (FIG. 12) in the analog processing circuit processing IC2 through the input buffer circuits INITU and INITO (77 and 78). If the level of the ITU is "1" in the 1-word period in which the storage time is to be switched, the 1-bit data of the shift register ITSR is shifted to the right. If the level of the ITO is "1", the 1-bit data of the ITSR is shifted to the left. Although the ITU and ITO do not both become "1", the ITO has higher priority if this actually occurs. The F/Fs 111 and 112 which receive outputs from the input buffer circuits INITU and INITO, which in turn receive the ITU and ITO, are incorporated in case a hunching phenomenon occurs in the comparator CP2 in the analog processing circuit IC2; these F/Fs 111 and 112 convert these outputs into stabilized signals for a 1-word period and write them. The F/F 109 is a flip-flop which detects if the data in the shift register ITSR is at the leftmost bit and which keeps this function block unresponsive to the ITO. The F/F 110 is a flip-flop which detects if the data in the shift register ITSR is at the rightmost bit and which keeps this function block unresponsive to the ITU.

Switching of the storage time is performed by increasing or decreasing the clock pulses which are supplied to the shift register ITSR. For increasing the storage time, the timing pulse ITCP is superposed on the clock pulse CP to shift the data to the right by one bit. For decreasing the storage time, the timing pulse TB3 is superposed on the clock pulse CP to shift the data to the left by one bit. This operation is as shown in FIG. 40.

The F/F 91 is a flip-flop which stores the switched storage time until the subsequent data read-out.

The distance measurement number setting part is included in the control circuit SQ-C and is a function block which consists of the storage time latch ITL and gates 93 to 100, as shown in FIGS. 21-13, 21-14, 21-19 and 21-20. The distance measurement number setting part stores the data in the shift register SR during setting of the PHF/F (FIGS. 21-17, 21-28, 21-33 and 21-34) and sets the maximum distance measurement number which may be allowed after the switch SW2 is turned on while the REF/F is under the reset condition, that is, while the distance measurement is incomplete.

The storage time latch ITL stores in units of 2 bits the content of the shift register ITSR after setting the PHF/F. A flash signal for this is supplied from the gate 93. When "1" is output from a bit of the storage time latch ITL, the content of the flash time latch ITL does not change by the action of the gates 94 to 97 even when the flash signal is supplied. The release of the data stored in the storage time latch ITL is effected by the direct resetting signal. The storage time latch ITL outputs signals to the three output lines R66 to R68 of the decoder PLA1 for decoding outputs "3", "5" and "2" from the counter CNT3. Thus, the storage time latch ITL sets twice the distance measurement when the storage time during the setting of the PHF/F is longest or shortest, three times when the storage time is longer or shorter by one step, or five times when the storage time is either of the intermediate two steps.

The chattering absorbing circuit CAB is a function block consisting of gates 63, 64, 68, 69, 71 and 73 and the F/Fs 65, 66, 67, and 600, and is time-divisionally used through the select gate circuit SG8 for writing the level of the terminals LP and SW5. The F/Fs 65 and 66 are counters of direct reset type and are directly reset when the terminals LP and SW5 are in contact with the respective contacts, and count from 0 to 3 in synchronism with the leading edge of the timing pulse TB5 when the terminals leave the contacts. The gate 68 outputs "1" when the count of the counter is "3" and the counter stops counting when the count becomes "3".

The output of the gate 68 corresponds to the input after chattering absorption of the levels of the terminals LP and SW5. Particularly in the case of the terminal LP, it is converted into pulse signals output for the 1-word period when the level of the terminal LP changes from "0" to "1" or from "1" to "0". Since an output pulse may not be obtained when the timing of the direct resetting pulses of the F/Fs 65 and 66 coincide with the leading edge of the inverted timing pulse NTB5, the F/F 600 is incorporated for preventing this.

This detailed timing of the chattering absorption circuit is as shown in FIG. 41.

As shown in FIGS. 21-25, 21-26, 21-31 and 21-32, the input buffer circuits INLP and INSW5 comprise combinations of inverter buffers 57 and 58 and resistors, respectively. The select gate circuit SG8 is a function block consisting of gatey 59, 61 and 62.

The function of the camera control circuit IC1 in the respective statuses of the sequence will now be described in more detail. the condition of each status is determined by the status latch circuit SL (FIGS. 21-15, 21-16, 21-21 and 21-22) which has D latches corresponding to 4 bits connected in parallel with each other. The status latch circuit SL latches out the status supplied from the status control circuit L-C (FIGS. 21-15, 21-16, 21-21 and 21-22) in synchronium with the trailing edge of the latch pulse from the clock terminal. The 4-bit output of the status latch circuit SL sets the statuses CC0 to CC13 according to the binary codes and is initialized to the status CC0 by the system resetting signal PU. Control in the respective statuses is performed according to the statuses of the counters CNT1 (FIGS. 21-15, 21-16, 21-21 and 21-22), CNT2 and CNT3 (FIGS. 21-13, 21-14, 21-19 and 21-20) in synchronism with the trailing edge of the input clock pulse. The counter CNT1 is always counted up in synchronism with the trailing edge of the timing pulse TB5 in the respective modes. The counters CNT2 and CNT3 are under different use conditions in the respective statuses. These use conditions are as shown in Table 2 below:

TABLE 2

| Status | PHF/F | CNT1 | CNT2 | CNT3 |
|---|---|---|---|---|
| CC0 | * | TB5 count | CP count | CNT2 MSB count |
| CC1 | * | TB5 count | * | |
| CC2 | RESET | TB5 count | CNT1 MSB count | TB5 count |
|  | SET | TB5 count | CNT1 MSB count | CC6 count |
| CC3 | RESET | TB5 count | CNT1 MSB count | TB5 count |
|  | SET | TB5 count | CNT1 MSB count | CC6 count |
| CC4 | RESET | TB5 count | CNT1 MSB count | TB5 count |
|  | SET | TB5 count | CNT1 MSB count | CC6 count |
|  | RESET | TB5 count | SR1 and SR2 shift amount count | TB5 count |
| CC5 | SET | TB5 count | SR1 and SR2 shift amount count | CC6 count |
| CC6 | *(SET) | TB5 count | SR1 and SR2 shift amount count | CC6 count |
| CC7 | *(SET) | TB5 count | CNT1 MBS count | CNT2 MSB count |
| CC8 | *(SET) | TB5 count | Lens displacement count | CNT1 MSB count |
| CC9 | *(SET) | TB5 count | CNT1 MSB count | * |
| CC10 | * | TB5 count | CNT1 MSB count | CNT2 MSB count |
| CC11 | * | TB5 count | CNT1 MSB count | * |
| CC12 | * | TB5 count | CNT1 MSB count | CNT2 MSB count |
| CC13 | * | TB5 count | * | * |

The function of the camera control circuit IC1 in each status will now be described in detail.

In the camera control circuit IC1, when the power is turned on, VDD is established while a voltage is applied to the terminal PU of FIGS. 21-29, 21-30, 21-35 and 21-36 to charge the capacitor interposed between the terminal PU and GND. The charge voltage is defined by the time constant of the resistor and capacitor pair. During the time until the charge voltage exceeds the VTH (threshold voltage) of the buffer 51 of the input stage of the terminal PU, signals of high level are supplied from the buffer 51 to keep the PUF/F under the reset condition. The $\bar{Q}$ output of the PUF/F is output as the system resetting signal PU through the gate 384 to initialize the required circuit. The mode set after this initialization is the status CC0, that is, the initial mode.

The status cc0 has two functions: the sequence control for the battery control and the initialization of the required circuit.

The output time period of the system resetting signal PU is much shorter than the system resetting signal PU. An initial resetting signal is prepared by the internal circuit (initial resetting circuit IRS in FIGS. 21-25, 21-26, 21-31 and 21-32) of the camera control circuit IC1 to perform initialization of the circuits involved in the battery check.

In addition to the status F/F, the counter CNT1 for sequence control shown in FIG. 21E is initialized by the system resetting signal PU. While the system resetting signal PU is of high level, the shift registers 08, 09 and 10 shown in FIGS. 21-29, 21-30, 21-35 and 21-36 for generating the timing pulses TB0, TB1, TB2, TB3, TB4 and TB5, regulate the input to the gate 11. Since '0' data is forcibly transferred in this case, the timing pulse TB0 is made high level, and the timing pulses TB1 to TB5 are made low level.

The counters CNT2 and CNT3 for the sequence control shown in FIGS. 21-13, 21-14, 21-19 and 21-20 count up in synchronism with the output pulses from F/F 365 shown in FIGS. 21-13, 21-14, 21-19 and 21-20 but are, before then, initialized by the initial resetting signals. The initial resetting signals are also supplied to the BCF/F shown in FIGS. 21-27, 21-28, 21-33 and 21-34 through the gate 203 to forcibly reset the flip-flop.

Under the normal condition, when the power is turned on, the system resetting signals PU are output for about 652 msec by the actions of the counters CNT2 and CNT3. However, the flash signals to be supplied to the BCF/F for the battery check are output about 730 $\mu$sec after the level shift from the low level of the system resetting signal PU, so the battery check is not performed. When the system resetting signals PU become low level and the timing pulses TB1 to TB5 begin to sequentially output, the sequence is transferred to the status CC1 at the timing of the leading edge of the first timing pulse TB5.

In the status CC10, the SEF/F, LBF/F, PHF/F, LPF/F, and REF/F shown in FIGS. 21-27, 21-28, 21-33 and 21-34 and TRF/F shown in FIGS. 21-1, 21-2, 21-7 and 21-8 are directly set. ICGF/F in FIG. 21E is reset in synchronism with the trailing edge of the timing pulse TB5 during the change from the status CC0 to CC1.

The battery check is performed by forcibly maintaining the terminal PU at GND level. In this case, although the status is kept at CC0, the counters CNT2 and CNT3 as serial counters count up in synchronism with the output pulses from the F/F 365. To the terminal SST shown in FIGS. 21-3, 21-4, 21-9 and 21-10 are supplied signals for commanding the energizing of the shutter for 729.6 $\mu$sec every 62.3 msec through the output lines R19, R20 and R21 of the decoder PLA1, gates 147 and 148, and an F/F 500. The output of the battery check at the terminal LB in FIG. 21 is latched in the BCF/F according to the output of the output line. As has been described hereinbefore, the battery check is performed under the condition the dummy load R10 (FIG. 9) is added to the other battery.

The OR product of the output of the flip-flop BCF/F for the battery check and the pulse signal for sound generator drive is output from the terminal BZ shown in FIGS. 21-1, 21-2, 21-7 and 21-8. When releasing the forcible grounding of the terminal PU, the power source is turned off with the camera. However, the battery check output from the terminal BZ disappears even when such a measure is not taken, since the BCF/F is directly reset by the inverted signal of the system resetting signal PU.

The timing chart of the operation in the status CC0 is as shown in FIG. 42.

In the subsequent status CC1, that is, in the mode wherein the initial check mode consists of 8 word time, the battery check is performed with the actual load by energizing the shutter. Also performed are the disconnection check of the shutter electromagnet coil SCL, the discrimination of the winding completion detection switch SW5, and the initialization of the storage time setting shift register ITST of the storage time control circuit ITC in FIGS. 21-13, 21-14, 21-19 and 21-20. This mode is set to an 8-word period, that is, 732 μsec, in order to guarantee the energizing time of the actual load for the battery check.

For performing the battery check, a signal commanding the shutter to be energized is output to the terminal SST during this mode while the level of the terminal LB shown in FIGS. 21-27, 21-28, 21-33 and 21-34 is checked. When this level is high, the battery voltage is considered normal.

The disconnection check of the electromagnetic shutter coil SCL is performed by applying a voltage to the electromagnetic shutter coil SCL from the terminal SC shown in FIGS. 21-27, 21-28, 21-33 and 21-34 through a resistor of about 5 KΩ as has been described with reference to FIG. 18. If the status of the terminal SC is low level, the electromagnetic shutter coil SCL is confirmed to be normal.

The checking of the winding completion detection switch SW5 is performed through the status of the switch SW5 shown in FIGS. 21-25, 21-26, 21-31 and 21-32. If it is low level, the winding is confirmed to be incomplete.

The initialization of the storage time setting shift register ITSR in the storage time control circuit ITC is performed by disconnecting a circulation loop of the shift register ITSR by the gates 85 to 87 and by writing the timing pulse TB4.

The discrimination and initialization described above are performed in the final word of this mode. In the case of a dead battery or a disconnection of the shutter coil, the sequence advances to the status CC13. In the case of the winding completion, the sequence advances to the status CC9. The sequence advances to the subsequent status CC2 in other cases.

The initialization of the storage time is performed when the status advances to the status CC2. The resetting of FSQF/F in FIGS. 21-25, 21-26, 21-31 and 21-32 is simultaneously performed. The FSQF/F is a flip-flop which is placed under the reset condition after the power is turned on or immediately before the distance measuring operation and which is set when the read-out of the image signal from the image sensor IS is performed once. If this flip-flop is not set, the read-out of the binary image signal from the terminal DV in FIGS. 21-5, 21-6, 21-11 and 21-12 is prohibited by the input circuit DVR.

The various discriminations at the eighth word of the status CC1 are as shown in the truth table in FIG. 43. These discriminations are made by gates 242, 243, and 245 which are receiving the output from the output line R25 of the decoder PLA1 shown in FIGS. 21-15, 21-16, 21-21 and 21-22. The outputs of the gates 242, 243, and 245 are supplied to the status control circuit L-C of FIG. 21E to determine the status to be entered next.

The timing chart of the operation in the status CC1 is as shown in FIG. 44.

In the status CC2, that is, in the distance measuring discrimination mode, the sequence of the 2-word time or 297-word time is executed according to the status of the PHF/F of FIGS. 21-27, 21-28, 21-33 and 21-34 which is set after the second stroke of the shutter release button to maintain the power source according to the level of the terminal POP of FIGS. 21-27, 21-28, 21-33 and 21-34.

In this status, status discrimination of the switch SW2 operative in cooperation with the second stroke of the shutter release button is performed at the first word through a gate 205. If the switch SW2 is discriminated to have been turned on, the PHF/F is reset before the sequence advances to the second word. The truth table for this discrimination is shown in FIG. 45. At the second word, a judgment is made on whether to execute from the third word, to return to the first word of the status CC2, to advance to the status CC3, or to advance to the status CC6, according to the levels of the PHF/F, the terminal POP, the terminal SELF which becomes low level during the operation of the self-timer, and the REF/F which is set when the distance measurement is obtained. The truth table for this discrimination is shown in FIG. 46. At the 297th word, a discrimination is made on whether to return to the first word of the status CC2 or to advance to the status CC3 according to the levels of the terminal SELF and the REF/F. The truth table for this discrimination is shown in FIG. 47. If it is discriminated that the terminal SW2 is at low level at the first word, the PHF/F is set from the second word.

In the status CC2, signals for performing the discrimination of low luminance (camera shake warning) are output to the exposure system circuit IC3. Signals of high level are output from the terminal LBC shown in FIGS. 21-3, 21-4, 21-9 and 21-10 for the 256-word time, that is, 23.4 msec. The level of the terminal LB of FIGS. 21-27, 21-28, 21-33 and 21-34 is latched in the flip-flop LBF/F for camera shake warning according to the flash signal output as the first clock of the 257th word.

An OR product of the output of the LBF/F and the pulse signals for driving the sound generator is output from the terminal BZ of FIGS. 21-1, 21-2, 21-7 and 21-8.

In the status CC2, the LBC output is produced for the 256-word time and there is extra time of 41 words. This extra time is for resetting the photometric integrating circuit LMC (FIG. 17) at the exposure system circuit IC3, which integrates signals corresponding to the amount of incident light.

The timing chart for this operation in the status CC2 is as shown in FIG. 48.

The status CC3, that is, the storage mode, is a mode for controlling the storage time of the image sensor IS. In this mode, the charge clear signals ICG to be supplied to the image sensor IS are changed from high to low level to control the storage time thereafter. During this time, the optical images in the standard field of view and the reference field of view are stored in the image sensor IS.

This storage time is controlled based on the address of the ROM which is accessed at the timing of the timing pulse TB5 at the location of the 1-bit data which is circulating in the storage time setting shift register ITSR in the storage time control circuit ITC shown in FIGS. 21-13, 21-14, 21-19 and 21-20. Shifting of the 1-bit data is performed by adding or subtracting one clock pulse supplied to the shift register ITSR during a time of 1 word. This operation is performed in response to the outputs ITU and ITO from the storage time discrimination comparator CP2 in the analog processing circuit IC2 shown in FIG. 12. When the output ITU is received, the data shift is performed so as to make the storage time longer. When the output ITO is received, the data shift is performed to shorten the storage time.

The storage time is controlled to 91.5 μsec, 457.5 μsec, 2.013 msec, 8.693 msec, 30.561 msec, and 91.775 msec. In the status CC3, however, since the charge clear signals ICG change from high to low level after the initial word, the storage time is controlled to 0.366 μsec, 1.922 msec, 8.601 msec, 30.47 msec, and 91.683 msec. The sequence advances to the status CC4 thereafter. Counting in the status CC3 is performed by operating the counters CNT1 and CNT2 as a serial counter.

The data shift from the shift register ITSR is performed in response to the outputs ITU and ITO supplied from the comparator CP2 in the analog processing circuit IC2 at the end of the status CC4.

In summary, the storage time of the image sensor IS is controlled in 6 steps according to the outputs ITU and ITO from the storage time discrimination comparator CP2 in the analog processing circuit IC2. The remaining 91.5 μsec of the storage time controlled in the status CC3 is assigned to the first word of the status CC4. The control relationship in the status CC3 is as shown in the timing chart in FIG. 49. The levels of the counters CNT1 and CNT2 for this are as shown in FIG. 50.

The status CC4, that is, the read-out mode, is a mode for reading out the picture image data of the optical image for the standard field of view and the reference field of view, this image data being stored in the image sensor IS in the status CC3. The read-out of the image signals begins when the shift pulse SH is supplied to the image sensor IS. The read-out is performed in synchronism with the transfer clock pulses ∅1 to ∅4. The read-out signals are encoded into binary signals at the analog processing circuit IC2 and are written in the camera control circuit IC1 through the terminal DV of FIGS. 21-5, 21-6, 21-11 and 21-12. The binary image data is assigned to and stored in the shift register SR0 for the standard field of view and to the shift registers SR1 and SR2 for the reference field of view by switching the gates of the select gate circuits SG1, SG2 and SG3.

Writing of the binary image data is performed through the terminal DV. In the first data writing immediately after the power source is turned on or after the completion of winding for continuous photography, or immediately after the storage time is changed, all the data are forcibly written as "0", since the Q output of the FSQF/F in FIGS. 21-25, 21-26, 21-31 and 21-32 or the output of the F/F 91 in the storage time control circuit ITC in FIGS. 21-25, 21-26, 21-31 and 21-32 is high level, the output of gate 116 in FIGS. 21-25, 21-26, 21-31 and 21-32 is high level, and the input to the terminal DV is gate-prohibited at the gate 377 of the input circuit DVR in FIGS. 21-5, 21-6, 21-11 and 21-12. In all of these cases, when binary encoding the image signals from the image sensor IS from the analog processing circuit IC2, it is judged that it is better not to write data from the terminal DV, since the updated picture image data for setting the slice level is either not present or is not effective. This is a necessary measure for preventing erratic measuring operations due to incorrect signals.

In this mode, to the analog processing circuit IC2 are supplied various control signals such as the dark resetting signal DR, the dark detecting signal DD, the peak resetting signal PR, the peak detecting signal PD, the sampling and resetting signal SR, and the sampling and holding signal SHD, from the buffer circuits DRB (178), DDB (177), PRB (266), PDB (267), SRB (268), and SHDB (269) in FIGS. 21-3, 21-4, 21-9 and 21-10. The functions of these control signals are as previously described with reference to FIGS. 12 and 13.

Simultaneously, evaluation of the binary data during the respective read-out period of the standard field of view and the reference field of view is performed. If all of the bits of either field of view are "0" or "1" during these periods, the silice failure is detected which is stored in a corresponding flip-flop SFF/F in the slice failure detecting circuit SLFD in FIGS. 21-5, 21-6, 21-11 and 21-12.

In the shift registers SR0, SR1, and SR2 (these are of dynamic type) in which are stored the binary data for the standard field of view and the reference field of view, justification is performed on the data which has been written, until this mode is completed. The respective shift registers SR0, SR1, and SR2, in which is written the data from the analog processing circuit IC2, are of the dynamic type which constantly receives clock pulses. Since the condition of the data changes according to the time elapsed since the time data is written, justification of the data in the shift registers SR0, SR1, and SR3 is performed.

The respective shift registers have the constructions below:
Shift register for standard field of view—SR0 48 bits
Shift register for reference field of view (No. 1)—SR1 48 bits
Shift register for reference field of view (No. 2)—SR2 42 bits The timing for writing of the data is as shown in FIG. 51.

The levels of the shift registers SR0, SR1, and SR2 at the time of completion of the read-out of the signals from the image sensor IS are as shown in the figure; the heads of the contents of the shift registers SR0, SR1, and SR2 are unjustified. The justification of the data in all of the shift registers SR0, SR1 and SR2 may be performed until this mode is completed by combining the operation of circulating the data in the shift register SR0 corresponding to four circulations through the 6-bit bypass shift register SR00 and the operation of waiting for the timing at which the data in the shift registers SR1 and SR2 is justified.

At the final word time of this mode, the discrimination of the outputs ITU and ITO for the suitability of the storage time of the image sensor IS and the discrimination of the flip-flop SLF/F for slice failure storage are performed. If necessary, the data shift in the storage time setting shift register ITSR is performed. If "1" is output from the SLF/F, a slice failure is detected. Then, the sequence returns to the status CC2. If not, the sequence advances to the subsequent status CC5.

The timing chart of the detailed operation in status CC4 is as shown in FIG. 52.

In the status CC5, that is, in the distance measuring processing mode, the correlation between the data in the shift register SR0 for the standard field of view and the data in the shift registers SR1 and SR2 for the reference field of view is obtained to calculate the distance data. In this mode, the evaluation of the data and the conversion of the obtained data into the control data are also performed.

The basic mode of operation of the shift registers SR0, SR1, and SR2 will now be described.

In this mode, the contents of the shift registers SR0 and SR1 are circulated through the 6-bit bypass shift register SR00 and the 5-bit bypass shift register SR01, respectively. The data in the shift register SR2 is circulated with 43 clock pulses CP from the clock control circuit CLC in FIGS. 21-5, 21-6, 21-11 and 21-12 during the time the data in the shift registers SR0 and SR1 circulate once.

Accordingly, during the time while the data in the shift register SR0 circulates once to return to the original state, the data in the shift register SR1 and the data in the shift register SR2 are shifted to the right by one bit relative to each other. During such time, the data of the reference field of view is shifted to the right by one bit relative to the data of the standard field of view by substituting the initial bit of the shift register SR2 for the final bit of the shift register SR1.

The functions particularly related to this processing are shown in FIG. 53 as extracted from the system construction of FIG. 20.

As for the method for this data processing, the 48-bit data in the shift registers SR0 and SR1 are compared for identity at the exclusive OR gate 304 during one circulation. The obtained result is converted into pulses by the pulse generating circuit 305 and the produced pulses are counted by the counter CNT4 as the number of coincident bits. The count is then converted into the serial data by the shift register PSR2 of parallel-in/serial-out type and is compared with the data in the shift register SR6 at the magnitude comparing circuit DCMP.

In the first comparison, the data of the shift register SR6 is "0". Therefore, unless the data in the shift register PSR2 is "0", the magnitude comparing circuit DCMP makes a discrimination of "PSR2>SR6". In response to the comparison output, the data in the shift register PSR2 is read in the shift register SR6. In the first correlation, the content of the counter CNT3 is also "0". The content of the counter CNT3 is written in the shift register PSR1 of parallel-in/serial-out type, provided that the data in the shift register PSR2 is written in the shift register SR6 by the output of the magnitude comparing circuit DCMP.

In the next coincidence detection, the shift registers SR1 and SR2 are serially connected to shift the data by one bit comparison with the data in the shift registers SR0 and SR1. Only when the number of coincident bits obtained in the counter CNT4 as a result of this coincidence detection is compared at the magnitude comparing circuit DCMP with the data in the shift register SR6 through the shift register PSR2 of parallel-in/serial-out type and a discrimination of "PSR2>SR6" is made, the data in the shift register PSR2 is replaced by the data in the shift register SR6 and the content of the counter CNT3 which is counted up according to the shift amount to the right of the data in the shift registers SR1 and SR2 is written in the shift register PSR1.

When the content of the counter CNT3 becomes "43" after repeated operations as described above, this operation is interrupted. At this instant, the maximum number of coincident bits is in the shift register SR6 and the content of the counter CNT3 when the maximum number of coincident bits is obtained at the shift register PSR1, that is, the shift amount of the data, is obtained in the shift register PSR1. As may be apparent from the principle of distance measurement of the distance measuring system described with reference to FIGS. 10, 14 and 15, the data in the shift register PSR2 is the distance data obtained taking the infinite distance data as a reference.

Considering the ideal case in which the part of the data for the reference field of view which is written in the shift registers SR1 and SR2 completely coincides with the data for the standard field of view written in the shift register SR0, the maximum number of coincident bits obtained in the shift register SR6 is preferably "48", which corresponds to all of the bits. However, due to various factors, there are cases where it may not become "48". When the obtained maximum number of coincident bits is very small, the distance data obtained in the shift register PSR1 must be considered unreliable.

In this mode, after taking the digital correlation of the binary image data for the standard field of view and the reference field of view, it is judged at the magnitude comparing circuit DCMP if the data in the shift register SR6, that is, the maximum number of coincident bits, is above or below "45". If "SR6≧45", the content of the shift register PSR1 is transferred to the shift register SR7. If "SR6<45", the writing of the data in the shift register SR7 is not performed. If "SR6≧45", it is judged that the distance measurement is completed and the REF/F in FIGS. 21-27, 21-28, 21-33 and 21-34 is set.

Next, the data in the shift register SR7 is compared with the farthest limit "5" for the flash photography mode and compared therewith by the mgnitude comparing circuit DCPM to discriminate if the distance is farther than the distance represented by "5", that is, if the data is smaller than "5". If the data is smaller than "5" and the terminal POP shown in FIGS. 21-27, 21-28, 21-33 and 21-34 is low level, that is, in the case of the flash pop, the data in the shift register SR7 is replaced by "5".

When the data in the shift register SR7 is compared with the normal farthest limit "31" and is greater than "31", the data in the shift register SR7 is made to be "0" data. When the data in the shift register SR7 is smaller than "31", the data is complement-converted except for the MSB. Through this processing, the data in the shift register SR7 is converted into the control data of 32 steps wherein "0" is at the closest side and "31" is at the infinite distance.

The above operation is shown in the timing chart in FIG. 54. The overall sequence of the status CC5 as well as the counting of the shift amount of the data in the shift registers SR1 and SR2 is controlled by the counter CNT2. The sequence during the comparison of the data in the shift register SR0 with the data in the shift register SR1 is controlled by the counter CNT1. Referring to FIG. 54, at the timing of the output STR of the output line R56 of the decoder PLA1 in FIG. 21B, the content of the counter CNT4 is transferred to the shift register PSR2. At the timing of the output CMP of the output line R57 of the decoder PLA1, the content of the shift register PSR2 is compared with the content of the shift register SR6 by the magnitude comparing circuit DCMP. At the timing of the output LDL of the gate 159 in FIGS. 21-3, 21-4, 21-9 and 21-10, the content of the shift register PSR2 is transferred to the shift register SR6 according to the comparison result, if necessary. During one circulation of the data in the shift register SR0, the data in the shift register SR2 is shifted with 43 pulses by the amount corresponding to one circulation and one bit. This is performed by removing one clock pulse to the shift register SR2 during each word, removing one clock pulse during one word at the timing of an output 4P of the output line R58 of the decoder PLA1, and removing one more clock pulse during one word at the timing of the output 4P of the output line R58 of the decoder PLA1. The counter CNT1 is reset for every circulation of the data in the register SR0. The counter CNT2 is counted up for every circulation of the data in the shift register SR0.

When the content of the counter CNT2 reaches "43", the content of the shift register SR2 is all shifted to the shift register SR1. Therefore, the identity detection of the data is terminated at this point. Thereafter, control pulses A to F are output from the output lines R59 to R64 of the decoder PLA1.

At the timing of the control pulse A, the content in the shift register SR6 is compared in the magnitude comparing circuit DCMP with the stationary data from an output line OR25 of the data storing table PLA2 in FIGS. 21-15, 21-16, 21-21 and 21-22, that is, with the data on the allowable maximum number of coincident bits "45". The obtained result is output to an F/F 313 in the magnitude comparing circuit DCMP for the period of the timing of the subsequent control pulse B.

At the time of the control pulse B, the condition of the F/F 313, that is, whether or not the F/F 313 is under the set condition, is discriminated by a gate 219 in FIGS. 21-17, 21-18, 21-23 and 21-24 and the sequence returns to the previous status CC2 since the content of the shift register SR6 is smaller than the allowable maximum number of coincident bits "45". In contrast with this, if the F/F 313 is under the reset condition, it is discriminated at a gate 314 in the select gate circuit SG5 at the input side of the shift register SR7 in FIGS. 21-17, 21-18, 21-23 and 21-24 to reset the RFF/F in FIGS. 21-27, 21-28, 21-33 and 21-34 as well as to write the content of the shift register PSR1, that is, the distance data, into the shift register SR7.

At the timing of the control pulse C, the content of the shift register SR7 is compared in the magnitude comparing circuit DCMP with the stationary data from an output line OR23 of the data storing table PLA2, that is, the allowable limit distance "5" for flash pop. The obtained result is output to the F/F 313 during the timing of the subsequent control pulse D.

At the timing of the control pulse D, the operation is performed according to the conditon of the F/F 313. If the F/F 313 is under the set condition, no operation is performed. If the F/F 313 is under the reset condition, the condition that the flash pop is performed is discriminated by a gate 346 in the select gate SG5 and the data in the shift register SR7 is rewritten as "5".

At the timing of the control pulse E, the content of the shift register SR7 is compared in the magnitude comparing circuit DCMP with the stationary data from an output line OR24 of the data storing table PLA2, that is, the constant "31". The obtained result is output to the F/F 313 during the timing of the control pulse F.

At the timing of the control pulse F, the operation is performed according to the condition of the F/F 313. If the F/F 313 is under the set condition, all of the data in the shift register SR7 is made "0". If the F/F 313 is under the reset condition, the data in the shift register SR7 is complement-converted except for the MSB. This data conversion is performed through gates 349 and 345 of the data converting circuit CMPL in FIGS. 21-17, 21-18, 21-23 and 21-24. This conversion is made such that control data is "0" when the distance data is more than "31" (closest), and is "31" when the distance data is "0" (infinite distance). This data conversion is to accomplish a correspondence between the control data and the control of the photographic lens which is being displaced from the closest toward the infinite distance.

When the REF/F is not set, the data in the shift register SR7 is not converted. Instead, the stationary data, that is, the fixed point data "21" or "27" from an output line OR21 or OR22 of the data storing table PLA2 is used. Different values of the stationary data are set for the flash pop and non-pop.

The status CC6, that is, the sequence discrimination mode, is a mode which is selected when the switch SW2 operative in cooporation with the second stroke of the shutter release button is depressed and the PHF/F in FIGS. 21-27, 21-28, 21-33 and 21-34 is set. In this mode, the terminal SELF which is made low level for self-timer photography, the SEF/F which is set after completion of the counting of the self-timer, the REF/F which is set when the distance measurement is obtained, and the content of the counter CNT3 which counts the number of distance measuring operations after the power is maintained, are judged to determine which status is to be executed next.

When logical values as shown in the truth table in FIG. 55 are established, the corresponding statuses are entered. FIG. 56 shows the timing chart of the status CC6 and the logical judgement.

The number N in the counter CNT3 is determined by the storage time of the time when this mode is first entered during repetitive photography in the continuous photography mode after the power is turned on; it is set to be "2", "3", or "5".

In the status CC7, that is, in the self-timer counting mode, the self-timer time is counted in seconds. For counting the self-timer time, the timing pulses TB5 are counted from "0" to "109170" by serially connecting the counters CNT1, CNT2, and CNT3. The count in this case is 9.9 seconds.

During the counting of the self-timer, the status of the terminal SELF in FIGS. 21-27, 21-28, 21-33 and 21-34 is constantly checked by a gate 256 in FIGS. 21-15, 21-16, 21-21 and 21-22. When the terminal SELF becomes high level, the PHF/F is reset through a gate 207. The sequence then returns to the status CC1 and the self-timer operation is released.

During the self-timer counting, rectangular pulses of 2.7 kHz frequency are output at a frequency of 1.3 Hz to the terminal BZ in FIGS. 21-1, 21-2, 21-7 and 21-8 from the count "0" to "81919", that is, during the initial 7.5 seconds. Rectangular pulses of 2.7 kHz are output at a frequency of 5.2 Hz to the terminal BZ during the count of "81920" to "109170", that is, during the remaining 2.5 seconds.

After the above operation is completed and the counters CNT1, CNT2, and CNT3 count "109170", the SEF/F is set and the sequence returns to the status CC1.

FIG. 57 is a timing chart of the operation in the status CC7.

In the status CC8, that is, in the lens control mode, the counters CNT1 and CNT3 are connected serially to count the timing pulses TB5. The counter CNT2 is used to count the on-and-off of the pulses which are input from the input terminal LP of FIGS. 21-25, 21-26, 21-31 and 21-32 as the photographic lens is displaced.

During the 8-word period in which the content of the counters CNT1 and CNT3 is "0" to "7", the signals are output from the terminal SST in FIGS. 21-3, 21-4, 21-9 and 21-10 to the exposure system circuit IC3 to energize the electromagnetic shutter coil SCL for 732 μsec- At the timing of the count "7", the level of the terminal LB in FIGS. 21-27, 21-28, 21-33 and 21-34 is detected. If it is high level, the battery voltage is judged to be sufficient and the sequence continues. If it is, on the other hand, low level, the battery voltage is judged to be too low and the sequence jumps to the status CC13. A gate 228 in FIGS. 21-27, 21-28, 21-33 and 21-34 is involved in this operation.

When the count becomes "8", signals are output through the logic circuit consisting of a gate 163 and the output line R74 of the decoder PLA1 of FIGS. 21-3, 21-4, 21-9 and 21-10 so that the terminal MG of FIGS. 21-17, 21-18, 21-23 and 21-24 is low level and a high level output is provided to a gate 317. At this instant, since the LPF/F in FIGS. 21-27, 21-28, 21-33 and 21-34 is under the reset status, the output of a gate 316 of FIGS. 21-17, 21-18, 21-23 and 21-24 is made high level. Therefore, a low level output is produced from the terminal MG through the buffer circuit MGB (inverter 373).

In this mode, the input to the terminal LP is selected as the input to the chattering absorbing circuit CAB by the select gate circuit SG8 consisting of the gates 59, 61 and 62 in FIGS. 21-25, 21-26, 21-31 and 21-32, so that the output of the gate 68 is of high level before the terminal MG becomes low level. In the beginning of this mode, the terminal LP is high level and the output of the select gate circuit SG8 is low level. Therefore, the chattering absorbing circuit CAB waits after counting "3".

When the terminal MG becomes low level, both the start magnet STMG and the automatic focusing magnet AFMG (FIG. 3) are energized. Thus, the photographic lesns starts to be displaced, and the terminal LP is brought into contact with the contact to the pulse plate PC through the brush BR in FIG. 3 to immediately make the output of the gate 68 low level. Then, pulses are output from the gate 73 for a 1-word period to set the LPF/F through a gate 199 in FIGS. 21-27, 21-28, 21-33 and 21-34. If either the start magnet STMG or the automatic focusing magnet AFMG is defective, the photographic lens is not displaced or the stopper ST slips in the stop pawl 5'a before the terminal LP is brought into contact with the pulse plate PC through the brush BR. Thus, pulses are not produced from the gate 73 and the LPF/F is not set.

When the LPF/F is set, the output of the gate 316 depends upon the output of the F/F 313 of the magnitude comparing circuit DCMP. The counter CNT2 receives at the clock input the output of the gate 73 through gates 143 and 138 in FIG. 21D in order to count the pulses from the gate 73. The output of the counter CNT2 is supplied to the magnitude comparing circuit DCMP through gates 318 and 325 in the select gate circuit SG6 in FIGS. 21-17, 21-18, 21-23 and 21-24 from the shift register PSR1, and is compared with the control data from the shift register SR7 which is input through gates 324 and 326 in the select gate circuit SG7 or the fixed point data from the data storing table PLA2 which is input through gates 391 and 326. The comparison result obtained is output to the F/F 313.

When the data from the shift register PSR1, that is, the data corresponding to the displacement of the photographic lens, is small, the output of the F/F 313 is high level and the terminal MG is at low level. When the count of the counter CNT2 increases and the data from the shift register PSR1 is shifted to equal the fixed point data or the data in the shift register SR7 as the photographic lens is displaced farther, the output of the F/F 313 becomes low level and the terminal MG changes to high level. Consequently, both the start magnet STMG and the automatic focusing magnet AFMG are de-energized and the photographic lens stops its movement.

When the output of the F/F 313 becomes low level, the sequence advances to the subsequent status CC9 by gates 259 and 260 in FIGS. 21-3, 21-4, 21-9 and 21-10 and gate 197 in FIGS. 21-27, 21-28, 21-33 and 21-34.

This mode is limited to the case where a certain extra time may be allowed for the entire movement of the photographic lens. If the output from the terminal MG does not become low level after 2041 counts, that is, after 187 msec has elapsed, it is judged that there has been some kind of accident such as a disconnection of the magnet STMG or AFMG, blocking of the displacement of the photographic lens, or low displacing speed of the photographic lens. For this purpose, the setting or resetting condition of the LPF/F is discriminated by gates 197 and 198 in FIGS. 21-27, 21-28, 21-33, and 21-34. If the LPF/F is under the set status, the sequence advances to the next status CC9. If the LPF/F is under the reset condition, the sequence advances to the status CC13.

The timing chart in various operating conditions in this mode is shown in FIG. 58.

In the status CC9, that is, the shutter control mode, the counters CNT1 and CNT2 are connected serially to count the timing pulses TB5 as well as to exchange signals with the exposure system circuit IC3 for shutter control.

The 256-word period wherein the contents of the counters CNT1 and CNT2 change from "0" to "255", that is, 23.424 msec, is for the stabilizing time after the lens control in the status CC8.

The sequence advances from the status CC8 wherein the lens control is performed to the status CC9 simultaneously as the output of the F/F 313 in the magnitude comparing circuit DCMP in FIGS. 21-17, 21-18, 21-23 and 21-24 becomes low level and the automatic focusing magnet AFMG is deenergized. In this case, the photographic lens is not completely stabilized at the controlled position due to various factors such as response delay of the mechanism or the like. A picture of good quality may not be taken if the shutter control is immediately performed. Therefore, extra time must be taken until the photographic lens is stabilized. The 23.424 msec described above is used for this purpose.

Upon energizing of the start magnet STMG, the winding completion detecting switch SW5 is transferred from the incomplete winding side, that is, the side of the terminal B, to the complete winding side, that is, the side of the terminal A. When this is not performed normally, since the winding motor M is kept short-circuited in the subsequent status CC10, that is, in the winding mode, a short-circuiting current instantaneously flows to adversely affect the system and the winding of the film may not be performed. If the shutter control is to be performed directly, the winding is not performed. Moreover, in the next photographing operation, multi-exposure within one frame of the film occurs. Therefore, it is necessary to check the winding completion detecting switch SW5 immediately before shutter control. This checking must be performed with a delay corresponding to the response delay of the mechanism from the time at which the start magnet STMG is energized. If the data in the shift register SR7 is small in the status CC8, the output of the F/F 313 becomes low level before the transfer of the winding completion detecting switch SW5. Since the sequence then immediately advances to the status CC9, the winding completion detecting switch SW5 is checked after the delay time of 23.424 msec described above has elapsed in the status CC9.

If the terminal SW5 of the winding completion detecting switch SW5 is detected to be at high level, the sequence immediately advances to the status CC13 and the subsequent operations are all stopped. If this occurs after the start magnet STMG is energized to displace the photographic lens, the camera will not operate thereafter, as will be described hereinafter. The parts involved in this operation are the output line R79 of the decoder PLA2 of FIGS. 21-3, 21-4, 21-9 and 21-10 and a gate 227 in FIGS. 21-27, 21-28, 21-33 and 21-34.

From the 257th word, an output of high level is supplied from the terminal SST in FIGS. 21-3, 21-4, 21-9 and 21-10 to the exposure system circuit IC3 to start energizing the electromagnetic shutter coil SCL. When the energizing of the electromagnetic shutter coil SCL starts, the shutter blades begin to open after a certain period during which they overlap. During this overlapping period, the auxiliary aperture first closes the opening for detecting low luminance (camera shake) and then gradually opens in synchronism with the opening action of the shutter blades. The time difference between the output from the terminal SST and the output from the terminal LBC is 56 words, 51.3 msec.

During this timing of the closure of the auxiliary aperture, an output of high level is produced from the terminal LBC to the exposure system circuit IC3 to start the exposure control. Simultaneously, the status of the terminal LB in FIGS. 21-27, 21-28, 21-33 and 21-34 is determined. When the terminal LB changes from low to high level, the exposure is considered to be appropriate and the terminals SST and LBC are made low level. The sequence thus advances to the next status CC10. Thus, the electromagnetic shutter coil SCL is energized, and the shutter blades begin to be closed by the biasing force of the spring.

In this mode, the sequence unconditionally advances to the status CC10 after a certain period of time has elapsed even though the terminal LB is at low level. This period of time varies according to the level of the terminal POP. When the terminal POP is at high level, this period corresponds to the 5761st word (count 5760) of the status CC9, that is, about 500 msec after the terminal SST becomes high level. When the terminal POP is low level, this period corresponds to the 577th word of the status CC9, that is, about 29.4 msec after a terminal SST1 becomes high level.

The signal SST is supplied to the TRF/F in FIGS. 21-1, 21-2, 21-7 and 21-8 which receives as the clock input the inverted timing pulses NTB5; the signal SST is also supplied through an inverter to a gate 83 to which is input the output of the TRF/F. Therefore, the gate 83 produces a signal of high level for a 1-word period from the time of the trailing edge of the signal SST, which is input to a terminal TRI through the output buffer circuit TRIB (buffer 74). This signal is supplied to the flash circuit as a trigger signal. The TRF/F is directly reset in the status CC0. The TRF/F is constantly placed under the reset condition if the terminal POP is at high level. Therefore, signals are not produced from the terminal TR1 except when the flash is popped.

According to the principle of the status CC9, the output line R77 of the decoder PLA1 in FIGS. 21-3, 21-4, 21-9 and 21-10 is involved in the waiting time for the stabilization of the photographic lens; and the output line R78, gates 165 and 263, and a buffer 264 (output buffer circuit SSTB) are involved in the output from the terminal SST. For the checking of the winding completion detecting switch SW5, the output line R79 of the decoder PLA1 and the gate 277 in FIGS. 21-27, 21-28, 21-33 and 21-34 are involved. For the LBC output, output lines R80 and R81 of the decoder PLA1, gates 166, 174 and 262, an F/F 306, and a buffer 265 (output buffer circuit LBCB) are involved. For the time limit determined according to the high or low level of the terminal POP, the output lines R82 and R83 of the decoder PLA1 and gates 170 to 172, and gates 224 and 225 in FIGS. 21-27, 21-28, 21-33 and 21-34 are involved. The sequence is controlled according to the condition of the signal which arrives first between the signal from the terminal LB and the time limit signal, by checking the input to the terminal LB by the gate 224. The timing in this mode is as shown in FIG. 59.

In status CC10, that is, in the winding mode, the counters CNT1, CNT2, and CNT3 are serially connected to count the timing pulses TB5 and to output a signal for energizing the film winding motor M.

This mode is selected when the switch SW5 is discriminated to be low level, that is, at the incomplete winding side, in the status CC1; and when the shutter control is terminated in the status CC9. These two conditions may be differentiated by checking whether the PHF/F is reset (former case) or set (latter). In the case of the former, this may be utilized for idle winding immediately after mounting the film by mechanical means and forcibly setting the switch SW5 at low level. Therefore, the jump mode after completion of this mode is different.

In this mode, 266 words from "0" to "255" of the counters CNT1 to CNT3, that is, 23.424 msec, is used as the closing time of the shutter blades after the shutter blades are energized.

The transfer from the status CC9 in which the shutter control is performed to the status CC10 is performed simultaneously with the de-energizing of the electromagnetic shutter coil SCL when the output from the terminal SST becomes low level. Since the shutter blades are still open in this case, the immediate winding operation after this results in a blurred photograph. Therefore, extra time for full closure of the shutter blades must be considered in this mode, and the 23.424 msec described above is utilized for this time.

From the 257th word of this mode, an output of high level is supplied to the terminal WUP in FIGS. 21-3, 21-4, 21-9 and 21-10 to energize the film winding motor M. Simultaneously, the level of the terminal SW5 is checked through the chattering absorbing circuit. When this terminal is at high level, the sequence changes from the status CC11 to the status CC13. The transfer to the status CC11 is selected when this routine is executed when the PHF/F is set. The transfer to the status CC13 is selected when this routine is executed when the PHF/F is reset.

Since the film winding motor M is operated in this mode, a wind-up trouble or stoppage of the motor M due to tension at the film end may occur, since this imposes an extra load on the motor power source, if the terminal of the switch SW5 is not made high level after a certain period of time has elapsed, the sequence advances to the status CC12 in this mode to de-energize the motor M. The time limit in this case is at the 20481st word (count 20480) of the mode, and the time for making the terminal WUP high level is 1.85 seconds.

As for the principle of the status CC10, the output line R85 of the decoder PLA1 is involved in the waiting time of the shutter closure, and the output lines R84 an R85 of the decoder PLA1 and a gate 167 are involved in the WUP output. The checking of the winding completion detecting switch SW5 is discriminated by a gate 226 in FIGS. 21-27, 21-28, 21-33 and 21-34. The gates 367 and 366 discriminate the setting and resetting of the PHF/F and determine the advance of the sequence to the status CC11 or to the status CC13. The time limiting operation is discriminated by the output line R87 of the decoder PLA1 and determines, through a gate 222 in FIGS. 21-27, 21-28, 21-33 and 21-34, the advance of the sequence to the status CC12. The timing chart in this mode is shown in FIG. 60.

The status CC11, that is, the winding completion mode, will not be described. This mode is entered when all the operations are performed normally. This mode is controlled by serially connecting the counters CNT1 and CNT2 while counting the timing pulses TB5. When this mode is entered, the resetting signal is simultaneously supplied from the output line R88 of the decoder PLA1 in FIGS. 21-3, 21-4, 21-9 and 21-10 to the PHF/F through a gate 169. Therefore, if the switch SW1 is not depressed when this mode is entered, all the operations of the camera are terminated.

In contrast with this, if the switch SW1 is not depressed at this instant, the level of the terminal POP is discriminated by a gate 221 in FIGS. 21-27, 21-28, 21-33 and 21-34 at the 257th word (count 256). If the terminal POP is at high level, the sequence returns to the status CC0. However, if the terminal POP is at low level, that is, the flash pop, the status is fixed at this mode and the discrimination of the level of the terminal POP is repeatedly performed at every 257th word.

A waiting time of 23.5 msec is included in this mode as a time for executing the status CC0 after completing the winding, that is, for allowing the stabilization of the mechanism during continuous photography. The timing chart of the operation in this mode is as shown in FIG. 61.

The status CC12, that is, the alarm mode, will now be described. This mode is entered when the terminal SW5 does not become high level due to some trouble or when the film reaches the end in the status CC10. This mode is controlled by serially connecting the counters CNT1, CNT2, and CNT3 and counting the timing pulses TB5. In this mode, since the resetting signal is supplied to the PHF/F to the output line R89 of the decoder PLA1 through the gate 169 at the 53249th word (count 53248), that is, after 4.87 seconds, the operation terminates at this instant if the switch SW1 is not depressed at this instant. On the other hand, if the switch SW1 is depressed, the status is fixed at this mode while the PHF/F is reset. The timing chart in this mode is as shown in FIG. 62.

In this mode, the pulse signal for driving the sound generator is output from the terminal BZ. The waveform of the pulse signal is as shown in FIG. 63. The pulse signal is output from the output line R91 of the decoder PLA1 through a gate 79 and a buffer 75 (output buffer circuit BZB) in FIGS. 21-1, 21-2, 21-7 and 21-8.

This alarm mode is to indicate the film end or wind-up trouble by an alarm sound to signal the need for rewinding or replacement of the film.

Finally, the alarm mode will now be described. This mode is entered when the discrimination is made in the status CC1 to the effect that the battery voltage is low or the electromagnetic shutter coil SCL is disconnected, when the discrimination is made in the status CC8 to the effect that the battery voltage is low or the magnets STMG and AFMG are not normally operating, when the transfer of the winding completion detecting switch SW5 is not confirmed in the status CC9, or when the status CC10 is executed while the PHF/F is reset.

Since the PHF/F for holding the power source is immediately reset, all of the control operations are released unless the switch SW1 is being depressed. If the switch S1 is being depressed, the status is fixed at this mode while the PHF/F is kept reset.

Under the condition for entering this mode, even if the switch SW1 or SW2 is turned on, this mode is immediately entered and no operation is performed except in the case of the defective automatic focusing magnet AMFG. In the case of the defective automatic focusing magnet AFMG, only the winding is performed when the switch SW1 is turned on, and then the alarm mode is entered.

When this mode is entered in the idle winding of the film or while the PHF/F is reset, and when the sequence is transferred to the status CC11 as in the case of the normal winding completion condition, the photographing operation may be performed according to continuous photography if the switch SW2 is being depressed. This mode is intended to insert a pause in the series of operations. The timing chart of this mode is as shown in FIG. 64.

The series of operations in the statuses CC0 to CC13 as described above may be summarized as shown in FIGS. 65-1 to 65-8, 66-1 to 66-7 and 67-1 to 67-3.

The camera control circuit IC1 has various terminals for exchange of signals with external equipment. The functions of the various terminals will be described briefly hereinbelow.

The quartz oscillator XL is connected to the terminals CG1 and CG2. As the detail is shown in FIG. 68, the quartz oscillator may be removed and clock pulses may be supplied externally at the terminal CG1

The power-up clear capacitor C9 is connected to the terminal PU as shown in FIG. 69 to obtain the power-up clear signals for a period of time which is determined by the time constant for internal resistor r1 with the capacitor C9, and by the VTH of the inverter buffer 51 of the timing circuit CLK-G FIGS. 21-29, 21-30, 21-35 and 21-36. During the battery check, this terminal is kept at the GND potential by the battery check switch (BC, SW) SW 11. Referring to the figure, power source voltage VDD is applied from the DC-DC converter DCC (FIG. 9). Reference voltage VSS is at GND potential.

Signals are output at the respective terminals ND, MD and FD through respective inverter buffer circuit 374, 375, and 376 (FIGS. 21-17, 21-18, 21-23 and 21-24) of the output buffer circuits NDB, MDB, and FDB. The electrical connections are as shown in FIG. 70. When the distance data is calculated according to a distance measuring sequence, the output of the terminal corresponding to the calculated distance data becomes low level. This signal output is produced after the number of coincident bits is above the minimum allowable number of coincident bits in status CC6.

The relationship between the calculated distance and the levels of the respective terminals is as shown in FIG. 71.

The transfer clock pulses ∅1 to ∅4 for the image sensor IS as shown in FIG. 31 are output to respective terminals ∅1 to ∅4 through the buffers 48, 49, 47 and 50 (FIGS. 21-29, 21-30, 21-35 and 21-36) in an output buffer circuit CLB. The resetting pulse RS for the image sensor IS is output to the terminal RS through the buffer 46 in the output buffer circuit CLB immediately before the leading edge of the transfer clock pulses ∅2 and ∅4. The waveform of these pulses is as shown in FIG. 72. The shift pulse SH for the image sensor IS, that is, the read-out initiating pulse, is output to a terminal SH through the output buffer circuit SHB (buffer 176 of FIGS. 21-3, 21-4, 21-9 and 21-10). The timing of this pulse is as shown in FIG. 73. The charge clear signal ICG for the image sensor IS is output to a terminal ICG through the output buffer circuit ICGB (buffer 179 of FIGS. 21-3, 21-4, 21-9 and 21-10). The period of low level of the charge clear signal ICG corresponds to the storage time, and its timing is as shown in FIG. 74.

Figure 75:
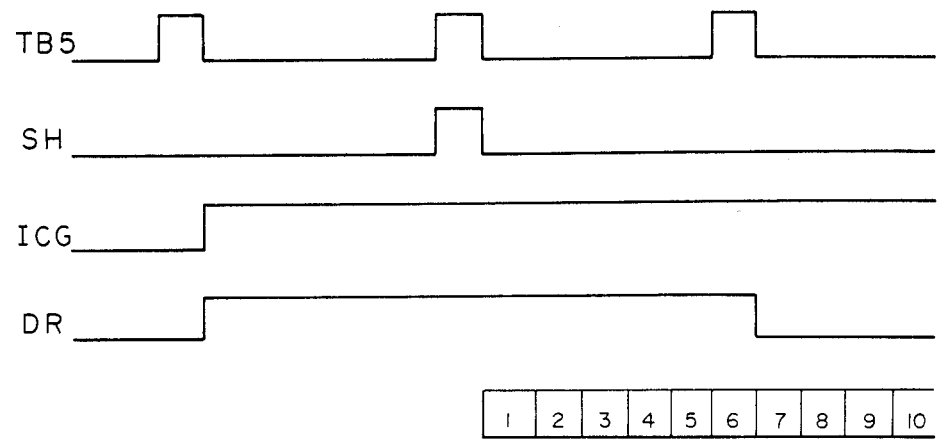
Figure 76:
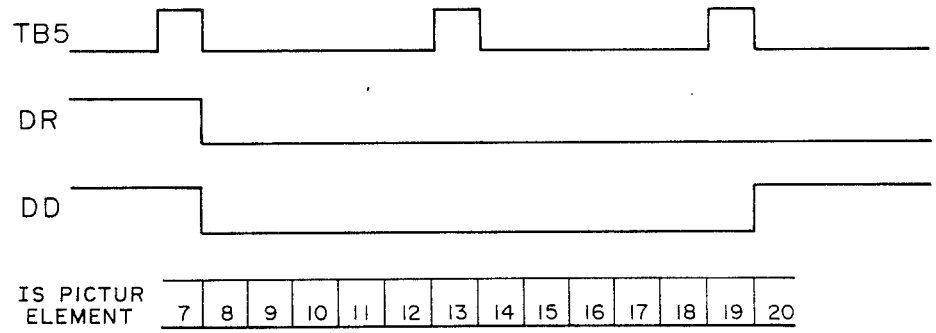
Figure 79:
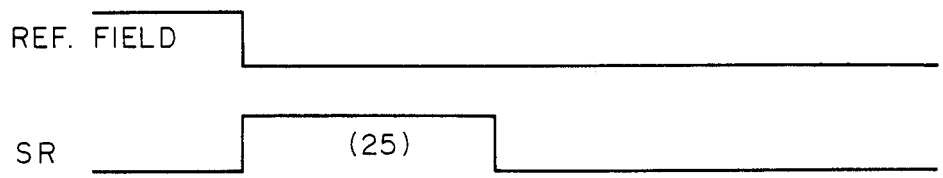
Figure 80:
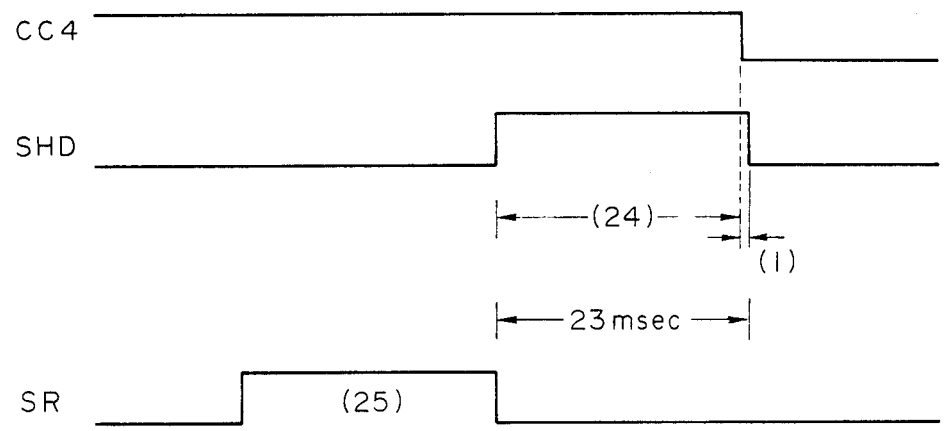

The dark resetting pulse DR of high level for the dark holding circuit DHC (FIG. 12) built in the analog processing circuit IC2 is output to a terminal DR for a period of 2 words through the output buffer circuit DRB (buffer 178 of FIGS. 21-3, 21-4, 21-9 and 21-10). The timing of this pulse is as shown in FIG. 75. The dark detecting signal DD of low level for the dark holding circuit DHC is output to the terminal DD for a period of 2 words through the output buffer circuit DDB (inverter buffer 177 of FIGS. 21-3, 21-4, 21-9 and 21-10). The timing of this pulse is as shown in FIG. 76. The peak resetting signal PR of high level for the peak detecting circuit PDC (FIG. 12) built in the analog processing circuit IC2 is output for a period of 5 words to a terminal PR through the output buffer circuit PRB (buffer 266 of FIGS. 21-3, 21-4, 21-9 and 21-10). The timing of this pulse is as shown in FIG. 77. The peak detecting signal PD of low level for the peak detecting circuit PDC is output for a period of 8 words to a terminal PD through the output buffer circuit PDB (inverter buffer 267 of FIGS. 21-3, 21-4, 21-9 and 21-10). The timing of this pulse is as shown in FIG. 78. The sampling and resetting signal SR for the peak holding circuit PHC built in the analog processing circuit IC2 is output for a period of 25 words to a terminal SR through the output buffer SRB (buffer 268 of FIGS. 21-3, 21-4, 21-9 and 21-10). The timing of this pulse is as shown in FIG. 79. This sampling and resetting signal SR begins to be output simultaneously with the completion of the read-out of the reference field of view B. The sampling and holding signal SHD of low level for the peak holding circuit PHC is output for a period of 25 words to a terminal SHD through the output buffer circuit SHDB (inverter buffer 269 of FIGS. 21-3, 21-4, 21-9 and 21-10). The timing of this pulse is as shown in FIG. 80. The sampling and holding signal SHD is output next to the sampling and resetting signal SR for a total period of 25 words: 24 words in the status CC4 and 1 word in the status CC5.

To the terminal DV is input binary image data obtained by binary encoding at a slicing level (obtained by multiplyig the peak value by a constant smaller than 1, such as 0.8) set according to the peak value of the image signal of the standard field of view A held by the peak holding circuit PHC in the analog processing circuit IC2.

The terminal ITU is a terminal for receiving a discrimination signal from the analog processing circuit IC2, which discriminates whether or not the charge storage time of the image sensor IS is short. The discrimination is input at high level at the end of the status CC4 when the peak value held in the peak holding circuit PHC is determined by the analog processing circuit IC2 to be smaller than the predetermined lower limit. This high level is established in the analog processing circuit IC2 at the end of the status CC4. However, in the camera control circuit IC1, this high level is detected by the flash pulse for change of the storage time, and the data in the storage time setting shift register ITSR is shifted to the left.

The terminal ITO is a terminal for receiving a discrimination signal from the analog processing circuit IC2, which discriminates whether or not the charge storage time of the image sensor IS is long. This discrimination signal is input at high level when the peak value held in the peak holding circuit PHC is determined by the analog processing circuit IC2 to be greater than a predetermined upper limit. The timing of this signal is the same as in the case of the terminal ITU. This discrimination signal is detected by the flash pulse for changing the storage time by the camera control circuit IC1, and the data in the storage time setting shift register ITSR is shifted to the right.

Figure 81:
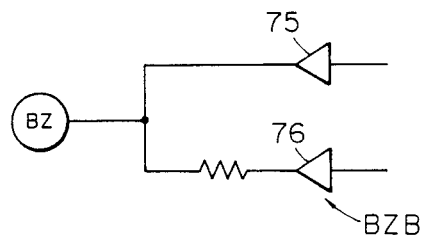

The terminal BZ is a terminal for driving a sound generator such as a piezoelectric buzzer in the case of the battery check, the camera shake alarm, the self-timer operation, and the wind-up trouble (including tension on the film at the film end). The output buffer circuit BZB is so constructed that the volume of the second output may be varied in the output mode. The detail of the output buffer circuit BZB is as shown in FIGS. 21-1, 21-2, 21-7 and 21-8. A resistor is connected in series with the buffer circuit BZB in order to reduce the sound volume during the camera shake alarm. The basic construction of the output buffer circuit BZB is as shown in FIG. 81. The waveforms of the outputs from the terminal BZ in the respective output modes are shown in FIG. 82.

The terminal MG is a terminal for outputting a signal for starting or interrupting displacement of the photographic lens and is normally at high level. When it becomes low level, both the start magnet STMG for starting the displacement of the photographic lens and the automatic focusing magnet AFMG for interrupting the displacement are energized.

Figure 83:
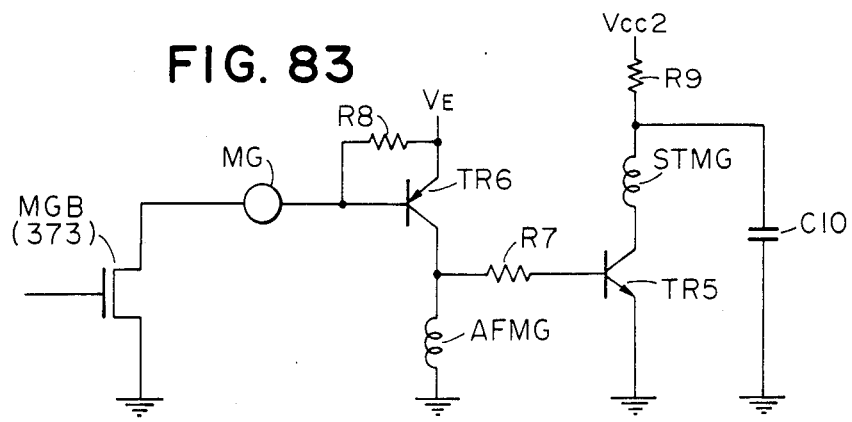

As has been described with reference to FIG. 3, when the spring SP1 for biasing the photographic lens 4 from the closest position to the infinite distance position is under biased condition and when the photographic lens 4 is at the reference position, the start magnet STMG holds the lens by its permanent magnetic force and the automatic focusing magnet AFMG does not attract the stopper ST toward the photographic lens 4 if the terminal MG is at high level. When this terminal becomes low level under this condition, both the start magnet STMG and the automatic focusing magnet AFMG are energized, so that the permanent start magnet STMG is de-magnetized and the automatic focusing magnet AFMG attracts the stopper ST. Therefore, the photographic lens 4 starts to be displaced toward the infinite distance position by the biasing force of the spring, and the position counting process for comparing the position of the photographic lens with the control data based on the distance measurement is started. When the photographic lens 4 reaches the control position, this terminal becomes high level. Then, the automatic focusing magnet AFMG is de-magnetized to release the attracting force of the stopper ST, so that the photographic lens 4 is stopped at the control position. Although the start magnet STMG is also de-energized, it does not lose its holding effect until the next charging operation. The output buffer circuit MGB (inverter buffer 373) for outputting the signals to the terminal MG is as shown in FIG. 83.

The terminal TR1 is a terminal for outputting the light-emitting trigger signals for the flash circuit through the output buffer circuit TRIB (buffer 74). From this terminal are output signals of high level for a period of 1 word after the signal SST is turned off during the exposure control in the status CC9. The configuration of the output buffer circuit TRIB is as shown in FIG. 84, and the timing chart for it is as shown in FIG. 85.

Figure 86:
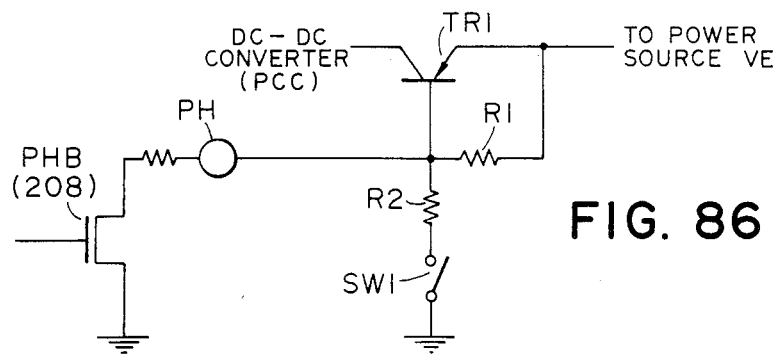

The terminal PH is a terminal for outputting signals for energizing the power maintaining transistor TR1 through an output buffern circuit PHB (inverter buffer 208). The configuration of this buffer circuit PHB is as shown in FIG. 86.

The terminal WUP is a terminal for outputting signals for energizing the transistor TR4 for the electronic winding motor M through and output buffer circuit WUPB (buffer 270). The configuration of the buffer circuit WUPB is as shown in FIG. 87.

The terminal SELF is a terminal which is short-circuited to the GND side when connected to an external switch (self-timer switch SW8) as shown in FIG. 88. When this terminal is at the GND potential, the distance measurement is performed in the continuous distance measuring mode, and the self-timer counting is initiated at the second stroke of the shutter release button.

When the terminal SW2 is a terminal which is connected to an external switch (second switch SW2) as shown in FIG. 89 and is short-circuited to the GND side at the second stroke of the shutter release button. When this terminal is at the GND side, the camera performs a series of camera control operations including self-timer counting, distance measuring operation, lens control, shutter control, film winding and so on. The power source is simultaneously maintained.

The terminal POP is a terminal which is connected to an external switch (flash pop switch SW7) as shown in FIG. 90 and is short-circuited to the GND side in the case of flash pop. The camera performs the operations such as limiting of the exposure time or far distance limiting as a result of fixed point determination wh en the distance cannot be measured.

The terminal SW5 is a terminal which is connected to a switch which is in turn switched over according to the operation of an external switch (winding completion detecting switch SW5) as shown in FIG. 91, the external switch being operated according to the winding condition and the operation of the start magnet STMG. This terminal is open until the start magnet STMG operates under the complete winding condition. This terminal is short-circuited to the GND side during the period of time from when the start magnet STMG operates to the time when the film winding is completed. The camera control circuit IC1 performs the discrimination of the operating conditions of the camera according to the level of this terminal. The input to this terminal is received in the system through the chattering absorbing circuit CAB shown in FIGS. 20-1 to 20-4, 21-25, 21-26, 21-31 and 21-32.

The terminal LP is a terminal for receiving, during the control of the photographic lens 4, the levels of the brush BR and the pulse plate PC described with reference to FIG. 3, which operate according to the displacement of the photographic lens. In this case, either of the brush BR or the pulse plate PC is connected to the GND side, and the other is connected to this terminal. External connections of the terminal LP are as shown in FIG. 92. As may be seen from this figure, this terminal receives the pulse input when the pulse plate PC rotates as the photographic lens 4 is being displaced. At first, the photographic lens 4 is latched at the closest position by the biasing force of the spring SP1. Under this condition, this brush BR is separated from the pulse plate PC, and the terminal is at high level. When the start magnet STMG and the automatic focusing magnet AFMG are energized under this condition, the photographic lens 4 starts to be displaced toward the infinite distance, the pulse plate PC rotates, and the terminal becomes low level. Then, the camera control circuit IC1 judges that the start magnet STMG and the automatic focusing magnet AFMG both have operated normally and starts the counting operation of the counter CNT2.

The count of the counter CNT2 is first "0", and is incremented by 1 when the terminal becomes high level. This count is incremented every time the terminal level changes from low to high or from high to low. When this count coincides with the control data, the output from the terminal MG to the start magnet STMG and the automatic focusing magnet AFMG is made high level to interrupt the displacement of the photographic lens 4. In this manner, the terminal LP is used for confirming the operation of the magnets STMG and AFMG and for detecting the position of the photographic lens 4 during the displacement of the photographic lens 4 by the biasing force of the spring SP1.

A terminal SC is an input/output terminal which is connected to the shutter coil SCL as shown in FIG. 93. When the shutter coil SCL with such a construction is disconnected, the output of a buffer 212 in the input buffer circuit IOSC is made high level. When the shutter coil SCL is normal, the output level from this terminal is less than the VTH of a buffer 213. When the shutter coil SCL is disconnected, the output level from this terminal becomes higher than the VTH of the buffer 213. The disconnection detection utilizes this fact.

During the last word of the status CC1, a current is supplied to the shutter coil SCL through a resistor r of 5 KΩ. In the case of a disconnection in the shutter coil SCL, this terminal becomes higher than the VTH. The disconnection of the shutter coil SCL is detected through the buffer 213 in this manner.

Finally, the terminals SST, LBC and LB are terminals for exchange of signals with the exposure system circuit IC3. The terminals SST and LBC are terminals for outputting signals for the exposure system circuit IC3 through the buffer circuits SSTB and LBCB (buffers 264 and 265) to the output terminal shown in FIGS. 21-3, 21-4, 21-9 and 21-10. The terminal LB is a terminal for inputting signals from the exposure system circuit IC3 through the input buffer circuit INLB shown in FIGS. 21-27, 21-28, 21-33 and 21-34. The terminal SST is a terminal for the energizing command of the shutter electromagnet to the exposure system circuit IC2. The shutter electromagnet is made high level by making this terminal high level. The shutter electromagnet is de-energized by making this terminal low level. The terminal LBC is a terminal for providing an integration command to the photometric integrating circuit LMC (FIG. 17) of the exposure system circuit IC3. The integration is performed by making this terminal high level, and integration resetting is performed by making this terminal low level.

The terminal LB in the exposure system circuit IC3 is a terminal for selectively outputting, according to the levels of the terminal SST and the terminal LBC of the camera control circuit IC1, the outputs from the camera shake discrimination comparator CP4, the exposure determination comparator CP3, and the battery voltage discrimination comparator CP5 (all shown in FIG. 17) of the exposure system circuit IC3. The output logic is as shown in FIG. 94.

In summary, various advantages as will be described below may be obtained according to the characteristic features of the present invention:

(1) According to the first characteristic feature of the present invention, a camera is provided which has a distance detecting system for repeatedly detecting the object distance, and a photographic lens control system which performs focusing of the photographic lens on an object by interrupting the displacement of the photographic lens from a predetermined set position caused by actuator means when the photographic lens has reached a position specified by distance data obtained by the distance detecting system, wherein a control means is incorporated for prohibiting the displacement of the photographic lens to be caused by the actuator means until the effective distance data is obtained from the distance detecting system or until the number of distance detecting operations of the distance detecting system reaches a predetermined value. According to this characteristic feature, when performing the focusing of the photographic lens after the distance detection by the distance detecting system, camera operations supported by more efficient and effective sequence control can be achieved in terms of the ultimate end of the camera, photography, even when the effective distance data is not easily obtained, depending upon the photographing conditions, particularly the condition of the object.

In relation to this characteristic feature, a camera as in the case of the embodiment as described hereinabove is very advantageous in that the control of the photographic lens may be performed according to prefixed distance data which is prepared in advance, when effective distance data can not be obtained before the number of distance detecting operations of the distance detecting system reaches the predetermined value.

(2) According to the second characteristic feature of the present invention, the camera has an automatic focusing device which performs focusing of the photographic lens on an object by detecting whether or not the photographic lens has reached the in-focus position during the course of displacement from a predetermined set position by actuator means, and by interrupting the displacement of the photographic lens when the photographic lens has reached the in-focus position, wherein a sequence control means is incorporated such that timer means is operated at the same time as the initiation of the movement of the photographic lens and that the subsequent operating sequence is executed after the elapse of time which is determined by the timer means. According to this second characteristic feature, improved camera operation with the ultimate end of the camera, photography, can be achieved by the more effective sequence control since the operations for subsequent exposures can be accomplished even when there is a defect in a mechanical or electrical part involved in the control of the photographic lens. Therefore, the operator may not be subjected to unnecessary troubles, and the danger of camera shake is eliminated.

(3) According to the third characteristic feature of the present invention, the camera has an automatic focusing device which performs focusing on an object by detecting whether or not the photographic lens has reached the in focus position during the course of the displacement from a predetermined set position by actuator means, and by interrupting the displacement of the photographic lens when the photographic lens has reached the in-focus position, wherein a sequence control means is incorporated which controls the camera operation by detecting whether or not the photographic lens has actually begun displacement after the command for initiating the displacement of the photographic lens has been received by the actuator means, such that a predetermined subsequent sequence operation for photography is continued if the displacement has been started, or the sequence operation for photography is immediately interrupted if the displacement has not been started. According to this characteristic feature, waste of camera power can be prevented when there is a defect in a mechanical or electric part involved in the control of the photographic lens.

(4) According to the fourth characteristic feature of the present invention, a camera is provided having a distance detecting system with a digital counter means for detecting the object distance, wherein at least part of the digital counter means can be selectively used as a self-timer means. According to this fourthe feature, when adding a self-timer function as an additional feature to a camera which incorporates a distance detecting system with a digital counter means for detecting the object distance for automatic focusing of a photographic lens, no specific means for providing the self-timer function need be added. Therefore, the compact size of the camera is guaranteed, resulting in a more efficient camera.

(5) According to the fifth characteristic feature of the present invention, a camera with an automatic winding device is provided which has a sequence control means for controlling the camera operation by detecting whether or not the winding is completed before taking a photograph and by, when the winding is not completed, performing a predetermined sequence operation for photography after completing winding by operating the automatic winding device. According to this fifth characteristic feature, troubles resulting from the winding are prevented and correct photographing operation is guaranteed.

(6) According to the sixth characteristic feature of the present invention, a camera is provided having a device for allowing continuous photography while a shutter release button is being depressed, wherein a control means is incorporated for controlling the camera operation by detecting whether or not an electronic flash is used and by allowing only one photographic operation if the electronic flash is used. According to this sixth characteristic feature, in a camera which is capable of continuous photography while the shutter release button is kept depressed and which still allows the use of an electronic flash, photographing operations appropriate to in-use or not-in-use of the electronic flash can be accomplished, considering the fact that the electronic flash generally requires a very long time for charging before emission of light.

(7) According to the seventh characteristic feature of the present invention, a camera with a low luminance detecting means is provided wherein a sequence control means for controlling the camera operation is incorporated which detects whether or not an electronic flash is used and, if the electronic flash is used, performs a predetermined operation sequence for photography without performing low luminance detection by the low luminance detecting means. According to this seventh characteristic feature, in a camera which has a routine for low luminance detection and for generating an alarm in the sequence for exposure determination and which allows the use of an electronic flash, improved camera operation which is more suitable to the case wherein the electronic flash is used can be achieved by referring to the photographing conditions, that is, the use of the electronic flash, and by not executing unnecessary operations in the predetermined operation sequence set in the camera in advance.

(8) According to the eighth characteristic feature of the present invention, a camera is provided having an electromagnetically driven shutter which is driven by an electromagnetic means, wherein a battery checking means is incorporated which, in response to a battery check command, energizes the electromagnetic means for a short period of time such that the shutter does not open, to thereby check the battery voltage at this instant. According to this eight characteristic feature, a more correct battery check can be performed wit-out being accompanied by photographing operations.

It is very advantageous, as shown in the embodiment described hereinabove for achieving a more correct battery voltage check, to intermittently repeat the energizing of the electromagnetic means for a short period of time for checking the battery voltage.

(9) According to the ninth characteristic feature of the present invention, an automatic focusing camera is provided which has a lens control part wherein the start and stop of a photographic lens is controlled by respective electromagnets, and a common control signal is supplied to both these electromagnets such that the change from a first state to a second state of the control signal commands the electromagnet, for starting the photographic lens, to start the lens, and the change from the second state to the first state commands the electromagnet, for stopping the photographic lens, to stop the lens. According to this ninth characteristic feature, in an automatic focusing camera of the type wherein whether or not a photographic lens has reached the in-focus position with respect to an object is detected during the course of displacement of the photographic lens from a predetermined position in a predetermined direction, and the photographic lens is stopped at this in-focus position, an excellent control part for controlling the start and stop of the photographic lens, can be realized which is simple in construction which simplifies the control sequence, and which results in le-s erratic operation.

(10) According to the tenth characteristic feature of the present invention, a camera is provided which performs automatic focusing control of a photographic lens by comparing distance data obtained by distance measurement with lens position data indicative of the displaced position of the photographic lens, wherein the distance data obtained by taking the infinite distance as a reference is converted into lens position data taking the closest position as a reference such that the data can be converted into data suitable for the lens control, that is, unnecessary parts are omitted if not all of the distance data is necessary for lens control. According to thicharacteristic feature, any type of distance measuring system may be used in combination with a lens control system of totally different type. This is quite an advantageous feature.

(11) According to the eleventh feature, a camera with an automatic focusing system is provided which rejects distances outside the range allowing synchronous operation of the electronic flash when the distance data is correctly obtained as a result of distance measuring operation by an automatic distance measuring device when the camera is set in the flash photography mode, and which generates predetermined distance data within the predetermined range if the automatic distance measuring device has not correctly measured the object distance. According to this eleventh characteristic feature, an improved automatic focusing system for a camera for flash photography can be realized.

(12) Finally, according to the twelfth characteristic feature of the present invention, a camera is provided which has a device which detects an overload due to a wind-up trouble or tension at a film end and interrupts the operation of a winding device by stopping supply of power after the elapse of a predetermined period of time or the like, and which simultaneously generates an alarm (an alarm sound) which can be sensed by the operator. According to this twelfth characteristic feature of the present invention, improved measures against the wind-up troubles or the like can be provided in a camera with an automatic winding device.

Although not all of the advantageous features of the present invention are specifically described, various advantages are obtainable according to the various characteristic features recited in the description. The present invention is effective to solve various problems as described hereinabove.

What we claim is:

1. A camera comprising a distance detecting system for repeatedly detecting an object distance; a photographic lens control system for stopping the displacement of a photographic lens when said photographic lens reaches a position represented by distance data obtained by said distance detecting system, during the course of displacement from a predetermined set position of said photographic lens by actuating means; and controlling means for prohibiting initiation of the displacement of said photographic lens by said actuating means until effective distance data is obtained from said distance detecting system or until the number of distance detecting operations reaches a predetermined value.

2. A camera according to claim 1, wherein said signal integrating and storing type image sensor which is capable of arbitrarily controlling a signal integration time is provided in said distance detecting system as means for photoelectrically detecting an object image, and said controlling means is so constructed that said predetermined value of the number of distance detecting operations of said distance detecting system is varied according to the signal integration time set in said image sensor.

3. A camera according to claim 1, wherein a two-step shutter release button is provided, said distance detecting system is rendered operative upon depressing of said shutter release button to a first position, and said controlling means is so constructed as to prohibit initiation of the displacement of said photographic lens by said actuating means until said effective data is obtained from said distance detecting system or the number of distance detecting operations reaches said predetermined value, after depression of said shutter release button to a second position.

4. A camera according to any one of claims 1 to 3, wherein said control means is so constructed that said photographic lens displacement is performed according to prefixed distance data in case effective distance data are not obtained before the number of distance detecting operations of said distance detecting system reaches said predetermined value.

5. A camera comprising an automatic focusing device which performs focusing of a photographic lens on an object by detecting whether or not said photographic lens has reached an in-focus position with respect to said object during the course of displacement of said photographic lens from a predetermined set position by actuating means, and by stopping the displacement of said photographic lens when said photographic lens has reached said in-focus position; and sequence control means for controlling camera operation so as to detect whether or not said photographic lens has started displacement after a command for initiating the displacement of said photographic lens has been supplied to said actuating means, and to perform subsequent predetermined operation sequence for photography in a case where the initiation of the displacement of said photographic lens has been detected, or to immediately interrupt said predetermined operation sequence for photography in a case where the initiation of the displacement of said photographic lens has not been detected.

6. A camera according to claim 5, wherein said automatic focusing device comprises a distance detecting system which detects a distance to an object and outputs data on said object distance as digital data, and a photographic lens control system which stops the displacement of said photographic lens when a count of pulses obtained in association with the displacement of said photographic lens from said predetermined set position is brought into a predetermined relationship with said digital data on said object distance; and said sequence control means is constructed so as to detect whether or not the displacement of said photographic lens has actually been initiated, through detection of a first pulse of said pulses obtainable in association with the displacement of said photographic lens.

7. A camera according to claim 5, wherein said actuating means comprises electromagnetic means for initiating displacement of said photographic lens upon being energized by said photographic lens displacement initiating command; and said detection by said sequence control means of whether or not the displacement of said photographic lens has actually been initiated after reception of said command is also effective to detect a trouble in said photographic lens actuating electromagnetic means.

8. A camera according to any one of claims 5 to 7, wherein electromagnetic means for automatic focusing is provided in said automatic focusing device, which constrains stopper means for stopping said photographic lens upon being energized in synchronism with the operation of said actuating means and which releases said stopper means upon being deenergized to stop said photographic lens at said in-focus position when said photographic lens has reached said in-focus position, said stopper means being constructed to prohibit the substantial displacement of said photographic lens when said photographic lens is set at said predetermined set position; and the detection on whether or not the displacement of said photographic lens has actually been initiated upon reception of said command is also effective to detect a trouble in said automatic electromagnetic focusing means.

9. A camera according to claim 5 or 6, wherein said sequence control means includes means responsive to initiation of the displacement of said photographic lens to initiate the lens control operation of said automatic focusing device.

10. A camera according to claim 5 or 6, wherein said sequence control means performs the camera operation control based on the result of said detection after predetermined time has elapsed after said detection.

11. A camera according to claim 10, wherein said sequence control means includes means for controlling said predetermined time.

12. A camera according to claim 11, wherein said predetermined time is longer than the time required for said photographic lens to be displaced from said predetermined set position to a predetermined terminal position.

13. A camera comprising a distance detecting system for repeatedly detecting a distance to an object; a photographic lens control system for focusing a photographic lens on said object by stopping the displacement of said photographic lens when said photographic lens has reached a position indicated by distance data obtained by said distance detecting system, during the course of displacement from a predetermined set position caused by actuating means; and controlling means for prohibiting initiation of the displacement of said photographic lens by said actuating means until the number of distance detecting operations of said distance detecting system reaches a predetermined value.

14. A camera according to claim 13, wherein said distance detecting system has a signal integrating and storing type image sensor, whose signal integrating time is arbitrarily controllable, as means for photoelectrically detecting an image of said object, and said controlling means is capable of varying said predetermined value of the number of distance detecting operations of said distance detecting system according to the signal integrating time set in said image sensor.

15. A camera according to claim 13, wherein a two-step shutter release button is provided, said distance detecting sytem being operable upon depression of said shutter release button to a first position; and said controlling means prohibits initiation of the displacement of said photographic lens by said actuating means until the number of distance detecting operations of said distance detecting system reaches said predetermined value after the depression of the release button to a second position.

16. A camera according to any one of claims 13 to 15, wherein said controlling means is so constructed as to control said photographic lens according to prefixed distance data prepared in advance in a case where effective distance data are not obtained before the number of distance detecting operations of said distance detecting system reaches said predetermined value.

17. A camera according to claim 13, further comprising:
   a self-timer device; and
   means for switching over between a self-timer photography mode using said self-timer device and a normal photography mode which does not use said self-timer device, said controlling means being responsive to said switching means to establish different values, as said predetermined value, for said self-timer photography mode and said normal photography mode.

18. A camera according to claim 17, wherein said predetermined value in the self-timer mode is greater than that in the normal photography mode.

19. A camera for use with a flash device, further comprising:
   (A) shutter means for gradually increasing transmission of light when supplied with electricity and for blocking transmission of light when supply of electricity is stopped;
   (B) means for controlling the supply of electricity to said shutter means; and
   (C) means responsive to said controlling means for generating a trigger signal to said flash device in response to the stop of the supply of electricity to said shutter means by said controlling means.

* * * * *